United States Patent
Wankewycz et al.

(10) Patent No.: US 12,162,626 B2
(45) Date of Patent: Dec. 10, 2024

(54) UNMANNED VEHICLE

(71) Applicant: H3 Dynamics Holdings Pte. Ltd., Singapore (SG)

(72) Inventors: Taras Wankewycz, Singapore (SG); Matthew Mehmet Crawford, Singapore (SG); Cher Chuan Lee, Singapore (SG); Harshavardhan Thakar, Singapore (SG)

(73) Assignee: H3 Dynamics Holdings Pte. Ltd., Singapore (SG)

( * ) Notice: Subject to any disclaimer, the term of this patent is extended or adjusted under 35 U.S.C. 154(b) by 583 days.

(21) Appl. No.: 17/276,634

(22) PCT Filed: Sep. 18, 2019

(86) PCT No.: PCT/SG2019/050467
§ 371 (c)(1),
(2) Date: Mar. 16, 2021

(87) PCT Pub. No.: WO2020/060488
PCT Pub. Date: Mar. 26, 2020

(65) Prior Publication Data
US 2022/0041299 A1    Feb. 10, 2022

(30) Foreign Application Priority Data

Sep. 18, 2018 (SG) .......................... 10201808080T
Sep. 18, 2018 (SG) .......................... 10201808081R
Sep. 25, 2018 (SG) .......................... 10201808370R

(51) Int. Cl.
*B64F 1/28* (2006.01)
*B64D 27/24* (2006.01)
(Continued)

(52) U.S. Cl.
CPC ............... *B64F 1/28* (2013.01); *B64D 27/24* (2013.01); *B64D 37/14* (2013.01); *B64D 37/30* (2013.01);
(Continued)

(58) Field of Classification Search
CPC ............ B64F 1/28; B64U 50/32; B64D 37/30
See application file for complete search history.

(56) References Cited

U.S. PATENT DOCUMENTS 5,106,035 A    4/1992   Langford, III
5,593,640 A    1/1997   Long et al.
(Continued)

FOREIGN PATENT DOCUMENTS

CN    106276790    1/2017
CN    109250683    1/2019
(Continued)

OTHER PUBLICATIONS

HES Energy Systems Pte Ltd; Office Action for European patent application No. 19707897.5, mailed Jul. 12, 2023, 3 pgs.
(Continued)

*Primary Examiner* — Christopher P Ellis
(74) *Attorney, Agent, or Firm* — Taylor English Duma LLP

(57) ABSTRACT

The application provides an autonomous refueling vehicle for a hydrogen-electric aircraft, which includes two or more wings. The wings are provided with one or more removable electric propulsion pods. The autonomous refueling vehicle includes a hydrogen refueling module adapted to connect to the propulsion pods and to a hydrogen source. The autonomous refueling vehicle includes also includes a propulsion pod handling device, which is adapted to remove the propulsion pod from the wings and to position the propulsion pods on the hydrogen refueling module such that the pro-
(Continued)

pulsion pods are connected to the hydrogen refueling module. The autonomous refueling vehicle is also adapted to autonomously move itself to the hydrogen source to allow the hydrogen refueling module to removably connect to the hydrogen source for refueling of the propulsion pods.

12 Claims, 53 Drawing Sheets

(51) Int. Cl.
  *B64D 37/14* (2006.01)
  *B64D 37/30* (2006.01)
  *B64U 50/19* (2023.01)
  *B64U 50/31* (2023.01)
  *B64U 50/32* (2023.01)
  *B64U 10/14* (2023.01)
  *B64U 10/25* (2023.01)
  *B64U 101/30* (2023.01)

(52) U.S. Cl.
  CPC .............. *B64U 50/19* (2023.01); *B64U 50/31* (2023.01); *B64U 50/32* (2023.01); *B64U 10/14* (2023.01); *B64U 10/25* (2023.01); *B64U 2101/30* (2023.01); *B64U 2201/102* (2023.01); *B64U 2201/20* (2023.01)

(56) References Cited

U.S. PATENT DOCUMENTS

| | | | |
|---|---|---|---|
| 5,702,491 A | 12/1997 | Long et al. | |
| 7,966,945 B1 * | 6/2011 | Miller | B61C 7/04 |
| | | | 105/49 |
| 9,428,154 B2 * | 8/2016 | Mulato | B60L 50/64 |
| 9,701,284 B2 * | 7/2017 | Poillot | H01M 50/244 |
| 9,845,158 B2 | 12/2017 | Liske et al. | |
| 9,873,408 B2 | 1/2018 | Capizzo | |
| 10,501,193 B2 | 12/2019 | Oldroyd et al. | |
| 11,414,199 B2 | 8/2022 | Rainville et al. | |
| 11,420,757 B2 * | 8/2022 | Clarke | H01M 8/04701 |
| 11,420,761 B2 | 8/2022 | Thomas et al. | |
| 11,525,544 B2 * | 12/2022 | Clarke | B60L 53/80 |
| 2002/0171236 A1 * | 11/2002 | Joitescu | B60K 15/07 |
| | | | 280/834 |
| 2004/0028966 A1 | 2/2004 | Hibbs et al. | |
| 2005/0238573 A1 | 10/2005 | Zhang et al. | |
| 2007/0113921 A1 * | 5/2007 | Capizzo | B60L 53/80 |
| | | | 141/231 |
| 2008/0075987 A1 | 3/2008 | Kindler et al. | |
| 2009/0025293 A1 | 1/2009 | Patton et al. | |
| 2009/0198372 A1 | 8/2009 | Hammerslag | |
| 2010/0055517 A1 | 3/2010 | Uzhinsky et al. | |
| 2010/0065691 A1 | 3/2010 | Droney | |
| 2011/0008216 A1 | 1/2011 | Miki et al. | |
| 2012/0068008 A1 | 3/2012 | Buchheit | |
| 2012/0160957 A1 | 6/2012 | Gagne et al. | |
| 2013/0306797 A1 | 11/2013 | Dalle Donne et al. | |
| 2015/0118588 A1 | 4/2015 | Mclean et al. | |
| 2015/0123462 A1 | 5/2015 | Kamradt | |
| 2015/0125348 A1 | 5/2015 | Sugiyama et al. | |
| 2015/0207160 A1 | 7/2015 | Masetti-Placci et al. | |
| 2015/0353300 A1 | 12/2015 | Grossman | |
| 2016/0023897 A1 | 1/2016 | Gu | |
| 2016/0176533 A1 | 6/2016 | Cazals et al. | |
| 2016/0364989 A1 | 12/2016 | Speasl et al. | |
| 2017/0327091 A1 | 11/2017 | Capizzo | |
| 2017/0327219 A1 | 11/2017 | Alber | |
| 2018/0002026 A1 | 1/2018 | Oldroyd et al. | |
| 2018/0002027 A1 | 1/2018 | Mccullough et al. | |
| 2018/0041053 A1 * | 2/2018 | Capizzo | A63H 30/04 |
| 2018/0107219 A1 | 4/2018 | Harris et al. | |
| 2020/0277069 A1 | 9/2020 | Rainville et al. | |
| 2020/0313209 A1 | 10/2020 | Rainville et al. | |

| | | | |
|---|---|---|---|
| 2021/0050608 A1 | 2/2021 | Wankewycz et al. | |
| 2021/0269152 A1 | 9/2021 | Wankewycz et al. | |
| 2022/0041263 A1 | 2/2022 | Rainville | |
| 2022/0131214 A1 | 4/2022 | Wankewycz et al. | |
| 2022/0359901 A1 | 11/2022 | Madhusudan | |
| 2022/0393204 A1 | 12/2022 | Rainville | |
| 2023/0088830 A1 * | 3/2023 | Kim | B64F 5/40 |
| | | | 244/221 |
| 2023/0143288 A1 * | 5/2023 | Orchard | F17C 13/086 |
| | | | 244/135 R |
| 2023/0356856 A1 * | 11/2023 | Gilmore | B64D 37/08 |

FOREIGN PATENT DOCUMENTS

| | | | | |
|---|---|---|---|---|
| EP | 4032807 A1 * | 7/2022 | ............. | B60L 50/71 |
| FR | 3133890 A1 * | 9/2023 | | |
| GB | 970420 | 9/1964 | | |
| JP | 2009099534 | 5/2009 | | |
| JP | 2010265137 A | 11/2010 | | |
| KR | 101342599 | 12/2013 | | |
| KR | 1020180019276 | 2/2018 | | |
| KR | 20180019276 A * | 7/2022 | | |
| WO | 2007008891 | 1/2007 | | |
| WO | WO-2012013351 A1 * | 2/2012 | ............. | B64D 37/12 |
| WO | WO-2013177717 A1 * | 12/2013 | ............. | B60K 15/03 |
| WO | 2016105638 | 6/2016 | | |
| WO | 2017127022 | 7/2017 | | |
| WO | 2019151953 | 8/2019 | | |
| WO | 2019156627 | 8/2019 | | |
| WO | 2020003181 | 1/2020 | | |
| WO | 2020159443 | 8/2020 | | |
| WO | WO-2021231647 A1 * | 11/2021 | ............. | B60L 50/72 |
| WO | WO-2021231649 A1 * | 11/2021 | ............. | B60L 50/72 |
| WO | WO-2022250613 A2 * | 12/2022 | ............. | B60L 50/60 |
| WO | WO-2024015421 A1 * | 1/2024 | | |

OTHER PUBLICATIONS

Wankewycz, Taras; Requirement for Restriction/Election for U.S. Appl. No. 16/967,024, filed Aug. 3, 2020, mailed Jun. 20, 2023, 6 pgs.
H3 Dynamics Holdings Pte. Ltd.; Office Action for European Patent application No. 19826227.1, mailed Jul. 13, 2023, 5 pgs.
Wankewycz, Taras; Requirement for Restriction/Election for U.S. Appl. No. 17/427,500, filed Jul. 30, 2021, mailed Jun. 1, 2023, 10 pgs.
H3 Dynamics Holdings Pte. Ltd.; Office Action for Israel patent application No. 284918, mailed Jan. 7, 2024, 6 pgs.
HES Energy Systems Pte Ltd; Office Action for Singapore application No. 11202007367U, mailed Apr. 3, 2024, 7 pgs.
Wankewycz, Taras; Requirement for Restriction/Election for U.S. Appl. No. 16/967,024, filed Aug. 3, 2020, mailed Mar. 12, 2024, 5 pgs.
Wankewycz, Taras; Final Office Action for U.S. Appl. No. 17/255,192, filed Dec. 22, 2020, mailed Mar. 19, 2024, 22 pgs.
Wankewycz, Taras; Final Office Action for U.S. Appl. No. 17/427,500, filed Jul. 30, 2021, mailed Mar. 6, 2024, 23 pgs.
Wankewycz, Taras; International Search Report and Written Opinion for PCT/SG2020/050042, filed Jan. 30, 2020, mailed May 26, 2020, 9 pgs.
HES Energy Systems Pte Ltd; Written Opinion for Singapore patent application No. 11202007367U, mailed Oct. 11, 2022, 14 pgs.
Wankewycz, Taras; International Search Report and Written Opinion for PCT/SG2019/050060, filed Feb. 1, 2019, mailed Jun. 19, 2019, 15 pgs.
Wankewycz, Taras; International Search Report and Written Opinion for PCT/IB2019/055425, filed Jun. 27, 2019, mailed Dec. 9, 2019, 10 pgs.
Wankewycz, Taras; International Search Report and Written Opinion for PCT/SG2019/050467, filed Aug. 18, 2019, mailed Jan. 31, 2020, 11 pgs.
HES Energy Systems Pte. Ltd.; Office Action for Israel Patent Application No. 276479, mailed Dec. 13, 2022, 9 pgs.

(56) References Cited

OTHER PUBLICATIONS

HES Energy Systems Pte Ltd; Extended European Search Report for application No. 20749241.4, mailed Nov. 22, 2022, 7 pgs.
H3 Dynamics Holdings Pte. Ltd.; Extended European Search Report for patent application No. 19861959.5, mailed Apr. 28, 2022, 6 pgs.
H3 Dynamics Holdings Pte. Ltd.; Office Action for European patent application No. 19861959.5, mailed Sep. 14, 2023, 5 pgs.
H3 Dynamics Holdings Pte. Ltd.; Office Action for Japanese patent application No. 2021-515070, mailed Nov. 21, 2023, 8 pgs.
HES Energy Systems Pte Ltd.; Office Action for Israel patent application No. 276479, mailed Dec. 10, 2023, 6 pgs.
Wankewycz, Taras; Non-Final Office Action for U.S. Appl. No. 17/255,192, filed Dec. 22, 2020, mailed Aug. 24, 2023, 47 pgs.
Wankewycz, Taras; Non-Final Office Action for U.S. Appl. No. 17/427,500, filed Jul. 30, 2021, mailed Sep. 19, 2023, 43 pgs.

* cited by examiner

UNMANNED VEHICLE

The present application relates to a hydrogen-electric powered unmanned vehicle and a hydrogen-electric aviation system. The application also relates to a safety system using the hydrogen-electric powered unmanned vehicle.

Currently, approximately 2% of all CO2 emissions come from the aviation industry due to use of conventional petroleum-based fuels (also known as jet fuel) for aircrafts. Since global and regional air travel are quickly accelerating, it is estimated that this CO2 emission problem will get worse. Emissions could increase by 300-700% by 2050 according to ICAO. There is a need to reduce the CO2 emission while increasing the range for aircrafts. Electrification with power solutions or technologies that reduces CO2 emission is the most practical route. Hence, electrification of the aviation or electrification of the aircrafts is going to be one of the key challenges of the next decades and also one of the major technology trends in the broader aviation industry. Technology solutions to reduce CO2 emissions for aviation and all other vehicles have been on the rise recently and such efforts need to be quickly accelerated in order to improve the penetration of environmentally friendly solutions to the market now to curb alarming trends in global warming.

Aviation applications would usually require a power solution to be compact and lightweight, possess high energy density (Wh/kg) in order to reduce the weight of the power solution (and also the maximum take-off weight for the aircraft). Furthermore, these new power solutions need to provide reasonably high air speed values that would be accepted by the aviation industry.

Currently, electrification of aircrafts has been mostly experimented with the conventional battery power solutions or solar power solutions, or hybrid of battery and solar power solutions. Summary of these approaches and some relevant examples are provided in this section.

Even though conventional batteries have very high efficiencies for generation of electricity for numerous applications such as hand-held devices, power tools, and even for electric cars, their low energy density characteristics (also known as Wh/kg), low energy storage capacity, safety issues arising from thermal management and thermal runaway propagation aspects put limits on how long a battery-powered aircraft can fly. Furthermore, the fast charging of large battery modules is another issue that needs to be solved in order to make the use of batteries for aviation applications. The most important criteria for increasing the range (in this case distance traveled by the aircraft or effective flight time in the air) while developing a power solution for aviation applications is the specific energy (energy per unit of mass) of that power solution. Despite the advancements made in the conventional batteries, their specific energy (Wh/kg) values have remained very low for aviation applications such as <200 Wh/kg. Though, one advantage of the all-battery powered aircrafts has been their high air speed values. An example of battery powered manned aircrafts as follows: WO2017107722A1 describes a manned aerial vehicle (multi-rotor by design) that is powered with an all-battery based power solution and all the batteries are located at a central location and rotors are energized with the electrical energy that is being produced from a centralized battery bank. The greatest disadvantage of an all-battery powered solution has been the weight of the system. Since the battery technology has to carry the entire active materials within the battery, there is a linear relationship between the weight of the battery and the overall energy storage capacity. In layman's term, if a single battery module is providing X units of Wh/kg for Y hours of flight, then to get 10Y hours of flight, there is a need to carry 10 battery modules to store 10X units of Wh/kg. This linear relationship between the weight of the battery module and the energy storage capacity has made it impossible to have a manned electric aircraft with all-battery powered approach.

Solar powered aircrafts or solar-battery hybrid aircrafts have been another approach to electrify the aviation and such platforms have been designed, built, and successfully flown for very long flight times, though their speed (which is a function of the energy output of the solar cells or photovoltaic cells) has been inferior. In order to increase the solar power output, a large number solar cells or photovoltaic cells have been placed over the wing of the aircraft, and placing large number of solar cells or photovoltaic cells result in extremely long and wide wing, which is undesirable from an aerodynamic perspective to attain high air speeds. Long/wide wing design and low power output from the current solar cells or photovoltaic cells have put limits in how fast these aircrafts can fly (mostly due to aerodynamics) and also how much weight they can carry. Due to these limitations, the aviation industry has been very reluctant to design all-solar-powered or hybrid solar/battery powered manned aircrafts. An example of solar/battery powered aircraft as follows: US20160280075A1 describes the Solar Impulse aircraft that utilizes solar/battery hybrid power management for manned aircraft and the following hyperlink: https://aroundtheworld.solarimpulse.com/.

The recent years have also seen a surge in the use of unmanned vehicles (air, ground, maritime, underground, underwater, etc.) for remote sensing, surveillance, and numerous other applications. Due to limited energy storage capacity of conventional batteries, the effective operational times have been limited to very short times (in layman's terms, less than a few hours or less than an hour depending on the payload weight) for these unmanned vehicles.

Due to increased use of radio or remote controlled unmanned aerial vehicles (UAVs), unmanned ground and underground vehicles, or underwater vehicles for numerous applications such as hobby toys for aviation enthusiasts, remote sensing, filming, and etc., there emerged a new safety risk of having such unmanned vehicles around: their unauthorized use against critical and high-risk infrastructures such as airports, no-fly zones areas, military bases, manufacturing facilities, or human-element involved activities such a crowd gathering for a music concert, or a marathon rallying, or protection of an individual, or any other target in order to create chaos or damage to such premises or individuals.

It is an object of this application to provide a hydrogen aviation system comprising a hydrogen-electric aircraft, hybrid batteries, and distributed and interchangeable electric propulsion pods and their autonomous refueling with the aid of autonomous hydrogen refueling infrastructure.

It is also an object of this application to provide an automated unmanned vehicle storing station with hydrogen energy refueling/recharging/exchanging capability to provide hydrogen to hydrogen fuel cell powered unmanned vehicles using a fully automatic hydrogen cylinder, cartridge, or pod replacement base station.

It is another object of this application to provide a drone defense system to neutralize or incapacitate any unauthorized or stray or outlaw flying unmanned vehicles.

The application provides an autonomous refueling vehicle for a hydrogen-electric aircraft. The autonomous refueling vehicle often refers to a vehicle on land, such as a truck, which is provided with a control system. The control system is configured to receive information regarding, for example, the surrounding terrain, obstacles, and a particular path, and to automatically respond to this information such that the vehicle is able to negotiate the terrain, avoid the obstacles, or track a particular path with little or no human intervention. The autonomous refueling vehicle is also provided with an assembly that is configured to connect to an energy source containing fuel, such as hydrogen, and to a fuel storage device of an aircraft to allow the fuel flowing to the fuel storage device. The fuel storage device can refer to a hydrogen-electric device that is configured to store hydrogen as fuel and to convert hydrogen into electrical power for powering electrical components of the aircraft. The hydrogen-electric device includes, for example, a hydrogen-electric propulsion pod that is configured to rotate propellers of the aircraft. The autonomous refueling vehicle is also called autonomous ground refueling vehicle.

The hydrogen-electric aircraft includes two or more wings, which are often attached to a body of the aircraft. The aircraft also includes one or more removable electric propulsion pods that are attached to one of the wings. The electric propulsion pods can be removed from the wings for maintenance when it is needed. The electric propulsion pod is also called hydrogen-electric propulsion pods or distributed and interchangeable electric propulsion pod.

The removable electric propulsion pod includes a body that is provided with a hydrogen refueling interface that is adapted to receive hydrogen. The propulsion pod further includes a lock and unlock mechanism that is connected to the body of the propulsion pod. The lock and unlock mechanism is adapted to removably attach the body to one of the wings.

Referring to the autonomous refueling vehicle, it includes a hydrogen refueling module, which is adapted to connect to the hydrogen refueling interface of the propulsion pod and to a hydrogen source. In use, the hydrogen refueling module allows hydrogen from the hydrogen source to flow to the hydrogen refueling interface, and to a hydrogen storage device of the propulsion pod. The hydrogen can be provided in liquid or gaseous form.

The autonomous refueling vehicle also includes a propulsion pod handling device that is adapted to activate the lock and unlock mechanism of each propulsion pod to remove each propulsion pods from one of the wings. In use, the autonomous refueling vehicle autonomously moves itself to a predetermined location such that the propulsion pod handling device is positioned directly below the propulsion pods of one of the wings. A control unit of the autonomous refueling vehicle then directs the propulsion pod handling device to move to the propulsion pod, and later hold or grasp the propulsion pod. The propulsion pod handling device then activates the lock and unlock mechanism such that the propulsion pod is unlocked from the wing. The propulsion pod handling device then moves the unlocked propulsion pod towards the hydrogen refueling module.

The propulsion pod handling device then positions the electric propulsion pod on the hydrogen refueling module such that the hydrogen refueling interface of the propulsion pod is connected to the hydrogen refueling module.

The autonomous refueling vehicle afterward autonomously moves itself to the hydrogen source to allow the hydrogen refueling module to removably connect to the hydrogen source. Hydrogen from the hydrogen source then flows to the hydrogen refueling module, to the hydrogen refueling interface, and to the hydrogen storage device of the propulsion pod for refueling of the hydrogen storage device.

The autonomous refueling vehicle provides several benefits. It allows the electric propulsion pods of the aircraft to be removed for refueling of hydrogen in the propulsion pods speedily. This reduces ground servicing time for the hydrogen-electric aircraft.

The propulsion pod handling device can be adapted to attach the electric propulsion pods to one of the wings.

In one implementation, the hydrogen refueling module includes a hydrogen receiving interface which is adapted to connect to the hydrogen source via a hydrogen transfer line, and a chamber which is connected to the hydrogen receiving interface. The hydrogen refueling module also includes a plurality of recesses with hydrogen discharge ports that are connected to the chamber. Each recess is adapted to receive one or more electric propulsion pods for allowing the hydrogen discharge ports to be connected to corresponding hydrogen refueling interfaces of the electric propulsion pods. In use, the hydrogen refueling module is connected to the hydrogen source, hydrogen of the hydrogen source flows to the hydrogen receiving interface, to the chamber, to the hydrogen discharge ports, and to the corresponding hydrogen refueling interfaces of the electric propulsion pods. The chamber is also called hydrogen fuel manifold.

In one embodiment, the propulsion pod handling device includes one or more robotic arms with one or more robotic grasping mechanisms. Each robotic grasping mechanism is adapted to position the electric propulsion pod onto a predetermined location of the hydrogen refueling module. The robotic grasping mechanism is also adapted to attach the electric propulsion pod to one of the wings and to remove the electric propulsion pod from one of the wings.

In another embodiment, the propulsion pod handling device comprises a hydrogen refueling module elevating assembly, which is adapted to vertically move the hydrogen refueling module towards and away from the electric propulsion pods. The propulsion pod handling device further includes one or more lift and catch mechanisms that are adapted to attach the propulsion pods to one of the wings when the hydrogen refueling module elevating assembly is positioned near the propulsion pods. The lift and catch mechanisms are also adapted to remove the propulsion pods from one of the wings. This allows the propulsion pods to be attached or removed essentially simultaneously.

The autonomous refueling vehicle can further comprises at least two wheels, which are adapted to move towards and away from the hydrogen-electric aircraft. In one implementation, the autonomous refueling vehicle comprises a mono-directional steering mechanism that is adapted to direct the wheels to move in one direction. The one direction is perpendicular to a longitudinal axis of the hydrogen-electric aircraft. In another implementation, the autonomous refueling vehicle further comprises a multi-directional steering mechanism that is adapted to direct the wheels to move towards and away from the hydrogen-electric aircraft in multiple directions.

The application also provides an autonomous hydrogen refueling infrastructure. The autonomous hydrogen refueling infrastructure includes the autonomous refueling vehicle mentioned above and a hydrogen source for providing hydrogen to the autonomous refueling vehicle.

The hydrogen source can include an autonomous movable hydrogen supply tank. In one implementation, the autonomous movable hydrogen supply tank comprises two or more wheels with a multidirectional steering mechanism, which is adapted to move in multiple directions.

The application further provides a hydrogen refueling system for aviation. The hydrogen refueling system includes a hydrogen-electric aircraft and the autonomous hydrogen refueling infrastructure mentioned above. The hydrogen-electric aircraft includes two or more wings as well as one or more electric propulsion pods that are removably attached to one of the wings. The removable electric propulsion pod includes a body that is provided with a hydrogen refueling interface that is adapted to receive hydrogen. The propulsion pod further includes a lock and unlock mechanism that is connected to the body of the propulsion pod. The lock and unlock mechanism is adapted to removably attach the body of the propulsion pod to one of the wings.

The application also provides an automated hydrogen refueling and storage assembly for one or more unmanned vehicles. The unmanned vehicle refers to a vehicle that can be remotely controlled by a people or directed autonomously by an onboard computer such that the unmanned vehicle moves in a manner to avoid obstacles and according to a predetermined movement path.

The unmanned vehicle includes one or more hydrogen storage devices that store hydrogen in the form of, for example, liquid or gas. The hydrogen is often used to generate electrical power for powering the unmanned vehicle. When the hydrogen of the hydrogen storage devices is substantially used or depleted, the used hydrogen storage devices are to be refueled or refilled. The used hydrogen storage devices can also be replaced with new or unused hydrogen storage devices. This is often done when the unmanned vehicle is not in use and it is placed or stored inside a storage assembly for the unmanned vehicle. The storage assembly can be provided with apparatuses adapted to refuel the used hydrogen storage device with hydrogen and/or to exchange the used hydrogen storage device with an unused hydrogen storage device or a refilled hydrogen storage device. The storage assembly can have a control system for performing the replacement and the refueling processed automatically or autonomously.

The automated hydrogen refueling and storage assembly includes a hydrogen storage device handling unit for holding and moving the hydrogen storage device to and from the unmanned vehicle. The automated hydrogen refueling and storage assembly also includes a vertically movable landing platform. The landing platform is adapted to receive one or more landing unmanned vehicles and to move itself, together with the landed unmanned vehicle, downwards to a predetermined position, where the used hydrogen storage device of the landed unmanned vehicle can be exchanged or replaced. The hydrogen storage device handling unit is adapted to vertically move upwards near to the predetermined position and to receive the hydrogen storage device from the landed unmanned vehicle, which has been used for a period. Hydrogen in the used hydrogen storage device is often substantially used or depleted.

The automated hydrogen refueling and storage assembly further includes a disposing storage unit. The disposing storage unit is adapted to receive the used hydrogen storage device from the hydrogen storage device handling unit and to store the used hydrogen storage device. The used hydrogen storage device can be disposed later. The disposing storage unit is also called modular disposing storage box.

The automated hydrogen refueling and storage assembly also includes a hydrogen storage device storing unit for storing a plurality of hydrogen storage devices. The hydrogen storage devices are often new and used. They can also be used hydrogen storage devices that have been refilled with hydrogen. The hydrogen storage device storing unit is adapted to transfer a hydrogen storage device from the plurality of the hydrogen storage devices to the hydrogen storage device handling unit. The hydrogen storage device handling unit then receives the transferred hydrogen storage device and later attaches the transferred hydrogen storage device to landed unmanned vehicle. The hydrogen storage device storing unit is also called modular refueling/refilling storage box.

The disposing storage unit and the hydrogen storage device storing unit are located inside and underneath the landing platform.

In one implementation, the hydrogen storage device handling unit can be positioned adjacent to the disposing storage unit and the hydrogen storage device storing unit. In another implementation, the hydrogen storage device handling unit is positioned between the disposing storage unit and the hydrogen storage device storing unit.

The hydrogen storage device storing unit can include a hydrogen refueling unit that is adapted to provide hydrogen to the used hydrogen storage devices that are provided and stored in the hydrogen storage device storing unit.

In one embodiment, the hydrogen storage device handling unit includes a robotic arm with a grasping mechanism and with a locking/unlocking mechanism. The grasping mechanism and the locking/unlocking mechanism are adapted to work cooperatively to grasp the used hydrogen storage device from the landed unmanned vehicle. The grasping mechanism and the locking/unlocking mechanism can be further adapted to work cooperatively to attach the hydrogen storage device that is substantially filled with hydrogen to the landed unmanned vehicle.

The disposing storage unit can include a first conveyer belt mechanism. The first conveyer belt mechanism is adapted to transfer the used hydrogen storage device from the hydrogen storage device handling unit to the disposing storage unit.

The hydrogen storage device storing unit can include a second conveyer belt mechanism. The second conveyer belt mechanism is adapted to transfer the hydrogen storage devices that have been substantially filled with hydrogen to the hydrogen storage device handling unit.

The hydrogen storage device can include a member that is selected from a group consisting of hydrogen cylinder, hydrogen cartridge, and hydrogen pods. The hydrogen storage device handling unit is thus also called hydrogen cylinder or cartridge or pod lifting mechanism.

The application also provides another automated hydrogen refueling and storage assembly for one or more unmanned vehicles, wherein the unmanned vehicle includes one or more hydrogen storage devices. This automated hydrogen refueling and storage assembly is also called automated hydrogen refueling and storage modular assembly.

The second automated hydrogen refueling and storage modular assembly includes a hydrogen storage device handling unit and a vertically movable landing platform. The landing platform is adapted to receive one or more landing unmanned vehicles and to move itself, together with the landed unmanned vehicles downwards to a predetermined position for exchanging the used hydrogen storage device of the landed unmanned vehicle. The hydrogen storage device handling unit then vertically moves upwards near to the predetermined position and later receives the used hydrogen storage device from the landed unmanned vehicle.

The automated hydrogen refueling and storage modular assembly also includes a hydrogen storage device storing unit. The hydrogen storage device storing unit is adapted to receive the used hydrogen storage device from the hydrogen storage device handling unit, and to store the used hydrogen storage device. The hydrogen storage device storing unit is also adapted to store hydrogen storage devices that are filled with hydrogen. The hydrogen-filled hydrogen storage devices can be new, unused, or ones that have been refilled with hydrogen. The hydrogen storage device storing unit is further adapted to transfer another hydrogen storage device, which refers to the hydrogen-filled hydrogen storage device, to the hydrogen storage device handling unit.

The automated hydrogen refueling and storage modular assembly further includes a hydrogen refueling unit. The hydrogen refueling unit is adapted to receive the used hydrogen storage device from the hydrogen storage device storing unit and to provide hydrogen to the used hydrogen storage device.

The hydrogen refueling unit and the hydrogen storage device storing unit of the automated hydrogen refueling and storage modular assembly are located next to the landing platform.

The hydrogen refueling unit and the hydrogen storage device storing unit can be located adjacent to each other.

The hydrogen storage device handling unit can be further adapted to receive the other hydrogen storage device or the hydrogen-filled hydrogen storage device from the hydrogen storage device handling unit and to attach the hydrogen-filled hydrogen storage device to the landed unmanned vehicle.

In one implementation, the hydrogen storage device storing unit is located between the hydrogen refueling unit and the landing platform.

The hydrogen storage device storing unit can include a conveyer belt mechanism. The conveyer belt mechanism is adapted to transfer the hydrogen storage device between the hydrogen storage device handling unit and the hydrogen storage device storing unit.

In a special implementation, the hydrogen storage device handling unit includes a robotic arm with a grasping mechanism and with a locking/unlocking mechanism. The grasping mechanism and the locking/unlocking mechanism are adapted to work cooperatively to grasp the hydrogen storage device from the landed unmanned vehicle.

The grasping mechanism and the locking/unlocking mechanism can further be adapted to work cooperatively to attach the hydrogen storage device to the landed unmanned vehicle.

The application also provides a drone defense assembly for neutralization of one or more drones. The drone defense assembly includes the automated hydrogen refueling and storage assembly mentioned above as well as one or more hydrogen fuel cell powered unmanned vehicles. Each hydrogen fuel cell powered unmanned vehicle includes one or more hydrogen storage devices. The drone defense assembly also includes a drone-detection radar. The automated hydrogen refueling and storage assembly further includes a control unit or control section.

The control unit is adapted to communicatively connect to the drone-detection radar and to the hydrogen fuel cell powered unmanned vehicles. The drone-detection radar is adapted to detect drones, to assess potential threats of the detected drones, and to send at least one control signal to the control unit. The control unit is further adapted to direct the hydrogen fuel cell powered unmanned vehicles according to the at least one control signal to move in a manner to neutralize the potential threats.

The subject matter of a hydrogen aviation eco-system with a hydrogen-electric aircraft with distributed and interchangeable electric propulsion pods and their autonomous refueling with the aid of autonomous ground vehicles is described in greater detail in the accompanying figures, in which FIG. 1 illustrates the schematic back-view of hydrogen-electric aircraft with distributed and interchangeable propulsion pods and solar wing FIG. 2 illustrates the schematic top-view of hydrogen-electric aircraft with distributed and interchangeable propulsion pods and solar wing FIG. 3 illustrates the schematic view of distributed and interchangeable electric propulsion pods with locking/unlocking mechanism to attach them to the hydrogen-electric aircraft with an automated lock/unlock mechanism for autonomous refueling of the depleted pods FIG. 4 illustrates the schematic view of autonomous ground refueling vehicles with robotic arms or robotic grasping mechanisms to lock/unlock the distributed and interchangeable electric propulsion pods and transfer them for the refueling (vehicles have mono-directional steering mechanism: the autonomous ground vehicle approaches the plane in a perpendicular form and moves away in the perpendicular form)

FIG. 5 illustrates the schematic view of autonomous ground refueling vehicles with lift and catch mechanisms to lock/unlock the distributed and interchangeable electric propulsion pods and transfer them for the refueling (vehicles have mono-directional steering mechanism: the autonomous ground vehicle approaches the plane in a perpendicular form and moves away in the perpendicular form)

FIG. 6 illustrates the schematic view of autonomous ground refueling vehicles with robotic arms or robotic grasping mechanisms to lock/unlock the distributed and interchangeable electric propulsion pods and transfer them for their refueling (vehicles have multi-directional steering mechanism: the autonomous ground vehicle can approach the hydrogen-electric aircraft from multiple different directions and can move away from the hydrogen-electric aircraft in multiple different directions)

FIG. 7 illustrates the schematic view of autonomous ground refueling vehicles with lift and catch mechanisms to lock/unlock the distributed and interchangeable electric propulsion pods and transfer them for their refueling (vehicles have multi-directional steering mechanism: the autonomous ground vehicle can approach the hydrogen-electric aircraft from multiple different directions and can move away from the hydrogen-electric aircraft in multiple different directions)

Figure 10:
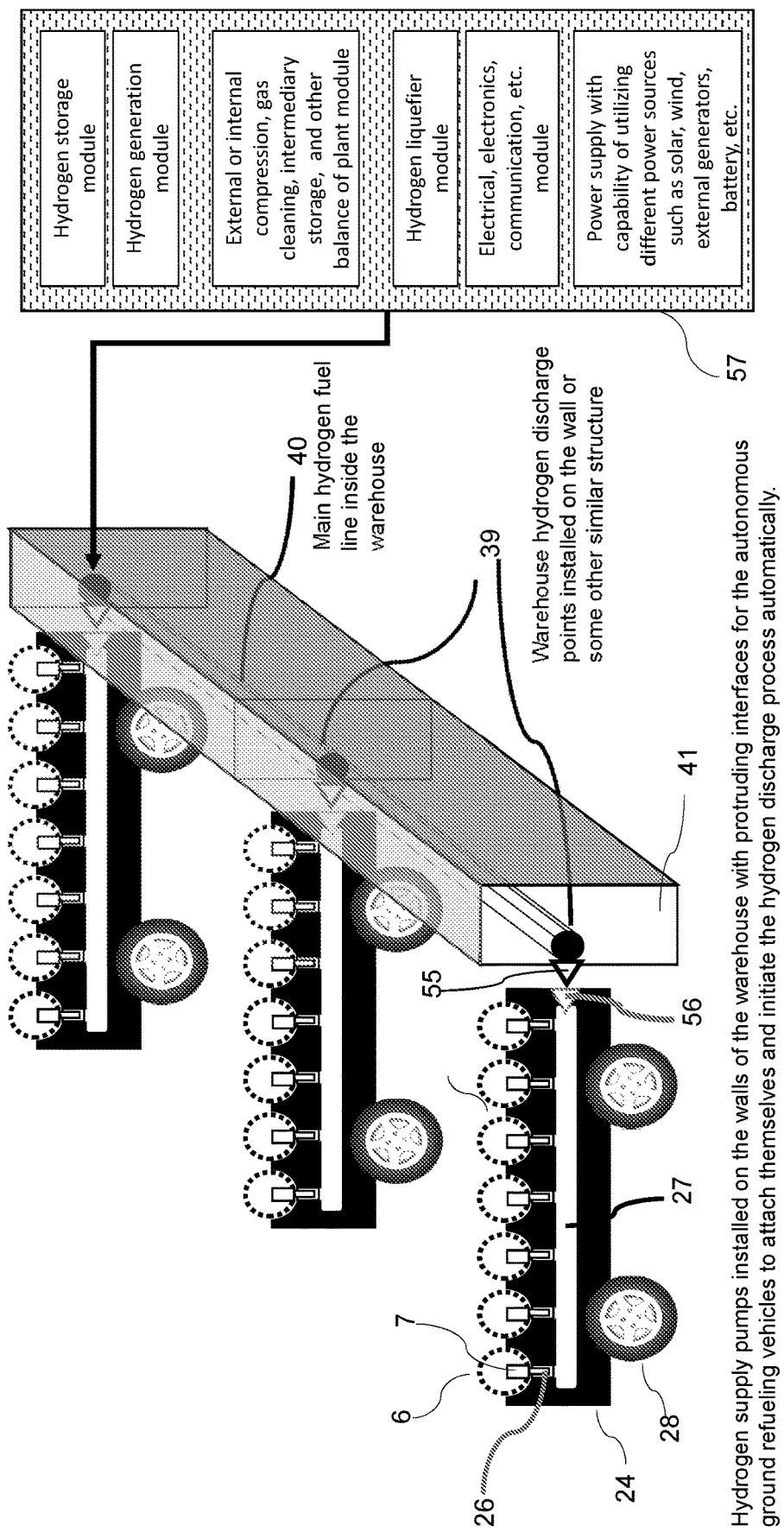
Figure 11:
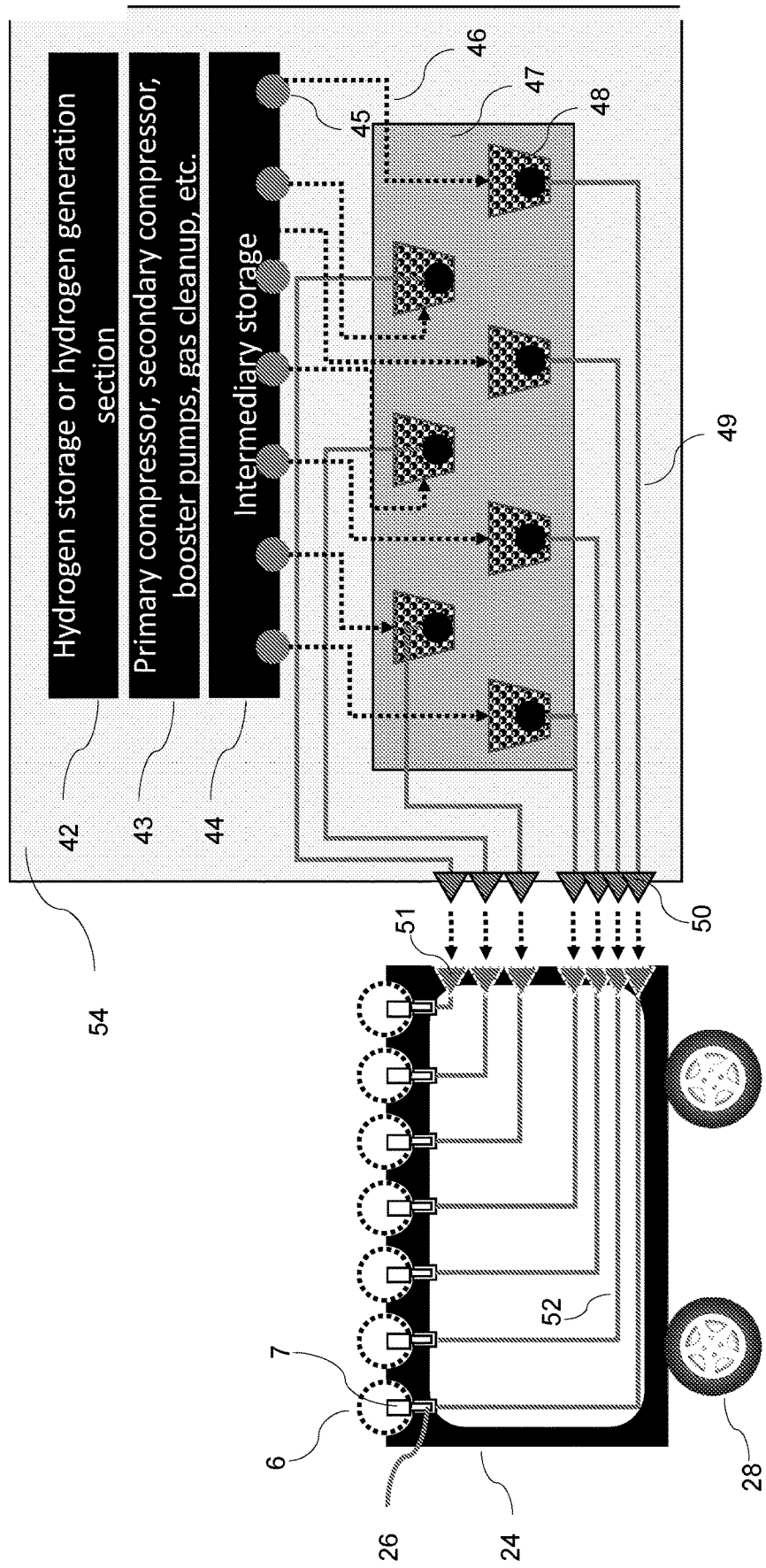
Figure 12:
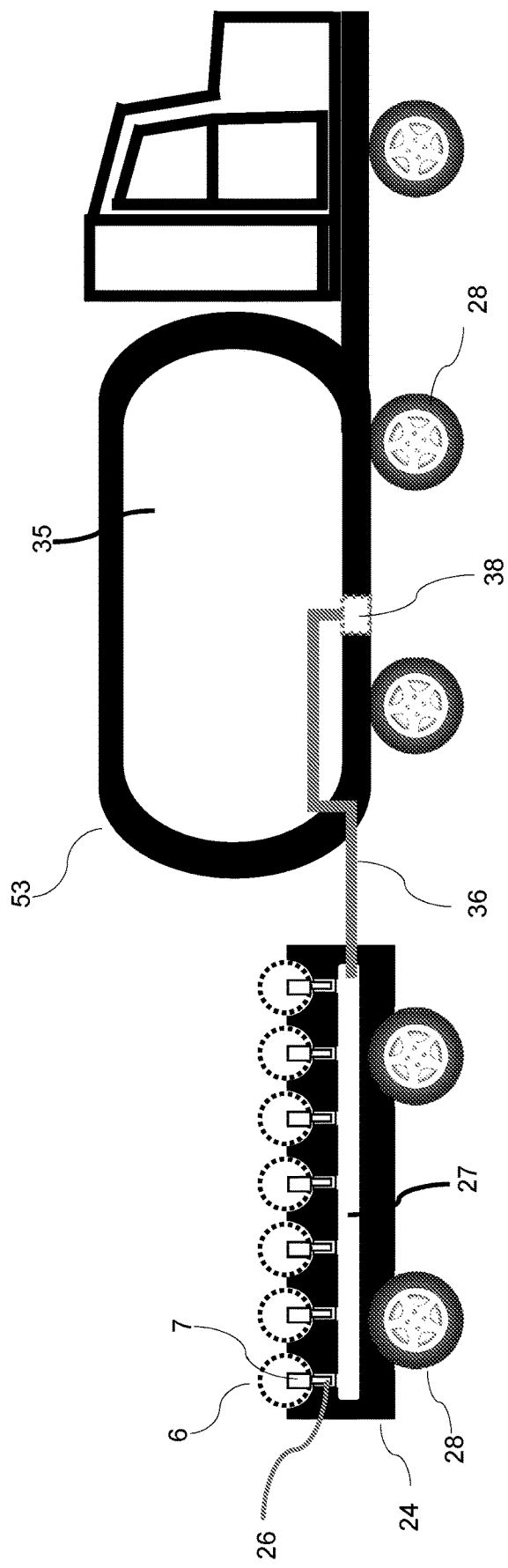

FIG. 10 illustrates the schematic view of multiple autonomous ground refueling vehicles charging the depleted distributed & interchangeable electric propulsion pods using hydrogen fuel from the building, warehouse, or hangar hydrogen supply lines by simply connecting their hydrogen receiving interfaces existing on the autonomous ground refueling vehicle to the hydrogen discharge points existing on the building, warehouse, or hangar infrastructure FIG. 11 illustrates the schematic view of an autonomous ground refueling vehicles charging the depleted distributed & interchangeable electric propulsion pods with liquid hydrogen using the hydrogen fuel from the on-site liquid hydrogen generator by simply connecting its hydrogen receiving interface existing on the autonomous ground refueling vehicle to the liquid hydrogen discharge points existing on the on-site liquid hydrogen generator setup FIG. 12 illustrates the schematic view of an autonomous ground refueling vehicle charging the depleted distributed & interchangeable electric propulsion pods by using hydrogen fuel from another manned ground hydrogen fuel supply tanker (with mono-directional steering mechanisms)

Figure 13:
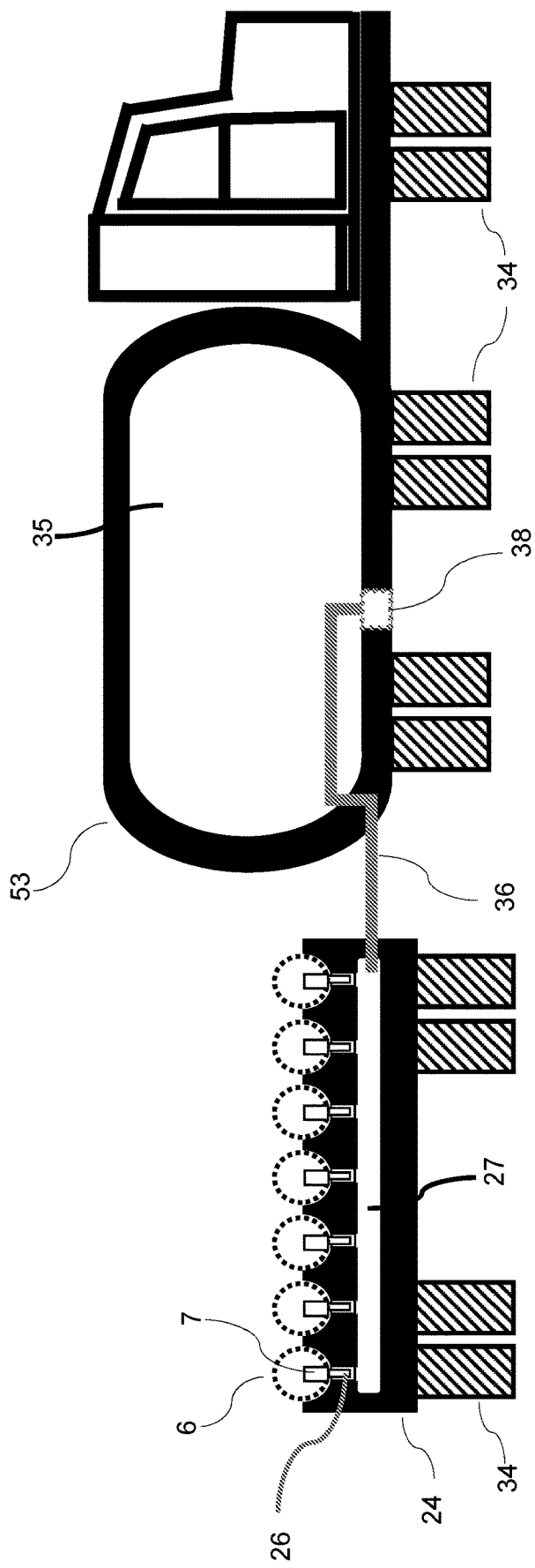

FIG. 13 illustrates the schematic view of an autonomous ground refueling vehicle charging the depleted distributed & interchangeable electric propulsion pods by using hydrogen fuel from another manned ground hydrogen fuel supply tanker (with multi-directional steering mechanisms)

Figure 14:
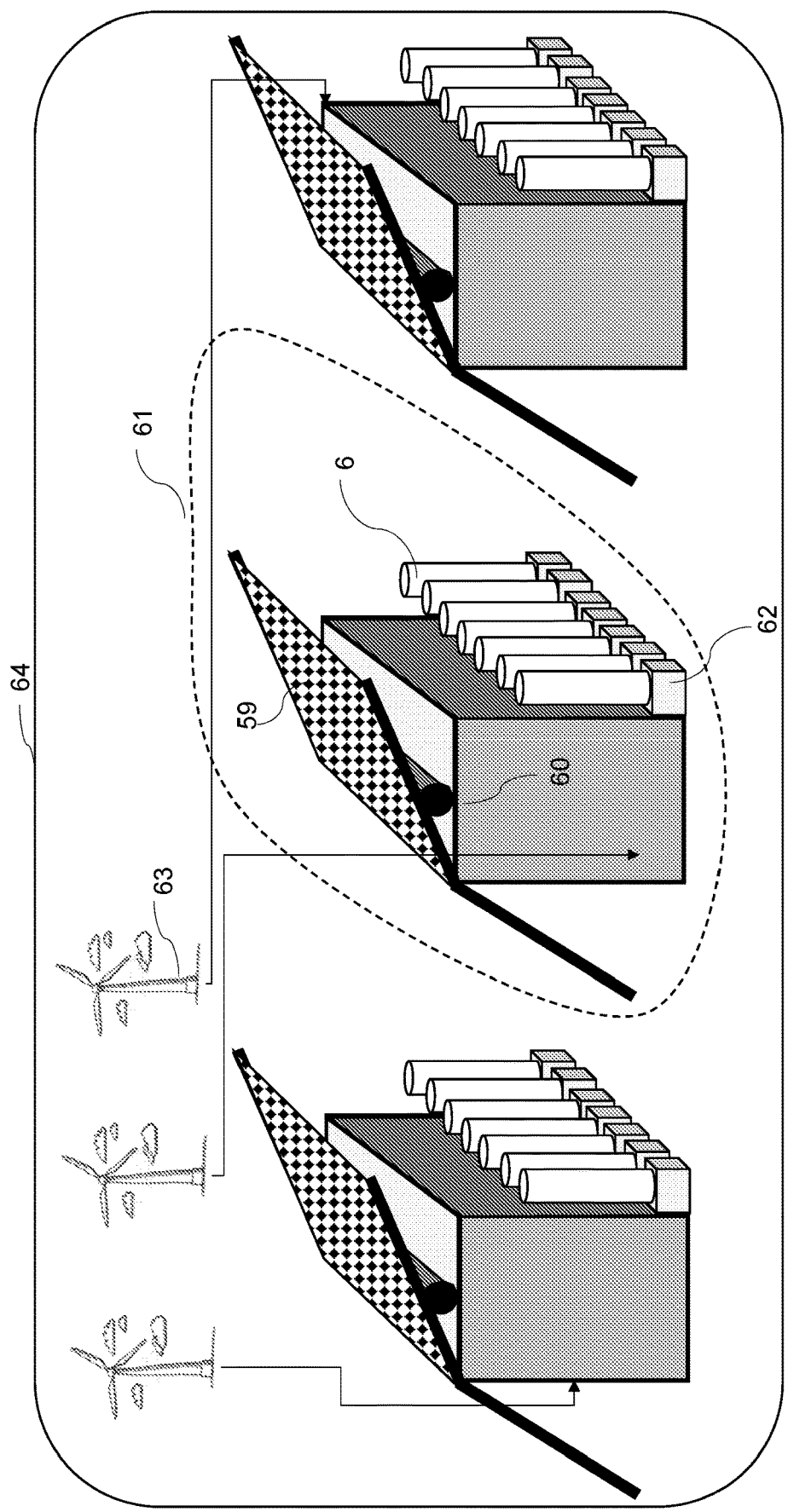

FIG. 14 illustrates the schematic view of a hydrogen farm with modular and autonomous hydrogen generation/refueling modules that have the capability of utilizing various forms of renewable energy (solar, wind or solar and wind) and hybridization of this electrical energy with the batteries or fuel cells to generate the hydrogen fuel (gaseous or liquid) that is needed to refuel the distributed and interchangeable propulsion pods.

Figure 15:
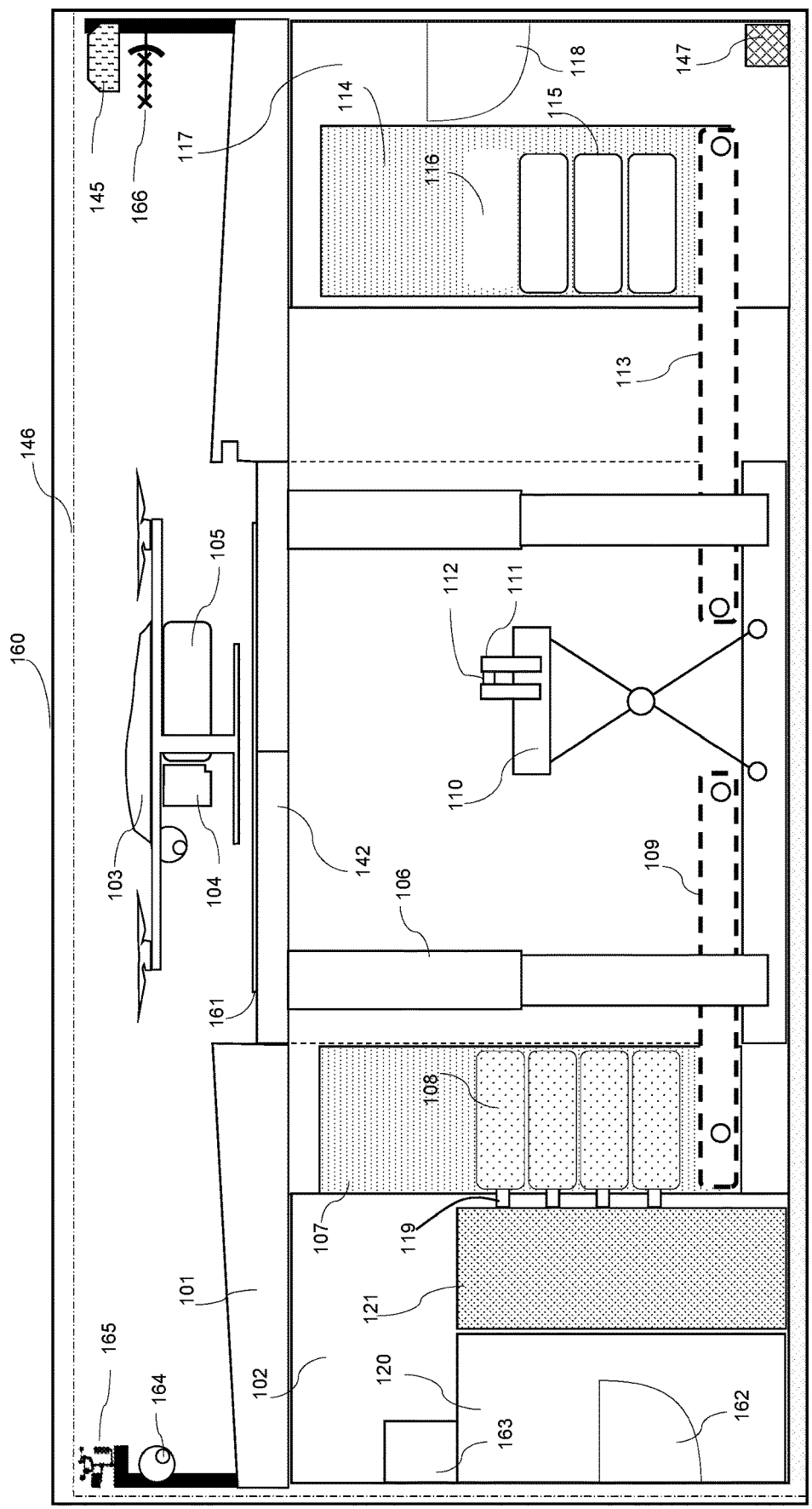
Figure 16:
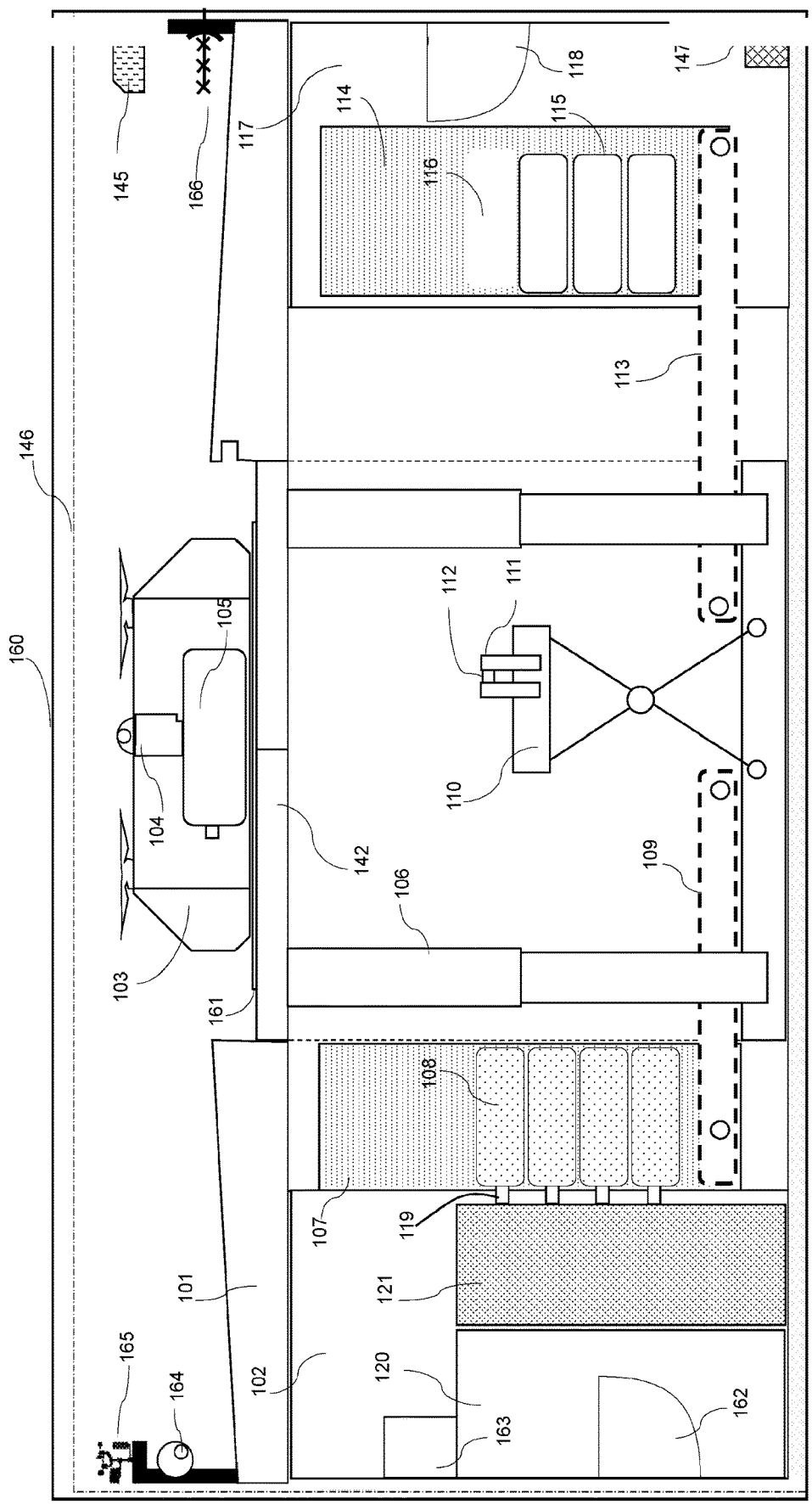
Figure 17:
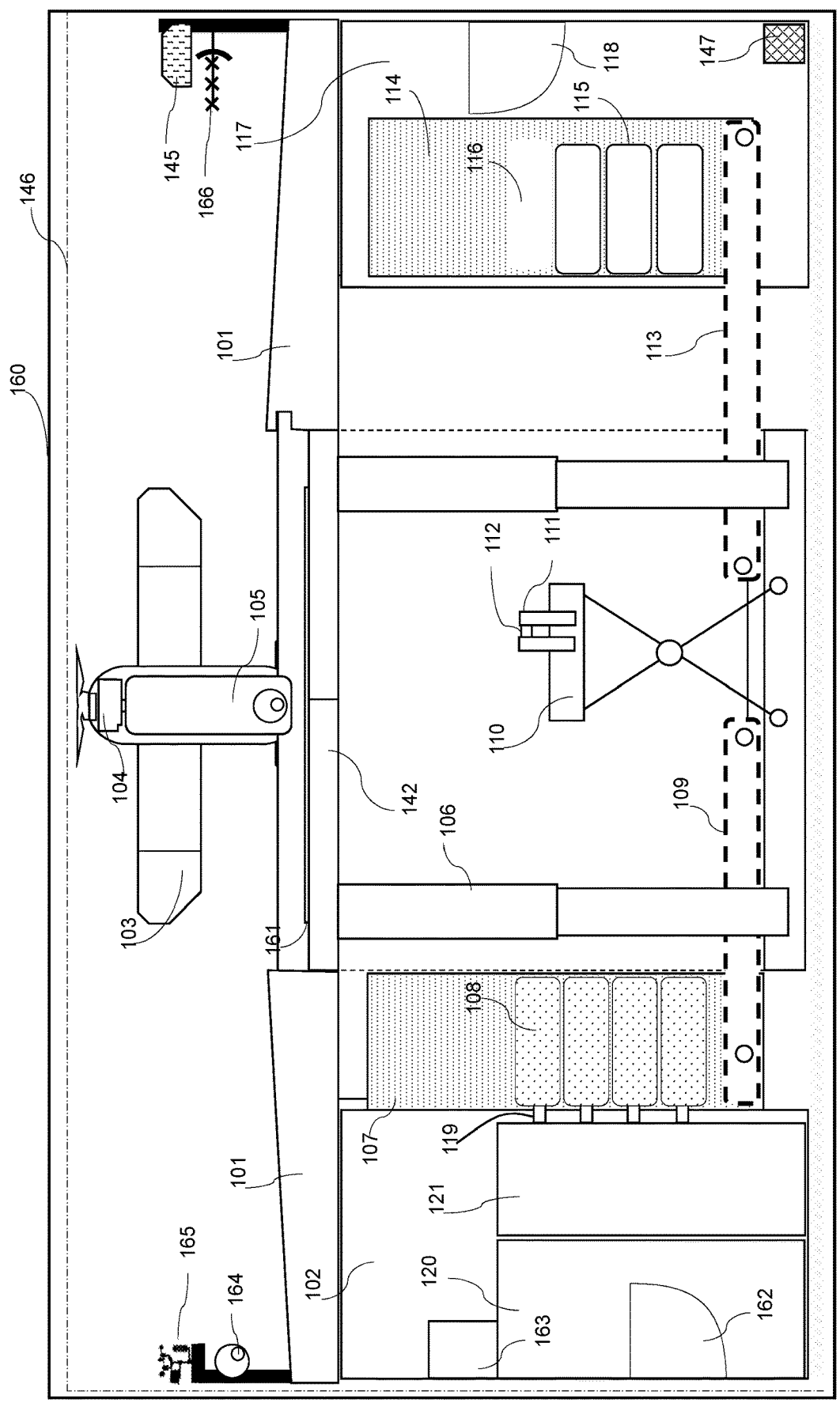
Figure 18:
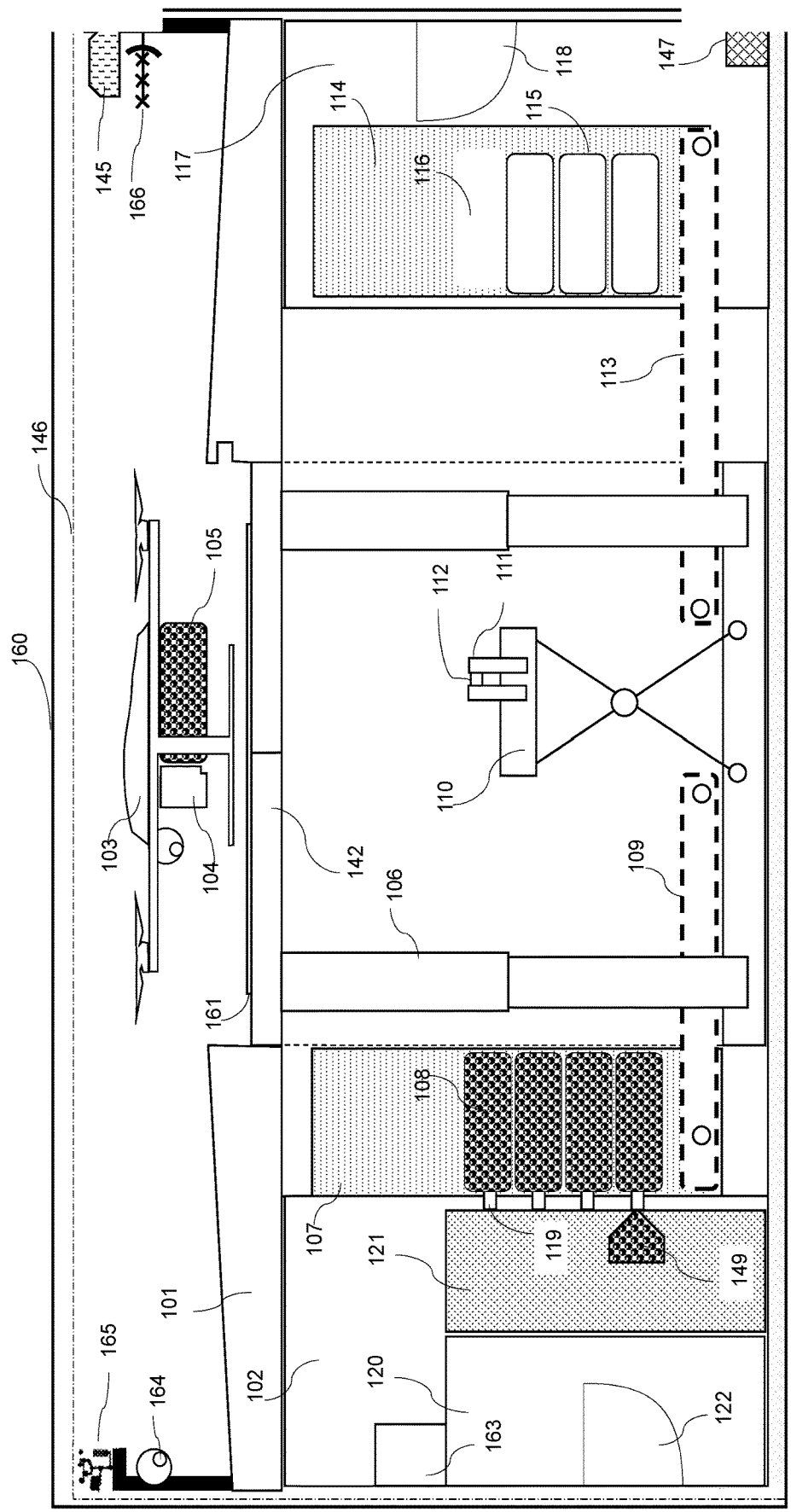
Figure 21:
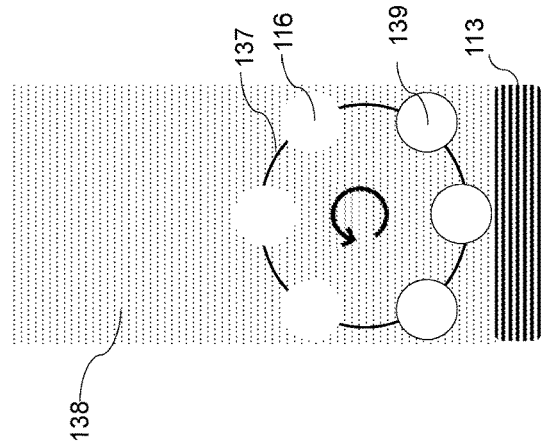
Figure 20:
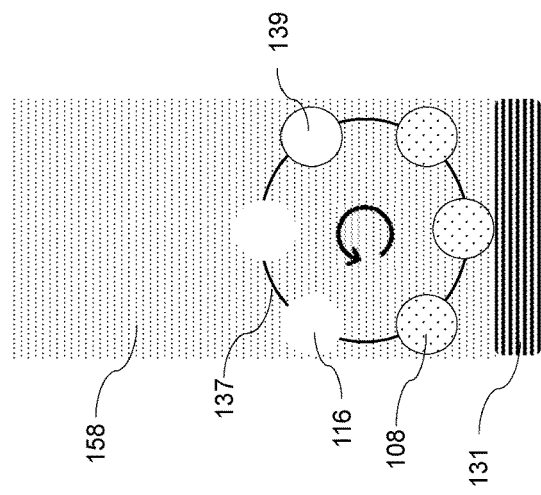
Figure 19:
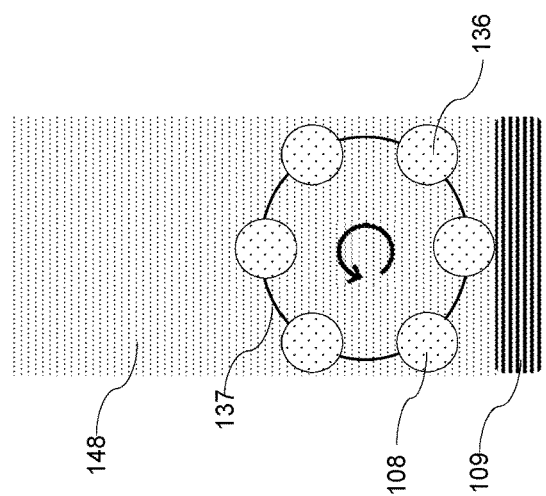
Figure 24:
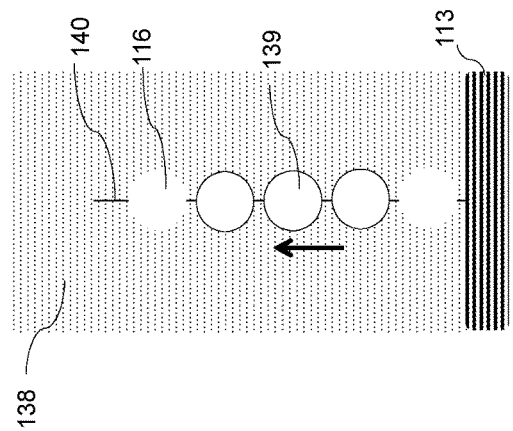
Figure 23:
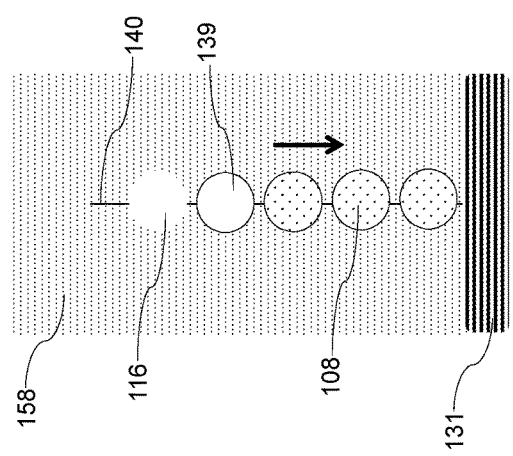
Figure 22:
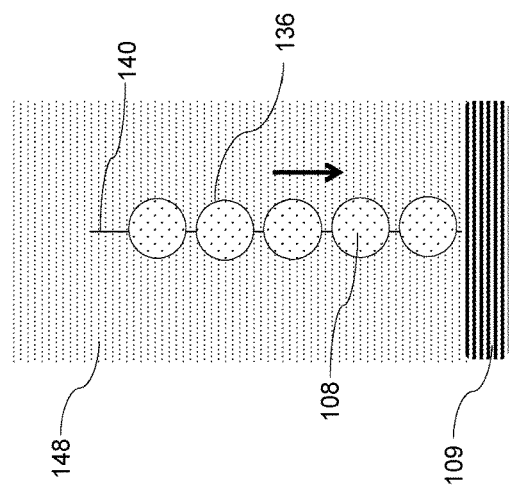
Figure 25:
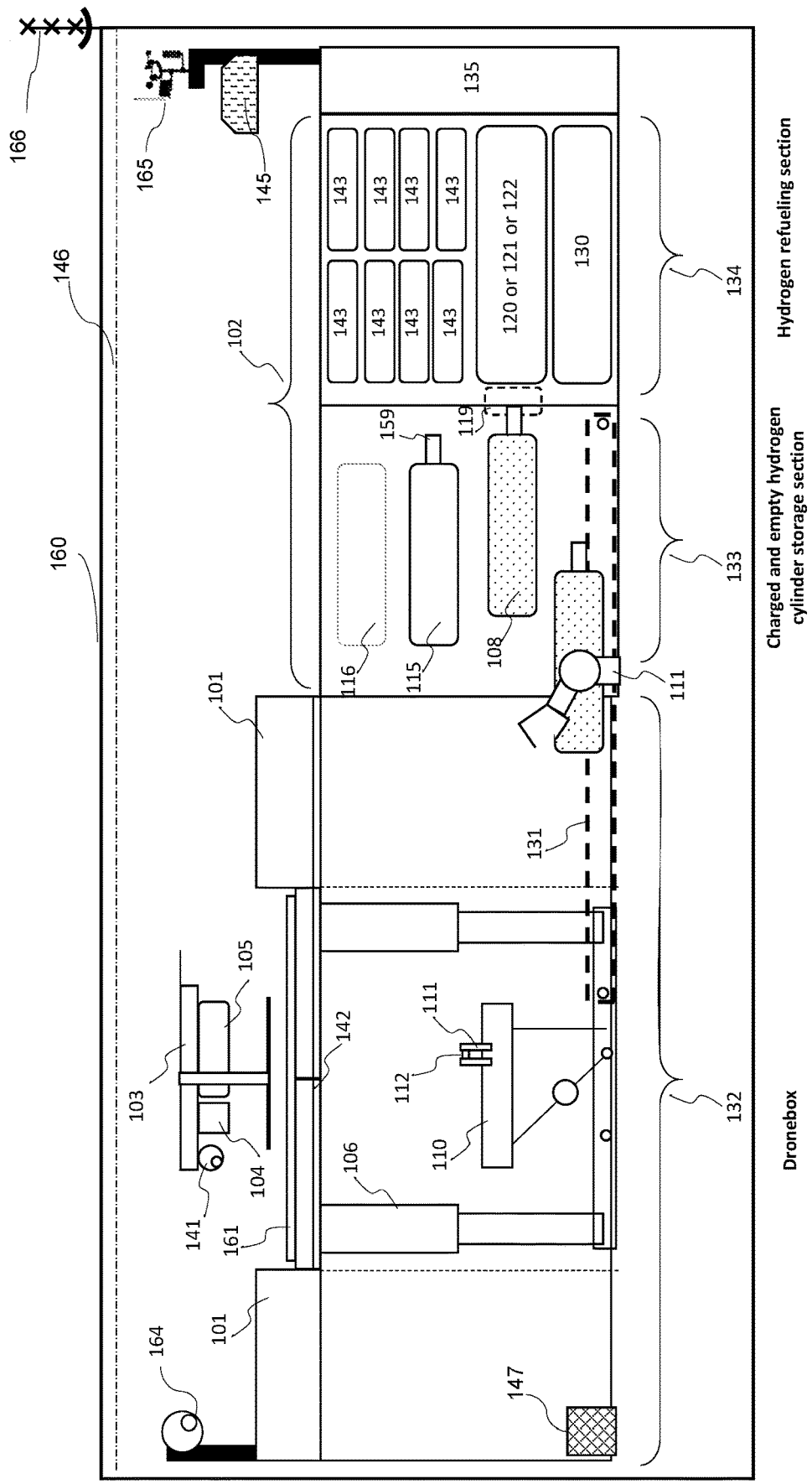
Figure 26:
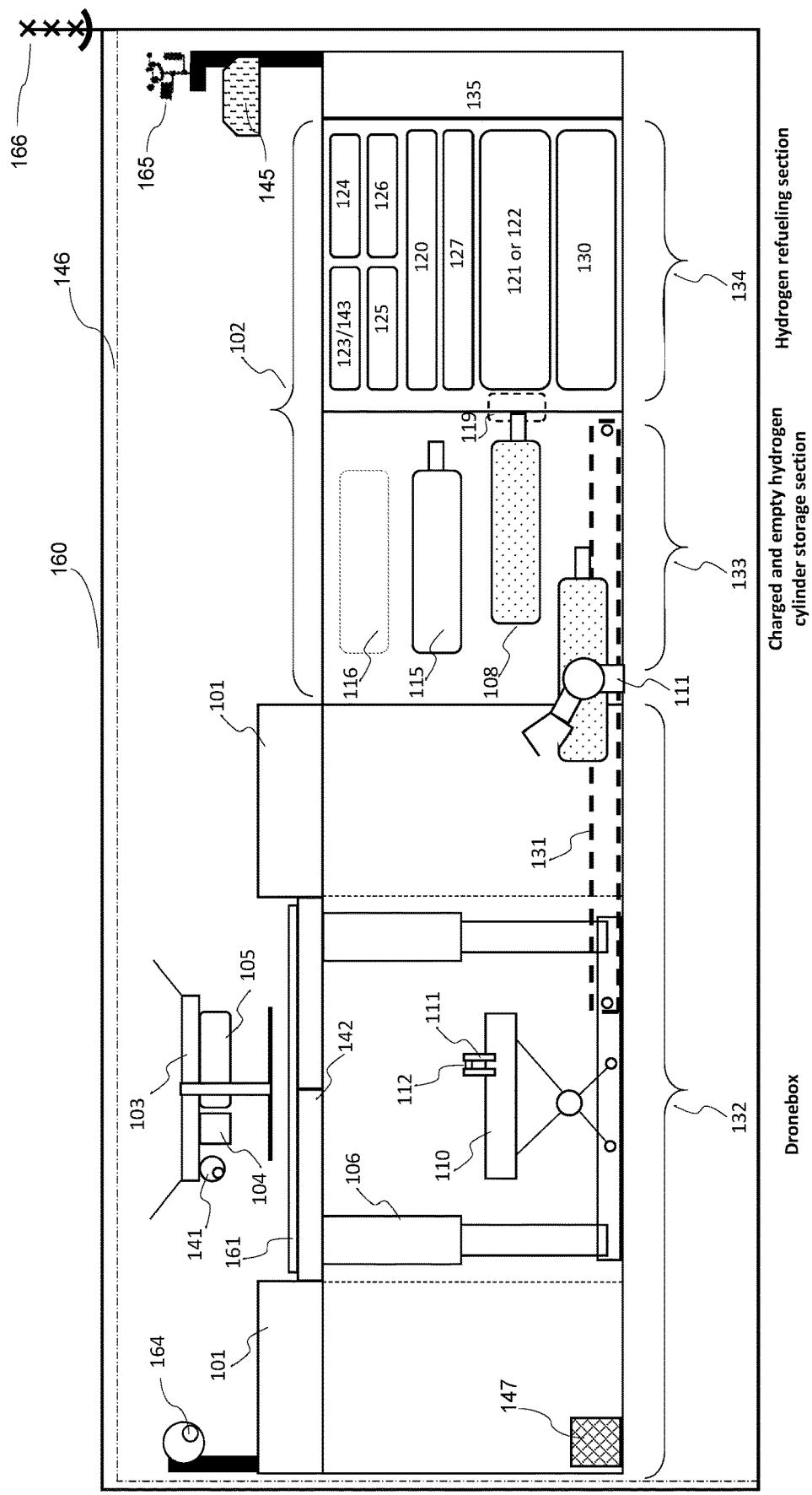
Figure 27:
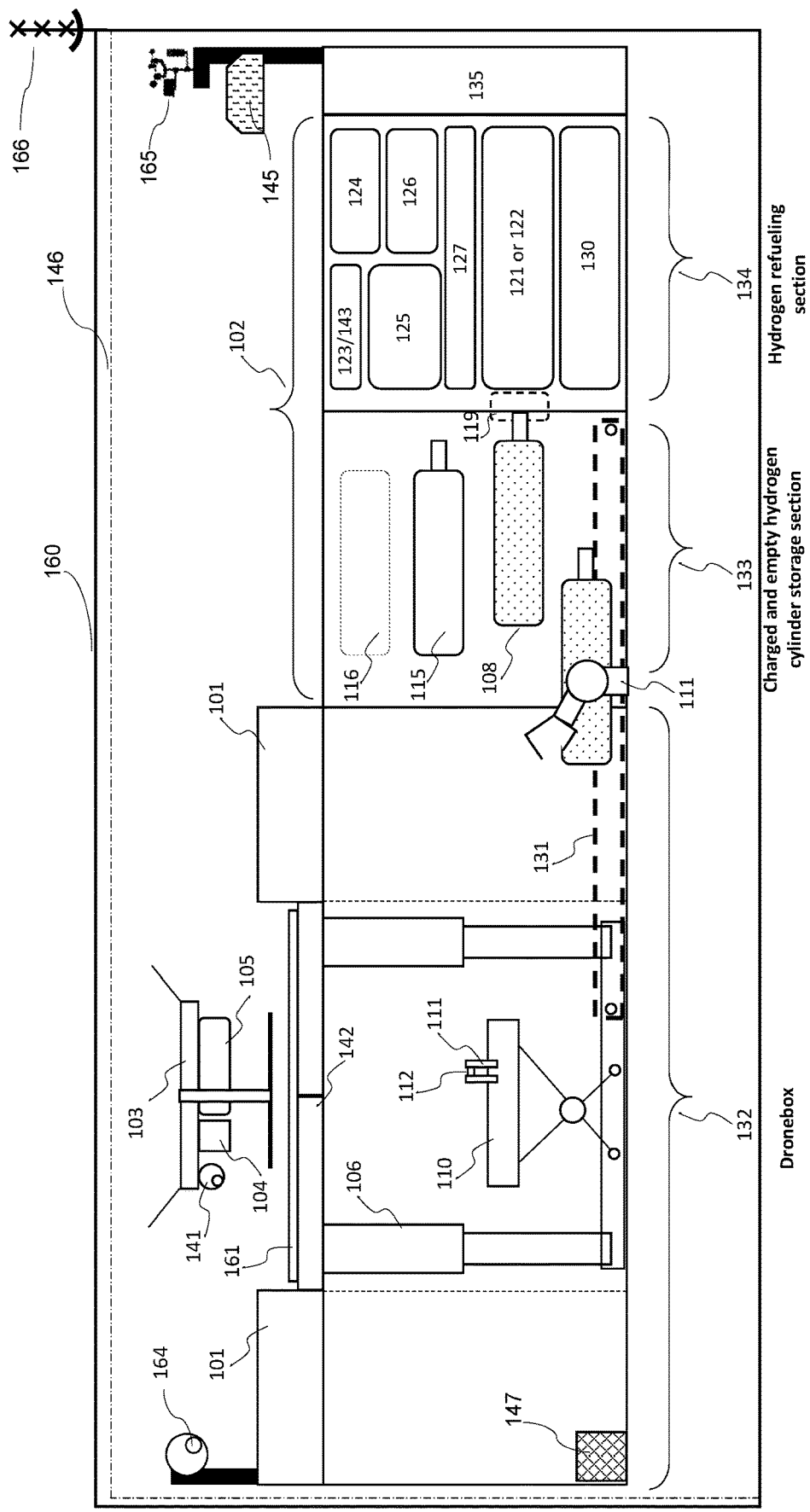
Figure 28:
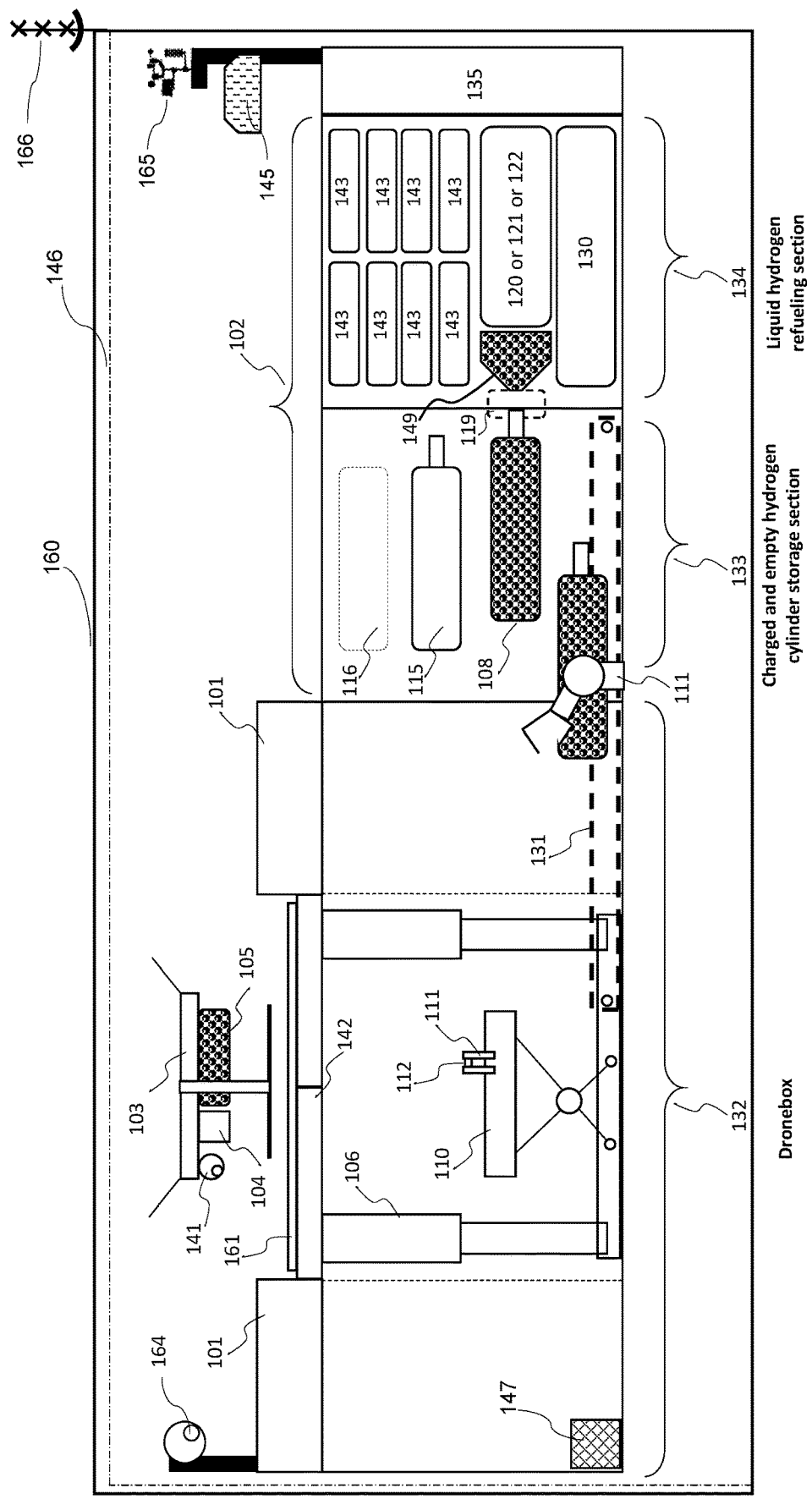
Figure 29:
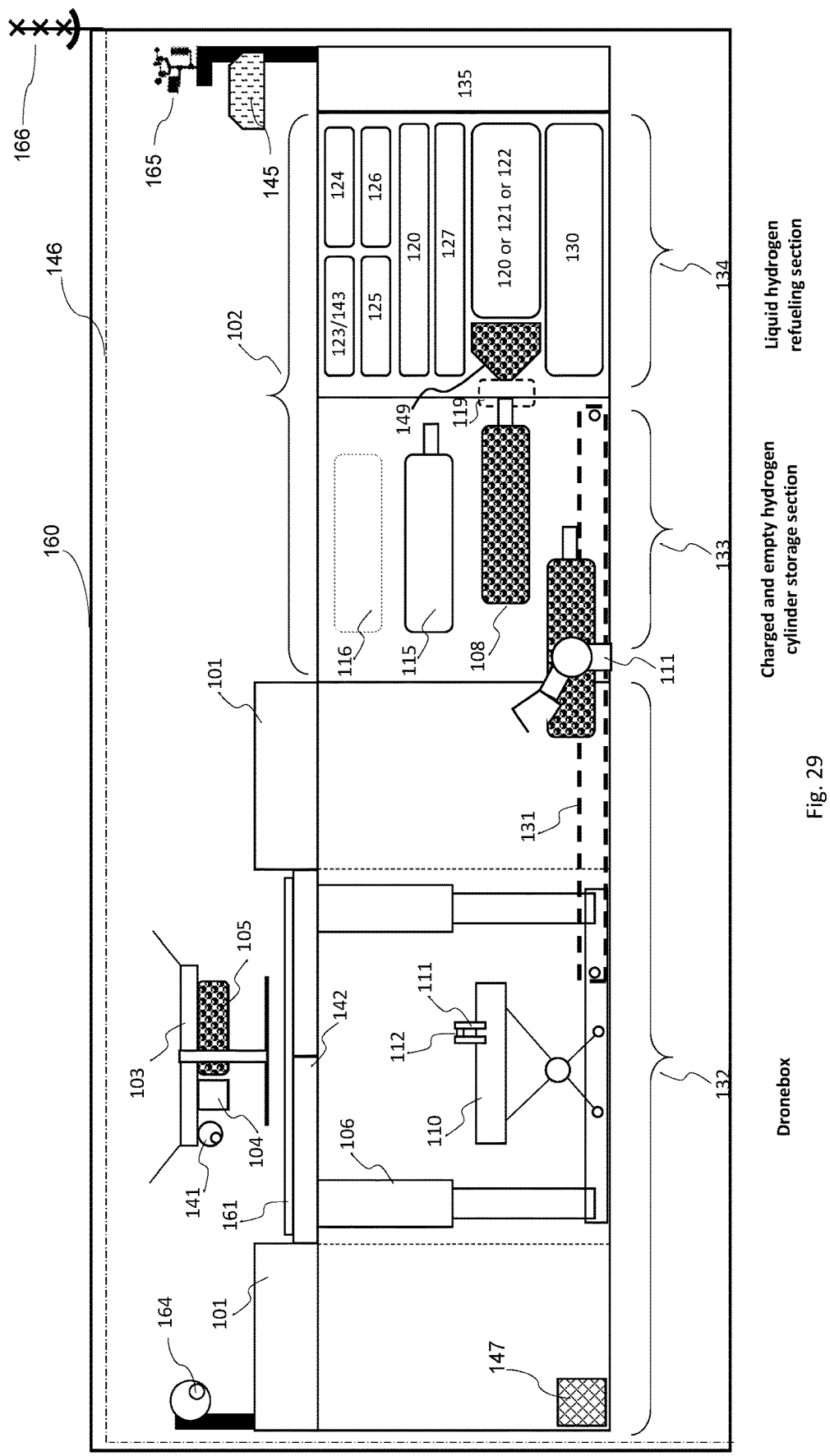
Figure 30:
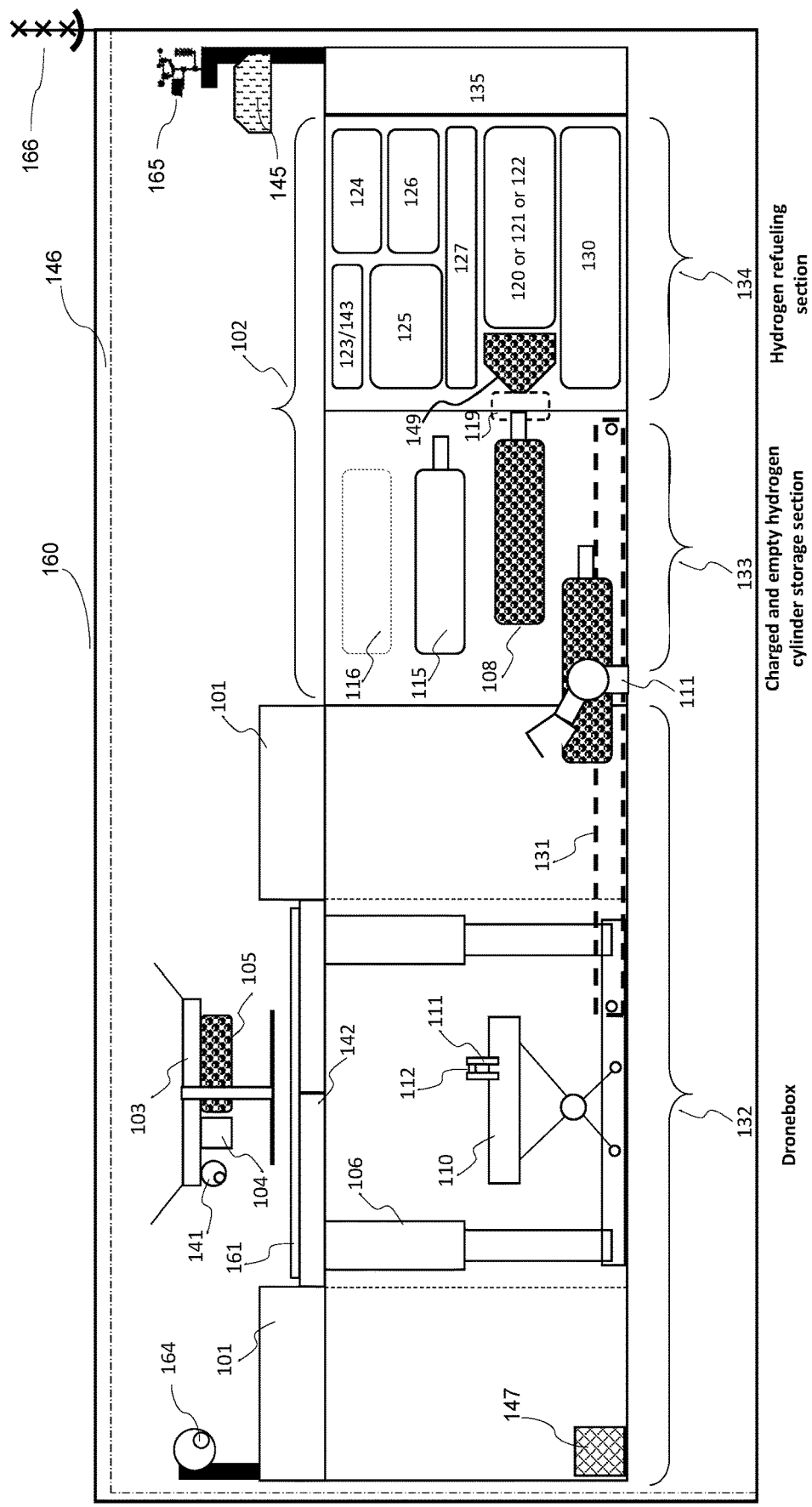
Figure 31:
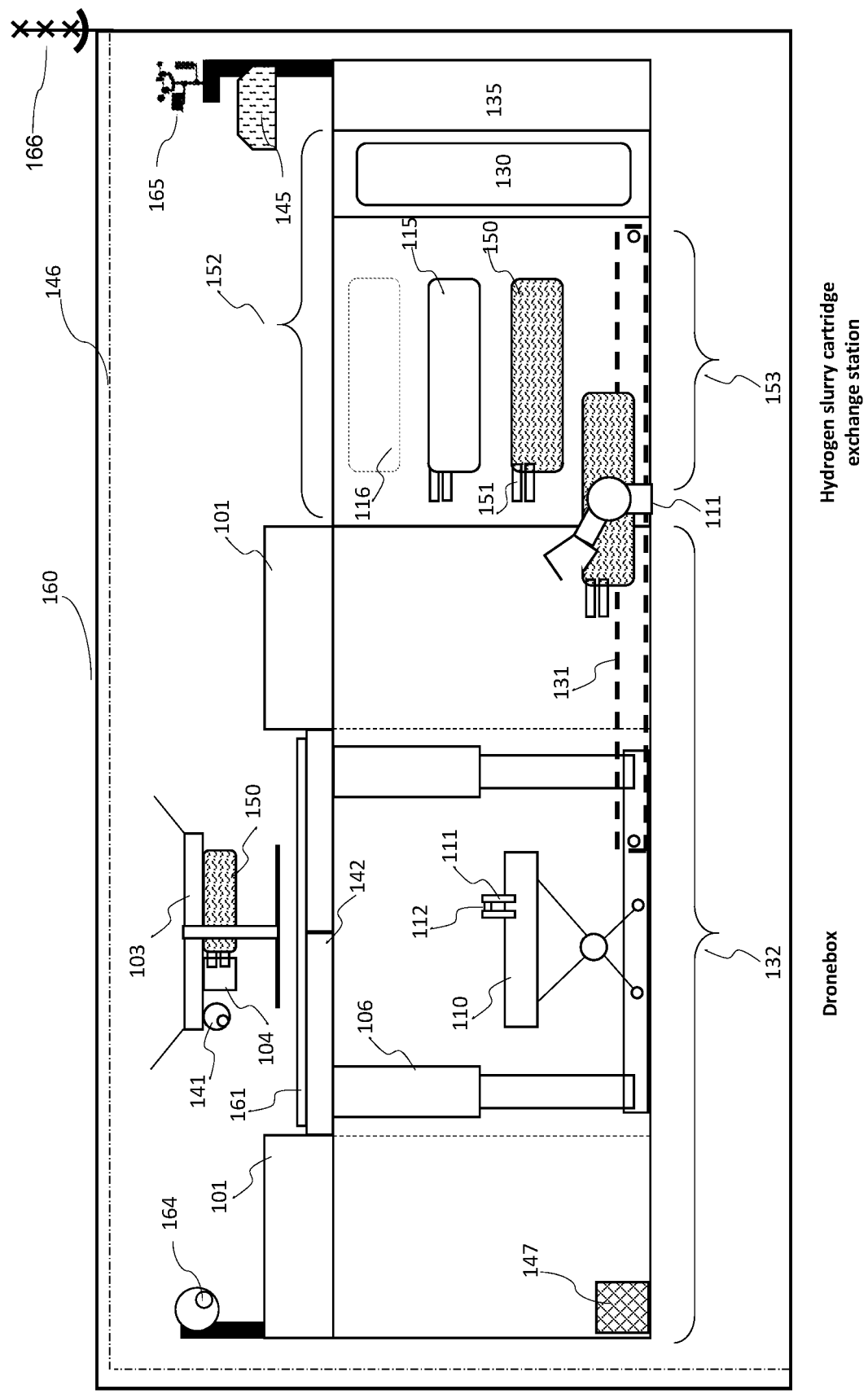
Figure 32:
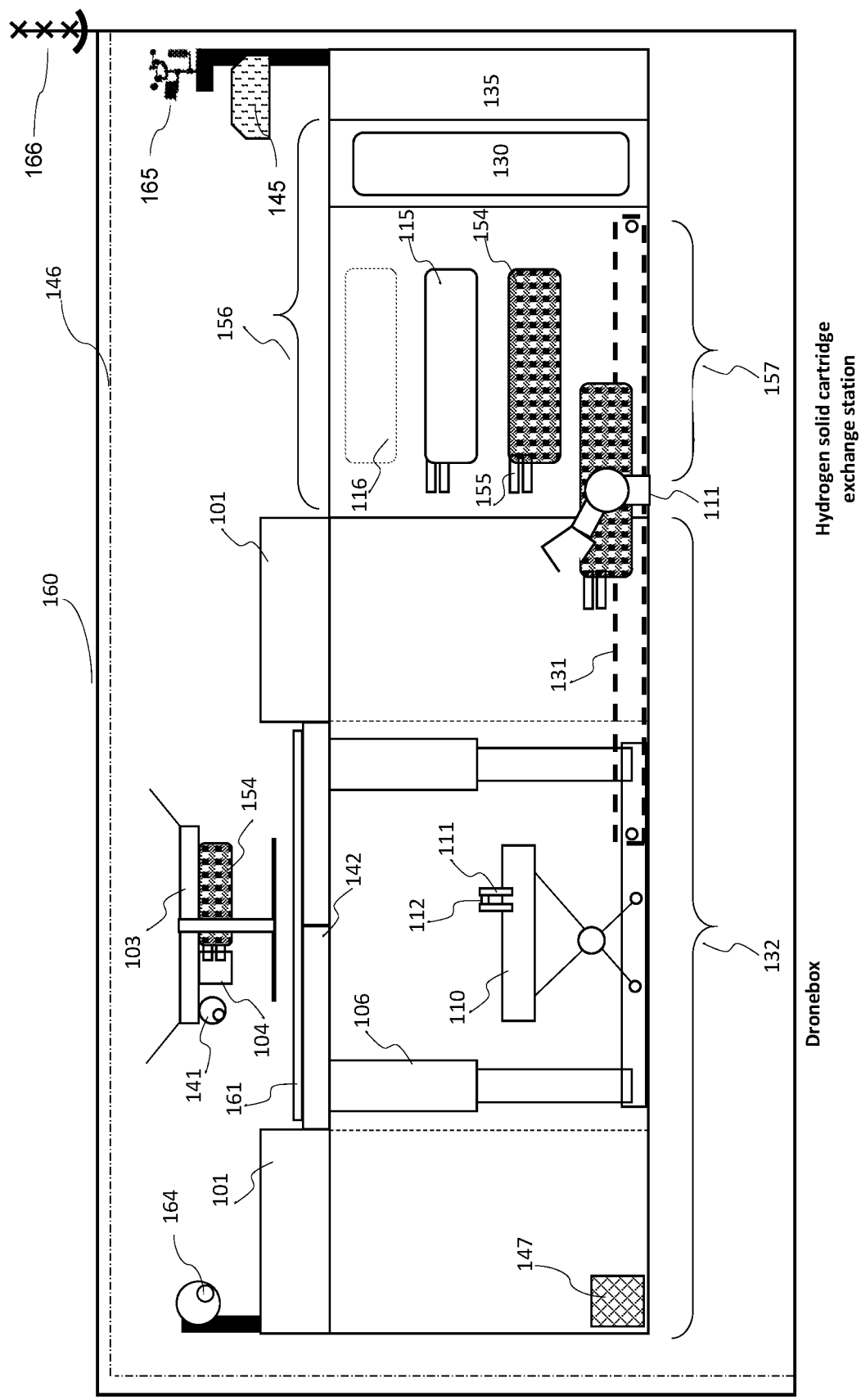
Figure 33:
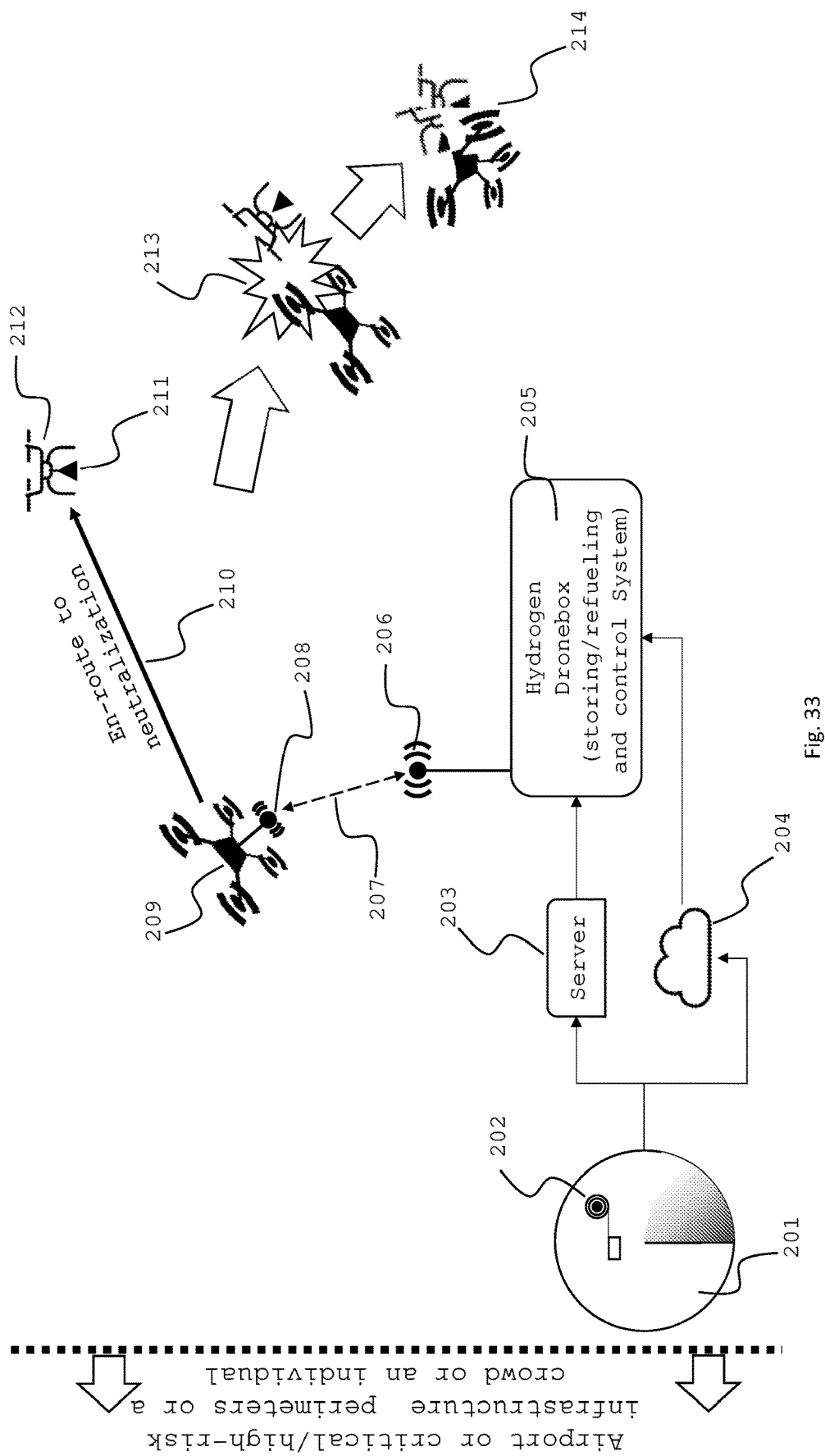
Figure 34:
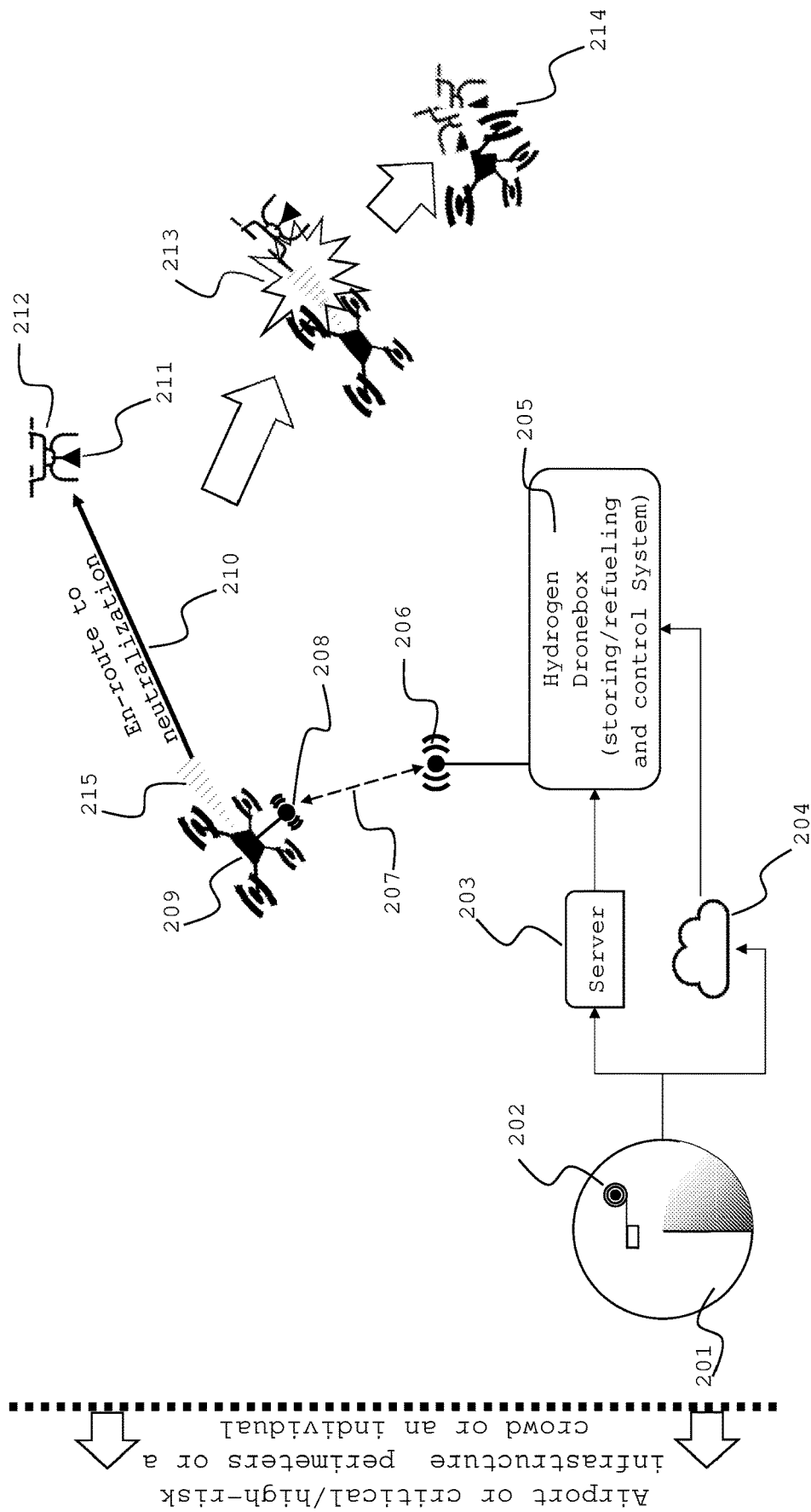
Figure 35:
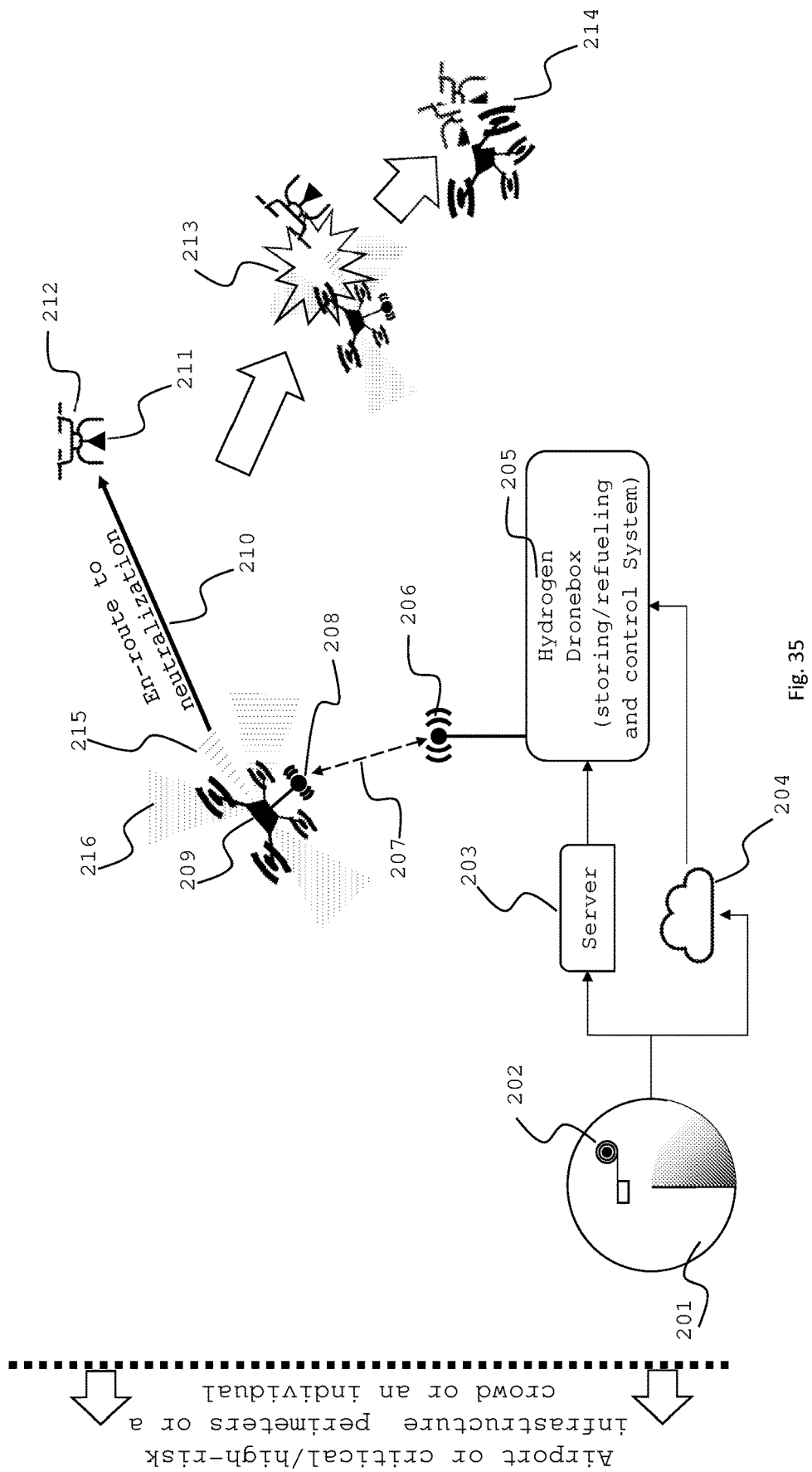
Figure 36:
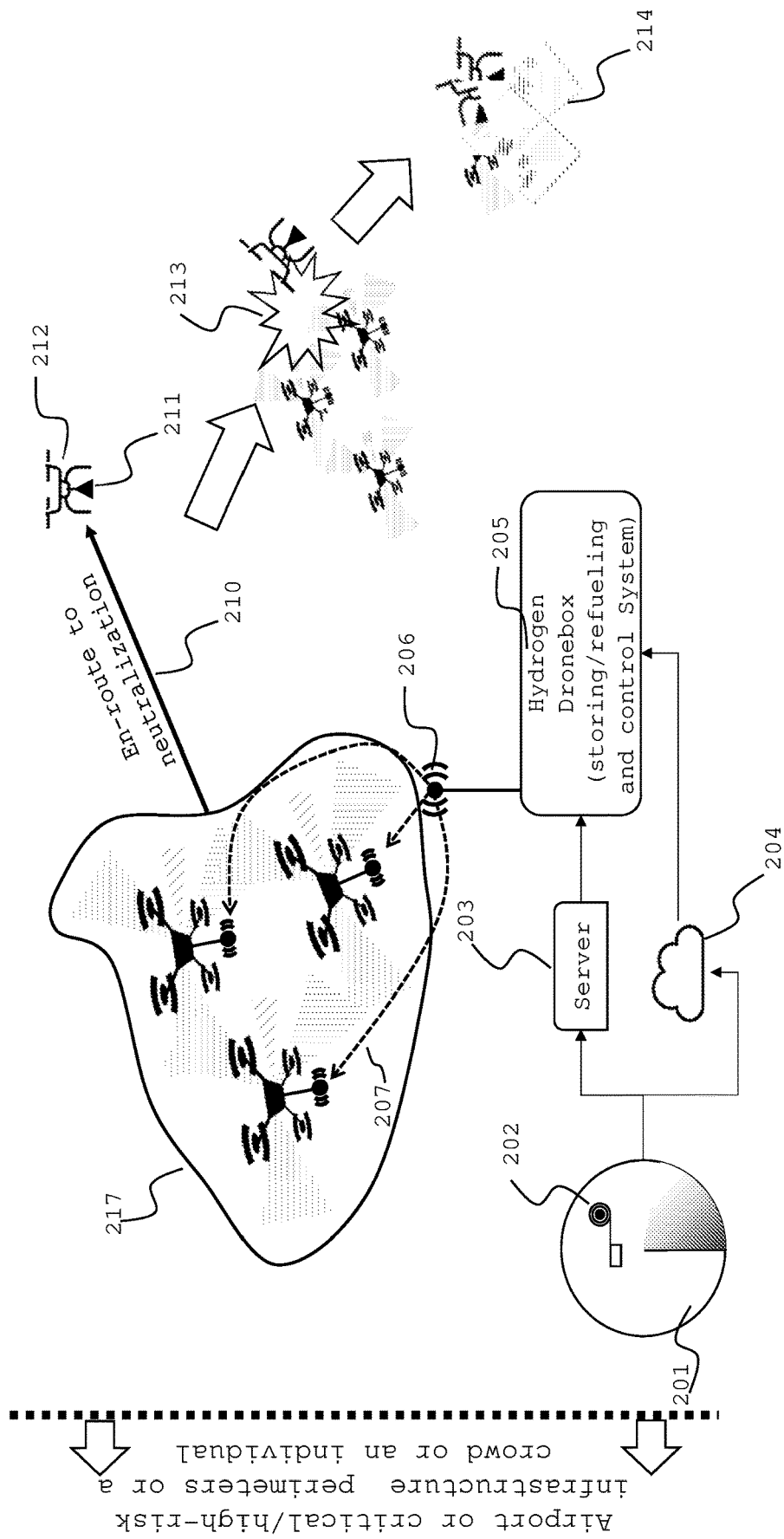
Figure 37:
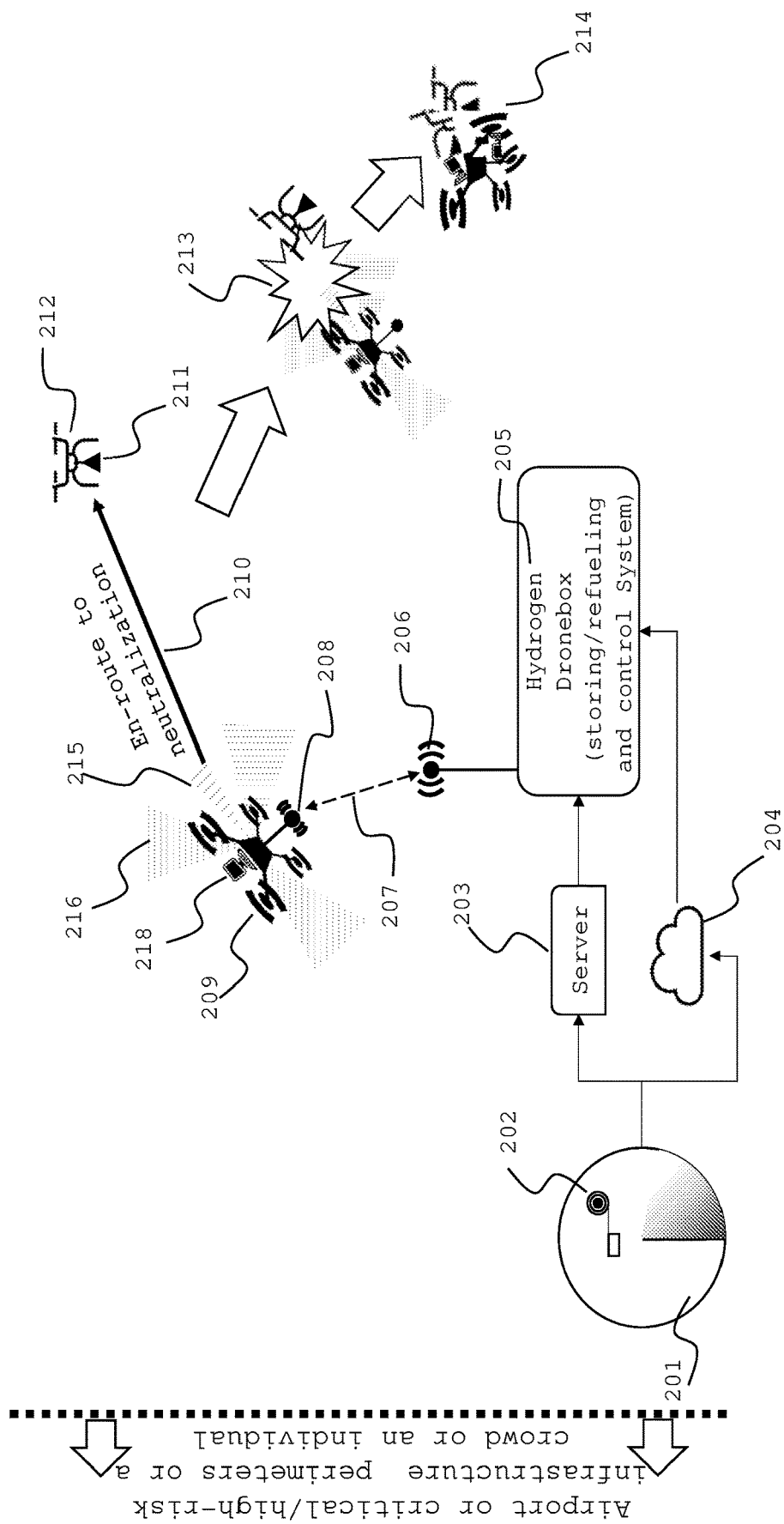
Figure 38:
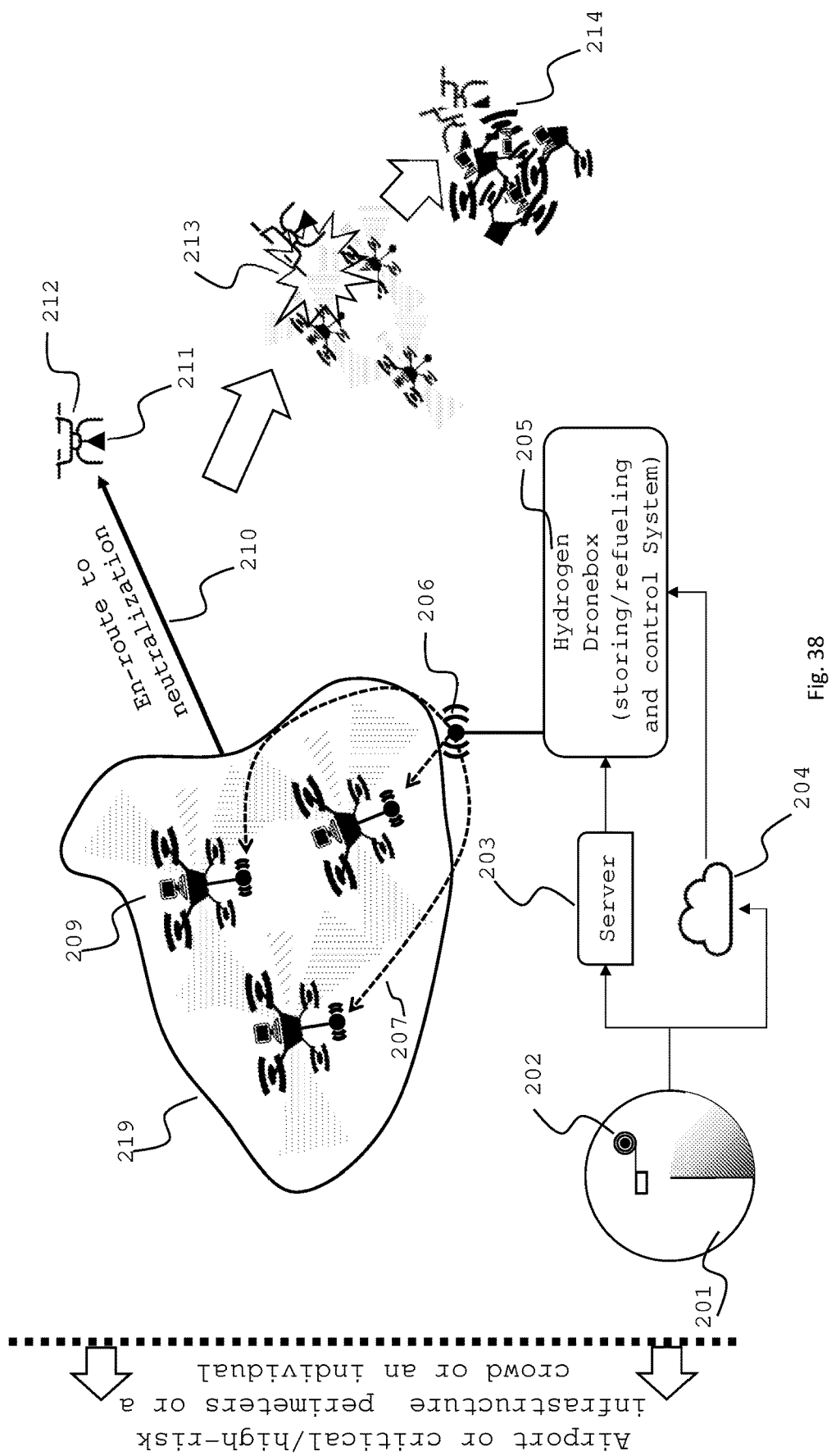
Figure 39:
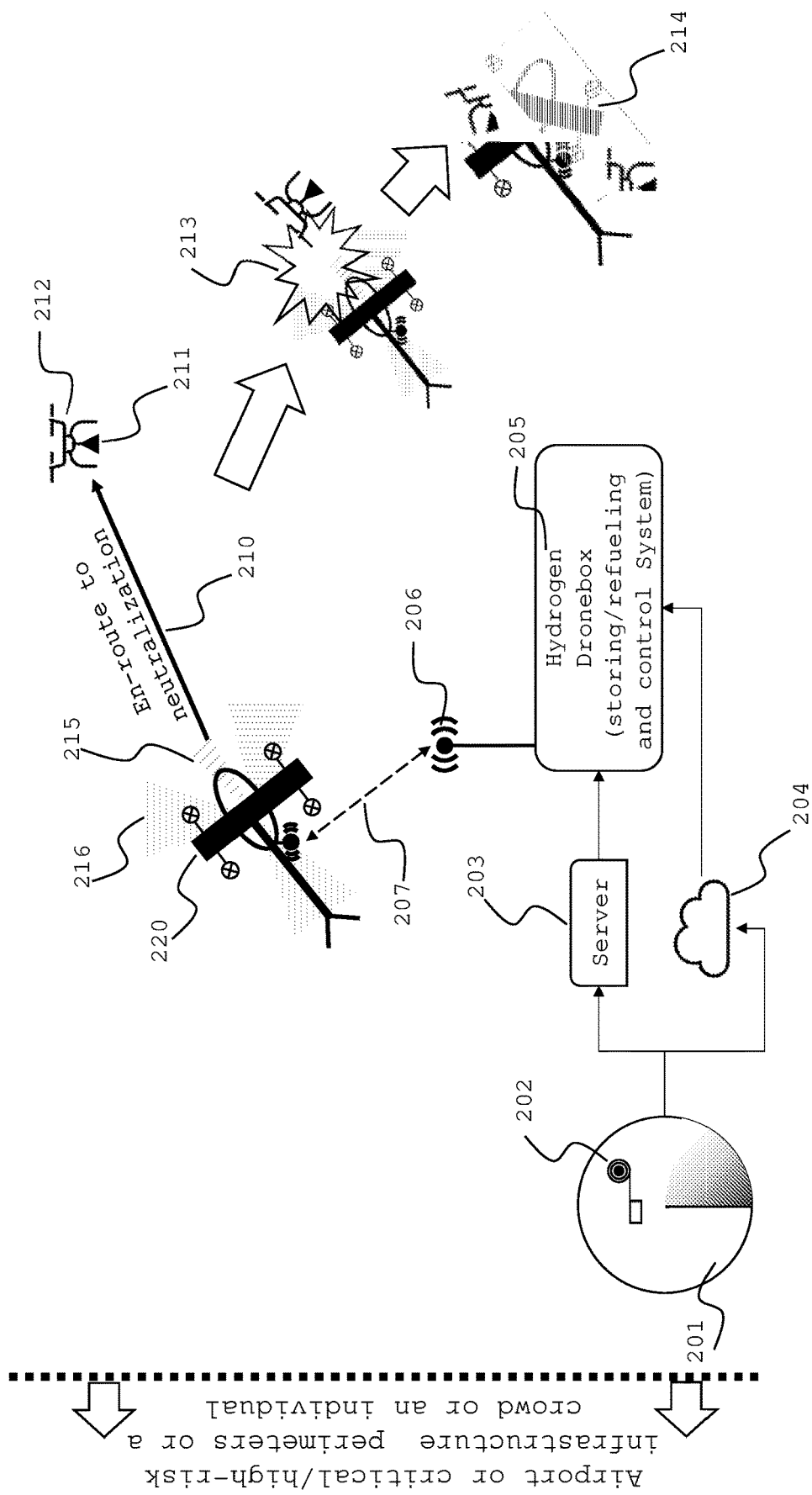
Figure 40:
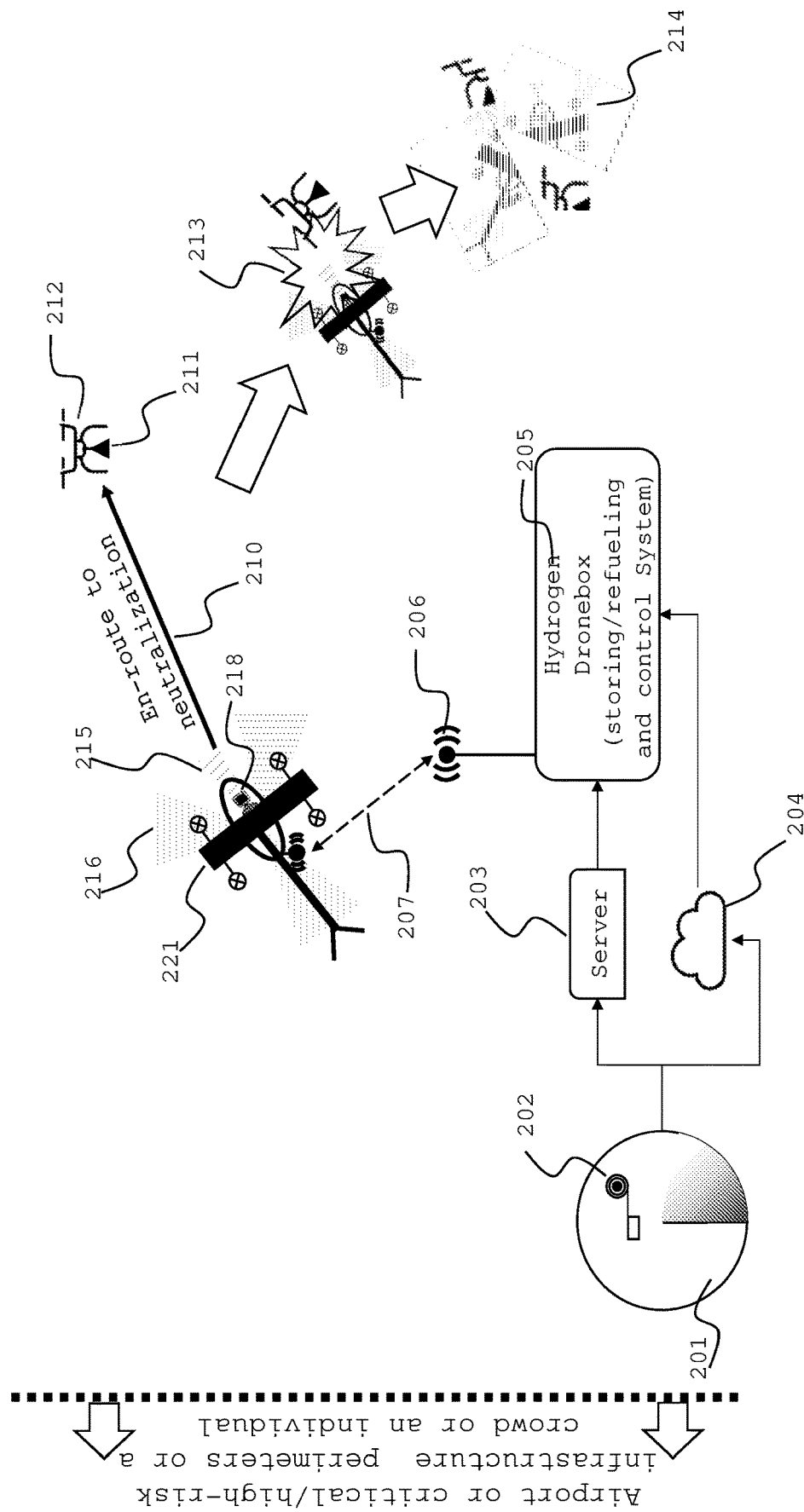
Figure 41:
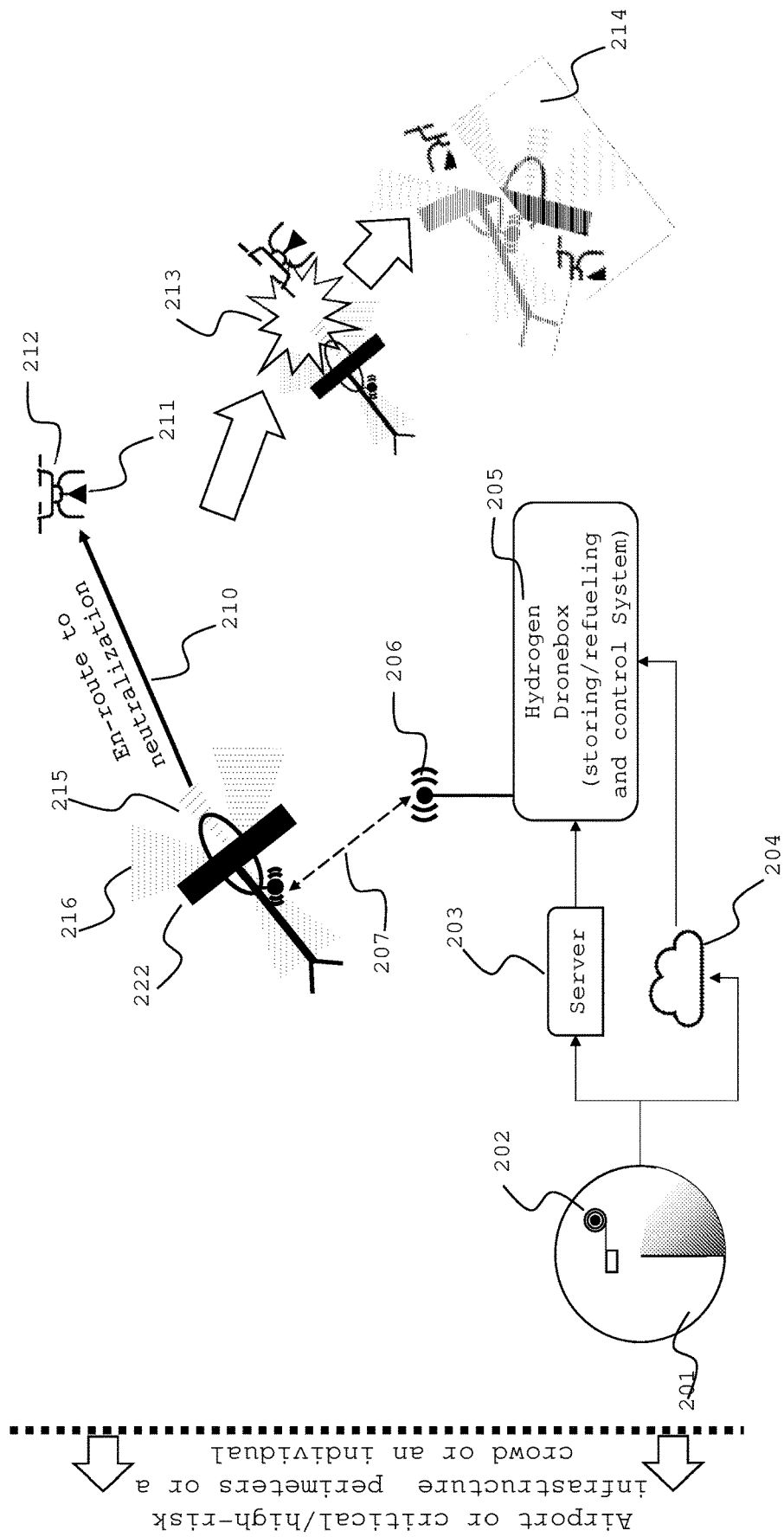
Figure 42:
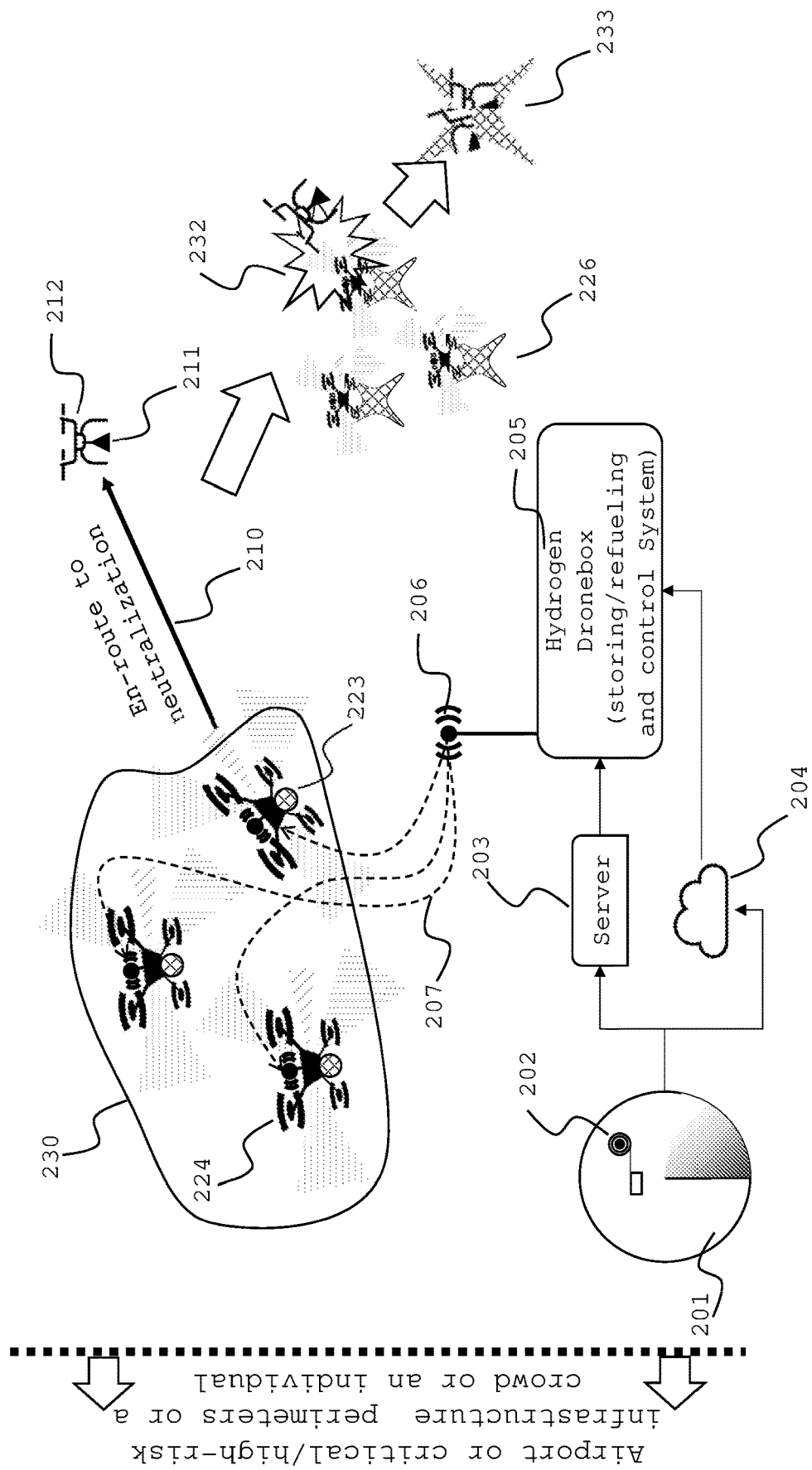
Figure 43:
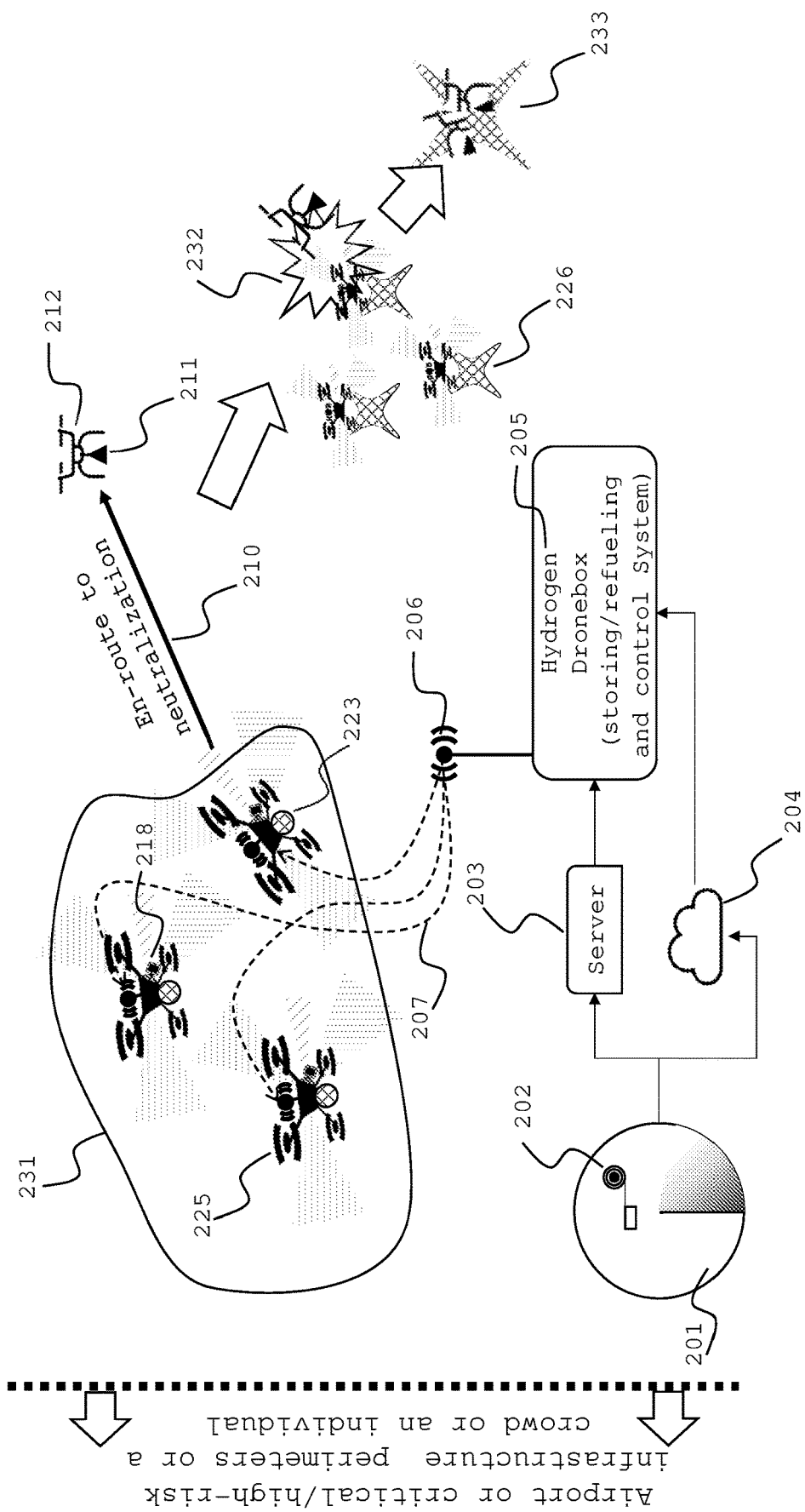
Figure 44:
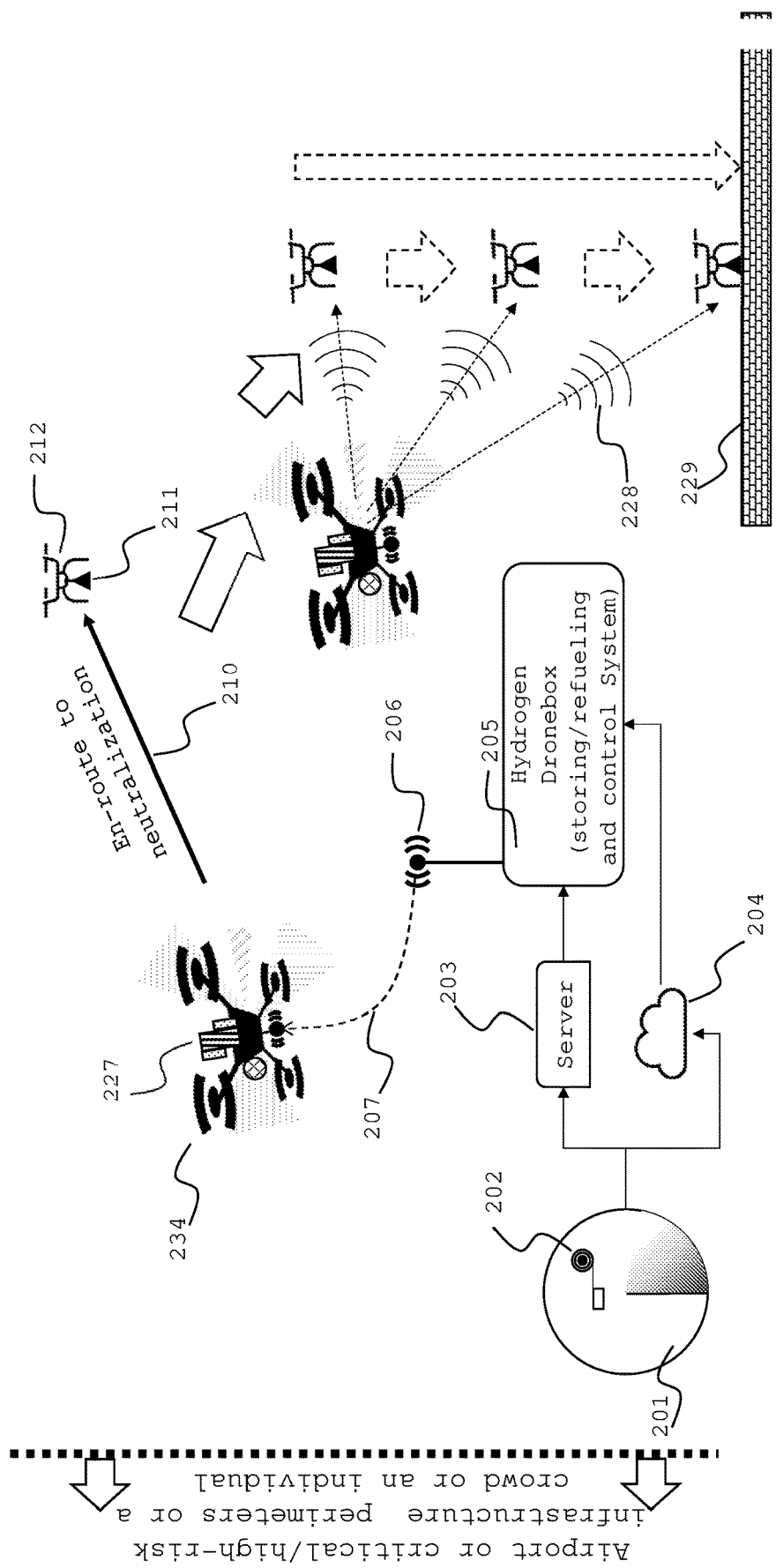
Figure 45:
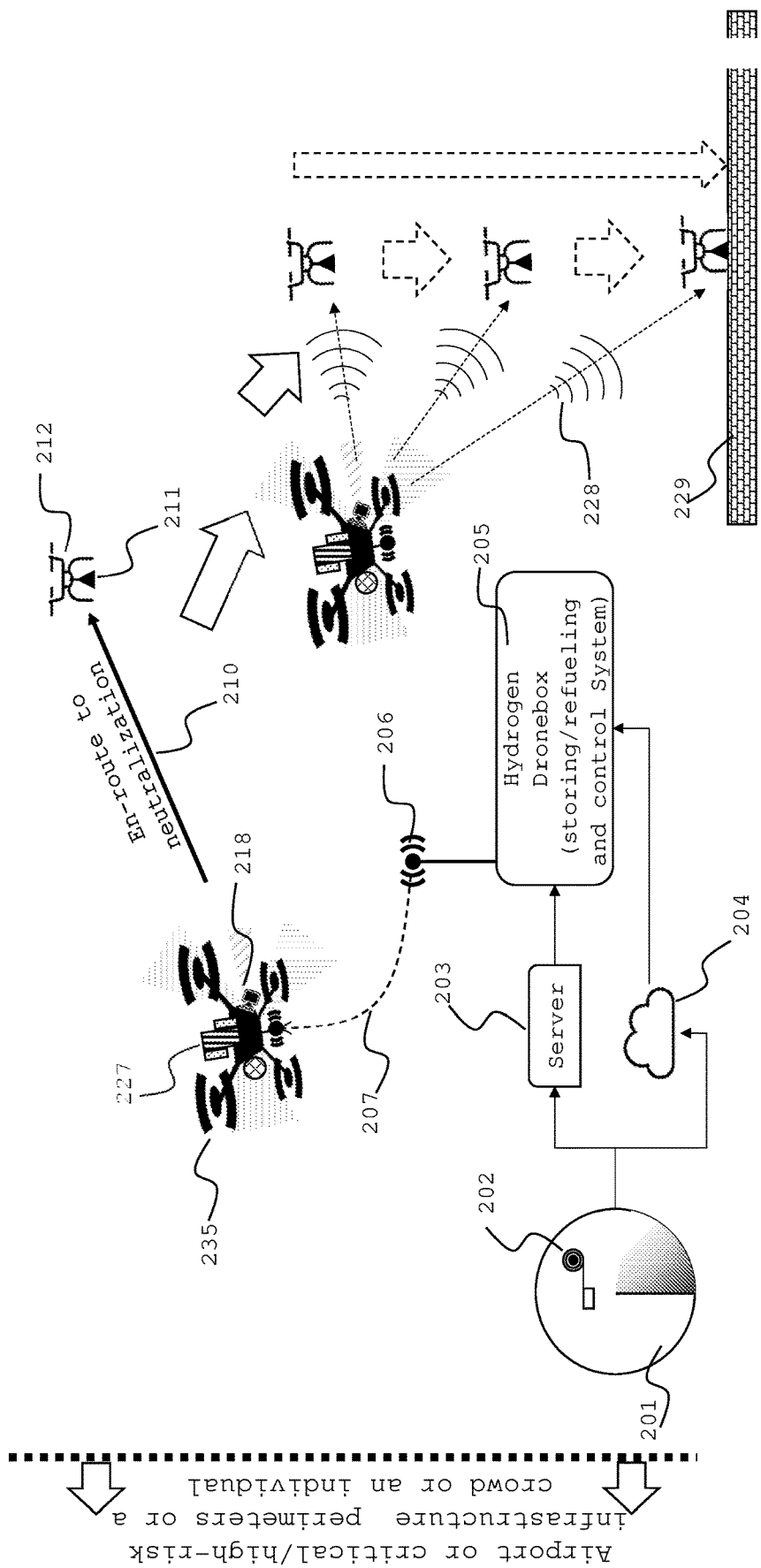
Figure 46:
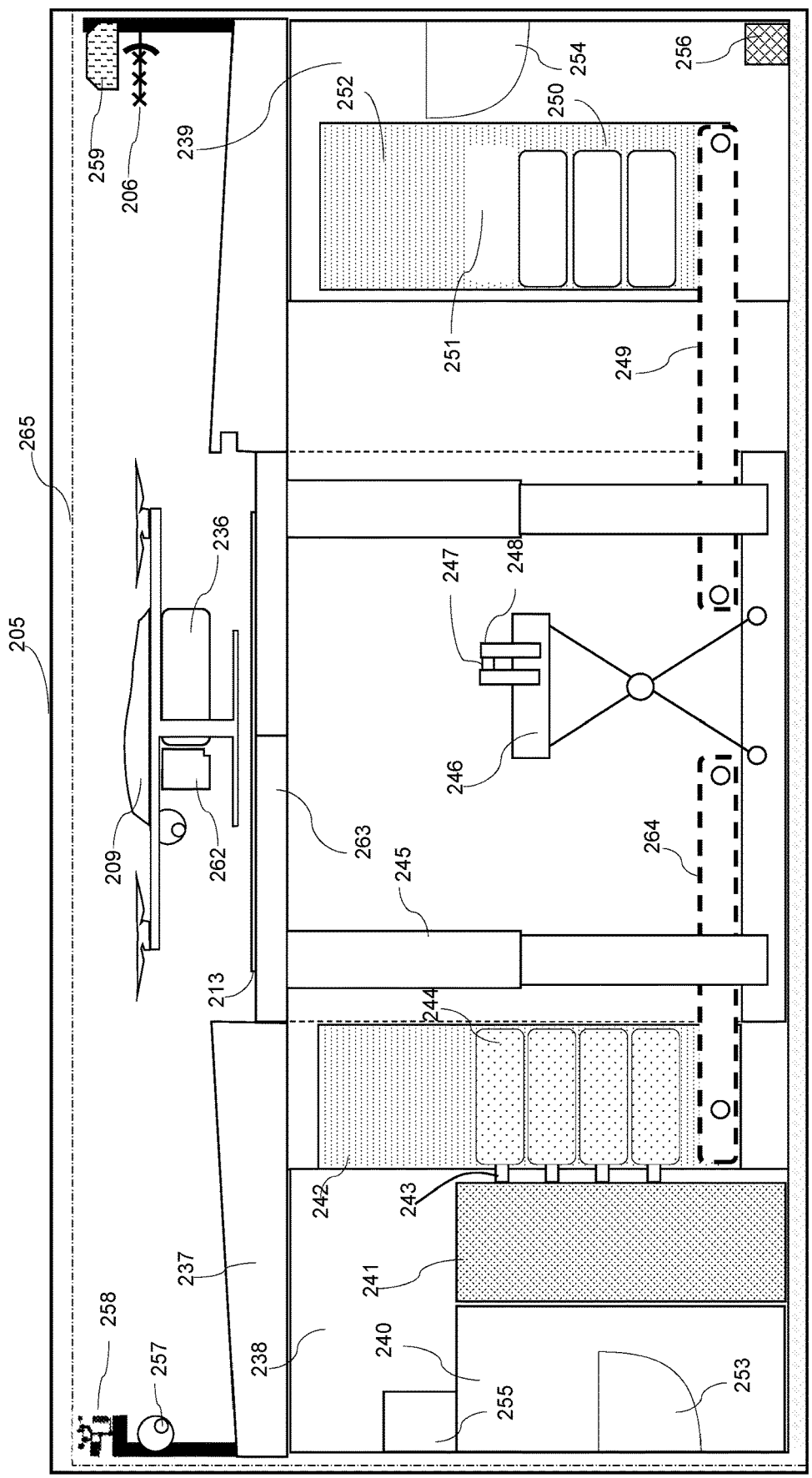
Figure 47:
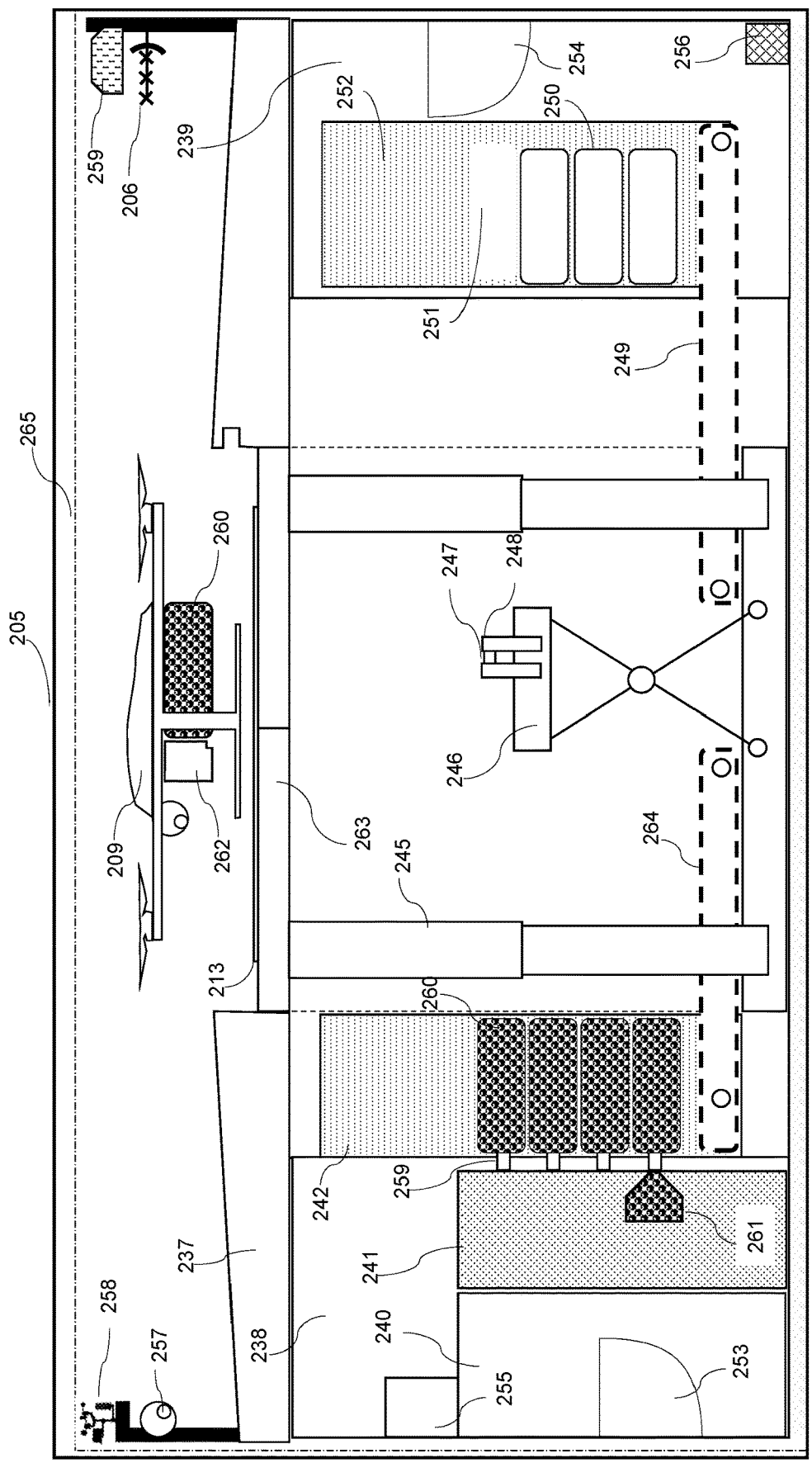
Figure 48:
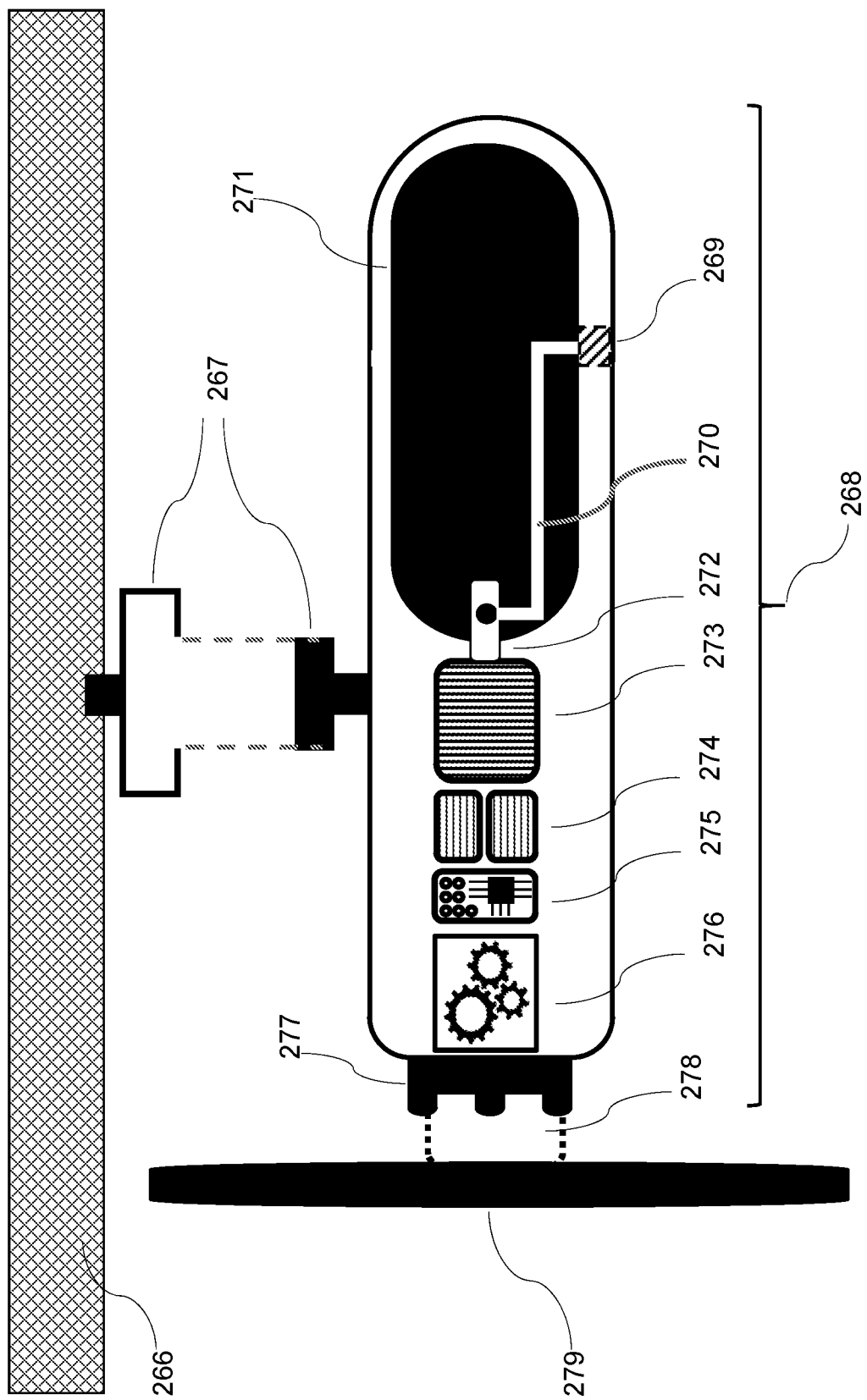
Figure 49:
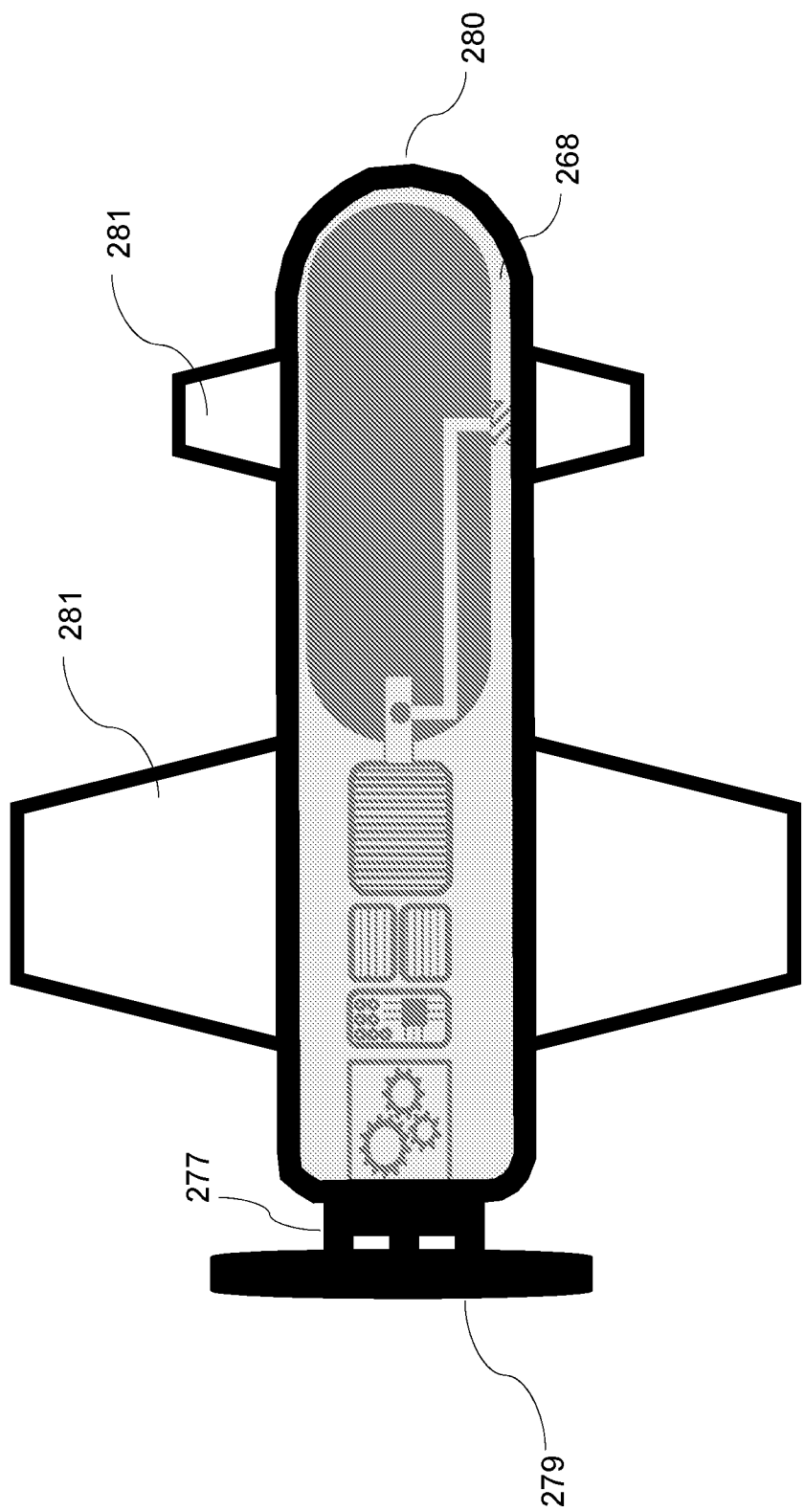
Figure 50:
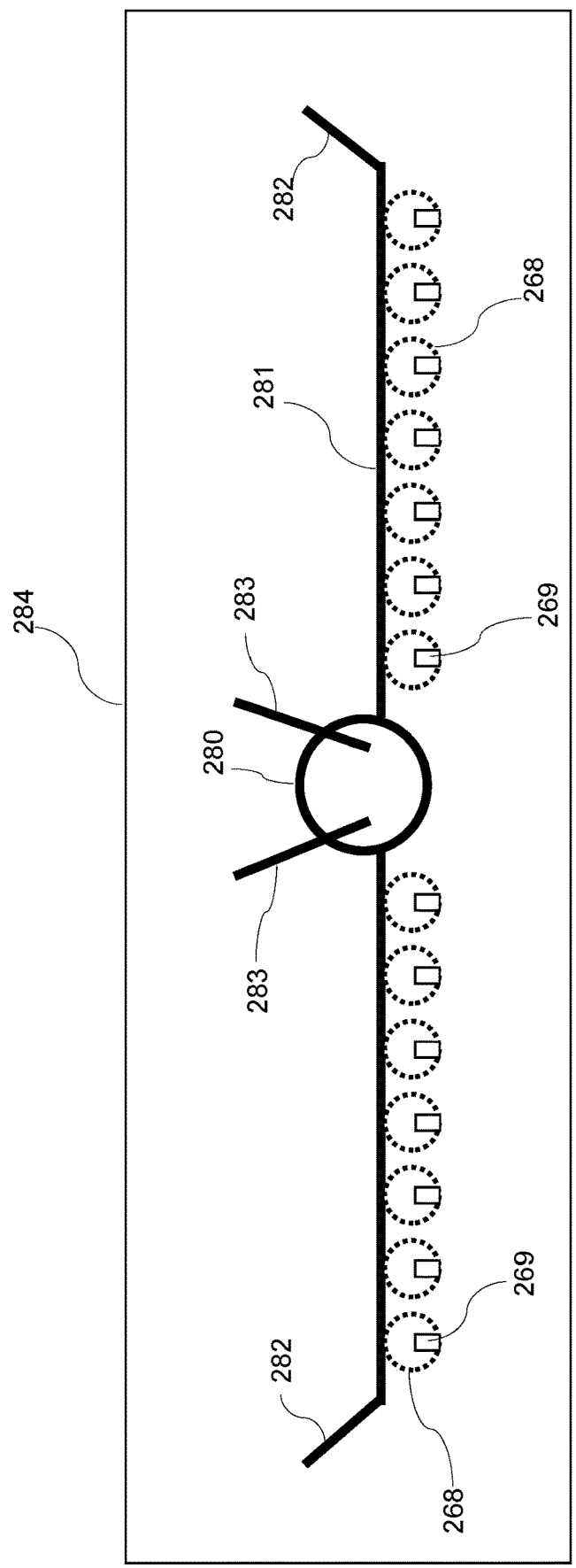
Figure 51:
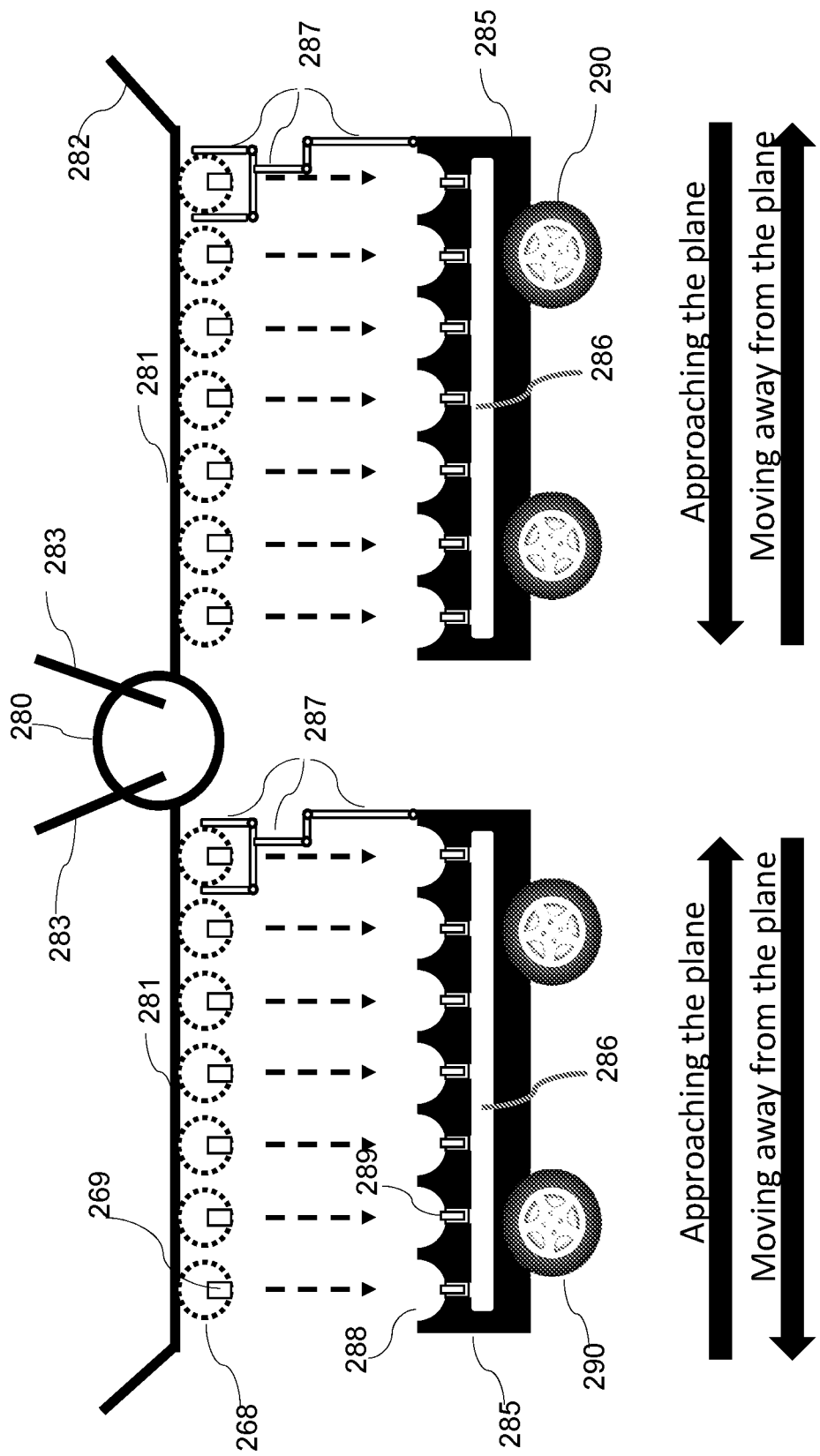
Figure 52:
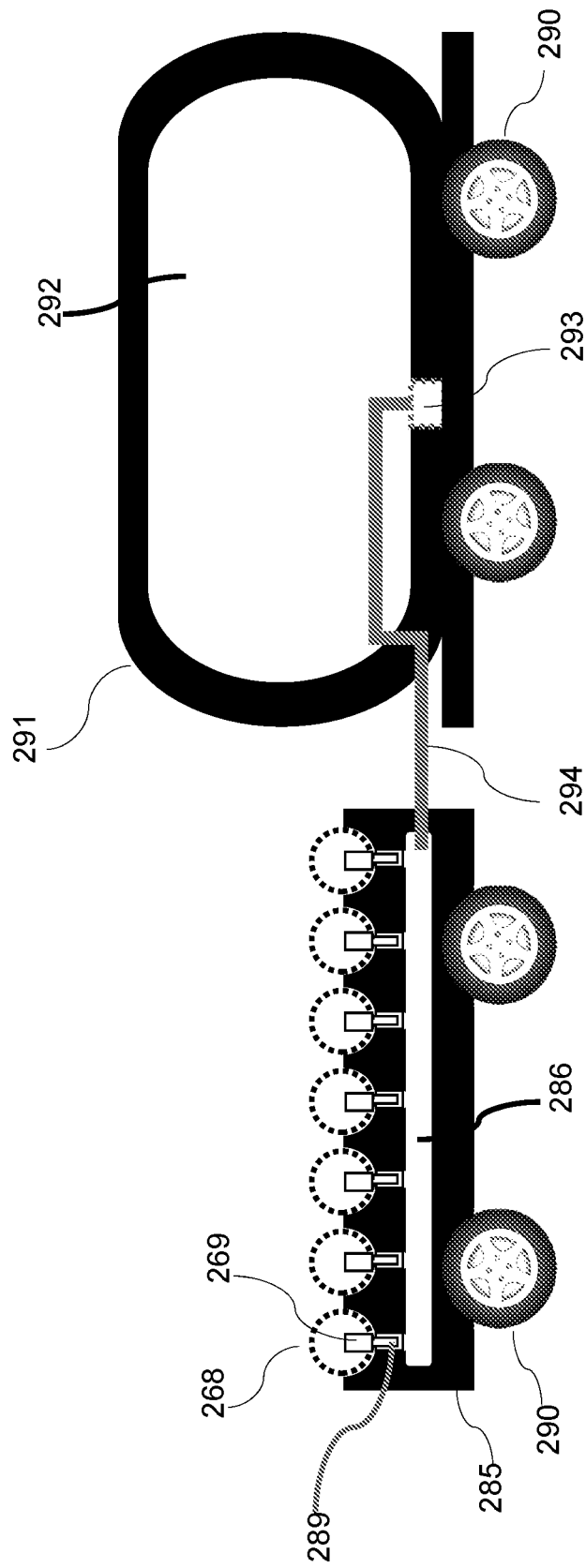
Figure 53:
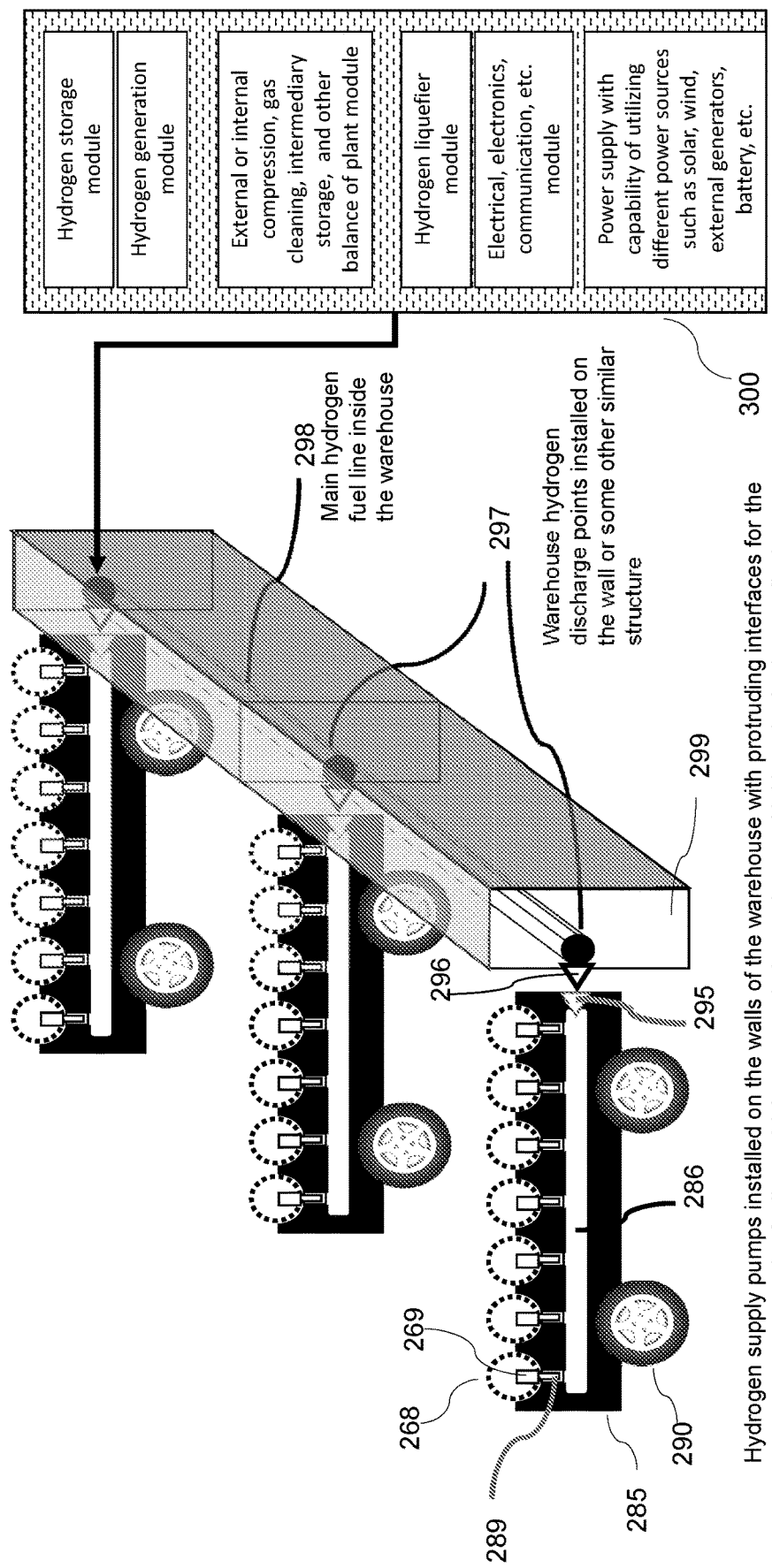
Figure 54:
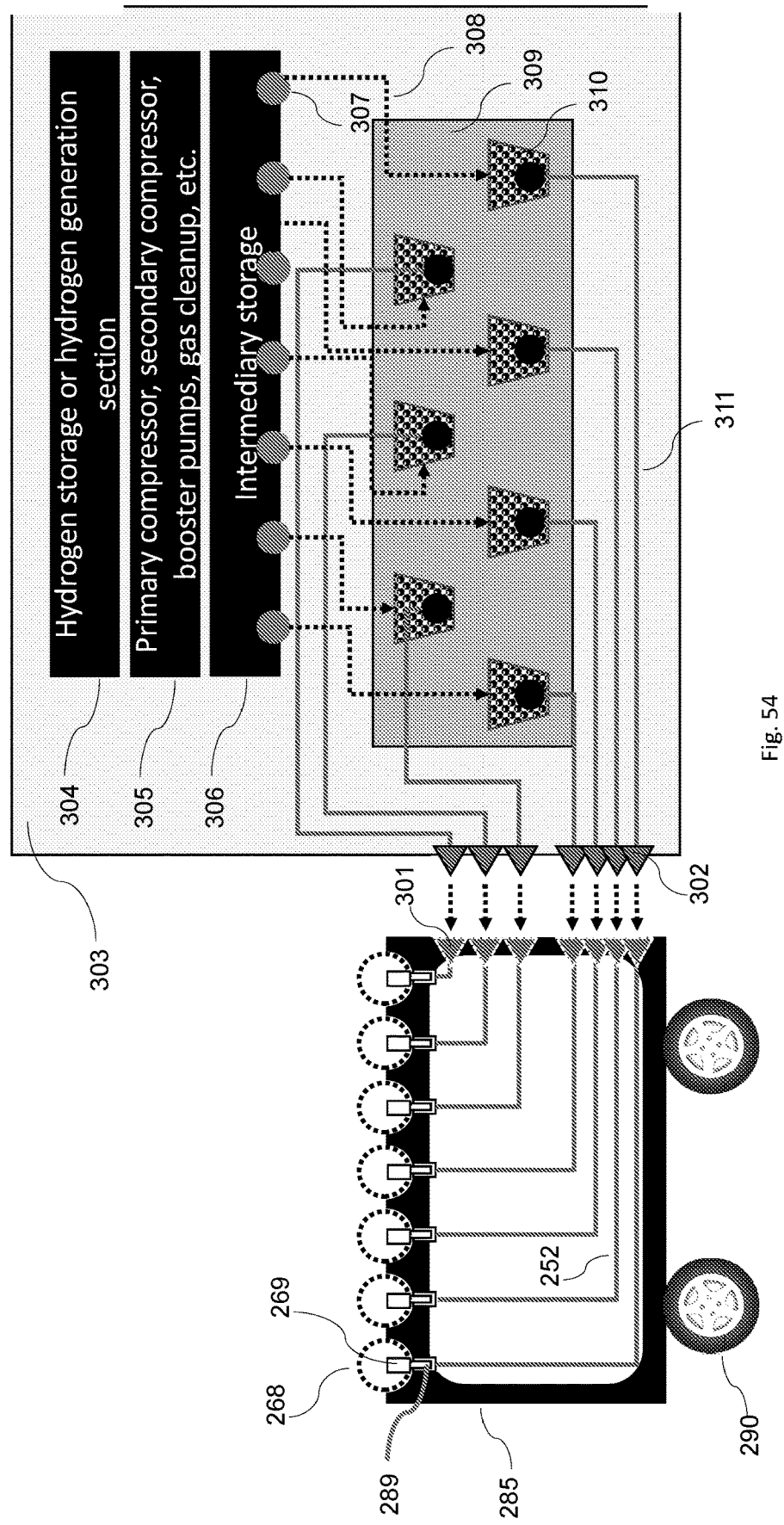
Figure 55:
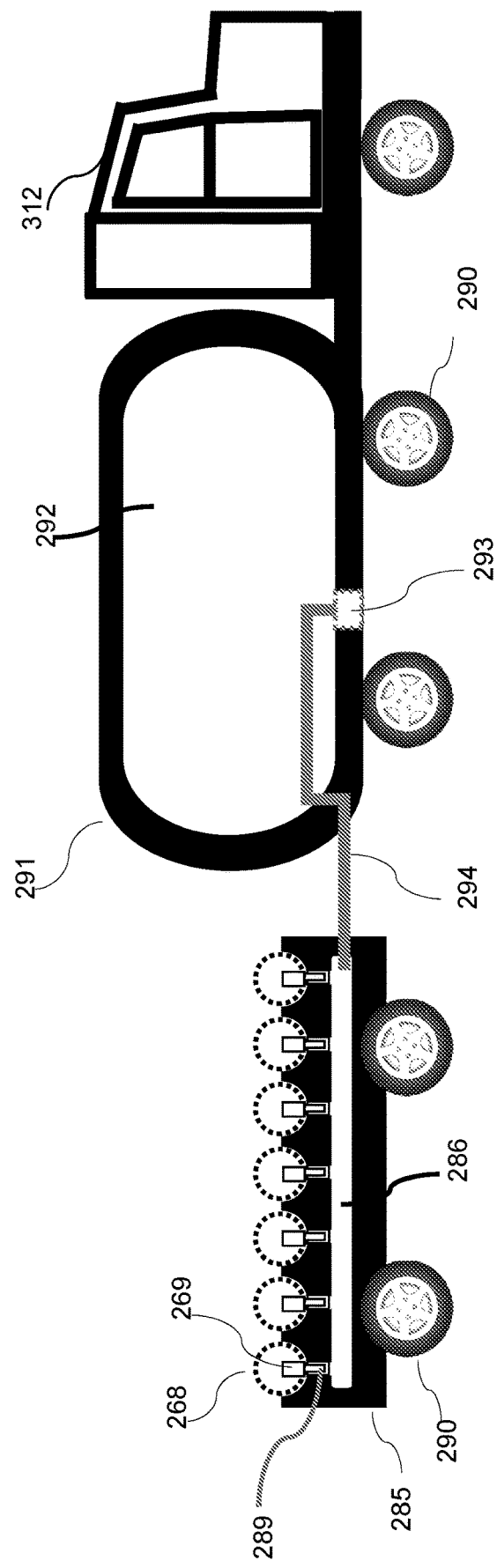
Figure 56:
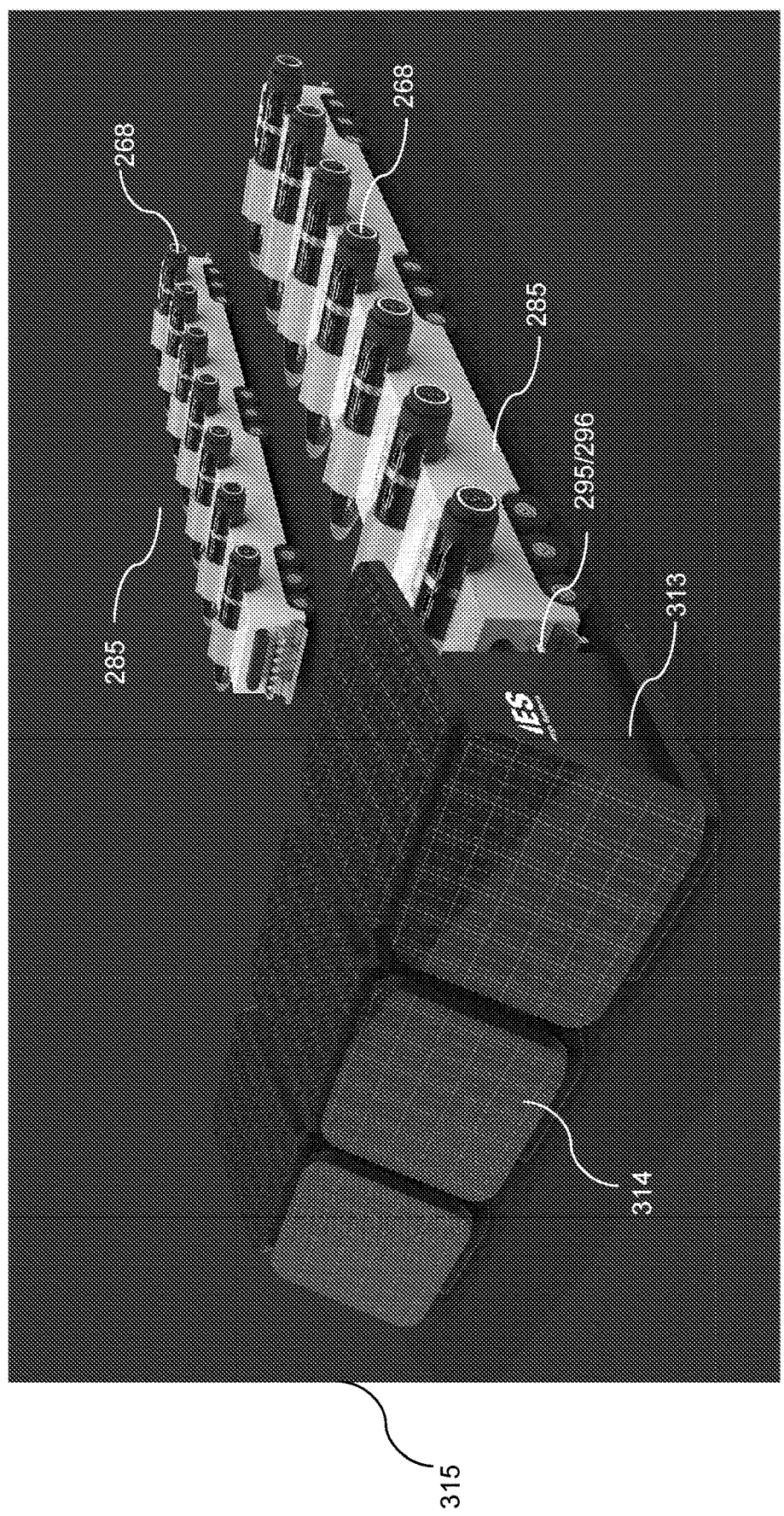
Figure 57:
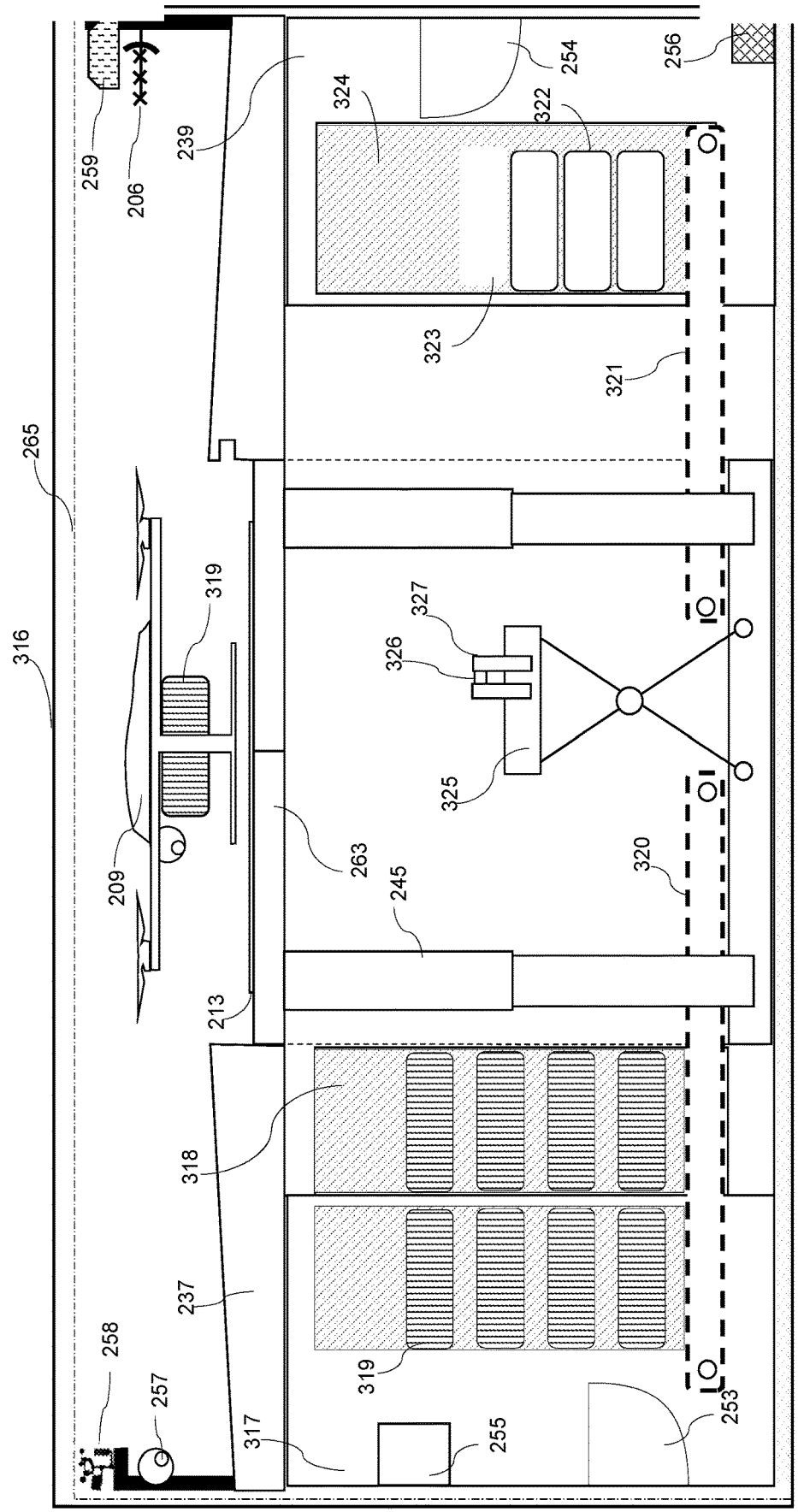

FIG. 15 illustrates the schematic view of autonomous hydrogen refueling and a multi-rotor unmanned vehicle storing station where fully automated hydrogen cylinder, cartridge, or pod replacement mechanism is placed underneath landing area (where hydrogen is stored in the form of gaseous or liquid, or generated from a slurry, or solid material such as hydride) for the unmanned vehicle applications FIG. 16 illustrates the schematic view of autonomous hydrogen refueling and a VTOL unmanned vehicle storing station where fully automated hydrogen cylinder, cartridge, or pod replacement mechanism is placed underneath the landing area (where hydrogen is stored in the form of gaseous or liquid, or generated from a slurry, or solid material) for the unmanned vehicle applications FIG. 17 illustrates the schematic view of autonomous hydrogen refueling and a vertically (or perpendicular to the ground) launched unmanned vehicle storing station where fully automated hydrogen cylinder, cartridge, or pod replacement mechanism is placed underneath the landing area (where hydrogen is stored in the form of gaseous or liquid, or generated from a slurry, or solid material) for the unmanned vehicle applications FIG. 18 illustrates the schematic view of autonomous hydrogen refueling and unmanned vehicle storing station of FIG. 15 and has the capability of transforming gaseous hydrogen to liquid hydrogen via a hydrogen liquefier device and the unmanned vehicle carries the hydrogen in the liquid form on its own platform for the unmanned vehicle applications FIG. 19 illustrates the schematic view of charged cartridges being stored inside the autonomous hydrogen refueling and unmanned vehicle storing station using a revolving mechanism with multiple chambers holding charged hydrogen cylinder, cartridge, or pods for the unmanned vehicle applications FIG. 20 illustrates the schematic view of charged/depleted cartridges being stored on the same revolving mechanism inside the autonomous hydrogen refueling and unmanned vehicle storing station using a revolving mechanism with multiple chambers holding charged or depleted hydrogen cylinder, cartridge, or pods for the unmanned vehicle applications FIG. 21 illustrates the schematic view of depleted hydrogen cylinders, cartridges, or pods being stored inside the autonomous hydrogen refueling and unmanned vehicle storing station using a revolving mechanism with multiple chambers holding depleted hydrogen cylinder, cartridge, or pods for the unmanned vehicle applications FIG. 22 illustrates the schematic view of charged cartridges being stored inside the autonomous hydrogen refueling and unmanned vehicle storing station using a linear (also known as Pezi-dispenser) mechanism with multiple chambers holding charged hydrogen cylinder, cartridge, or pods for the unmanned vehicle applications FIG. 23 illustrates the schematic view of charged/depleted cartridges being stored on the same linear mechanism (also known as Pezi-dispenser) inside the autonomous hydrogen refueling and unmanned vehicle storing station using a linear mechanism with multiple chambers holding charged or depleted hydrogen cylinder, cartridge, or pods for the unmanned vehicle applications FIG. 24 illustrates the schematic view of depleted hydrogen cylinders, cartridges, or pods being stored inside the autonomous hydrogen refueling and unmanned vehicle storing station using a linear (also known as Pezi-dispenser) mechanism with multiple chambers holding depleted hydrogen cylinder, cartridge, or pods for the unmanned vehicle applications FIG. 25 illustrates the schematic view of autonomous hydrogen refueling and unmanned vehicle storing station where fully automated hydrogen cylinder replacement mechanism is integrated to the side of the drone landing area and utilizes hydrogen in the gaseous form for the unmanned vehicle FIG. 26 illustrates the schematic view of autonomous hydrogen refueling and unmanned vehicle storing station where fully automated hydrogen cylinder replacement mechanism is integrated to the side of the drone landing area, hydrogen generation is accomplished with an electrolyzer and then generated hydrogen gas is transferred to the unmanned vehicle's cylinder via multiple pressurization mechanisms for the unmanned vehicle FIG. 27 illustrates the schematic view of autonomous hydrogen refueling and unmanned vehicle storing station of FIG. 26 where fully automated gaseous hydrogen cylinder replacement mechanism is integrated to the side of the drone landing area, hydrogen generation is accomplished with a high pressure electrolyzer to achieve the first pressurization stage without a compressor and then transfer it to the unmanned vehicle's storage medium with another pressurization mechanism for the unmanned vehicle FIG. 28 illustrates the schematic view of autonomous hydrogen refueling and unmanned vehicle storing station of FIG. 25 where fully automated liquid hydrogen cylinder replacement mechanism is integrated to the side of the drone landing area and utilizes a liquid hydrogen device and produces liquid hydrogen from the pressurized gaseous hydrogen storage for the unmanned vehicle FIG. 29 illustrates the schematic view of autonomous hydrogen refueling and unmanned vehicle storing station of FIG. 26 where fully automated liquid hydrogen cylinder replacement mechanism is integrated to the side of the drone landing area and generates hydrogen with an electrolyzer, pressurize it with multiple external pressurization mechanisms, and transforms the gaseous hydrogen to liquid form and unmanned vehicle carries the liquid hydrogen on its own platform FIG. 30 illustrates the schematic view of autonomous hydrogen refueling and unmanned vehicle storing station of FIG. 27 where fully automated liquid hydrogen cylinder replacement mechanism is integrated to the side of the drone landing area and generates hydrogen with a high pressure to achieve the first pressurization stage without a compressor, use an external pressurization mechanism to achieve the second pressure stage and then utilize a hydrogen liquefier to obtain liquid hydrogen and enable the unmanned vehicle to carry liquid hydrogen on its own platform FIG. 31 illustrates the schematic view of autonomous hydrogen refueling and unmanned vehicle storing station of FIG. 26 where fully automated slurry hydrogen cartridge replacement mechanism is integrated to the side of the drone landing area, hydrogen generation is accomplished by using a slurry of chemical hydride with a water or water/caustic solution mixture and a reactor to release hydrogen from the hydride material FIG. 32 illustrates the schematic view of autonomous hydrogen refueling and unmanned vehicle storing station of FIG. 26 where fully automated solid hydrogen cartridge replacement mechanism is integrated to the side of the drone landing area, hydrogen generation is accomplished by using a hydride and water as the solvent inside a reactor to release hydrogen from the hydride material FIG. 33 illustrates the schematic view of a hydrogen fuel cell powered unmanned vehicle (multi-rotor drone), its storing and autonomous refueling station (the said station is also called as drone box), its communication with the drone box and drone-detection systems to obtain the location of the unauthorized, stray or outlaw drone, its activation and being en-route for neutralization of the unauthorized, stray or outlaw drone FIG. 34 illustrates the schematic view of a hydrogen fuel cell powered unmanned vehicle (multi-rotor drone) with a camera, its storing and autonomous refueling station (the said station is also called as drone box), its communication with the drone box and drone-detection systems to obtain the location of the unauthorized, stray or outlaw drone, its activation and being en-route for neutralization of the unauthorized, stray, or outlaw drone FIG. 35 illustrates the schematic view of a hydrogen fuel cell powered unmanned vehicle (multi-rotor drone) with a camera and proximity sensors, its storing and autonomous refueling station (the said station is also called as drone box), its communication with the drone box and drone-detection systems to obtain the location of the unauthorized, stray or outlaw drone, its activation and being en-route for neutralization of the unauthorized, stray, or outlaw drone FIG. 36 illustrates the schematic view of a swarm of hydrogen fuel cell powered unmanned vehicles (multi-rotor drones) with cameras and proximity sensors, their storing and autonomous refueling station (the said station is also called as drone box), their communication with the drone box and drone-detection systems to obtain the location of the unauthorized, stray or outlaw drone, their activation and being en-route for neutralization of the unauthorized, stray, or outlaw drone FIG. 37 illustrates the schematic view of a hydrogen fuel cell powered unmanned vehicle (multi-rotor drone) with a camera, proximity sensors, and an on-board computer (for autonomous course navigation and correction, search and identification, etc.), its storing and autonomous refueling station (the said station is also called as drone box), its communication with the drone box and drone-detection systems to obtain the location of the unauthorized, stray or outlaw drone, its activation and being en-route for neutralization of the unauthorized, stray, or outlaw drone FIG. 38 illustrates the schematic view of a swarm of hydrogen fuel cell powered unmanned vehicles (multi-rotor drones) with cameras, proximity sensors, and onboard computers (for autonomous course navigation and correction, search and identification, etc.), their storing and autonomous refueling station (the said station is also called as drone box), their communication with the drone box and drone-detection systems to obtain the location of the unauthorized, stray or outlaw drone, their activation and being en-route for neutralization of the unauthorized, stray, or outlaw drone FIG. 39 illustrates the schematic view of a hydrogen fuel cell powered unmanned vehicle (VTOL, vertical takeoff and landing) with a camera and proximity sensors, its storing and autonomous refueling station (the said station is also called as drone box), its communication with the drone box and drone-detection systems to obtain the location of the unauthorized, stray or outlaw drone, its activation and being en-route for neutralization of the unauthorized, stray, or outlaw drone FIG. 40 illustrates the schematic view of a hydrogen fuel cell powered unmanned vehicle (VTOL) with a camera, proximity sensors, and an on-board computer (for autonomous course navigation and correction, search and identification, etc.), its storing and autonomous refueling station (the said station is also called as drone box), its communication with the drone box and drone-detection systems to obtain the location of the unauthorized, stray or outlaw drone, its activation and being en-route for neutralization of the unauthorized, stray, or outlaw drone FIG. 41 illustrates the schematic view of a hydrogen fuel cell powered unmanned vehicle (fixed-wing) with a camera and proximity sensors, its storing and autonomous refueling station (the said station is also called as drone box), its communication with the drone box and drone-detection systems to obtain the location of the unauthorized, stray or outlaw drone, its activation and being en-route for neutralization of the unauthorized, stray, or outlaw drone FIG. 42 illustrates the schematic view of a swarm of hydrogen fuel cell powered unmanned vehicles (multi-rotor drones) with cameras, proximity sensors, and capturing nets, their storing and autonomous refueling station (the said station is also called as drone box), their communication with the drone box and drone-detection systems to obtain the location of the unauthorized, stray or outlaw drone, their activation and being en-route to neutralization of the unauthorized, stray, or outlaw drone FIG. 43 illustrates the schematic view of a swarm of hydrogen fuel cell powered unmanned vehicles (multi-rotor drones) with cameras, proximity sensors, on-board computers (for autonomous course navigation and correction, search and identification, etc.), and capturing nets, their storing and autonomous refueling station (the said station is also called as drone box), their communication with the drone box and drone-detection systems to obtain the location of the unauthorized, stray or outlaw drone, their activation and being en-route to neutralization of the unauthorized, stray, or outlaw drone FIG. 44 illustrates the schematic view of a hydrogen fuel cell powered unmanned vehicle (multi-rotor drone) with a camera, proximity sensors, a capturing net, and a spoofing or jamming or electronic disruption device, its storing and autonomous refueling station (the said station is also called as drone box), its communication with the drone box and drone-detection systems to obtain the location of the unauthorized, stray or outlaw drone, its activation and being en-route to neutralization of the unauthorized, stray or outlaw drone FIG. 45 illustrates the schematic view of a hydrogen fuel cell powered unmanned vehicle (multi-rotor drone) with a camera, proximity sensors, on-board computers (for autonomous course navigation and correction, search and identification, etc.), a capturing net, and a spoofing or jamming or electronic disruption device, its storing and autonomous refueling station (the said station is also called as drone box), its communication with the drone box and drone-detection systems to obtain the location of the unauthorized, stray or outlaw drone, its activation and being en-route to neutralization of the unauthorized, stray or outlaw drone FIG. 46 illustrates the schematic view of autonomous hydrogen storing/refueling station (collectively known as drone box assembly) where fully automated hydrogen cylinder, cartridge, or pod replacement mechanism is placed underneath landing area (where hydrogen is stored in the form of gaseous or liquid, or generated from a slurry, or solid material such as hydride) for the hydrogen fuel cell powered unmanned vehicle that will be used to neutralize the threat of an unauthorized or stray or outlaw drone FIG. 47 illustrates the schematic view of autonomous hydrogen storing/refueling station (collectively known as drone box assembly) of FIG. 14 and has the capability of transforming gaseous hydrogen to liquid hydrogen via a hydrogen liquefier device and the unmanned vehicle carries the hydrogen in the liquid form on its own platform for significantly improved effective flight time characteristics FIG. 48 illustrates the schematic view of a distributed and interchangeable electric propulsion pod that has the platform flexibility of being utilized across multiple different unmanned vehicles either in the single form or multiple forms for the neutralization of drones FIG. 49 illustrates the schematic view of a fixed-winged unmanned with a single distributed and interchangeable electric propulsion pod that functions both as the powering device and also the fuselage FIG. 50 illustrates the schematic view of a fixed-winged unmanned with multiples of distributed and interchangeable electric propulsion pods in order to obtain a powerful unmanned vehicle extended flight range and also maneuvering capability for better interceptions of the drones creating safety risks FIG. 51 illustrates the schematic view of autonomous refueling vehicle removing the depleted distributed and interchangeable electric propulsion pods with the aid of robotic solutions and transfer these pods for refueling to the refueling locations FIG. 52 illustrates the schematic of view of autonomous refueling of the depleted distributed and interchangeable electric propulsion pods stowed over the autonomous ground vehicle by getting the hydrogen fuel from another autonomous ground hydrogen supply tank FIG. 53 illustrates the schematic of view of autonomous refueling of the depleted distributed and interchangeable electric propulsion pods stowed over the autonomous ground vehicles by getting their hydrogen fuel from the hydrogen discharge points located within a building, warehouse, hangar or an infrastructure that has its own hydrogen storage, generation, and dispensation capability FIG. 54 illustrates the schematic of view of autonomous liquid hydrogen refueling of the depleted distributed and interchangeable electric propulsion pods stowed over the autonomous ground vehicle by getting the liquid hydrogen fuel from the liquid hydrogen discharge points located over a liquid hydrogen plant or within a building, warehouse, hangar or an infrastructure that has its own hydrogen storage, generation, and dispensation capability FIG. 55 illustrates the schematic of view of autonomous refueling of the depleted distributed and interchangeable electric propulsion pods stowed over the autonomous ground vehicle by getting the hydrogen fuel from a manned ground hydrogen supply tanker FIG. 56 illustrates the schematic of view of autonomous refueling of the depleted distributed and interchangeable electric propulsion pods stowed over the autonomous ground vehicles by getting the hydrogen fuel from a hydrogen farm that is comprised of renewable energy powered modular hydrogen generation and dispensing units FIG. 57 illustrates the schematic of view of an unmanned vehicle, its storing/recharging or storing/exchanging station for non-hydrogen based powering mechanisms In the following description, details are provided to describe embodiments of the application. It shall be apparent to one skilled in the art, however, that the embodiments may be practiced without such details.

Some parts of the embodiment have similar parts. The similar parts may have the same names or similar part numbers. The description of one similar part also applies by reference to another similar parts, where appropriate, thereby reducing repetition of text without limiting the disclosure.

In order to increase the effective flight time and the range, it is essential that all possible energy resources are utilized very efficiently with a smart engineering approach both on the design of the electric aircraft and design of the power supply system. Currently manned aircrafts are utilizing multiple (less than four or five depending on the aircraft platform) jet engines to handle all of the power needed to safely taxiing, take-off, cruise, landing, and all other operations while en-route to their destinations. While having only a few large jet engines to generate power is quite advantageous such as less weight and achieving reasonable air speeds, in the case of catastrophic engine failures, there are also some major disadvantages such as losing the control of the aircraft and crash landing with fatalities. All-battery powered manned aircrafts have also been following a similar power solution design compared to conventional aircrafts with jet engines, namely multiple large batteries stored at the same location to create a more or less centralized power generation scheme, to achieve high air speed values, though this design has also created issues from a thermal management perspective and resulted in failures (such as https://electrek.co/2018/06/04/siemens-electric-plane-prototype-firecrash-death/). Solar or solar/battery hybrid designs, on the other hand, provided a safe platform by spreading out the solar cells or photovoltaic cells over the entire wing surface, though long/wide wing to accommodate large number of solar cells or photovoltaic cells created an aerodynamic issue that limit the high air speed.

In order to overcome all of the abovementioned issues, this application discloses a hydrogen aviation eco-system with a unique hydrogen-electric aircraft design with distributed and interchangeable propulsion pod concept and their autonomous refueling and also an autonomous mobile catapult system with batteries to assist during the take off in order to reduce the battery weight within the fuselage or cockpit sections. The hydrogen-electric aircraft, as the name suggests, has the capability of utilizing different hydrogen fuels such as gaseous hydrogen compressed to pressures up to 1000 bars in hydrogen cylinders, liquid hydrogen, and hydrogen generated from other hydrogen storing materials. While it is preferred to have gaseous hydrogen at high pressures (preferably up to 1000 bars) or liquid hydrogen for the manned hydrogen-electric aircrafts, much smaller aircrafts can utilize almost all forms of hydrogen storage such as gaseous hydrogen at high pressures (up to 1000 bars), liquid hydrogen, or hydrogen generated via different mechanisms from hydrogen storing materials such as hydrides. Since the weight of the power solution is at premium for both manned and unmanned aircrafts, it is suggested to utilize other energy sources as well such as solar cells or photovoltaic cells to reduce the weight of the power solution. In this application, the said hydrogen-electric aircraft has solar cells or photovoltaic cells spread out onto the surface of the wing and a battery bank to utilize the solar power to its fullest by first storing the solar power while the hydrogen-electric aircraft is either on the ground or while it is taking off or flying or landing. The conventional wisdom always tells us that the refueling of hydrogen fuel to the hydrogen storage medium such as hydrogen cylinder is the most difficult step for manned aircraft and also numerous other applications. In order to minimize the refueling time, this application integrates a distributed and interchangeable propulsion pod design into the said hydrogen-electric aircraft with lock/unlock mechanism that would make it easy to remove the depleted distributed and interchangeable propulsion pods from the wing and put the charged distributed and interchangeable propulsion pod onto the wing without an operator's involvement. Having the distributed design for the propulsion pods also adds the following safety/redundancy feature to the hydrogen-electric aircraft: existence of multiple propulsion pods and also multiple propulsion propellers with a propulsion pod behind each propeller make the entire power generation scheme very much decentralized and in the case of a propulsion pod or propeller failure, the hydrogen-electric aircraft can still safely fly and land without a total catastrophic event. Furthermore, this application also integrates a refueling approach that is autonomous, where all of the depleted propulsion pods are unlocked simultaneously from the hydrogen-electric aircraft wing's autonomously with the help of robotic arms or robotic grasping mechanism or lift and catch mechanisms, then loaded onto the autonomous ground refueling vehicle and its transportation to the hydrogen refueling locations (whether this is another autonomous ground hydrogen refueling tank, autonomous hydrogen refueling at a building or warehouse or hangar, or manned refueling with the aid of an operator using a ground hydrogen fuel supply tanker, etc), then transporting back the charged propulsion pods back to the hydrogen-electric aircraft, and installation of the charged propulsion pods onto the wing. Another item that is relevant for the hydrogen aviation eco-system is to have an autonomous mobile catapult system with batteries to assist during the take off. The main functionalities of such an assisted take off is to reduce the overall battery system weight that is located within the fuselage or cockpit. The autonomous mobile catapult system with batteries to assist during the takeoff is envisioned to be a mobile platform or another vehicle that resembles to an autonomous ground vehicle from a design perspective, have the capability of carrying the hydrogen-electric aircraft, contains sufficient quantities of battery modules to provide power to the hydrogen electric aircraft during the takeoff period. This entire hydrogen eco-system including the hydrogen-electric aircraft design furthers the advancement of hydrogen use for increasing the effective flight for aircraft while reducing the carbon emission.

Figure 1:
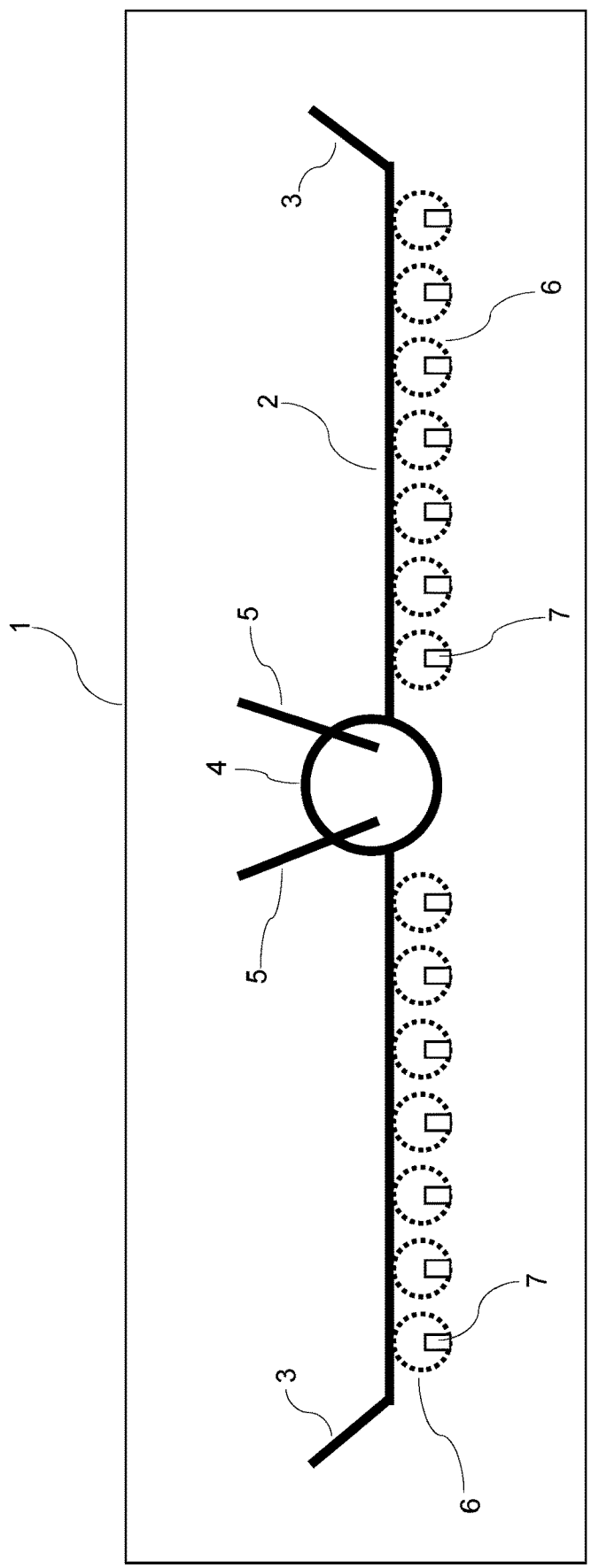

FIG. 1 shows the back-view of hydrogen-electric aircraft with distributed and interchangeable electric propulsion pods and solar wing 1, multiple solar cells or photovoltaic cells are placed across the wing surface area to establish the solar wing 2 to provide additional power during the day by utilizing the solar power from sun, winglets 3 to reduce drag, fuselage 4, vertical/horizontal stabilizers and rudder 5, distributed and interchangeable electric propulsion pods 6, and the refueling interface 7 for charging of hydrogen fuel to the depleted distributed and interchangeable electric propulsion pods 6. The hydrogen-electric aircraft 1 with distributed and interchangeable electric propulsion pods 6 and solar wing 2 has the capability of utilizing multiple of these distributed and interchangeable electric propulsion pods 6 and a sufficient number of these distributed and interchangeable electric propulsion pods 6 are attached to the solar wing 2 depending on the effective flight time or mission. For manned hydrogen-electric aircrafts, it is preferred to have the hydrogen fuel in the following forms: gaseous hydrogen at high pressures such as compressed hydrogen into a cylinder or some other form up to 1000 bars or liquid hydrogen stored in a cylinder or some other form. For unmanned hydrogen-electric aircrafts such (depending on the requirement of that particular platform), it is preferred to have the following hydrogen fuels: gaseous hydrogen at high pressures such as compressed hydrogen into a cylinder or some other form up to 1000 bars or liquid hydrogen stored in a cylinder or some other form or hydrogen generated from another hydrogen storing materials via different generation mechanisms such as hydride materials and utilization of water, water/alkali mixtures with or without a catalyst bed or with or without a reactor setup that utilizes heat to generate hydrogen from the hydride materials. While the hydrogen-electric aircraft with distributed and interchangeable electric propulsion pods and solar wing 1 is taxiing, flying or landing, solar wing 2 generate electricity from the conversion of solar light with solar cells or photovoltaic cells and stores this energy either in the battery located inside the fuselage 4 or this generated electrical energy is utilized to power the cockpit, A/C, and all other aircraft equipment/instrument that do not require much power. During the take-off period, distributed and interchangeable electric propulsion pods 6 provide power to the propellers in order to energize them and bring them to the full power for the taking-off and flight (and if it is needed, battery module on-board the hydrogen-electric aircraft also provides additional power to the propellers), while solar wing continue to power the all of the essential hydrogen-electric aircraft cockpit, A/C and all other essential aircraft equipment/instruments. The power management between distributed and interchangeable electric propulsion pods 6, batteries located on-board the hydrogen-electric aircraft 1, and solar wing can be managed according to the needs of the aircraft using a proper power management system that is used in the aviation industry.

Figure 2:
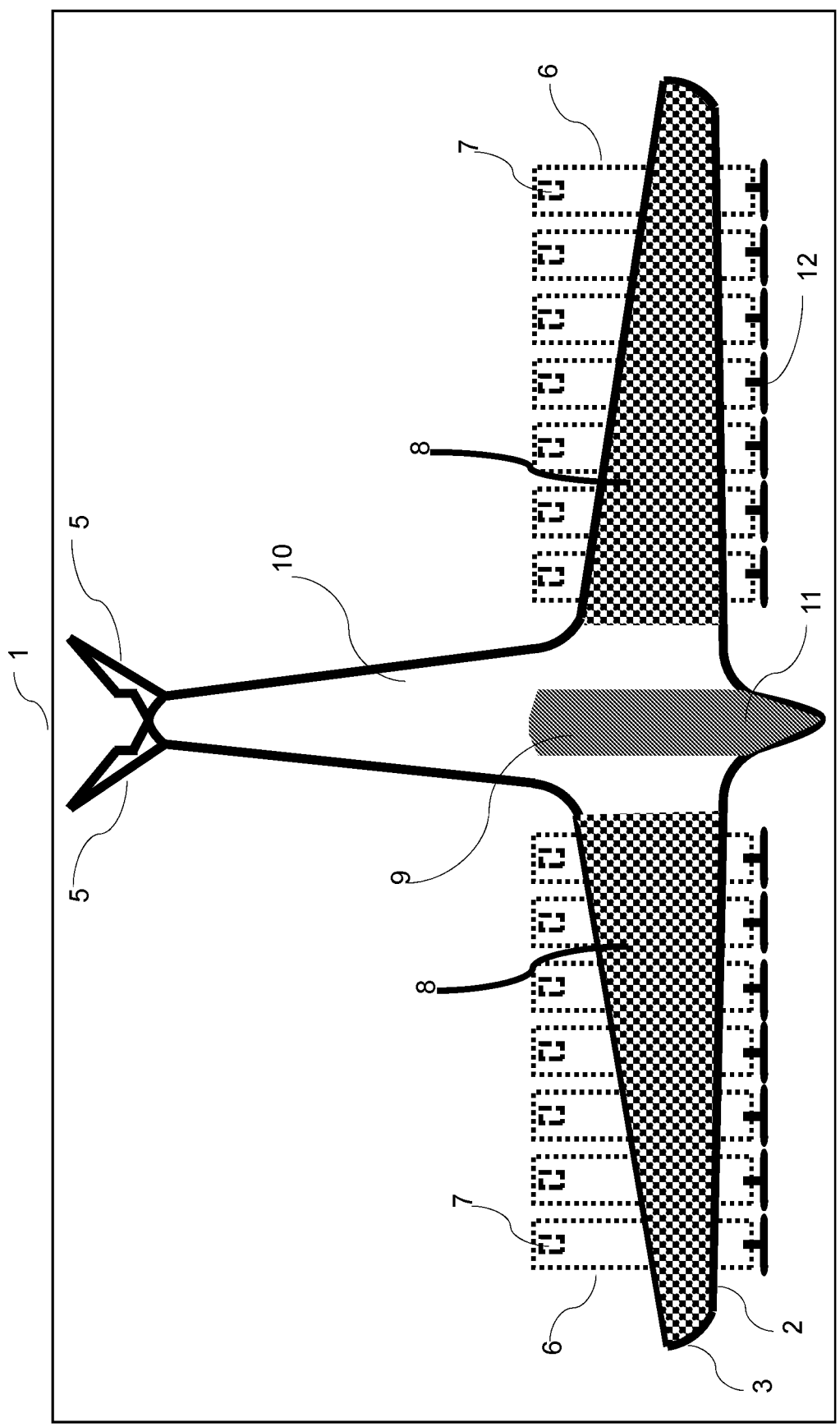

FIG. 2 shows the top-view of hydrogen-electric aircraft 1 with distributed and interchangeable electric propulsion pods 6 and solar wing 2 where multiple solar cells or photovoltaic cells 8 are placed across the entire wing surface area to establish the solar wing 2 to provide additional power during the day by utilizing the solar power from sun, winglets 3 to reduce drag, fuselage 4 to contain a hybrid battery 9 based energy storage option to store some or all of the electrical energy produced by the solar cells or photovoltaic cells 8, seats for the passengers, cockpit 11, windows, and all of the essential equipment/instrument are needed to provide a safe and pleasant flight, vertical/horizontal stabilizers and rudder 5, distributed and interchangeable electric propulsion pods 6, propulsion propellers 12 where these propellers are powered either solely by distributed and interchangeable electric propulsion pods, batteries, solar cells or photovoltaic cells, or a combination of these, and the refueling of depleted distributed and interchangeable electric propulsion pods 6 are easily achieved by having a refueling interface 7 for the distributed and interchangeable electric propulsion pods 6 located somewhere on the outer surface distributed and interchangeable electric propulsion pods 6. The hydrogen-electric aircraft 1 with distributed and interchangeable electric propulsion pods 6 and solar wing 2 has the capability of utilizing multiple of these distributed and interchangeable electric propulsion pods 6 and a sufficient number of these distributed and interchangeable electric propulsion pods 6 are attached to the solar wing 2 depending on the effective flight time or mission. For manned hydrogen-electric aircrafts, it is preferred to have the hydrogen fuel in the following forms: gaseous hydrogen at high pressures such as compressed hydrogen into a cylinder or some other form up to 1000 bars or liquid hydrogen stored in a cylinder or some other form. For unmanned hydrogen-electric aircrafts such (depending on the requirement of that particular platform), it is preferred to have the following hydrogen fuels: gaseous hydrogen at high pressures such as compressed hydrogen into a cylinder or some other form up to 1000 bars or liquid hydrogen stored in a cylinder or some other form or hydrogen generated from another hydrogen storing materials via different generation mechanisms such as hydride materials and utilization of water, water/alkali mixtures with or without a catalyst bed or with or without a reactor setup that utilizes heat to generate hydrogen from the hydride materials. While the hydrogen-electric aircraft 1 with distributed and interchangeable electric propulsion pods 6 and solar wing 2 is taxiing, flying or landing, solar wing 2 generate electricity from the conversion of solar light with solar cells or photovoltaic cells and stores this energy either in the battery located inside the fuselage 4 or this generated electrical energy is utilized to power the cockpit, A/C, and all other aircraft equipment/instrument that do not require much power. During the take-off period, distributed and interchangeable electric propulsion pods 6 provide power to the propellers in order to energize them and bring them to the full power for the taking-off and flight (and if it is needed, battery module on-board the hydrogen-electric aircraft also provides additional power to the propellers), while solar wing continue to power the all of the essential hydrogen-electric aircraft cockpit, A/C and all other essential aircraft equipment/instruments. The power management between distributed and interchangeable electric propulsion pods 6, batteries located on-board the hydrogen-electric aircraft 1, and solar wing 2 can be managed according to the needs of the aircraft by using a proper power management system that is used in the aviation industry.

Figure 3:
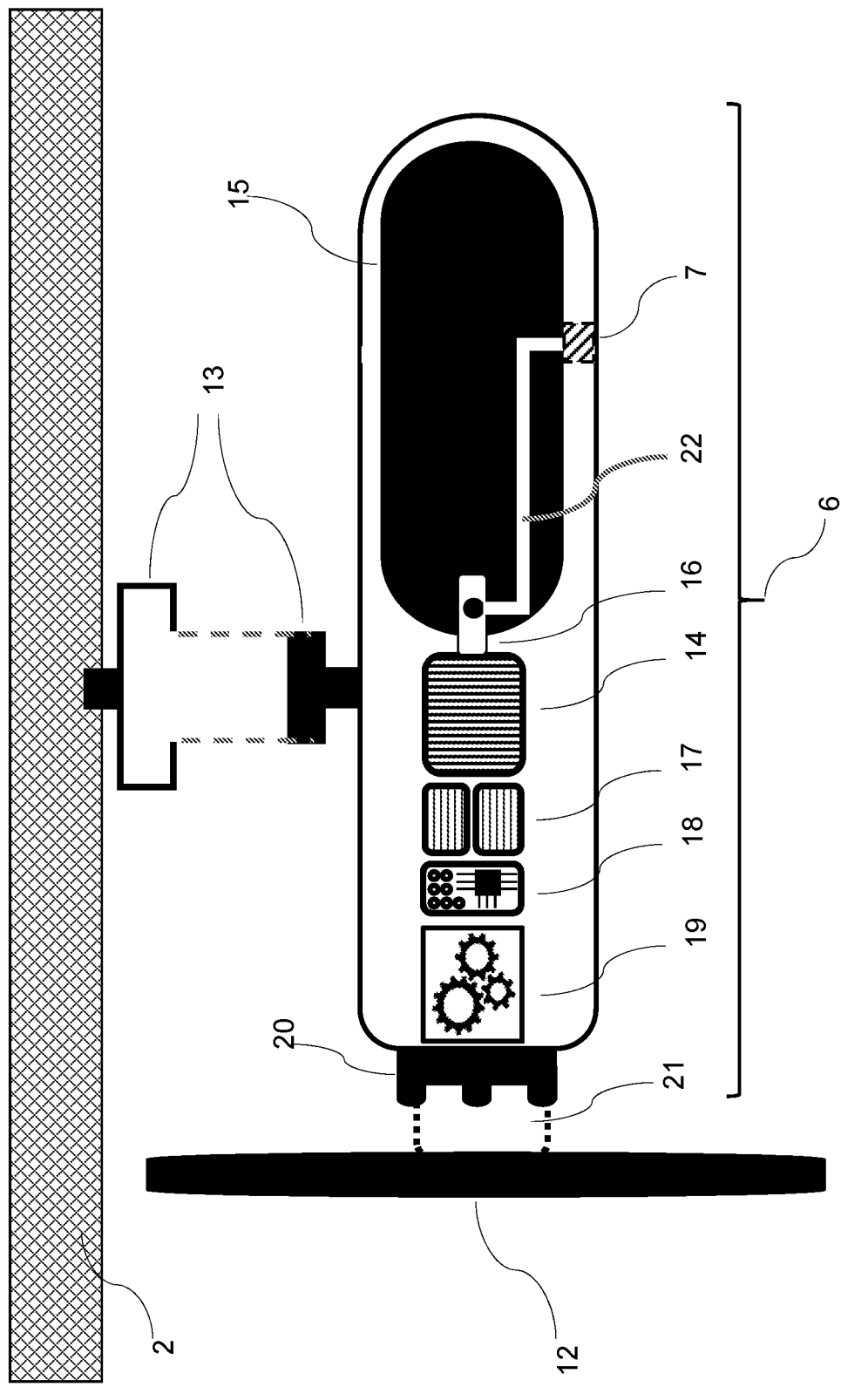

FIG. 3 shows a distributed and interchangeable electric propulsion pod 6, refueling interface 7 for the distributed and interchangeable electric propulsion pods (to get hydrogen from the autonomous ground refueling vehicles), a hydrogen storage cylinder 15, cartridge 15, or pod 15 to store the hydrogen fuel and transfer this fuel to the fuel cell stack 14 or stacks 14 with the aid of a delivery mechanism 16, the fuel cell stack 14 converts the hydrogen energy into electrical energy via electrochemical means and the generated electrical energy is diverted to either propulsion propeller 12, or stored inside the hybrid battery storage 17, or utilized within the fuselage 4 for another particular need, all of the operations of the distributed and interchangeable electric propulsion pod is managed with an electronics and control module 18, then electrical energy provided by the distributed and interchangeable electric propulsion pod 6, solar wing 2, and battery modules 9 or 17 on-board hydrogen-electric aircraft 1 are diverted to directly to the propeller 12 with or with an electric motor gearbox or gear setup 10 in order to propel or energize propeller 12 via propeller attachment interface 21 to the aircraft wing 2 and the distributed and interchangeable electric propulsion pods 6, data and electrical communication interface 20 to safely operate and monitor the status of the distributed and interchangeable electric propulsion pods 6, propeller 12, the speed of the propeller and hence the speed of the hydrogen-electric aircraft 1, monitoring the lock/unlock status of distributed and interchangeable electric propulsion pods 6, and numerous other parameters that need to be adjusted or monitored for a safe flight and aircraft maintenance. Furthermore, distributed and interchangeable electric propulsion pod 6 is attached or secured to the hydrogen-electric aircraft 1 wing 2 with the aid of a lock/unlock mechanism 13 that can easily be operated or manipulated with the aid of a robotic arm (though this application is not limited to the attachment of the propulsion pods to the wing only), robotic grasping mechanism 23, lift and catch mechanism 31, or some other similar robotic approaches that enables the autonomous exchange of the depleted distributed and interchangeable electric propulsion pods 6 with the recharged or refueled distributed and interchangeable electric propulsion pods 6. The hydrogen cylinder 15 of the distributed and interchangeable electric propulsion pods 6 has the capability of storing multiple different forms of hydrogen or this entire component can be replaced with another cylinder, cartridge or pod that is containing another form of hydrogen fuel (gaseous hydrogen, liquid hydrogen, slurry or cartridge hydrogen that uses a hydride material). The refueling of the depleted distributed and interchangeable electric propulsion pods 6 is achieved with the refueling interface 7 which is located on the surface of the distributed and interchangeable electric propulsion pods 6 for its easy access.

Figure 4:
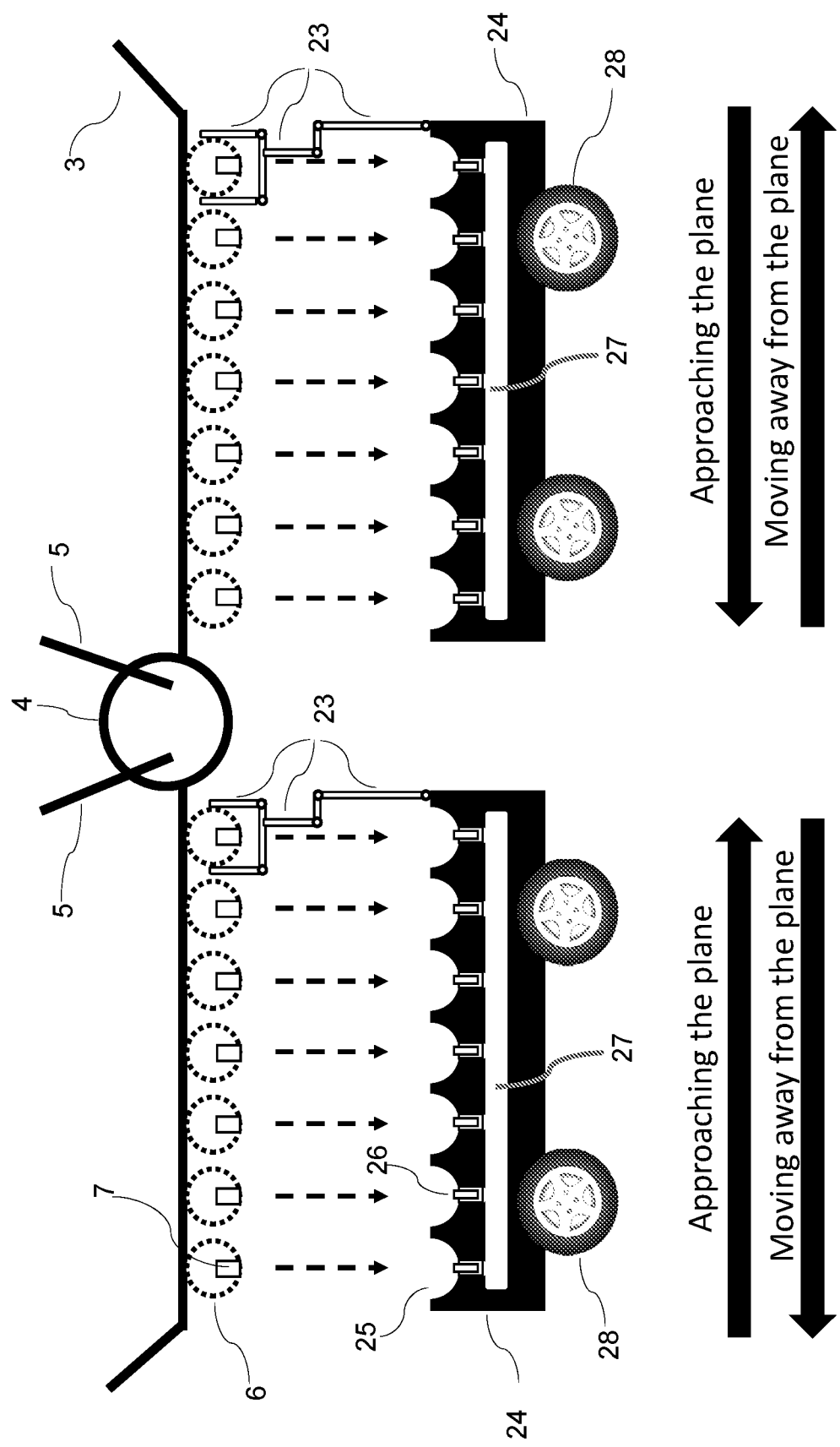

FIG. 4 shows multiple autonomous ground refueling vehicles 24 approaching the hydrogen-electric aircraft 1 from a perpendicular direction using their mono-directional steering mechanism 28 in order to place themselves underneath the solar wing 2 for the removal of the depleted distributed and interchangeable electric propulsion pods 6 by using robotic arms or robotic grasping mechanisms 23, then robotic arms or robotic grasping mechanisms attach themselves to the distributed and interchangeable electric propulsion pods 6 and unlocks the depleted distributed and interchangeable electric propulsion pods 6 from the solar wing 2 by activating the lock/unlock mechanism 13 and move the depleted distributed and interchangeable electric propulsion pods 6 onto storage section for charged or depleted distributed and interchangeable electric propulsion pods 25 and connects the refueling interface for the distributed and interchangeable electric propulsion pods 7 to the hydrogen fuel discharge ports from the autonomous ground vehicle to the depleted distributed and interchangeable electric propulsion pods 26 in order to refuel these depleted propulsion pods simultaneously by connecting it to the common hydrogen fuel manifold to supply hydrogen fuel to the hydrogen fuel discharge port 27, once the removal process of the depleted distributed and interchangeable electric propulsion pods 6 are completed, the autonomous ground refueling vehicles 24 moves away from the hydrogen-electric aircraft 1 from a perpendicular direction using their mono-directional steering mechanism for the autonomous ground refueling vehicle 28 in order to transport the depleted distributed and interchangeable electric propulsion pods 6 for refueling to the location of autonomous ground hydrogen fuel supply tank, hydrogen discharge points located inside/outside of the building, warehouse, or hangar where there is the hydrogen main line is located, or to the location of the manned ground hydrogen fuel supply tanker. After the refueling of the depleted distributed and interchangeable electric propulsion pods 6, the charged distributed and interchangeable electric propulsion pods 6 are transferred back to the hydrogen-electric aircraft 1 with the aid of the autonomous ground refueling vehicles 24, then robotic arms or robotic grasping mechanisms 23 located on the autonomous ground refueling vehicles 24 captures the charged distributed and interchangeable electric propulsion pods 6 and lift them to the proper location under the wing (or wherever the lock/unlock mechanism 13 is located), utilize the lock/unlock mechanism 13 to safely secure the charged distributed and interchangeable electric propulsion pods 6 to the hydrogen-electric aircraft. Utilization of multiple robotic arms or robotic grasping mechanisms 23 will ensure the replacement or exchange of all distributed and interchangeable electric propulsion pods 6 to be done simultaneously in order to reduce the refueling time.

Figure 5:
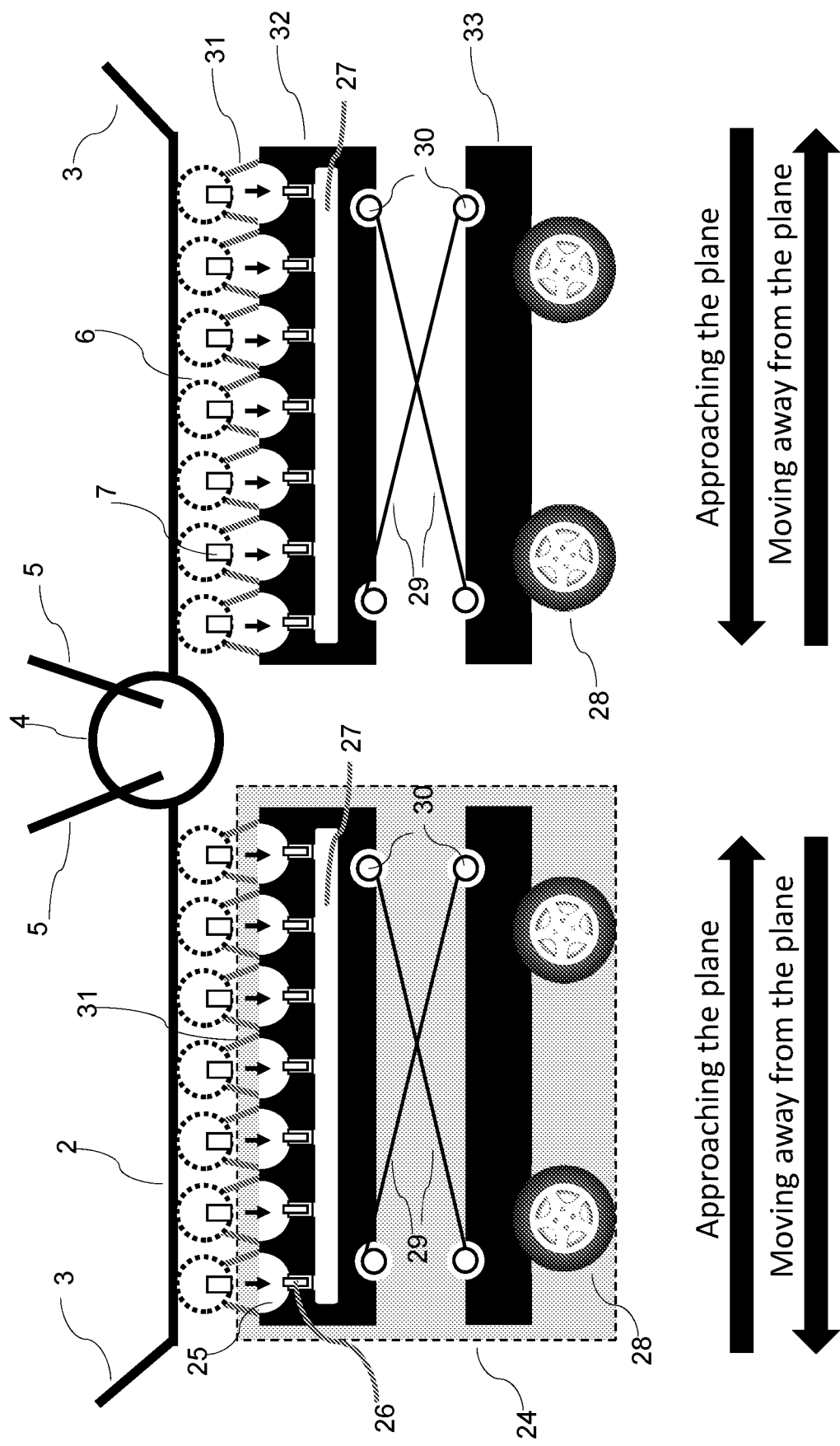

FIG. 5 shows multiple autonomous ground refueling vehicles 24 (that is comprised of an elevator section of the autonomous ground refueling vehicle with lift and catch mechanism 32 and a base section of the autonomous ground refueling vehicle to carry the elevator section of the autonomous ground refueling vehicle with lift and catch mechanism 33, where the elevator section of the autonomous ground refueling vehicle with lift and catch mechanism 32 is lifted towards the solar wing 2 using the autonomous ground refueling vehicle lift mechanism component 1, labeled 29, and autonomous ground refueling vehicle lift mechanism component 2, labeled 30) approaching the hydrogen-electric aircraft 1 from a perpendicular direction using their mono-directional steering mechanism 28 in order to place themselves underneath the solar wing 2 for the removal of the depleted distributed and interchangeable electric propulsion pods 6 by using a lift and catch mechanism 31, then the elevator section of the autonomous ground refueling vehicle with lift and catch mechanism 32 is raised to capture the depleted propulsion pods 6 and unlock them from the solar wing 2 and move the depleted distributed and interchangeable electric propulsion pods 6 onto storage section 25 and then connect the refueling interface for the distributed and interchangeable electric propulsion pods 7 to the hydrogen fuel discharge port from the autonomous ground vehicle to the depleted distributed and interchangeable electric propulsion pods 26 in order to refuel these depleted propulsion pods simultaneously by connecting it to the hydrogen fuel manifold to supply hydrogen fuel to the hydrogen fuel discharge port 27, once the removal process of the depleted distributed and interchangeable electric propulsion pods 6 are completed, the elevator section of the autonomous ground refueling vehicle with lift and catch mechanism 32 is lowered and the autonomous ground refueling vehicles 24 moves away from the hydrogen-electric aircraft 1 from a perpendicular direction using their mono-directional steering mechanism 28 in order to transport the depleted distributed and interchangeable electric propulsion pods 6 for refueling to the location of autonomous ground hydrogen fuel supply tank, hydrogen discharge points located inside/outside of the building, warehouse, or hangar where there is the hydrogen main line is located, or to the location of the manned ground hydrogen fuel supply tanker. After the refueling of the depleted distributed and interchangeable electric propulsion pods 6, the charged distributed and interchangeable electric propulsion pods 6 are transferred back to the hydrogen-electric aircraft 1 with the aid of the autonomous ground refueling vehicles 24, then lift and catch mechanisms 31 located on the autonomous ground refueling vehicles 24 captures the charged distributed and interchangeable electric propulsion pods 6 and lift them to the proper location under the wing (or wherever the lock/unlock mechanism 13 is located), utilize the lock/unlock mechanism 13 to safely secure the charged distributed and interchangeable electric propulsion pods 6. Utilization of multiple lift and catch mechanisms 31 will ensure the replacement or exchange of all distributed and interchangeable electric propulsion pods 6 be done simultaneously in order to reduce the refueling time.

Figure 6:
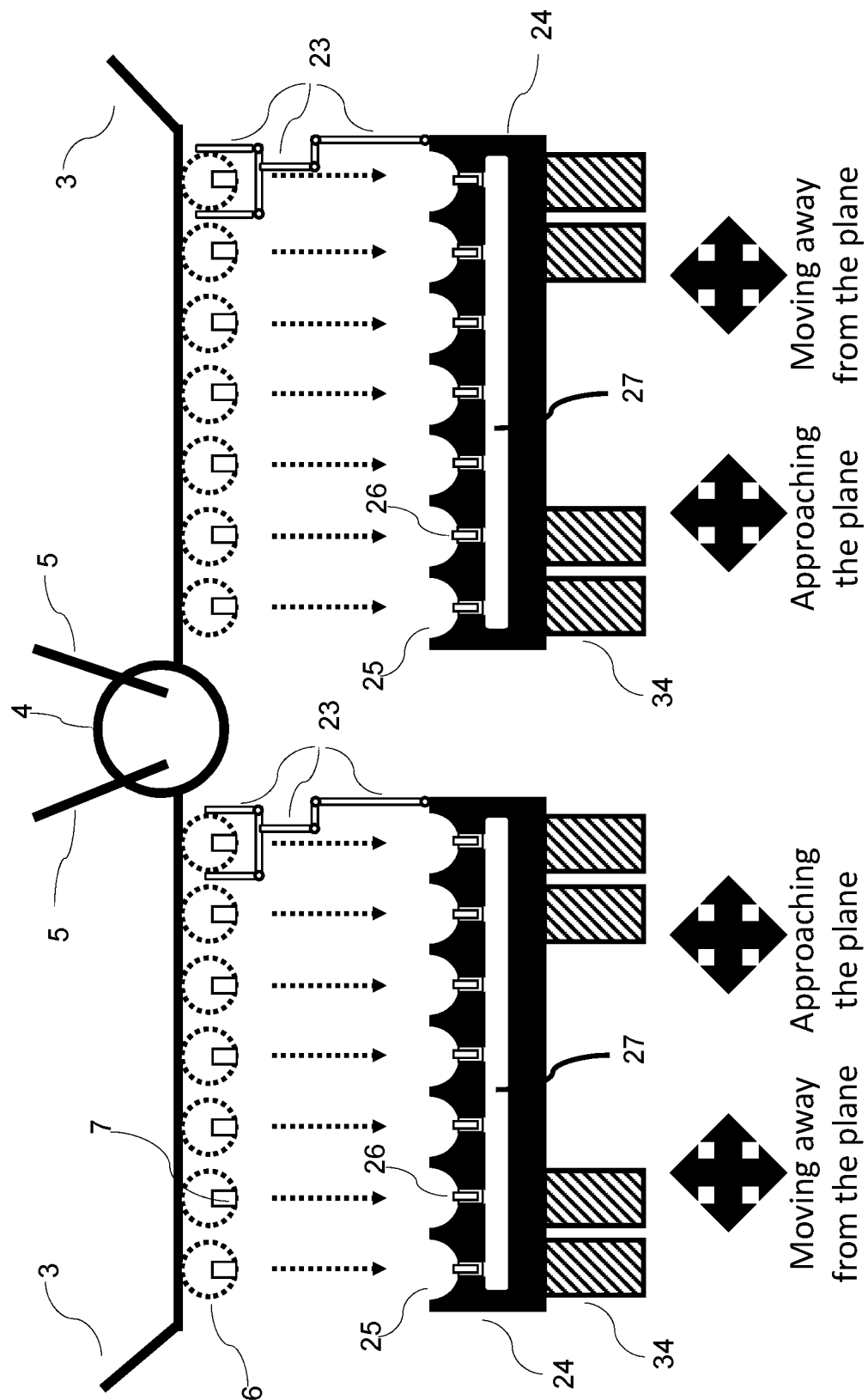

FIG. 6 shows multiple autonomous ground refueling vehicles 24 that can approach the hydrogen-electric aircraft 1 from multiple directions using their multi-directional steering mechanism 34 in order to place themselves underneath the solar wing 2 for the removal of the depleted distributed and interchangeable electric propulsion pods 6 by using robotic arms or robotic grasping mechanisms 23, then robotic arms or robotic grasping mechanisms attach themselves to the distributed and interchangeable electric propulsion pods 6 and unlocks the depleted distributed and interchangeable electric propulsion pods 6 from the solar wing 2 via activation of the lock/unlock mechanism 13 and then move them onto storage section 25 and connect the refueling interfaces 7 to the hydrogen fuel discharge port 26 from the autonomous ground vehicle to the depleted distributed and interchangeable electric propulsion pods in order to refuel these depleted propulsion pods 6 simultaneously by connecting it to the hydrogen fuel manifold 27 to supply hydrogen fuel to the hydrogen fuel discharge port, once the removal process of the depleted distributed and interchangeable electric propulsion pods 6 are completed, the autonomous ground refueling vehicles 24 moves away from the hydrogen-electric aircraft 1 from any direction that is safe or feasible using their multi-directional steering mechanism 34 in order to transport the depleted distributed and interchangeable electric propulsion pods 6 for refueling to the location of autonomous ground hydrogen fuel supply tank, hydrogen discharge points located inside/outside of the building, warehouse, or hangar where there is the hydrogen main line is located, or to the location of the manned ground hydrogen fuel supply tanker. After the refueling of the depleted distributed and interchangeable electric propulsion pods 6, the charged distributed and interchangeable electric propulsion pods 6 are transferred back to the hydrogen-electric aircraft 1 with the aid of the autonomous ground refueling vehicles 24, then robotic arms or robotic grasping mechanisms 23 located on the autonomous ground refueling vehicles 24 capture the charged distributed and interchangeable electric propulsion pods 6 and lift them to the proper location under the solar wing 2 (or wherever the lock/unlock mechanism 13 is located), utilize the lock/unlock mechanism 13 to safely secure the charged distributed and interchangeable electric propulsion pods 6. Utilization of multiple robotic arms or robotic grasping mechanisms 23 will ensure the replacement or exchange of all distributed and interchangeable electric propulsion pods 6 be done simultaneously in order to reduce the refueling time.

Figure 7:
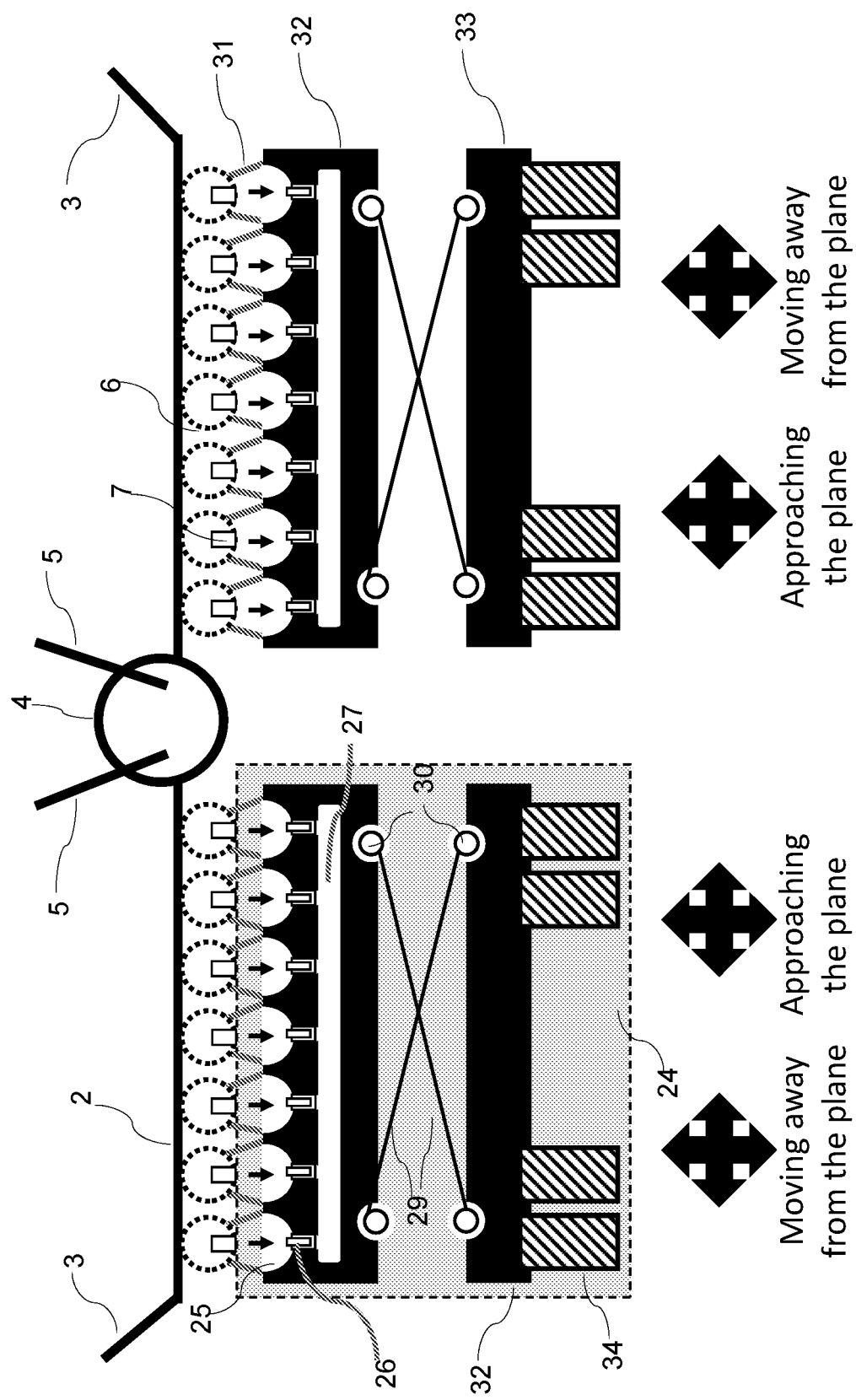

FIG. 7 shows multiple autonomous ground refueling vehicles 24 (that is comprised of an elevator section of the autonomous ground refueling vehicle with lift and catch mechanism 32 and a base section of the autonomous ground refueling vehicle to carry the elevator section of the autonomous ground refueling vehicle with lift and catch mechanism 33, where the elevator section of the autonomous ground refueling vehicle with lift and catch mechanism 32 is lifted towards the solar wing 2 using the autonomous ground refueling vehicle lift mechanism component 1, labeled 29, and autonomous ground refueling vehicle lift mechanism component 2, labeled 30) that can approach the hydrogen-electric aircraft 1 from multiple directions using their multi-directional steering mechanism 34 in order to place themselves underneath the solar wing 2 for the removal of the distributed and interchangeable electric propulsion pods 6 by using a lift and catch mechanism 31, then the elevator section of the autonomous ground refueling vehicle with lift and catch mechanism 32 is raised to capture the depleted propulsion pods and unlock the depleted distributed and interchangeable electric propulsion pods 6 from the solar wing 2 by activating the lock/unlock mechanism 13 and then move the depleted distributed and interchangeable electric propulsion pods 6 onto storage section 25 and connect the refueling interface 7 to the hydrogen fuel discharge port 26 from the autonomous ground vehicle to the depleted distributed and interchangeable electric propulsion pods in order to refuel these depleted propulsion pods simultaneously by connecting it to the hydrogen fuel manifold 27 to supply hydrogen fuel to the hydrogen fuel discharge port 26, once the removal process of the depleted distributed and interchangeable electric propulsion pods 6 are completed, the elevator section of the autonomous ground refueling vehicle with lift and catch mechanism 32 is lowered and the autonomous ground refueling vehicles 24 moves away from the hydrogen-electric aircraft 1 from any path that is safe or feasible via using their multi-directional steering mechanism 34 in order to transport the depleted distributed and interchangeable electric propulsion pods 6 for refueling to the location of autonomous ground hydrogen fuel supply tank, hydrogen discharge points located inside/outside of the building, warehouse, or hangar where there is the hydrogen main line is located, or to the location of the manned ground hydrogen fuel supply tanker. After the refueling of the depleted distributed and interchangeable electric propulsion pods 6, the charged distributed and interchangeable electric propulsion pods 6 are transferred back to the hydrogen-electric aircraft 1 with the aid of the autonomous ground refueling vehicles 24, then lift and catch mechanisms 31 located on the autonomous ground refueling vehicles 24 capture the charged distributed and interchangeable electric propulsion pods 6 and lift them to the proper location under the wing (or wherever the lock/unlock mechanism 13 is located), then utilize the lock/unlock mechanism 13 to safely secure the charged distributed and interchangeable electric propulsion pods 6. Utilization of multiple lift and catch mechanisms 31 will ensure the replacement or exchange of all distributed and interchangeable electric propulsion pods 6 be done simultaneously in order to reduce the refueling time.

Figure 8:
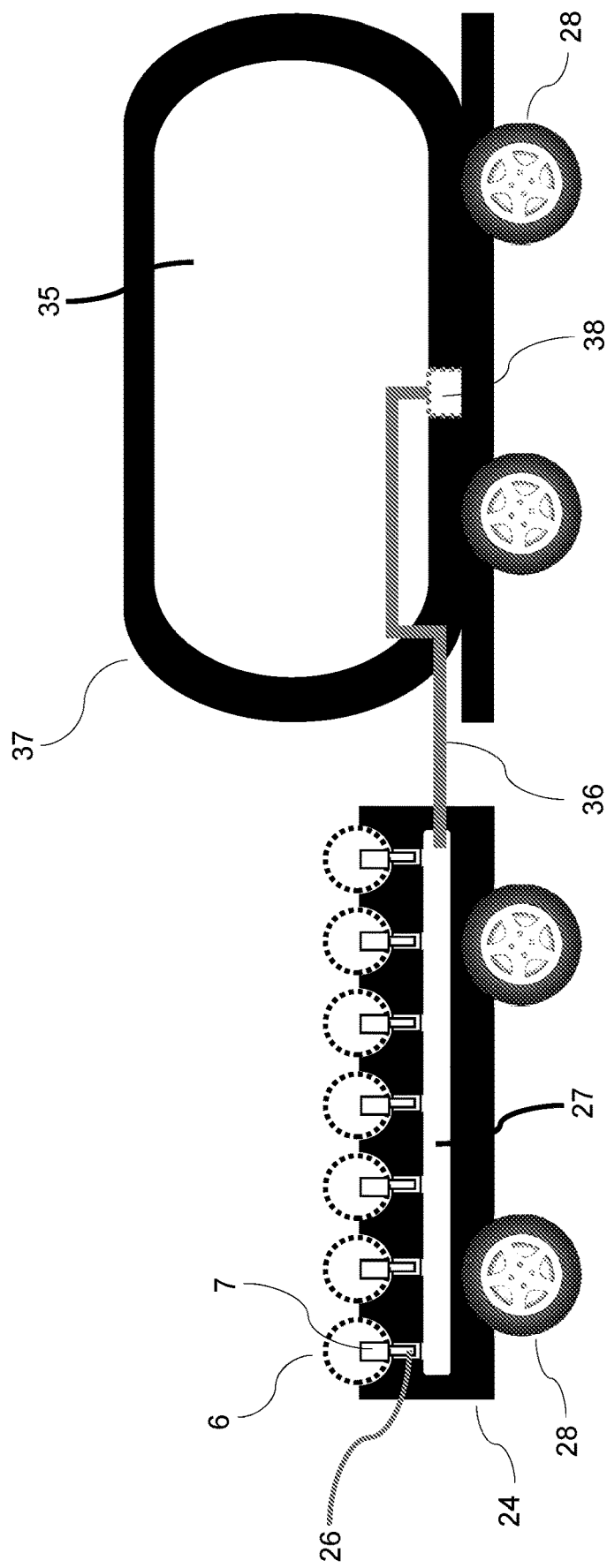
FIG. 8 illustrates the schematic view of an autonomous ground refueling vehicle charging the depleted distributed & interchangeable electric propulsion pods by using hydrogen fuel from another autonomous ground hydrogen supply tank (with mono-directional steering mechanisms)

FIG. 8 shows an autonomous ground refueling vehicle 24 carrying out the charging of the depleted distributed and interchangeable electric propulsion pods 6 with hydrogen fuel by using the hydrogen from another autonomous ground hydrogen supply tank 37, where autonomous ground refueling vehicle 24 is initially approaches to the autonomous ground hydrogen supply tank 37 using its mono-directional steering mechanism 28 and makes a connection with the hydrogen transfer line from hydrogen supply tank to autonomous ground refueling vehicle 36 in order to initiate the hydrogen fuel discharging process, then hydrogen fuel present in the autonomous ground hydrogen supply tank 35 gets discharged to the interface between the hydrogen fuel supply tank and hydrogen transfer line to move hydrogen fuel from the hydrogen fuel supply tank to the autonomous ground refueling vehicle 38 and this hydrogen fuel is then gets moved along the hydrogen transfer line from hydrogen supply tank to autonomous ground refueling vehicle 36, then enters the hydrogen fuel manifold to supply hydrogen fuel to the hydrogen fuel discharge port 27, then the refueling interface for the distributed and interchangeable electric propulsion pods 7 allows the entrance of the hydrogen fuel transferred from the autonomous ground hydrogen supply tank 37 and the refueling continues until the depleted distributed and interchangeable electric propulsion pods gets charged to the desired level, then with the proper refueling process communication and monitoring protocols the refueling process is stopped safely. After the hydrogen fuel refueling process stops, the autonomous ground refueling vehicle 24 carrying out the charged distributed and interchangeable electric propulsion pods 6 severs its connection from the hydrogen transfer line from hydrogen supply tank to autonomous ground refueling vehicle 36 and then drives autonomously to the location of the hydrogen-electric aircraft 1 that is waiting for charged distributed and interchangeable electric propulsion pods 6 to be installed on the solar wing 2.

Figure 9:
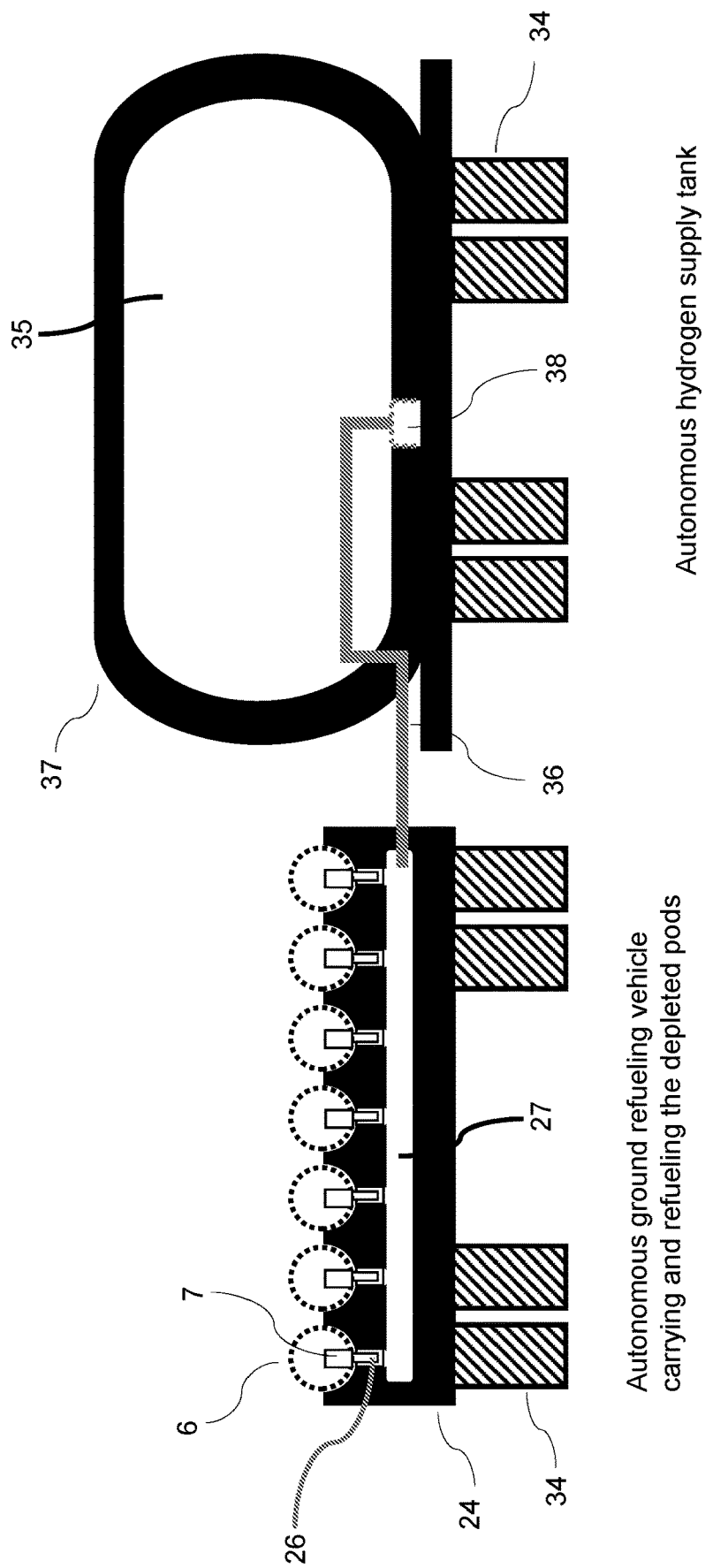
FIG. 9 illustrates the schematic view of autonomous ground refueling vehicle charging the depleted distributed & interchangeable electric propulsion pods by using hydrogen fuel from another autonomous ground hydrogen supply tank (with multi-directional steering mechanisms)

FIG. 9 shows an autonomous ground refueling vehicle 24 carrying out the charging of the depleted distributed and interchangeable electric propulsion pods 6 by using the hydrogen from another autonomous ground hydrogen supply tank 37, where autonomous ground refueling vehicle 24 is initially approaches to the autonomous ground hydrogen supply tank 37 using its multi-directional steering mechanism 34 and makes a connection with the hydrogen transfer line from hydrogen supply tank to autonomous ground refueling vehicle 36 in order to initiate the hydrogen fuel discharging process, then hydrogen fuel present in the autonomous ground hydrogen supply tank 35 gets discharged to the interface between the hydrogen fuel supply tank and hydrogen transfer line to move hydrogen fuel from the hydrogen fuel supply tank to the autonomous ground refueling vehicle 38 and this hydrogen fuel is then gets moved along the hydrogen transfer line from hydrogen supply tank to autonomous ground refueling vehicle 36, then hydrogen enters the hydrogen fuel manifold to supply hydrogen fuel to the hydrogen fuel discharge port 27, then the refueling interface for the distributed and interchangeable electric propulsion pods 7 allows the entrance of the hydrogen fuel transferred from the autonomous ground hydrogen supply tank 37 and the refueling continues until the depleted distributed and interchangeable electric propulsion pods gets charged to the desired level, then with the proper refueling process communication and monitoring protocols the refueling process is stopped safely. After the hydrogen fuel refueling process stops, the autonomous ground refueling vehicle 24 carrying out the charged distributed and interchangeable electric propulsion pods 6 severs its connection from the hydrogen transfer line from hydrogen supply tank to autonomous ground refueling vehicle 36 and then drives autonomously to the location of the hydrogen-electric aircraft 1 that is waiting for charged distributed and interchangeable electric propulsion pods 6 to be installed on the solar wing 2.

FIG. 10 shows multiple autonomous ground refueling vehicles 24 carrying out the refueling process by using the hydrogen from a building 41, warehouse 41, or hangar infrastructure 41 where there exists hydrogen fuel discharge or pumping points installed inside/outside of a building such as hydrogen refueling building/warehouse or hydrogen refueling hangar and where these hydrogen discharge points 39 are also connected to the main hydrogen fuel transfer line 40 inside a hydrogen refueling building, a hydrogen refueling warehouse or hydrogen refueling hangar, initially autonomous ground refueling vehicles 24 approaches to the hydrogen discharge points 55 by using their own autonomous navigation system to firmly and securely attach themselves to the hydrogen discharge points 55 and complete the connection to between gaseous or high pressure gaseous hydrogen discharge point and discharge mechanism 55 and gaseous or high pressure gaseous hydrogen receiving point and receiving mechanism 56, once the connection is successfully made, a signal is sent to the control module in order to initiate the discharge of hydrogen from the main hydrogen fuel transfer line inside a hydrogen refueling building, a hydrogen refueling warehouse or hydrogen refueling hangar 40, then the discharge of hydrogen starts, discharged hydrogen gets transferred from the main hydrogen fuel transfer line inside a hydrogen refueling building 40, a hydrogen refueling warehouse 40 or hydrogen refueling hangar 40 into the gaseous or high pressure gaseous hydrogen discharge point and discharge mechanism 55 and then to gaseous or high pressure gaseous hydrogen receiving point and receiving mechanism 56, then this hydrogen is transferred to hydrogen fuel manifold to supply hydrogen fuel to the hydrogen fuel discharge port 27, and then hydrogen fuel discharge port from the autonomous ground vehicle to the depleted distributed and interchangeable electric propulsion pods 26 allows the entrance of the hydrogen into the depleted distributed and interchangeable electric propulsion pods 6 via refueling interface for the distributed and interchangeable electric propulsion pods, the system waits until a desired amount of hydrogen fuel is provided into the hydrogen storage cylinder 15, cartridge 15 or pod 15 which is located inside the distributed and interchangeable electric propulsion pods 6, then another signal is sent to the control module in order to stop the flow of the hydrogen fuel into the distributed and interchangeable electric propulsion pods 6, then the connection between the gaseous or high pressure gaseous hydrogen discharge point and discharge mechanism 55 and gaseous or high pressure gaseous hydrogen receiving point and receiving mechanism 56 are severed and charged electric propulsion pods 6 are taken back to the hydrogen-electric aircraft 1 that is waiting for the charged electric propulsion pods 6. The hydrogen fuel is supplied to the hydrogen refueling building's main hydrogen fuel line 40, a hydrogen refueling warehouse's main hydrogen fuel line 40 or hydrogen refueling hangar's main hydrogen fuel line 40 from an autonomous hydrogen refueling infrastructure 57.

FIG. 11 shows an autonomous ground refueling vehicle 24 carrying out the refueling process by using the liquid hydrogen from an on-site liquid hydrogen production or generator device 54 where there exists multiple liquid hydrogen fuel discharge or pumping points 50 installed on the on-site liquid hydrogen production or generator device 54, initially gaseous hydrogen stored on-board 42 of the on-site liquid hydrogen generator set-up 54 or the hydrogen gas that is generated on-site with the aid of an electrolyzer 42, then stored inside of an intermediary storage 44 either with a primary compressor, secondary compressor or booster pump 43, then this high pressure hydrogen is sent to the hydrogen liquefier device 48 through hydrogen fuel transfer lines 46 from intermediary storage to the hydrogen liquefier device 48 after it passes through the interface between the intermediary storage and hydrogen liquefier device 45, and then gaseous hydrogen is converted into liquid hydrogen with the aid of the individual hydrogen liquefier 48, and then this liquid hydrogen fuel is directly transferred to the depleted distributed and interchangeable electric propulsion pod's 6 hydrogen storage cylinder 15 via first through the liquid hydrogen fuel transfer line 49, then through the liquid hydrogen discharge point and discharge mechanism 50, then through the liquid hydrogen receiving point and receiving mechanism 51, then through the liquid hydrogen transfer lines existing on the autonomous ground refueling vehicle to move the liquid hydrogen from liquid hydrogen dispenser to the depleted distributed and interchangeable electric propulsion pods 52, then through the hydrogen fuel discharge port from the autonomous ground vehicle to the depleted distributed and interchangeable electric propulsion pods 26, and refueling interface for the distributed and interchangeable electric propulsion pods 7, then system awaits until depleted pod is sufficiently charged with the liquid hydrogen, then a signal is sent to the control module to stop the flow of the liquid hydrogen from the on-site liquid hydrogen generator setup, once the flow is stopped, the autonomous ground refueling vehicle severs its connection from the on-site liquid hydrogen generator setup by disconnecting its liquid hydrogen receiving point and receiving mechanism 51 from the liquid hydrogen discharge point and discharge mechanism 50, then liquid hydrogen charged electric propulsion pods 6 are taken back to the hydrogen-electric aircraft 1 that is waiting for the charged electric propulsion pods 6.

FIG. 12 shows an autonomous ground refueling vehicle 24 carrying out the charging of the depleted distributed and interchangeable electric propulsion pods 6 by using the hydrogen from a manned ground hydrogen fuel supply tanker 53, where autonomous ground refueling vehicle 24 is initially approaches to the manned ground hydrogen fuel supply tanker 53 using its mono-directional steering mechanism 28 and makes a connection with the hydrogen transfer line from hydrogen supply tanker to autonomous ground refueling vehicle 36 in order to initiate the hydrogen fuel discharging process, then hydrogen fuel present in the manned ground hydrogen fuel supply tanker 53 gets discharged to the interface between the hydrogen fuel supply tank and hydrogen transfer line to move hydrogen fuel from the hydrogen fuel supply tank to the autonomous ground refueling vehicle 38 and this hydrogen fuel is then gets moved along the hydrogen transfer line from hydrogen supply tank to autonomous ground refueling vehicle 36, then enters the hydrogen fuel manifold to supply hydrogen fuel to the hydrogen fuel discharge port 27, then the refueling interface for the distributed and interchangeable electric propulsion pods 7 allows the entrance of the hydrogen fuel transferred from the manned ground hydrogen fuel supply tanker 53 and it continues until the depleted distributed and interchangeable electric propulsion pods gets charged to the desired level, then with the proper refueling process communication and monitoring protocols the refueling process is stopped safely. After the hydrogen fuel refueling process stops, the autonomous ground refueling vehicle 24 carrying out the charged distributed and interchangeable electric propulsion pods 6 severs its connection from the hydrogen transfer line from hydrogen supply tank to autonomous ground refueling vehicle 36 and then drives back autonomously to the location of the hydrogen-electric aircraft 1 that is awaiting for charged distributed and interchangeable electric propulsion pods 6 to be installed on the solar wing 2 (or wherever the lock/unlock mechanism 13 is located on the hydrogen-electric aircraft 1).

FIG. 13 shows an autonomous ground refueling vehicle 24 carrying out the charging of the depleted distributed and interchangeable electric propulsion pods 6 by using the hydrogen from a manned ground hydrogen fuel supply tanker 53, where autonomous ground refueling vehicle 24 is initially approaches to the manned ground hydrogen fuel supply tanker 53 using its multi-directional steering mechanism 34 and makes a connection with the hydrogen transfer line from hydrogen supply tank to autonomous ground refueling vehicle 36 in order to initiate the hydrogen fuel discharging process, then hydrogen fuel present in the manned ground hydrogen fuel supply tanker 53 gets discharged to the interface between the hydrogen fuel supply tank and hydrogen transfer line to move hydrogen fuel from the hydrogen fuel supply tank to the autonomous ground refueling vehicle 38 and this hydrogen fuel is then gets moved along the hydrogen transfer line from hydrogen supply tank to autonomous ground refueling vehicle 36, then enters the hydrogen fuel manifold to supply hydrogen fuel to the hydrogen fuel discharge port 27, then the refueling interface for the distributed and interchangeable electric propulsion pods 7 allows the entrance of the hydrogen fuel transferred from the manned ground hydrogen fuel supply tanker 53 and it continues until the depleted distributed and interchangeable electric propulsion pods gets charged to the desired level, then with the proper refueling process communication and monitoring protocols the refueling process is stopped safely. After the hydrogen fuel refueling process stops, the autonomous ground refueling vehicle 24 carrying out the charged distributed and interchangeable electric propulsion pods 6 severs its connection from the hydrogen transfer line from hydrogen supply tank to autonomous ground refueling vehicle 36 and then drives back autonomously to the location of the hydrogen-electric aircraft 1 that is awaiting for charged distributed and interchangeable electric propulsion pods 6 to be installed on the solar wing 2 (or wherever the lock/unlock mechanism 13 is located on the hydrogen-electric aircraft 1).

FIG. 14 shows a hydrogen farm 64 that is comprised of modular and autonomous renewable energy powered (solar or wind, hybridized with battery or fuel cells or any combination of different renewable energy sources with battery/fuel cells) hydrogen refueling modules 61 in order to capture the solar energy via solar panels 59 or capture the wind energy via wind turbines 63, then if needed store these either into a battery based storage system for a later use or combine this electricity with battery, fuel cell, etc. in order to power the electrolyzers for the generation of hydrogen gas from the water electrolysis reaction, then clean up the hydrogen stream for storage at an intermediary hydrogen storage tank or directly refill the distributed and interchangeable electric propulsion pods with hydrogen fuel via the hydrogen discharge points 62 device. The said hydrogen refueling module can utilize different forms of electrolyzers, hydrogen liquefier devices in order to generate either gaseous hydrogen or liquid hydrogen depending on the design of the hydrogen refueling module or the requirements of the hydrogen-electric aircraft or the design of the distributed and interchangeable electric propulsion pods or requirements of these propulsion pods. The examples of the design or power sources are only for exemplary reasons and the content of this application is not limited to the description provided in this section.

The application also includes an automatic and controllable robotic system with grasping mechanisms, charged or depleted cylinder or cartridge or pod storage sections, hydrogen generation or storage components, refueling, recharging or exchanging interfaces, conveyor belts, and associated mechanisms that can grab, transport, lift and plug a new cylinder, cartridge, or pod system onboard a UAV and on a storage rack.

Unmanned vehicle's storage system has several versions, each dedicated to a certain hydrogen storage solutions that can be swapped automatically: compressed hydrogen gas cylinders compressed at up to 300, 350, 500, and 1000 bars (hereunder mentioned as "gas cylinder"), liquid hydrogen where either commercially obtained gaseous hydrogen is transformed into liquid hydrogen or first gaseous hydrogen is generated (via electrolysis) and then transformed into liquid form (hereunder mentioned as "liquid cylinder"), a hydrogen-rich material such as hydride stored in a cartridge and then mixed with a mixture of a solvent such as water or water/caustic mixture with or without a reactor for on-demand hydrogen generation (hereunder mentioned as "slurry cartridge"), a hydrogen-rich material such as hydride stored as a solid in a reactor and then reacted with water for on-demand hydrogen generation (hereunder mentioned as "solid cartridge"). In addition to these, a pod concept that contains a fuel cell module and hydrogen storage solution can also be used in place of an on-board hydrogen storage cylinder depending on the nature of the unmanned vehicle platform and its mission requirements.

1. Hydrogen Gas Cylinder Concept #1

Commercial compressed hydrogen cylinders are stored on a rack in a modular box, connected to a compressor or booster pump solution for on-site hydrogen gas refueling. Commercial hydrogen gas cylinders are usually compressed to a pressure of 130 to 180 bars and unmanned vehicle platforms described in this application requires hydrogen gas to be stored at a pressure that is relevant for their intended operation in a lightweight manner. Lightweight hydrogen storage tanks such as composite cylinders can store hydrogen gas up to pressures of 1000 bars and a compression solution can be used to take the hydrogen from a commercial hydrogen cylinder that is at a lower pressure (<150 bars) and compress it to up to 1000 bars in order to store more hydrogen within the same volume inside the on-board hydrogen cylinder of the unmanned vehicle and hence increase the effective operation time and range (in terms of distance) of the unmanned vehicles stated in this. The stated composite tank is the hydrogen storage tank for the unmanned vehicle.

2. Hydrogen Gas Cylinder Concept #2

A water electrolysis unit to generate the hydrogen at ambient to low pressures (0 to 10 bars), then a compressor unit to pressurize this hydrogen gas to empty hydrogen cylinders located inside the refueling storage for interim storage (10 bars to 180 bars), then another secondary compressor or booster pump unit to further compress the hydrogen gas from 10 bars to 180 bars up to 1000 bars in order to refill unmanned vehicle's empty or spent hydrogen storage cylinder. The water electrolysis unit will also have following units to operate properly: a water storage tank and a water transfer pump, a water removal unit to dry out the hydrogen output stream, a gas cleanup unit to remove undesired/contaminant gases in the hydrogen stream (such as oxygen gas), a moisture removal unit to fully dry the hydrogen gas for high pressure storage, a controller to control the entire process safely, and a power supply.

3. Hydrogen Gas Cylinder Concept #3

A water electrolysis unit to generate the hydrogen and then compress and store it inside the interim storage cylinders without the primary compressor unit (up to 350 bars), then another compressor or booster pump unit to further compress the hydrogen gas from 350 bars to up to 1000 bars in order to refill unmanned vehicle's empty or spent hydrogen storage cylinder. The electrolyzer unit stated in this concept needs to be contained within another pressurized vessel in order to minimize the differential pressure between the internal of the electrolyzer unit and external of the electrolyzer unit to prevent damages. While most of the conventional electrolyzer units can handle an internal/external differential pressure of up to 180 bars, anything beyond this pressure compromises the safety of the electrolyzer unit, mostly due to mechanical deformation of the components used in the electrolyzers. In order to prevent the large differential pressure induced damages on the electrolyzer components, the electrolyzer itself needs to be contained within another pressurized enclosure that has been pressurized to a higher pressure compared to the pressure inside of the electrolyzer unit and has either one of the inert gases: nitrogen, helium, or argon. The water electrolysis unit will also have following units to operate properly: a water storage tank and a water transfer pump, a water removal unit to dry out the hydrogen output stream, a gas cleanup unit to remove undesired/contaminant gases in the hydrogen stream (such as oxygen gas), a moisture removal unit to fully dry the hydrogen gas for high pressure storage, a controller to control the entire process safely, and a power supply.

4. Hydrogen Liquid Cylinder Concept #1

Compressed hydrogen cylinders are stored on a rack in a modular box, connected to a compressor or booster pump solution and hydrogen liquefaction unit for on-site and on-demand liquid hydrogen refueling. Hydrogen gas occupies a large volume, even in its highly compressed form such as pressurized up to 1000 bars. On the other hand, liquid hydrogen has a much higher energy storage density and carrying liquid hydrogen on the unmanned vehicle platform will drastically enhance the effective operation time and range (distance) features. Hydrogen gas stored in the conventional pressurized cylinders can easily be transformed into liquid form using a compact and robust liquefaction device and stored in the liquid form inside the unmanned vehicle's hydrogen storage cylinder. The hydrogen liquefaction device (also known as hydrogen liquefiers) can be utilizing helium cycles or some other cryo-cooling mechanisms to transform gaseous form into liquid form and such devices or units are already existing commercially for different scales such as liquefaction at a few liters to multiple of thousands of liters.

5. Hydrogen Liquid Cylinder Concept #2

A water electrolysis unit to generate the hydrogen at ambient to low pressures (0 to 10 bars), then a compressor or booster pump unit to pressurize this hydrogen gas to empty hydrogen cylinders on board for interim storage (10 bars to 180 bars), then use a small and compact hydrogen liquefaction (also known as hydrogen liquefier) device or unit to transform gaseous hydrogen into liquid and refill the unmanned vehicle's empty or spent hydrogen liquid cylinder. The water electrolysis unit will also have following units to operate properly: a water storage tank and a water transfer pump, a water removal unit to dry out the hydrogen output stream, a gas cleanup unit to remove undesired/contaminant gases in the hydrogen stream (such as oxygen gas), a moisture removal unit to fully dry the hydrogen gas for high pressure storage, controller to control the entire process safely, and power supply.

6. Hydrogen Liquid Cylinder Concept #3

A water electrolysis unit to generate the hydrogen and then compress and store it inside the interim storage cylinders without the primary compressor unit (up to 350 bars), then use a small and compact hydrogen liquefaction (also known as hydrogen liquefier) device or unit to transform gaseous hydrogen into liquid and refill the unmanned vehicle's empty or spent hydrogen liquid canister. The electrolyzer unit stated in this concept needs to be contained within another pressurized vessel so that the in order to minimize the differential pressure between the internal of the electrolyzer unit and external of the electrolyzer unit. While most of the conventional electrolyzer units can handle an internal/external differential pressure of up to 180 bars, anything beyond this pressure compromises the safety of the electrolyzer unit, mostly due to mechanical deformation of the components used in the electrolyzers. In order to prevent the large differential pressure damages on the electrolyzer components, the electrolyzer itself needs to be contained within another pressure enclosure that has been pressurized to a higher pressure compared to the pressure inside of the electrolyzer unit and has either one of the inert gases: nitrogen, helium, or argon. The water electrolysis unit will also have following units to operate properly: a water storage tank and a water transfer pump, a water removal unit to dry out the hydrogen output stream, a gas cleanup unit to remove undesired/contaminant gases in the hydrogen stream (such as oxygen gas), a moisture removal unit to fully dry the hydrogen gas for high pressure storage, a controller to control the entire process safely, and a power supply.

7. Hydrogen Slurry Cartridges Based on Hydrides Mixed with Water or Water/Caustic Solvents For certain applications and environments, use of gaseous and liquified hydrogen may not be a feasible approach. One potential route to generate hydrogen for such situations is the use of hydride materials that can release hydrogen either catalytically or thermally. Ready-to-use sodium borohydride (or any other similar hydride materials) cartridges are stored on a rack in a modular box that can be exchanged manually or automatically. When a new mission is planned, one ready-to-use cartridge is selected and goes onto the unmanned vehicle platform, gas is generated either catalytically or thermally and used inside the fuel cell module to generate the electrical energy needed for the unmanned vehicle. The depleted cartridge is removed and discarded into a recycling box. The new cartridge is then embarked on the unmanned vehicle by an automatic robotic mechanism ("hot swap"). Water based slurries may be containing only water or water/caustic mixtures. It may also be essential to clean up the hydrogen gas stream from contaminants.

8. Hydrogen Solid Cartridges Based on Hydrides Mixed with Water

For certain applications and environments, use of gaseous or liquified hydrogen, or hydrogen slurry cartridge may not be a feasible approach. One potential route to generate hydrogen for such situations is the use of solid hydride materials without mixing with liquid water or water/caustic mixtures. To further detail out, solid hydride can be reacted with water moisture inside a reactor and generate ultra-pure hydrogen with minimal contaminants. This generated hydrogen then can be used inside the fuel cell module to generate electricity for the unmanned vehicle. Exchange of the spent solid cartridges with an unused one can also be done automatically based on the mechanisms disclosed in this application.

FIG. 15 shows an autonomous hydrogen refueling and a multi-rotor unmanned vehicle (though this application is not limited to the this type of the unmanned vehicle) storing station assembly 160 in which hydrogen fuel cell powered unmanned vehicle 103 (with a hydrogen fuel cell stack system 104 and an onboard hydrogen storage 105) lands on a landing platform with precision landing mechanisms 161 and 142 that aligns the unmanned vehicle to the appropriate position after the drone charging and storing station's opening doors 101 are opened, then landing platform's lifting mechanism 106 lowers the unmanned vehicle to a lower section inside the autonomous hydrogen refueling and unmanned vehicle storing station assembly 160 to prepare for the exchange of depleted on-board hydrogen storage 105, then hydrogen cylinder or cartridge or pod lifting mechanism 110 which utilizes a robotic grasping mechanism or a robotic arm 111 and locking/unlocking mechanism 112 to grasp depleted on-board hydrogen storage 105 and move this onto the depleted hydrogen cylinder or cartridge or pod conveyer belt 113 in order to move the depleted on-board hydrogen storage cylinder or cartridge or pod 105 in the direction of depleted hydrogen cylinder or cartridge or pod racks chamber with dispenser mechanism 114, then another robotic grasping mechanism or robotic arm 111 places the depleted on-board hydrogen storage cylinder, cartridge or pod 105 into one of the empty racks (labeled with 115 once it is placed in the rack) for depleted hydrogen cylinder, cartridge, or pod section 116. After then, another robotic grasping mechanism or a robotic arm 111 located in the vicinity of charged hydrogen cylinder or cartridge or pod racks chamber with dispenser mechanism 107 grabs a charged hydrogen storage cylinder or cartridge or pod 108 and moves it onto the charged hydrogen cylinder or cartridge or pod conveyer belt 109, then another robotic grasping mechanism or a robotic arm 111 located in the vicinity hydrogen cylinder or cartridge or pod lifting mechanism 110 captures the charged hydrogen cylinder or cartridge or pod 108 and installs it onto the unmanned vehicle platform via locking/unlocking mechanism 112. Even though robotics systems are becoming more advanced, it may be essential to have an external user to assist or interfere with the operation of the autonomous hydrogen refueling and unmanned vehicle storing station assembly 160 and for this opening mechanism 162 is advised to be incorporated for manual refilling of water, hydrogen cylinder, cartridges, or pods and also opening mechanism 118 for manual disposal of depleted hydrogen cylinder, cartridge, or pods. Modular refueling/refilling storage box 102 integrated into the autonomous hydrogen refueling and unmanned vehicle storing station 160 can be comprised of the following components either in combination or separately: electronics and controls 163 to safely operate the hydrogen refueling process, pressurized gaseous hydrogen cylinders from commercial suppliers (not shown here), electrolysis hydrogen generation unit 125 (not shown here), hydrogen slurry cartridges 150, hydrogen solid cartridges 154, liquid hydrogen cylinders 108, hydrogen pods 108 (that are comprised of a fuel cell stack, hydrogen storage, control electronics, etc. in a single package), water storage tank 123 and transfer pump 124 (not shown here) for the electrolyzers 125, gas cleanup units 126 (not shown here), primary compressor 120, secondary compressor 121, booster pump 122 (not shown here) and a refilling interface 119 to charge the depleted hydrogen cylinder, cartridge, or pod 105 or 108 or 115, charged hydrogen cylinder or cartridge or pod racks chamber with dispenser mechanism 107, charged hydrogen cylinders or cartridges or pods 108, and charged hydrogen cylinder or cartridge or pod conveyer belt 109. Modular disposing storage box 117 can be comprised of the following components either in combination or separately: Depleted hydrogen cylinder or cartridge or pod racks chamber with dispenser mechanism 114, empty rack for depleted hydrogen cylinder or cartridge or pod 116, depleted hydrogen cylinder or cartridge or pod 115, and depleted hydrogen cylinder or cartridge or pod conveyer belt 113. It is desired to have the autonomous hydrogen refueling and unmanned vehicle storing station assembly 160 be kept safe at various environments and hence an electric fence 146 to keep humans and animals away, a security device such as camera 164 to monitor and record the surroundings, and anti-tampering or anti-theft notification devices 147 can also integrated at various locations of the autonomous hydrogen refueling and unmanned vehicle storing station assembly 160. Furthermore, a weather sensor 165 or sensors package 165 is also advised to be integrated to the autonomous hydrogen refueling and unmanned vehicle storing station assembly 160 in order to enable the safe operation of the autonomous hydrogen refueling and unmanned vehicle storing station assembly 160 or safe operation of the unmanned vehicle 103 during abnormal weather conditions. The weather sensor or sensor package 165 can also contain a hyper-local weather estimating device with hyper-accurate forecasting capability to get the local weather conditions that are relevant to the safe operation of the unmanned vehicles at ground and an altitude range (0-10 meters, 10-50 meters, 50-100 meters, 100-1000 meters, etc.) where the mission is planned. In order to prevent the plants and other plant-like things to cover the opening doors or external sensor platforms of the refueling station and hinder its operations or to keep the externals of the station clean from the plants, weeds, etc., a weed-killer 145 or plant-killer device 145 can also be integrated. In addition to weed-killing feature, the weed-killer device can also be integrated with an insecticide/pesticide killer device/compound to prevent insecticide/pesticide infestation on the external or internal sections of the refueling station. A communication module 166 is used to directly or remotely connect to the automated hydrogen refueling/exchanging and storing station, get status update or sending comments and some examples of this communication module are a satcom device and its antenna, a telecom device and its antenna, etc. and the content of this application is not limited to these communication methods. The power source 135 to operate the autonomous hydrogen refueling and unmanned vehicle storing station assembly 160 can be obtained from a vehicle such as a pickup truck, van, car, etc. or from solar, wind, grid-electricity, battery, fuel cell, or combinations thereof, etc., but the content of this application is not limited to these power options.

FIG. 16 shows an autonomous hydrogen refueling and a VTOL (vertical takeoff and landing) unmanned vehicle (though this application is not limited to this type of unmanned vehicle) storing station assembly 160 in which hydrogen fuel cell powered unmanned vehicle 103 (with a hydrogen fuel cell stack system 104 and an on-board hydrogen storage cylinder or cartridge or pod 105) lands on landing platform with precision landing mechanisms 161 and 142 that aligns the unmanned vehicle to the appropriate position after the drone charging and storing station's opening doors 101 are opened, then landing platform's lifting mechanism 106 lowers the unmanned vehicle to a lower section inside the autonomous hydrogen refueling and unmanned vehicle storing station assembly 160 to prepare for the exchange of on-board hydrogen storage cylinder or cartridge or pod 105, then hydrogen cylinder or cartridge or pod lifting mechanism 110 which utilizes a robotic grasping mechanism or a robotic arm 111 and locking/unlocking mechanism 112 to grasp depleted on-board hydrogen storage cylinder or cartridge or pod 105 and move this onto the depleted hydrogen cylinder or cartridge or pod conveyer belt 113 in order to move the depleted on-board hydrogen storage cylinder or cartridge or pod 105 in the direction of depleted hydrogen cylinder or cartridge or pod racks chamber with dispenser mechanism 114, then another robotic grasping mechanism or robotic arm 111 places the depleted on-board hydrogen storage cylinder, cartridge or pod 105 into one of the empty racks (labeled with 115 once it is placed in the rack) for depleted hydrogen cylinder, cartridge, or pod section 116. After then, another robotic grasping mechanism or a robotic arm 111 located in the vicinity of charged hydrogen cylinder or cartridge or pod racks chamber with dispenser mechanism 107 grabs a charged hydrogen storage cylinder or cartridge or pod 108 and moves it onto the charged hydrogen cylinder or cartridge or pod conveyor belt 109, then another robotic grasping mechanism or a robotic arm 111 located in the vicinity hydrogen cylinder or cartridge or pod lifting mechanism 110 captures the charged hydrogen cylinder or cartridge or pod 108 and installs it onto the unmanned vehicle platform via locking/unlocking mechanism 112. Even though robotics systems are becoming more advanced, it may be essential to have an external user to assist or interfere with the operation of the autonomous hydrogen refueling and unmanned vehicle storing station assembly 160 and for this opening mechanism 162 is advised to be incorporated for manual refilling of water, hydrogen cylinder, cartridges, or pods and also opening mechanism 118 for manual disposal of depleted hydrogen cylinder, cartridge, or pods. Modular refueling/refilling storage box 102 integrated into the autonomous hydrogen refueling and unmanned vehicle storing station 160 can be comprised of the following components either in combination or separately: electronics and controls 163 to safely operate the hydrogen refueling process, pressurized gaseous hydrogen cylinders from commercial suppliers (not shown here), hydrogen slurry cartridges 108 or 150, solid hydrogen cartridges 108 or 154, liquid hydrogen cylinders 108, hydrogen pods 108 (that are comprised of a fuel cell stack, hydrogen storage, control electronics, etc. in a single package), electrolyzer 125 (not shown here), water storage tank 123 and transfer pump 124 (not shown here) for the electrolyzers 125, gas cleanup units 126 (not shown here), primary compressor 120, secondary compressor 121, booster pump 122 (not shown here) and a refilling interface 119 to charge the depleted hydrogen cylinder, cartridge, or pod 105 or 108 or 115, charged hydrogen cylinder or cartridge or pod racks chamber with dispenser mechanism 107, charged hydrogen cylinders or cartridges or pods 108, and charged hydrogen cylinder or cartridge or pod conveyor belt 109. Modular disposing storage box 117 can be comprised of the following components either in combination or separately: Depleted hydrogen cylinder or cartridge or pod racks chamber with dispenser mechanism 114, empty rack for depleted hydrogen cylinder or cartridge or pod 116, depleted hydrogen cylinder or cartridge or pod 115, and depleted hydrogen cylinder or cartridge or pod conveyor belt 113. It is desired to have the autonomous hydrogen refueling and unmanned vehicle storing station assembly 160 be kept safe at various environments and hence an electric fence 146 to keep humans and animals away, a security device such as camera 164 to monitor and record the surroundings, and anti-tampering or anti-theft notification devices 147 can also integrated at various locations of the autonomous hydrogen refueling and unmanned vehicle storing station assembly 160. Furthermore, a weather sensor 165 or sensors package 165 is also advised to be integrated to the autonomous hydrogen refueling and unmanned vehicle storing station assembly 160 in order to enable the safe operation of the autonomous hydrogen refueling and unmanned vehicle storing station assembly 160 or safe operation of the unmanned vehicle 103 during abnormal weather conditions. The weather sensor or sensor package 165 can also contain a hyperlocal weather estimating device with hyper-accurate forecasting capability to get the local weather conditions that are relevant to the safe operation of the unmanned vehicles at ground and an altitude range (0-10 meters, 10-50 meters, 50-100 meters, 100-1000 meters, etc.) where the mission is planned. In order to prevent the plants and other plant-like things to cover the opening doors or external sensor platforms of the refueling station and hinder its operations or to keep the externals of the station clean from the plants, weeds, etc., a weed-killer 145 or plant-killer device 145 can also be integrated. In addition to weed-killing feature, the weed-killer device can also be integrated with an insecticide/pesticide killer device/compound to prevent insecticide/pesticide infestation on the external or internal sections of the refueling station. A communication module 166 is used to directly or remotely connect to the automated hydrogen refueling/exchanging and storing station, get status update or sending comments and some examples of this communication module are a satcom device and its antenna, a telecom device and its antenna, etc. and the content of this application is not limited to these communication methods. The power source 135 to operate the autonomous hydrogen refueling and unmanned vehicle storing station assembly 160 can be obtained from a vehicle such as a pickup truck, van, car, etc. or from solar, wind, grid-electricity, battery, fuel cell, or combinations thereof, etc., but not limited to these options.

FIG. 17 shows an autonomous hydrogen refueling and a vertically (or perpendicularly) launched unmanned vehicle (though this application is not limited to this type of unmanned vehicle) storing station assembly 160 in which hydrogen fuel cell powered unmanned vehicle 103 (with a hydrogen fuel cell stack system 104 and an on-board hydrogen storage cylinder or cartridge or pod 105) lands on landing platform with precision landing mechanisms 161 and 142 that aligns the unmanned vehicle to the appropriate position after the drone charging and storing station's opening doors 101 are opened, then landing platform's lifting mechanism 106 lowers the unmanned vehicle to a lower section inside the autonomous hydrogen refueling and unmanned vehicle storing station assembly 160 to prepare for the exchange of on-board hydrogen storage cylinder or cartridge or pod 105, then hydrogen cylinder or cartridge or pod lifting mechanism 110 which utilizes a robotic grasping mechanism or a robotic arm 111 and locking/unlocking mechanism 112 to grasp depleted on-board hydrogen storage cylinder or cartridge or pod 105 and move this onto the depleted hydrogen cylinder or cartridge or pod conveyer belt 113 in order to move the depleted on-board hydrogen storage cylinder or cartridge or pod 105 in the direction of depleted hydrogen cylinder or cartridge or pod racks chamber with dispenser mechanism 114, then another robotic grasping mechanism or robotic arm 111 places the depleted on-board hydrogen storage cylinder, cartridge or pod 105 into one of the empty racks (labeled with 115 once it is placed in the rack) for depleted hydrogen cylinder, cartridge, or pod section 116. After then, another robotic grasping mechanism or a robotic arm 111 located in the vicinity of charged hydrogen cylinder or cartridge or pod racks chamber with dispenser mechanism 107 grabs a charged hydrogen storage cylinder or cartridge or pod 108 and moves it onto the charged hydrogen cylinder or cartridge or pod conveyor belt 109, then another robotic grasping mechanism or a robotic arm 111 located in the vicinity hydrogen cylinder or cartridge or pod lifting mechanism 110 captures the charged hydrogen cylinder or cartridge or pod 108 and installs it onto the unmanned vehicle platform via locking/unlocking mechanism 112. Even though robotics systems are becoming more advanced, it may be essential to have an external user to assist or interfere with the operation of the autonomous hydrogen refueling and unmanned vehicle storing station assembly 160 and for this opening mechanism 162 is advised to be incorporated for manual refilling of water, hydrogen cylinder, cartridges, or pods and also opening mechanism 118 for manual disposal of depleted hydrogen cylinder, cartridge, or pods. Modular refueling/refilling storage box 102 integrated into the autonomous hydrogen refueling and unmanned vehicle storing station 160 can be comprised of the following components either in combination or separately: electronics and controls 163 to safely operate the hydrogen refueling process, pressurized gaseous hydrogen cylinders from commercial suppliers (not shown here), hydrogen slurry cartridges 108 or 150, solid hydrogen cartridges 108 or 154, liquid hydrogen cylinders 108, hydrogen pods 108 (that are comprised of a fuel cell stack, hydrogen storage, control electronics, etc. in a single package), electrolyzer 125 (not shown here), water storage tank 123 and transfer pump 124 (not shown here) for the electrolyzers 125, gas cleanup units 126 (not shown here), primary compressor 120, secondary compressor 121, booster pump 122 (not shown here) and a refilling interface 119 to charge the depleted hydrogen cylinder, cartridge, or pod 105 or 108 or 115, charged hydrogen cylinder or cartridge or pod racks chamber with dispenser mechanism 107, charged hydrogen cylinders or cartridges or pods 108, and charged hydrogen cylinder or cartridge or pod conveyor belt 109. Modular disposing storage box 117 can be comprised of the following components either in combination or separately: Depleted hydrogen cylinder or cartridge or pod racks chamber with dispenser mechanism 114, empty rack for depleted hydrogen cylinder or cartridge or pod 116, depleted hydrogen cylinder or cartridge or pod 115, and depleted hydrogen cylinder or cartridge or pod conveyor belt 113. It is desired to have the autonomous hydrogen refueling and unmanned vehicle storing station assembly 160 be kept safe at various environments and hence an electric fence 146 to keep humans and animals away, a security device such as camera 164 to monitor and record the surroundings, and anti-tampering or anti-theft notification devices 147 can also integrated at various locations of the autonomous hydrogen refueling and unmanned vehicle storing station assembly 160. Furthermore, a weather sensor 165 or sensors package 165 is also advised to be integrated to the autonomous hydrogen refueling and unmanned vehicle storing station assembly 160 in order to enable the safe operation of the autonomous hydrogen refueling and unmanned vehicle storing station assembly 160 or safe operation of the unmanned vehicle 103 during bad weather conditions. The weather sensor or sensor package 165 can also contain a hyperlocal weather estimating device with hyper-accurate forecasting capability to get the local weather conditions that are relevant to the safe operation of the unmanned vehicles at ground and an altitude range (0-10 meters, 10-50 meters, 50-100 meters, 100-1000 meters, etc.) where the mission is planned. In order to prevent the plants and other plant-like things to cover the opening doors or external sensor platforms of the refueling station and hinder its operations or to keep the externals of the station clean from the plants, weeds, etc., a weed-killer 145 or plant-killer device 145 can also be integrated. In addition to weed-killing feature, the weed-killer device can also be integrated with an insecticide/pesticide killer device/compound to prevent insecticide/pesticide infestation on the external or internal sections of the refueling station. A communication module 166 is used to directly or remotely connect to the automated hydrogen refueling/exchanging and storing station, get status update or sending comments and some examples of this communication module are a satcom device and its antenna, a telecom device and its antenna, etc. and the content of this application is not limited to these communication methods. The power source 135 to operate the autonomous hydrogen refueling and unmanned vehicle storing station assembly 160 can be obtained from a vehicle such as a pickup truck, van, car, etc. or from solar, wind, grid-electricity, battery, fuel cell, or combinations thereof, etc., but not limited to these options.

FIG. 18 shows an autonomous liquid hydrogen refueling and unmanned vehicle storing station assembly 160 in which liquid hydrogen fuel cell powered unmanned vehicle 103 (with a hydrogen fuel cell stack system 104 and an on-board hydrogen storage cylinder or cartridge or pod 105) lands on landing platform with precision landing mechanisms 161 and 142 that aligns the unmanned vehicle to the appropriate position after the drone charging and storing station's opening doors 101 are opened, then landing platform's lifting mechanism 106 lowers the unmanned vehicle to a lower section inside the autonomous liquid hydrogen refueling and unmanned vehicle storing station assembly 160 to prepare for the exchange of on-board liquid hydrogen storage cylinder 105, then hydrogen cylinder lifting mechanism 110 which utilizes a robotic grasping mechanism or a robotic arm 111 and a locking/unlocking mechanism 112 to grasp the depleted on-board liquid hydrogen storage cylinder 105 and move this onto the depleted hydrogen cylinder conveyer belt 113 in order to move the depleted on-board liquid hydrogen storage cylinder 105 in the direction of depleted hydrogen cylinder racks chamber with dispenser mechanism 114, then another robotic grasping mechanism or robotic arm 111 places the depleted liquid hydrogen storage cylinder 105 into one of the empty racks (labeled with 115 after it is placed into the rack) for depleted hydrogen cylinder section 116. After then, another robotic grasping mechanism or a robotic arm 111 located in the vicinity of charged hydrogen cylinder racks chamber with dispenser mechanism section 107 grabs a charged liquid hydrogen storage cylinder 108 and moves it onto the charged hydrogen cylinder conveyor belt 109, then another robotic grasping mechanism or a robotic arm 111 located in the vicinity hydrogen cylinder lifting mechanism 110 captures the charged liquid hydrogen cylinder 108 and installs it onto the unmanned vehicle platform via locking/unlocking mechanism 112. The liquid hydrogen can be generated from the pressurized gas cylinders or initially generated with an electrolyzer unit and then converted into liquid form with a hydrogen liquefier device. Even though robotics systems are becoming more advanced, it may be essential to have an external user to assist or interfere with the operation of the autonomous liquid hydrogen refueling and unmanned vehicle storing station assembly 160 and for this opening mechanism 162 is advised to be incorporated for manual refilling of water, hydrogen cylinder, and also opening mechanism 118 for manual disposal of depleted liquid hydrogen cylinders. Modular refueling/refilling storage box 102 integrated into the autonomous liquid hydrogen refueling and unmanned vehicle storing station 160 can be comprised of the following components either in combination or separately: electronics and controls 163 to safely operate the hydrogen refueling process, pressurized gaseous hydrogen cylinders from commercial suppliers 143 (not shown here), compressed hydrogen cylinders 108 or liquid hydrogen cylinders 108, hydrogen pods 108 (that are comprised of a fuel cell stack, hydrogen storage, control electronics, etc. in a single package), electrolyzer 125 (not shown here), water storage tank 123 and water transfer pump 124 (not shown here) for the electrolyzers 125, gas cleanup units 126 (not shown here), primary compressor 120, secondary compressor 121, booster pump 122 (not shown here), hydrogen liquefier device 149 and a refilling interface 119 to charge the depleted liquid hydrogen cylinder or pod 105 or 115 with liquid hydrogen fuel, charged hydrogen cylinder racks chamber with dispenser mechanism 107, charged liquid hydrogen cylinders 108, and charged hydrogen cylinder conveyor belt 109. Modular disposing storage box 117 can be comprised of the following components either in combination or separately: Depleted liquid hydrogen cylinder or pod racks chamber with dispenser mechanism 114, empty rack for depleted liquid hydrogen cylinder or pod 116, depleted liquid hydrogen cylinder or pod 115, and depleted hydrogen cylinder or pod conveyor belt 113. It is desired to have the autonomous liquid hydrogen refueling and unmanned vehicle storing station assembly 160 be kept safe at various environments and hence an electric fence 146, a security monitoring device such as camera 164, and anti-tampering or anti-theft notification devices 147 are also integrated at various locations of the autonomous hydrogen refueling and unmanned vehicle storing station assembly 160. Furthermore, a weather sensor 165 or sensors package 165 is also advised to be integrated to the autonomous hydrogen refueling and unmanned vehicle storing station assembly 160 in order to enable the safe operation of the autonomous hydrogen refueling and unmanned vehicle storing station assembly 160 or safe operation of the unmanned vehicle 103 during bad weather conditions. The weather sensor or sensor package 165 can also contain a hyper-local weather estimating device with hyper-accurate forecasting capability to get the local weather conditions that are relevant to the safe operation of the unmanned vehicles at ground and an altitude range (0-10 meters, 10-50 meters, 50-100 meters, 100-1000 meters, etc.) where the mission is planned. In order to prevent the plants and other plant-like things to cover the opening doors or external sensor platforms of the refueling station and hinder its operations or to keep the externals of the station clean from the plants, weeds, etc., a weed-killer 145 or plant-killer device 145 can also be integrated. In addition to weed-killing feature, the weed-killer device can also be integrated with an insecticide/pesticide killer device/compound to prevent insecticide/pesticide infestation on the external or internal sections of the refueling station. A communication module 166 is used to directly or remotely connect to the automated hydrogen refueling/exchanging and storing station, get status update or sending comments and some examples of this communication module are a satcom device and its antenna, a telecom device and its antenna, etc. and the content of this application is not limited to these communication methods. The power source 135 to operate the autonomous hydrogen refueling and unmanned vehicle storing station assembly can be obtained from a vehicle such as a pickup truck, van, car, etc. or from solar, wind, grid-electricity, battery, fuel cell, or combinations thereof, etc., but not limited to these options.

FIG. 19 shows a revolving chamber design that is comprised of a charged hydrogen cylinder or cartridges or pod rack chamber 148, where charged hydrogen cylinder or cartridges or pods are arranged by a revolving racks' moving mechanism 137, has multiple charged hydrogen cylinders or cartridges or pods 108, has the capability of counter-clock-wise or clock-wise revolving, and has a charged hydrogen cylinder or cartridge or pod conveyer belt 109 to move the charged hydrogen cylinder or cartridges or pods 108 to their intended destination.

FIG. 20 shows a revolving chamber design that is comprised of a charged/depleted hydrogen cylinders or cartridges or pods rack chamber 158, where charged/depleted hydrogen cylinders or cartridges or pods are arranged by a revolving racks moving mechanism 137, has multiple charged/depleted hydrogen cylinders or cartridges or pods 108 or 139, has empty rack or racks for depleted hydrogen cylinders, cartridges or pods 116, has the capability of counter-clockwise or clock-wise revolving, and has a charged/depleted hydrogen cylinder or cartridge or pod conveyer belt 131 to move the charged hydrogen cylinder or cartridges or pods 108 to their intended destination.

FIG. 21 shows a revolving chamber design that is comprised of a depleted hydrogen cylinder or cartridges or pod rack chamber 138, where depleted hydrogen cylinders or cartridges or pods are arranged by a revolving racks' moving mechanism 137, has multiple depleted hydrogen cylinders or cartridges or pods 139, has single or multiple empty rack or racks for depleted hydrogen cylinder(s) or cartridge(s) or pod(s), has the capability of counter-clockwise or clock-wise revolving, and has a depleted hydrogen cylinder or cartridge or pod conveyer belt 13 to move the depleted hydrogen cylinders or cartridges or pods 139 to their intended destination.

FIG. 22 shows a linear chamber design (also known as Pezi-dispenser design) that is comprised of a charged hydrogen cylinder or cartridges or pods rack chamber 148, where charged hydrogen cylinder or cartridges or pods are arranged by a linear racks moving mechanism 140, has multiple charged hydrogen cylinders or cartridges or pods 108, has the capability of moving downward or upward, and has a charged hydrogen cylinder or cartridge or pod conveyer belt 109 to move the charged hydrogen cylinder or cartridges or pods 108 to their intended destination.

FIG. 23 shows a linear chamber design (also known as Pezi-dispenser design) that is comprised of a charged/depleted hydrogen cylinders or cartridges or pods rack chamber 158, where charged/depleted hydrogen cylinders or cartridges or pods are arranged by a linear racks moving mechanism 140, has multiple charged/depleted hydrogen cylinders or cartridges or pods 108 or 139, has empty rack or racks for depleted hydrogen cylinders, cartridges or pods 116, has the capability of moving upward or downward, and has a charged/depleted hydrogen cylinder or cartridge or pod conveyer belt 131 to move the charged hydrogen cylinder or cartridges or pods 108 to their intended destination.

FIG. 24 shows a linear chamber design that is comprised of a depleted hydrogen cylinder or cartridges or pods rack chamber 138, where depleted hydrogen cylinders or cartridges or pods are arranged by a linear racks moving mechanism 140, has multiple depleted hydrogen cylinders or cartridges or pods 139, has single or multiple empty rack or racks for depleted hydrogen cylinder(s) or cartridge(s) or pod(s) 116, has the capability of moving upward or downward, and has a depleted hydrogen cylinder or cartridge or pod conveyer belt 13 to move the depleted hydrogen cylinders or cartridges or pods 139 to their intended destination.

FIG. 25 shows an autonomous gaseous hydrogen refueling and unmanned vehicle storing station assembly 160 in which hydrogen fuel cell powered unmanned vehicle 103 (with a hydrogen fuel cell stack system 104 and an on-board hydrogen storage cylinder or pod 105) lands on a landing platform with precision landing mechanisms 161 and 142 that aligns the unmanned vehicle to the appropriate position after the drone charging and storing station's opening doors 101 and 142 are opened, then landing platform's lifting mechanism 106 lowers the unmanned vehicle to a lower section inside the autonomous hydrogen refueling and unmanned vehicle storing station assembly 160 to prepare for the exchange of on-board depleted hydrogen storage cylinder or pod 105, then hydrogen cylinder or pod lifting mechanism 110 which utilizes a robotic grasping mechanism or a robotic arm 111 and locking/unlocking mechanism 112 to grasp the depleted on-board hydrogen storage cylinder or pod 105 and move this onto the charged/depleted hydrogen cylinder or pod conveyer belt 131 in order to move the depleted on-board hydrogen storage cylinder or pod 105 into one of the empty chambers 116 (the empty cylinder, cartridge or pod is labeled with 115 once it is on the rack) which is located inside the charged/empty hydrogen cylinder storage section 133. After then, robotic grasping mechanism or a robotic arm 111 located in the vicinity of charged/depleted hydrogen cylinder storage section 133 grabs a charged hydrogen storage cylinder or cartridge or pod 108 and moves it onto the charged/depleted hydrogen cylinder or cartridge or pod conveyer belt 131, then another robotic grasping mechanism or a robotic arm 111 located in the vicinity hydrogen cylinder or cartridge or pod lifting mechanism 110 captures the charged hydrogen cylinder or cartridge or pod 108 and installs it onto the unmanned vehicle platform via a locking/unlocking mechanism 112. Even though robotics systems are becoming more advanced, it may be essential to have an external user to assist or interfere with the operation of the autonomous hydrogen refueling and unmanned vehicle storing station assembly 160 and for this opening mechanism 162 (not shown here) is advised to be incorporated for manual refilling of hydrogen cylinder, cartridges, or pods and also opening mechanism 118 (not shown here) for manual disposal/removal of depleted hydrogen cylinder, cartridge, or pods. Modular hydrogen refueling section 134 can be assembled next to the autonomous hydrogen refueling and unmanned vehicle storing station 160 (but this application is not limited to this location) can be comprised of the following components either in combination or separately: pressurized gaseous hydrogen cylinders from commercial suppliers 143, primary compressor 120, secondary compressor 121, booster pump 122, a refilling interface 119 or port 119 to charge the depleted hydrogen cylinder, cartridge, or pod 105 or 108 or 115, an electronic and controls unit to safely operate the autonomous hydrogen refueling and unmanned vehicle storing station 160, power source 135, and a conveyor belt 131. Charged/empty hydrogen cylinder storage section 133 can be comprised of the following components either in combination or separately: Charged/depleted hydrogen cylinder or cartridge or pod racks chamber with dispenser mechanism 114 (not shown), empty rack 116 for storage of depleted hydrogen cylinder or cartridge or pod 105 or 115, and charged/depleted hydrogen cylinder or cartridge or pod conveyor belt 131, and a robotic grasping mechanism or robotic arm. It is desired to have the autonomous hydrogen refueling and unmanned vehicle storing station assembly 160 be kept safe at various environments and hence an electric fence 146, a security monitoring device such as a camera 164, and anti-tampering or anti-theft notification devices 147 are also integrated at various locations of the autonomous hydrogen refueling and unmanned vehicle storing station assembly 160. The weather sensor or sensor package 165 can also contain a hyper-local weather estimating device with hyper-accurate forecasting capability to get the local weather conditions that are relevant to the safe operation of the unmanned vehicles at ground and an altitude range (0-10 meters, 10-50 meters, 50-100 meters, 100-1000 meters, etc.) where the mission is planned. In order to prevent the plants and other plant-like things to cover the refueling station and hinder its operations or to keep the externals of the station clean from the plants, weeds, etc., a weed-killer 145 or plant-killer device 145 can also be integrated. In addition to weed-killing feature, the weed-killer device can also be integrated with an insecticide/pesticide killer device/compound to prevent insecticide/pesticide infestation on the external or internal sections of the refueling station. Furthermore, a weather sensor or sensors package is also advised to be integrated to the autonomous hydrogen refueling and unmanned vehicle storing station assembly 160 in order to enable the safe operation of the autonomous hydrogen refueling and unmanned vehicle storing station assembly 160 or safe operation of the unmanned vehicle 103 during bad weather conditions. A communication module 166 is used to directly or remotely connect to the automated hydrogen refueling/exchanging and storing station, get status update or sending comments and some examples of this communication module are a satcom device and its antenna, a telecom device and its antenna, etc. and the content of this application is not limited to these communication methods. The power source 135 to operate the autonomous hydrogen refueling and unmanned vehicle storing station assembly can be obtained from a vehicle such as a pickup truck, van, car, etc. or from solar, wind, grid-electricity, battery, fuel cell, or combinations thereof, etc., but not limited to these options.

FIG. 26 shows an autonomous gaseous hydrogen refueling and unmanned vehicle storing station assembly 160 in which hydrogen fuel cell powered unmanned vehicle 103 (with a hydrogen fuel cell stack system 104 and an on-board hydrogen storage cylinder or pod 105) lands on a landing platform with precision landing mechanisms 142 and 161 that aligns the unmanned vehicle to the appropriate position after the drone charging and storing station's opening doors 101 and 142 are opened, then landing platform's lifting mechanism 106 lowers the unmanned vehicle to a lower section inside the autonomous hydrogen refueling and unmanned vehicle storing station assembly 160 to prepare for the exchange of on-board depleted hydrogen storage cylinder or pod 105, then hydrogen cylinder or pod lifting mechanism 110 which utilizes a robotic grasping mechanism or a robotic arm 111 and locking/unlocking mechanism 112 to grasp depleted on-board hydrogen storage cylinder or pod 105 and move this onto the charged/depleted hydrogen cylinder or pod conveyer belt 131 in order to move the depleted on-board hydrogen storage cylinder or pod 105 into one of the empty chambers 116 which is located inside the charged/empty hydrogen cylinder storage section 133. After then, robotic grasping mechanism or a robotic arm 111 located in the vicinity of charged/depleted hydrogen cylinder storage 133 grabs a charged hydrogen storage cylinder or pod 108 and moves it onto the charged/depleted hydrogen cylinder or pod conveyor belt 131, then robotic grasping mechanism or a robotic arm 111 located in the vicinity hydrogen cylinder or pod lifting mechanism 110 captures the charged hydrogen cylinder or pod 108 on the conveyer belt and installs it onto the unmanned vehicle platform via locking/unlocking mechanism 112. Even though robotics systems are becoming more advanced, it may be essential to have an external user to assist or interfere with the operation of the autonomous hydrogen refueling and unmanned vehicle storing station assembly 160 and for this opening mechanism 162 (not shown here) is advised to be incorporated for manual refilling of water, hydrogen cylinder, or pods and also opening mechanism 118 (not shown here) for manual disposal of depleted hydrogen cylinder, or pods. Modular hydrogen refueling section 134 can be assembled next to the autonomous hydrogen refueling and unmanned vehicle storing station 160 (but this application is not limited to this location) and can be comprised of the following components either in combination or separately: water storage 123, water transfer pump 124, an electrolyzer 125 to generate hydrogen from water electrolysis process, a gas cleanup unit for hydrogen stream 126 to remove the impurities, a primary compressor 120 to store the hydrogen at an elevated pressure inside the intermediary hydrogen storage tank 127, a secondary compressor 121 or a booster pump 122 to further increase the pressure and a refilling interface 119 to charge the depleted hydrogen cylinder or pod 105 or 108 or 115 with hydrogen fuel, an electronic and controls 130 to safely operate the autonomous hydrogen refueling and unmanned vehicle storing station, and charged/depleted hydrogen cylinder or pod conveyor belt 131, and a robotic grabbing mechanism or a robotic arm 111. Charged/empty hydrogen cylinder storage section 133 can be comprised of the following components either in combination or separately: Charged/depleted hydrogen cylinder or pod racks chamber with dispenser mechanism 114 (not shown), an empty rack 116 for storage of depleted hydrogen cylinder or pod 105 or 115, and a charged/depleted hydrogen cylinder or pod conveyor belt 131, and a robotic grasping mechanism or robotic arm 111. It is desired to have the autonomous hydrogen refueling and unmanned vehicle storing station assembly 160 be kept safe at various environments and hence an electric fence 146, a security monitoring device such as a camera 164, and anti-tampering or anti-theft notification devices 147 can also be integrated at various locations of the autonomous hydrogen refueling and unmanned vehicle storing station assembly 160. In order to prevent the plants and other plant-like things to cover the refueling station and hinder its operations or to keep the externals of the station clean from the plants, weeds, etc., a weed-killer 145 or plant-killer device 145 can also be integrated. In addition to weed-killing feature, the weed-killer device can also be integrated with an insecticide/pesticide killer device/compound to prevent insecticide/pesticide infestation on the external or internal sections of the refueling station. Furthermore, a weather sensor or sensors package is also advised to be integrated to the autonomous hydrogen refueling and unmanned vehicle storing station assembly 160 in order to enable the safe operation of the autonomous hydrogen refueling and unmanned vehicle storing station assembly 160 or safe operation of the unmanned vehicle 103 during bad weather conditions. The weather sensor or sensor package 165 can also contain a hyper-local weather estimating device with hyper-accurate forecasting capability to get the local weather conditions that are relevant to the safe operation of the unmanned vehicles at ground and an altitude range (0-10 meters, 10-50 meters, 50-100 meters, 100-1000 meters, etc.) where the mission is planned. A communication module 166 is used to directly or remotely connect to the automated hydrogen refueling/exchanging and storing station, get status update or sending comments and some examples of this communication module are a satcom device and its antenna, a telecom device and its antenna, etc. and the content of this application is not limited to these communication methods. The power source 135 to operate the autonomous hydrogen refueling and unmanned vehicle storing station assembly can be obtained from a vehicle such as a pickup truck, van, car, etc. or from solar, wind, grid-electricity, battery, fuel cell, or combinations thereof, etc., but not limited to these options.

FIG. 27 shows an autonomous gaseous hydrogen refueling and unmanned vehicle storing station assembly 160 in which hydrogen fuel cell powered unmanned vehicle 103 (with a hydrogen fuel cell stack system 104 and an on-board hydrogen storage cylinder or pod 105) lands on a landing platform with precision landing mechanisms 161 and 142 that aligns the unmanned vehicle to the appropriate position after the drone charging and storing station's opening doors 101 and 142 are opened, then landing platform's lifting mechanism 106 lowers the unmanned vehicle to a lower section inside the autonomous hydrogen refueling and unmanned vehicle storing station assembly 160 to prepare for the exchange of on-board depleted hydrogen storage cylinder or pod 105, then hydrogen cylinder or pod lifting mechanism 110 which utilizes a robotic grasping mechanism or a robotic arm 111 and locking/unlocking mechanism 112 to grasp depleted on-board hydrogen storage cylinder or pod 105 and move this onto the charged/depleted hydrogen cylinder or pod conveyer belt 131 in order to move the depleted on-board hydrogen storage cylinder or pod 105 into one of the empty chambers 116 which is located inside the charged/empty hydrogen cylinder storage section 133. After then, robotic grasping mechanism or a robotic arm 111 located in the vicinity of charged/depleted hydrogen cylinder storage 133 grabs a charged hydrogen storage cylinder or pod 108 and moves it onto the charged/depleted hydrogen cylinder or pod conveyor belt 131, then robotic grasping mechanism or a robotic arm 111 located in the vicinity hydrogen cylinder or pod lifting mechanism 110 captures the charged hydrogen cylinder or pod 108 and installs it onto the unmanned vehicle platform via locking/unlocking mechanism 112. Even though robotics systems are becoming more advanced, it may be essential to have an external user to assist or interfere with the operation of the autonomous hydrogen refueling and unmanned vehicle storing station assembly 160 and for this opening mechanism 162 (not shown here) is advised to be incorporated for manual refilling of water, hydrogen cylinder or pods and also opening mechanism 118 (not shown here) for manual disposal of depleted hydrogen cylinder or pods. Modular hydrogen refueling section 134 can be assembled next to the autonomous hydrogen refueling and unmanned vehicle storing station 160 (but this application is not limited to this location) and can be comprised of the following components either in combination or separately: water storage 123, water transfer pump 124, a high pressure electrolyzer 125 to generate hydrogen from water electrolysis process and compressed to a level without the need of a primary compressor 120, a gas cleanup unit for hydrogen stream 126, storage of the generated high pressure hydrogen inside the intermediary hydrogen storage tank 127 with the aid of the high pressure electrolyzer 125, transfer of hydrogen from intermediary storage tank 127 to the depleted hydrogen cylinder 105, 108, or 115 with the aid of a secondary compressor 121 or a booster pump 122 through a refilling interface 119 to charge the depleted hydrogen cylinder or pod 105 or 108 or 115 with hydrogen fuel, electronic and controls 130 to safely operate the autonomous hydrogen refueling and unmanned vehicle storing station, and charged/depleted hydrogen cylinder or pod conveyor belt 131. Charged/empty hydrogen cylinder storage section 133 can be comprised of the following components either in combination or separately: Charged/depleted hydrogen cylinder or pod racks chamber with dispenser mechanism 114 (not shown), empty rack 116 for storage of depleted hydrogen cylinder or pod 105, 108 or 115, and charged/depleted hydrogen cylinder or pod conveyor belt 131, and a robotic grasping mechanism or robotic arm 111. It is desired to have the autonomous hydrogen refueling and unmanned vehicle storing station assembly 160 be kept safe at various environments and hence an electric fence 146, a security monitoring device such as a camera 164, and anti-tampering or anti-theft notification devices 147 are also integrated at various locations of the autonomous hydrogen refueling and unmanned vehicle storing station assembly 160. In order to prevent the plants and other plant-like things to cover the refueling station and hinder its operations or to keep the externals of the station clean from the plants, weeds, etc., a weed-killer 145 or plant-killer device 145 can also be integrated. In addition to weed-killing feature, the weed-killer device can also be integrated with an insecticide/pesticide killer device/compound to prevent insecticide/pesticide infestation on the external or internal sections of the refueling station. Furthermore, a weather sensor or sensors package is also advised to be integrated to the autonomous hydrogen refueling and unmanned vehicle storing station assembly 160 in order to enable the safe operation of the autonomous hydrogen refueling and unmanned vehicle storing station assembly 160 or safe operation of the unmanned vehicle 103 during bad weather conditions. The weather sensor or sensor package 165 can also contain a hyperlocal weather estimating device with hyper-accurate forecasting capability to get the local weather conditions that are relevant to the safe operation of the unmanned vehicles at ground and an altitude range (0-10 meters, 10-50 meters, 50-100 meters, 100-1000 meters, etc.) where the mission is planned. A communication module 166 is used to directly or remotely connect to the automated hydrogen refueling/exchanging and storing station, get status update or sending comments and some examples of this communication module are a satcom device and its antenna, a telecom device and its antenna, etc. and the content of this application is not limited to these communication methods. The power source 135 to operate the autonomous hydrogen refueling and unmanned vehicle storing station assembly can be obtained from a vehicle such as a pickup truck, van, car, etc. or from solar, wind, grid-electricity, battery, fuel cell, or combinations thereof, etc., but not limited to these options.

FIG. 28 shows an autonomous liquid hydrogen refueling and unmanned vehicle storing station assembly 160 in which hydrogen fuel cell powered unmanned vehicle 103 (with a hydrogen fuel cell stack system 104 and an on-board liquid hydrogen storage cylinder or pod 105) lands on a landing platform with precision landing mechanisms 142 and 161 that aligns the unmanned vehicle to the appropriate position after the drone charging and storing station's opening doors 101 and 142 are opened, then landing platform's lifting mechanism 106 lowers the unmanned vehicle to a lower section inside the autonomous hydrogen refueling and unmanned vehicle storing station assembly 160 to prepare for the exchange of on-board depleted hydrogen storage cylinder or pod 105, then liquid hydrogen cylinder or pod lifting mechanism 110 which utilizes a robotic grasping mechanism or a robotic arm 111 and locking/unlocking mechanism 112 to grasp depleted on-board liquid hydrogen storage cylinder or pod 105 and move this onto the charged/depleted hydrogen cylinder or pod conveyer belt 131 in order to move the depleted on-board liquid hydrogen storage cylinder or pod 105 into one of the empty chambers 116 which is located inside the charged/empty hydrogen cylinder storage section 133. After then, robotic grasping mechanism or a robotic arm 111 located in the vicinity of charged/depleted hydrogen cylinder storage 133 grabs a charged hydrogen storage cylinder or cartridge or pod 108 and moves it onto the charged/depleted hydrogen cylinder or pod conveyor belt 131, then robotic grasping mechanism or a robotic arm 111 located in the vicinity hydrogen cylinder or pod lifting mechanism 110 captures the charged hydrogen cylinder or pod 108 and installs it onto the unmanned vehicle platform via locking/unlocking mechanism 112. Even though robotics systems are becoming more advanced, it may be essential to have an external user to assist or interfere with the operation of the autonomous hydrogen refueling and unmanned vehicle storing station assembly 160 and for this opening mechanism 162 (not shown here) is advised to be incorporated for manually storing hydrogen cylinder or pods and also opening mechanism 118 (not shown here) for manual disposal of depleted hydrogen cylinder or pods. Modular hydrogen refueling section 134 can be assembled next to the autonomous hydrogen refueling and unmanned vehicle storing station 160 (but this application is not limited to this location) and can be comprised of the following components either in combination or separately: compressed hydrogen gas storage cylinders 143 obtained from commercial suppliers, a set of primary compressor 120, secondary compressor 121, or booster pump 122 to further increase the pressure, a hydrogen liquefier device 149 to transform gaseous hydrogen to liquid hydrogen, transfer of hydrogen from liquefier device 149 to the depleted hydrogen cylinder 105, 108, or 115 with a refilling interface 119, an electronic and controls 130 to safely operate the autonomous hydrogen refueling and unmanned vehicle storing station or box, and a charged/depleted hydrogen cylinder or pod conveyor belt 131.

Charged/empty hydrogen cylinder storage section 133 can be comprised of the following components either in combination or separately: Charged/depleted hydrogen cylinder or pod racks chamber with dispenser mechanism 114 (not shown), empty rack 116 for storage of depleted hydrogen cylinder or cartridge or pod 105, 108 or 115, and charged/depleted hydrogen cylinder or pod conveyor belt 131, and a robotic grasping mechanism or robotic arm 111. It is desired to have the autonomous hydrogen refueling and unmanned vehicle storing station assembly 160 be kept safe at various environments and hence an electric fence 146, a security monitoring device such as a camera 164, and anti-tampering or anti-theft notification devices 147 can also be integrated at various locations of the autonomous hydrogen refueling and unmanned vehicle storing station assembly 160.

In order to prevent the plants and other plant-like things to cover the refueling station and hinder its operations or to keep the externals of the station clean from the plants, weeds, etc., a weed-killer 145 or plant-killer device 145 can also be integrated. In addition to weed-killing feature, the weed-killer device can also be integrated with an insecticide/pesticide killer device/compound to prevent insecticide/pesticide infestation on the external or internal sections of the refueling station. Furthermore, a weather sensor or sensors package is also advised to be integrated to the autonomous hydrogen refueling and unmanned vehicle storing station assembly 160 in order to enable the safe operation of the autonomous hydrogen refueling and unmanned vehicle storing station assembly 160 or safe operation of the unmanned vehicle 103 during bad weather conditions. The weather sensor or sensor package 165 can also contain a hyper-local weather estimating device with hyper-accurate forecasting capability to get the local weather conditions that are relevant to the safe operation of the unmanned vehicles at ground and an altitude range (0-10 meters, 10-50 meters, 50-100 meters, 100-1000 meters, etc.) where the mission is planned. A communication module 166 is used to directly or remotely connect to the automated hydrogen refueling/exchanging and storing station, get status update or sending comments and some examples of this communication module are a satcom device and its antenna, a telecom device and its antenna, etc. and the content of this application is not limited to these communication methods. The power source 135 to operate the autonomous hydrogen refueling and unmanned vehicle storing station assembly can be obtained from a vehicle such as a pickup truck, van, car, etc. or from solar, wind, grid-electricity, battery, fuel cell, or combinations thereof, etc., but not limited to these options.

FIG. 29 shows an autonomous liquid hydrogen refueling and unmanned vehicle storing station assembly 160 in which hydrogen fuel cell powered unmanned vehicle 103 (with a hydrogen fuel cell stack system 104 and an on-board hydrogen storage cylinder or pod 105) lands on a landing platform with precision landing mechanisms 161 and 142 that aligns the unmanned vehicle to the appropriate position after the drone charging and storing station's opening doors 101 and 142 are opened, then landing platform's lifting mechanism 106 lowers the unmanned vehicle to a lower section inside the autonomous hydrogen refueling and unmanned vehicle storing station assembly 160 to prepare for the exchange of on-board depleted hydrogen storage cylinder or pod 105, then hydrogen cylinder or pod lifting mechanism 110 which utilizes a robotic grasping mechanism or a robotic arm 111 and locking/unlocking mechanism 112 to grasp depleted on-board hydrogen storage cylinder or pod 105 and move this onto the charged/depleted hydrogen cylinder or pod conveyer belt 131 in order to move the depleted on-board hydrogen storage cylinder or pod 105 into one of the empty chambers 116 which is located inside the charged/empty hydrogen cylinder storage section 133. After then, robotic grasping mechanism or a robotic arm 111 located in the vicinity of charged/depleted hydrogen cylinder storage 133 grabs a charged hydrogen storage cylinder or cartridge or pod 108 and moves it onto the charged/depleted hydrogen cylinder or pod conveyor belt 131, then robotic grasping mechanism or a robotic arm 111 located in the vicinity hydrogen cylinder or pod lifting mechanism 110 captures the charged hydrogen cylinder or pod 108 and installs it onto the unmanned vehicle platform via locking/unlocking mechanism 112. Even though robotics systems are becoming more advanced, it may be essential to have an external user to assist or interfere with the operation of the autonomous hydrogen refueling and unmanned vehicle storing station assembly 160 and for this opening mechanism 162 (not shown here) is advised to be incorporated for manual refilling of water, hydrogen cylinder pods and also opening mechanism 118 (not shown here) for manual disposal of depleted hydrogen cylinder or pods. Modular hydrogen refueling section 134 can be assembled next to the autonomous hydrogen refueling and unmanned vehicle storing station 160 (but this application is not limited to this location) and can be comprised of the following components either in combination or separately: water storage tank 123, water transfer pump 124, an electrolyzer 125 to generate hydrogen from water electrolysis process, a gas cleanup unit for hydrogen stream 126, primary compressor 120 to store the hydrogen at an elevated pressure inside the intermediary hydrogen storage tank 127, a secondary compressor 121 or booster pump 122 to further increase the hydrogen pressure to a desired value, a hydrogen liquefier device to transform the pressurized gas into liquid hydrogen and charge this liquid into the depleted hydrogen cylinder or pod 105 or 108 or 115 through a refilling interface 119, an electronic and controls 130 to safely operate the autonomous hydrogen refueling and unmanned vehicle storing station, a robotic grasping mechanism or robotic arm 111, and a charged/depleted hydrogen cylinder or pod conveyor belt 131. Charged/empty hydrogen cylinder storage section 133 can be comprised of the following components either in combination or separately: Charged/depleted hydrogen cylinder or pod racks chamber with dispenser mechanism 114 (not shown), empty rack 116 for storage of depleted hydrogen cylinder or pod 105 or 115, and charged/depleted hydrogen cylinder or pod conveyor belt 131, and a robotic grasping mechanism or robotic arm 111. It is desired to have the autonomous hydrogen refueling and unmanned vehicle storing station assembly 160 be kept safe at various environments and hence an electric fence 146, a security monitoring device such as a camera 164, and anti-tampering or anti-theft notification devices 147 can also be integrated at various locations of the autonomous hydrogen refueling and unmanned vehicle storing station assembly 160. In order to prevent the plants and other plant-like things to cover the refueling station and hinder its operations or to keep the externals of the station clean from the plants, weeds, etc., a weed-killer 145 or plant-killer device 145 can also be integrated. In addition to weed-killing feature, the weed-killer device can also be integrated with an insecticide/pesticide killer device/compound to prevent insecticide/pesticide infestation on the external or internal sections of the refueling station. Furthermore, a weather sensor or sensors package is also advised to be integrated to the autonomous hydrogen refueling and unmanned vehicle storing station assembly 160 in order to enable the safe operation of the autonomous hydrogen refueling and unmanned vehicle storing station assembly 160 or safe operation of the unmanned vehicle 103 during bad weather conditions. The weather sensor or sensor package 165 can also contain a hyper-local weather estimating device with hyper-accurate forecasting capability to get the local weather conditions that are relevant to the safe operation of the unmanned vehicles at ground and an altitude range (0-10 meters, 10-50 meters, 50-100 meters, 100-1000 meters, etc.) where the mission is planned. A communication module 166 is used to directly or remotely connect to the automated hydrogen refueling/exchanging and storing station, get status update or sending comments and some examples of this communication module are a satcom device and its antenna, a telecom device and its antenna, etc. and the content of this application is not limited to these communication methods. The power source 135 to operate the autonomous hydrogen refueling and unmanned vehicle storing station assembly can be obtained from a vehicle such as a pickup truck, van, car, etc. or from solar, wind, grid-electricity, battery, fuel cell, or combinations thereof, etc., but not limited to these options.

FIG. 30 shows an autonomous liquid hydrogen refueling and unmanned vehicle storing station assembly 160 in which hydrogen fuel cell powered unmanned vehicle 103 (with a hydrogen fuel cell stack system 104 and an on-board hydrogen storage cylinder or pod 105) lands on a landing platform with precision landing mechanisms 161 and 142 that aligns the unmanned vehicle to the appropriate position after the drone charging and storing station's opening doors 101 and 142 are opened, then landing platform's lifting mechanism 106 lowers the unmanned vehicle to a lower section inside the autonomous hydrogen refueling and unmanned vehicle storing station assembly 160 to prepare for the exchange of on-board depleted hydrogen storage cylinder or pod 105, then hydrogen cylinder or pod lifting mechanism 110 which utilizes a robotic grasping mechanism or a robotic arm 111 and locking/unlocking mechanism 112 to grasp depleted on-board hydrogen storage cylinder or pod 105 and move this onto the charged/depleted hydrogen cylinder or pod conveyer belt 131 in order to move the depleted on-board hydrogen storage cylinder or pod 105 into one of the empty chambers 116 which is located inside the charged/empty hydrogen cylinder storage section 133. After then, robotic grasping mechanism or a robotic arm 111 located in the vicinity of charged/depleted hydrogen cylinder storage 133 grabs a charged hydrogen storage cylinder or pod 108 and moves it onto the charged/depleted hydrogen cylinder or pod conveyor belt 131, then robotic grasping mechanism or a robotic arm 111 located in the vicinity hydrogen cylinder or pod lifting mechanism 110 captures the charged hydrogen cylinder or pod 108 and installs it onto the unmanned vehicle platform via locking/unlocking mechanism 112. Even though robotics systems are becoming more advanced, it may be essential to have an external user to assist or interfere with the operation of the autonomous hydrogen refueling and unmanned vehicle storing station assembly 160 and for this opening mechanism 162 (not shown here) is advised to be incorporated for manual refilling of water, hydrogen cylinder, or pods and also opening mechanism 118 (not shown here) for manual disposal of depleted hydrogen cylinder or pods. Modular hydrogen refueling section 134 can be assembled next to the autonomous hydrogen refueling and unmanned vehicle storing station 160 (but this application is not limited to this location) and can be comprised of the following components either in combination or separately: water storage tank 123, water transfer pump 124, a high pressure electrolyzer 125 to generate hydrogen from water electrolysis process and store this to the intermediary storage 127 without the need of a primary compressor 120, a gas cleanup unit for hydrogen stream 126, a secondary compressor 121 or booster pump 122 to further increase the hydrogen pressure to a desired value, a hydrogen liquefier device to transform the pressurized gas into liquid hydrogen and charge this liquid into the depleted hydrogen cylinder pod 105 or 108 or 115 through a refilling interface 119, an electronic and controls 130 to safely operate the autonomous hydrogen refueling and unmanned vehicle storing station, a robotic grasping mechanism or robotic arm 111, and a charged/depleted hydrogen cylinder or pod conveyor belt 131. Charged/empty hydrogen cylinder storage section 133 can be comprised of the following components either in combination or separately: Charged/depleted hydrogen cylinder or pod racks chamber with dispenser mechanism 114 (not shown), empty rack 116 for storage of depleted hydrogen cylinder or pod 105, 108, or 115, and charged/depleted hydrogen cylinder or pod conveyor belt 131, and a robotic grasping mechanism or robotic arm 111. It is desired to have the autonomous hydrogen refueling and unmanned vehicle storing station assembly 160 be kept safe at various environments and hence an electric fence 146, a security monitoring device such as a camera 164, and anti-tampering or anti-theft notification devices 147 can also be integrated at various locations of the autonomous hydrogen refueling and unmanned vehicle storing station assembly 160. In order to prevent the plants and other plant-like things to cover the refueling station and hinder its operations or to keep the externals of the station clean from the plants, weeds, etc., a weed-killer 145 or plant-killer device 145 can also be integrated. In addition to weed-killing feature, the weed-killer device can also be integrated with an insecticide/pesticide killer device/compound to prevent insecticide/pesticide infestation on the external or internal sections of the refueling station. Furthermore, a weather sensor or sensors package is also advised to be integrated to the autonomous hydrogen refueling and unmanned vehicle storing station assembly 160 in order to enable the safe operation of the autonomous hydrogen refueling and unmanned vehicle storing station assembly 160 or safe operation of the unmanned vehicle 103 during bad weather conditions. The weather sensor or sensor package 165 can also contain a hyper-local weather estimating device with hyper-accurate forecasting capability to get the local weather conditions that are relevant to the safe operation of the unmanned vehicles at ground and an altitude range (0-10 meters, 10-50 meters, 50-100 meters, 100-1000 meters, etc.) where the mission is planned. A communication module 166 is used to directly or remotely connect to the automated hydrogen refueling/exchanging and storing station, get status update or sending comments and some examples of this communication module are a satcom device and its antenna, a telecom device and its antenna, etc. and the content of this application is not limited to these communication methods. The power source 135 to operate the autonomous hydrogen refueling and unmanned vehicle storing station assembly can be obtained from a vehicle such as a pickup truck, van, car, etc. or from solar, wind, grid-electricity, battery, fuel cell, or combinations thereof, etc., but not limited to these options.

FIG. 31 shows an autonomous hydrogen slurry cartridge exchange and unmanned vehicle storing station assembly 160 in which hydrogen fuel cell powered unmanned vehicle 103 (with a hydrogen fuel cell stack system 104 and an on-board hydrogen slurry storage cartridge or pod 150) lands on a landing platform with precision landing mechanisms 161 and 142 that aligns the unmanned vehicle to the appropriate position after the drone charging and storing station's opening doors 101 and 142 are opened, then landing platform's lifting mechanism 106 lowers the unmanned vehicle to a lower section inside the autonomous hydrogen slurry refueling and unmanned vehicle storing station assembly 160 to prepare for the exchange of on-board depleted hydrogen slurry storage cartridge or pod 150, then hydrogen slurry cartridge or pod lifting mechanism 110 which utilizes a robotic grasping mechanism or a robotic arm 111 and locking/unlocking mechanism 112 to grasp depleted on-board hydrogen slurry cartridge or pod 150 and move this onto the charged/depleted hydrogen slurry cartridge or pod conveyer belt 131 in order to move the depleted on-board hydrogen slurry cartridge or pod 150 or 115 into one of the empty chambers 116 which is located inside the charged/empty hydrogen slurry cartridge or pod storage section 133. After then, robotic grasping mechanism or a robotic arm 111 located in the vicinity of charged/depleted hydrogen slurry cartridge storage 133 grabs a unused hydrogen slurry cartridge or pod 150 and moves it onto the charged/depleted hydrogen slurry cartridge or pod conveyor belt 131, then robotic grasping mechanism or a robotic arm 111 located in the vicinity hydrogen cartridge or pod lifting mechanism 110 captures the unused hydrogen slurry cartridge or pod 108 and installs it onto the unmanned vehicle platform via locking/unlocking mechanism 112. Even though robotics systems are becoming more advanced, it may be essential to have an external user to assist or interfere with the operation of the autonomous hydrogen refueling and unmanned vehicle storing station assembly 160 and for this opening mechanism 162 (not shown here) is advised to be incorporated for manual exchange of hydrogen slurry cartridges or pods and also opening mechanism 118 (not shown here) for manual disposal of depleted hydrogen slurry cartridge or pods. Modular hydrogen slurry cartridge exchange section 153 can be assembled next to the autonomous hydrogen slurry refueling and unmanned vehicle storing station 160 (but this application is not limited to this location) and can be comprised of the following components either in combination or separately: empty rack 116 for depleted hydrogen slurry cartridge or pod, depleted hydrogen slurry cartridge or pod 115, charged hydrogen slurry cartridge 150 with a connector that can enable quick swapping of depleted slurry cartridge or pod with an unused one, an electronic and controls 130 to safely operate the autonomous hydrogen refueling and unmanned vehicle storing station, a robotic grasping mechanism or robotic arm 111, and a charged/depleted hydrogen slurry cartridge or pod conveyor belt 131 (all of these encased in hydrogen slurry cartridge storage section), and a power supply. Hydrogen slurry cartridge storage section 152 can be comprised of the following components either in combination or separately: Charged/depleted hydrogen slurry cartridge or pod racks chamber with dispenser mechanism 114 (not shown), empty rack 116 for storage of depleted hydrogen slurry cartridge or pod 115 or 150, and charged/depleted hydrogen slurry cartridge or pod conveyor belt 131, and a robotic grasping mechanism or robotic arm 111. It is desired to have the autonomous hydrogen slurry refueling and unmanned vehicle storing station assembly 160 be kept safe at various environments and hence an electric fence 146, a security monitoring device such as a camera 164, and anti-tampering or anti-theft notification devices 147 can also be integrated at various locations of the autonomous hydrogen slurry refueling and unmanned vehicle storing station assembly 160. In order to prevent the plants and other plant-like things to cover the refueling station and hinder its operations or to keep the externals of the station clean from the plants, weeds, etc., a weed-killer 145 or plant-killer device 145 can also be integrated. In addition to weed-killing feature, the weed-killer device can also be integrated with an insecticide/pesticide killer device/compound to prevent insecticide/pesticide infestation on the external or internal sections of the refueling station. Furthermore, a weather sensor or sensors package is also advised to be integrated to the autonomous hydrogen refueling and unmanned vehicle storing station assembly 160 in order to enable the safe operation of the autonomous hydrogen refueling and unmanned vehicle storing station assembly 160 or safe operation of the unmanned vehicle 103 during bad weather conditions. The weather sensor or sensor package 165 can also contain a hyper-local weather estimating device with hyper-accurate forecasting capability to get the local weather conditions that are relevant to the safe operation of the unmanned vehicles at ground and an altitude range (0-10 meters, 10-50 meters, 50-100 meters, 100-1000 meters, etc.) where the mission is planned. A communication module 166 is used to directly or remotely connect to the automated hydrogen refueling/exchanging and storing station, get status update or sending comments and some examples of this communication module are a satcom device and its antenna, a telecom device and its antenna, etc. and the content of this application is not limited to these communication methods. The power source 135 to operate the autonomous hydrogen refueling and unmanned vehicle storing station assembly can be obtained from a vehicle such as a pickup truck, van, car, etc. or from solar, wind, grid-electricity, battery, fuel cell, or combinations thereof, etc., but not limited to these options.

FIG. 32 shows an autonomous hydrogen solid cartridge exchange and unmanned vehicle storing station assembly 160 in which hydrogen fuel cell powered unmanned vehicle 103 (with a hydrogen fuel cell stack system 104 and an on-board hydrogen solid storage cartridge or pod 154) lands on a landing platform with precision landing mechanisms 161 and 142 that aligns the unmanned vehicle to the appropriate position after the drone charging and storing station's opening doors 101 and 142 are opened, then landing platform's lifting mechanism 106 lowers the unmanned vehicle to a lower section inside the autonomous hydrogen solid cartridge exchange and unmanned vehicle storing station assembly 160 to prepare for the exchange of on-board depleted hydrogen solid storage cartridge or pod 154, then hydrogen solid cartridge or pod lifting mechanism 110 which utilizes a robotic grasping mechanism or a robotic arm 111 and locking/unlocking mechanism 112 to grasp depleted on-board hydrogen solid cartridge or pod 154 and move this onto the charged/depleted hydrogen solid cartridge or pod conveyer belt 131 in order to move the depleted on-board hydrogen solid cartridge or pod 154 or 115 into one of the empty chambers 116 which is located inside the charged/empty hydrogen solid cartridge or pod storage section 157. After then, robotic grasping mechanism or a robotic arm 111 located in the vicinity of charged/depleted hydrogen solid cartridge storage 157 grabs a charged hydrogen solid cartridge or pod 154 and moves it onto the charged/depleted hydrogen cartridge or pod conveyor belt 131, then robotic grasping mechanism or a robotic arm 111 located in the vicinity hydrogen cartridge or pod lifting mechanism 110 captures the unused hydrogen cylinder or cartridge or pod 154 and installs it onto the unmanned vehicle platform via locking/unlocking mechanism 112. Even though robotics systems are becoming more advanced, it may be essential to have an external user to assist or interfere with the operation of the autonomous hydrogen solid cartridge exchange and unmanned vehicle storing station assembly 160 and for this opening mechanism 162 (not shown here) is advised to be incorporated for manual exchange of hydrogen solid cylinder, cartridges, or pods and also opening mechanism 118 (not shown here) for manual disposal of depleted hydrogen solid cartridge or pods. Modular hydrogen solid cartridge exchange section 156 or 157 can be assembled next to the autonomous hydrogen solid cartridge exchange and unmanned vehicle storing station 160 (but this application is not limited to this location) and can be comprised of the following components either in combination or separately: empty rack 116 for depleted hydrogen solid cartridge or pod, depleted hydrogen solid cartridge or pod 115, charged hydrogen solid cartridge 154 with a connector that can enable quick swapping of depleted solid cartridge or pod with an unused one, an electronic and controls 130 to safely operate the autonomous hydrogen solid cartridge exchange and unmanned vehicle storing station, a robotic grasping mechanism or robotic arm 111, and a charged/depleted hydrogen cartridge or pod conveyor belt 131 (all of these encased in hydrogen solid cartridge storage section), and a power supply. Hydrogen solid cartridge storage section 157 can be comprised of the following components either in combination or separately: Charged/depleted hydrogen solid cartridge or pod racks chamber with dispenser mechanism 114 (not shown), empty rack 116 for storage of depleted hydrogen solid cartridge or pod 115 or 154, and charged/depleted hydrogen solid cartridge or pod conveyor belt 131, and a robotic grasping mechanism or robotic arm 111. It is desired to have the autonomous hydrogen solid refueling and unmanned vehicle storing station assembly 160 be kept safe at various environments and hence an electric fence 146, a security monitoring device such as a camera 164, and anti-tampering or anti-theft notification devices 147 can also be integrated at various locations of the autonomous hydrogen solid refueling and unmanned vehicle storing station assembly 160. In order to prevent the plants and other plant-like things to cover the refueling station and hinder its operations or to keep the externals of the station clean from the plants, weeds, etc., a weed-killer 145 or plant-killer device 145 can also be integrated. In addition to weed-killing feature, the weed-killer device can also be integrated with an insecticide/pesticide killer device/compound to prevent insecticide/pesticide infestation on the external or internal sections of the refueling station. Furthermore, a weather sensor or sensors package is also advised to be integrated to the autonomous hydrogen refueling and unmanned vehicle storing station assembly 160 in order to enable the safe operation of the autonomous hydrogen refueling and unmanned vehicle storing station assembly 160 or safe operation of the unmanned vehicle 103 during bad weather conditions. The weather sensor or sensor package 165 can also contain a hyper-local weather estimating device with hyper-accurate forecasting capability to get the local weather conditions that are relevant to the safe operation of the unmanned vehicles at ground and an altitude range (0-10 meters, 10-50 meters, 50-100 meters, 100-1000 meters, etc.) where the mission is planned. A communication module 166 is used to directly or remotely connect to the automated hydrogen refueling/exchanging and storing station, get status update or sending comments and some examples of this communication module are a satcom device and its antenna, a telecom device and its antenna, etc. and the content of this application is not limited to these communication methods. The power source 135 to operate the autonomous hydrogen refueling and unmanned vehicle storing station assembly can be obtained from a vehicle such as a pickup truck, van, car, etc. or from solar, wind, grid-electricity, battery, fuel cell, or combinations thereof, etc., but not limited to these options.

The robotics hydrogen refueling or recharging or exchanging system is equipped with required electrical motors, linear drives lift system, and all of the other essential components.

It can be a robotic arm or a lifting solution. It is integrated to a moveable box that houses a landed drone or a robotic vehicle or an unmanned vehicle that falls under the category of air, ground, underground, or underwater classifications. The robotic system is powered by an electrical current generated by the main power supply source of the system which could be solar, wind, battery, fuel cells, generator sets, vehicle engine, or any other energy source that can be used to produce electrical energy.

The mechanical connections between the unmanned vehicle and the hydrogen storage solution are plug and play quick-connect and quick-disconnect connections with automated locking/unlocking system between the unmanned vehicle and the hydrogen fuel storage medium.

The system comprises of a fully automatic grasping mechanism that can quickly, gently and firmly grasp a target, being a hydrogen cylinder/cartridge/pod (regardless of its contents) in the scope of this application, and move it from one position to another using detachment/attachment, lifting, and shifting robotic solutions.

The capture mechanism comprises a locking mechanism that locks the targets into position before moving it. The retrieval movement is triggered by an external signal sent from a centralized information command center to electric rotating motors and linear actuators present on the system.

The robotic mechanism has six degrees of freedom or sufficient degrees of freedom to retrieve the empty/spent hydrogen cylinder/cartridge/pod, move the empty cylinder/cartridge/pod to the proper location for autonomous hydrogen refueling or exchanging a depleted storage medium and move an already refilled or unused cylinder/cartridge/pod and install it onto the unmanned vehicle. All of these operations can be done sequentially or in parallel depending on the system design.

Position and motion sensors are placed at several locations in the system in order to track the positions of the replacing cylinder/cartridge/pod and the depleted cylinder/cartridge/pod, and to ensure an accurate command and control of the robotic mechanism and the moving mechanisms. Feedback control loops are integrated to trigger correctional actions if required.

The system also includes integrated electrical & communication connecting devices such as, but not limited to, DC Wires (power channels), CAN channel, control and communication links connectivity to electronics controls of the solution, command & Control connected to an Energy Management System ("EMS") to safely operate the autonomous refueling station and refill the empty/spent hydrogen cylinder/cartridge/pod of the unmanned vehicle.

The command center comprises of an onboard computer with a processor and data storage capacities.

Data transmitted comprises positions of moving parts and cylinder/cartridge/pod, locker status, vehicle position, cylinder/cartridge/pod status such as, but not limited to, temperature and remaining fuel, etc. Data is transmitted to a receiver through a physical wire connection or a wireless connection.

This application describes an autonomous hydrogen refueling or exchanging and unmanned vehicle storing station assembly that has the capability of refueling or recharging or exchanging of an on-board hydrogen storage solution (in this case it is a cylinder/cartridge/pod that can either store gaseous, liquid hydrogen or can generate hydrogen from slurry or solid materials such as hydrides). While the gaseous or liquid containing cylinder/pod solutions do not have to be discharged and can be used repeatedly until the end of their lifetime, slurry or solid hydride containing cartridge/pod solutions may require to be disposed accordingly. The following sections describes some of the storing and disposal/removal processes that is relevant to the disclosed application design. While certain unmanned vehicles may solely use one particular hydrogen storage solution, some other more customized unmanned vehicle platforms may have the capability of utilizing multiple hydrogen storage solutions. In order to meet the requirement of that particular unmanned vehicle mission requirement to extent the operational time and range, the disclosed autonomous hydrogen refueling or exchanging and unmanned vehicle storing station may have either a gaseous or liquid cylinders/pods, or slurry or solid hydrogen cartridges/pods or it may have combinations of these (depending on the need of the unmanned vehicle's missions and different fuel utilization capability).

The charged/refilled cylinder/pod and the depleted cylinder/pod are transported by conveyor belts mounted on guides rail and sprocket wheel associated to a lift system to the right locations. The unused cartridge/pod and the depleted cartridge/pod are transported by conveyor belts mounted on guides rail and sprocket wheel associated to a lift system to the right locations.

A cylinder/cartridge/pod's storage room is for storing of refilled/recharged or unused cylinder/cartridge/pod. The room comprises a rack with moving parts, locking systems, and position and presence sensors. It is accessible to operators. cylinder/cartridge/pod can be manually or automatically loaded in a dedicated rack. Sensors send signals to the command center to indicate the presence or non-presence of loaded cartridge on the rack deck. Loaded cylinder/cartridge/pod are locked. When an unmanned vehicle lands on the station for cylinder/cartridge/pod replacement, one charged/unused cylinder/cartridge/pod is unlocked and a lifting mechanism grasps it to move it to a pre-loading room.

A cylinder/cartridge/pod's dispenser room is for storing depleted cylinder/cartridge/pod. The dispenser room comprises a rack with moving parts, locking systems, and position and presence sensors. It is accessible to operators. Operators can open the room manually and remove the depleted cylinder/cartridge/pod. When a sufficient percentage of the dispenser rack is filled with depleted cylinder/cartridge/pod, a signal is sent to the command center that communicates to the operators with a request for intervention. The operators start the removal by manually pushing a button that send a signal to the command center. A signal is then sent to unlock depleted cylinder/cartridge/pod. Green LED are light up next to each depleted cylinder/cartridge/pod. The operator can open the room and remove manually the depleted cylinder/cartridge/pod. Temperature and safety sensors ensure the safety level. If the temperature of a cartridge is above a certain limit, the cartridge remains locked a red LED lights up. The operator can initiate the manual refilling of the spent/empty hydrogen cylinder/pod by simply attaching to hydrogen refueling station that utilizes any one of the concepts provided in this application.

In order to improve the autonomous nature, it is suggested that depleted cylinders/pods are automatically forwarded to the hydrogen refueling section and autonomously refilled and stored for a later use. Same concept applies for the cartridges too.

Since the disclosed autonomous energy charging station can be used under different environmental conditions, its thermal isolation is also needed to be designed accordingly. Thermal isolation material isolates sensitive equipment from the heat or cold sources and provides an optimal environment for the safe operation of the components. Required heating and cooling systems are installed in the station.

Redundant feedback loop automation with safety functions through active system health management for continuous monitoring and urgent stop can also be added to further increase the autonomous nature of the disclosed application.

The robotic system is part of a modular sub-system that can be installed inside/outside of the vehicle storage solution.

Communication between the UAV and autonomous hydrogen refueling or exchanging and unmanned vehicle storing station in order to send an order for replacement, unlock old cartridge/tanks and swap cartridges/tanks can be achieved with the followings and this application is not limited to these: Ethernet/Wi-Fi/Bluetooth/USB.

Sensors embedded in the hot swapping mechanisms are connected to the missions planning software that optimizes the selection and distribution of charged cylinders/pods, and prepares the cylinder/pods for immediate replacement with a minimal waiting time, allowing faster replacement for the next mission. Same concept can also be used with cartridges.

In case several unmanned boxes are stacked together, the distribution system smartly allocates cylinders/cartridges/pods to the demanding vehicles based missions' plans.

The terms "comprises" or "comprising" are not exclusive and not to be interpreted to exclude the presence of other features, components or action stages.

Components and connectors used are following international standards.

Improving the safety of critical and high-risk infrastructures such airports, buildings/assets existing within the no-fly zone areas, military bases, manufacturing facility, refineries, or the safety of a crowd or an individual or any other target from the threat of unauthorized, stray, or outlaw drones is of paramount importance and currently there are no solutions existing to neutralize such drones without disrupting the operations/activities of those facilities or crowds or individuals. Current studies and also real-life encountered examples demonstrate that disruptions in the scheduled operations for such infrastructures have large economic consequences such as losing a revenue of $100.000 per minute to billions of USD per day depending on the size of the facility/infrastructure. While it is not that common to have a drone threat for the activity of a crowd or an individual, one may can easily state that depending the payload nature of the unauthorized or stray or outlaw drone, a large number of casualties can easily be created. In order to preserve the life of individuals or safety of any target from drone threats, there is a critical need for elegant solutions without disruptions in the scheduled operations or planned activities. Despite the fact that technologies for neutralization of drones are already existing (such as jamming, spoofing, or electronic disruption devices), though none of these can be utilized within the vicinity of airports or any other critical or high-risk infrastructures or in the vicinity of a crowd or manufacturing facility due to the electromagnetic interference that risks the safe operation of the friendly vehicles/hardware/electronics etc. (airplanes, radars, communications, medical equipment, portable electronics, digital infrastructure, etc.).

In order to overcome all of the abovementioned issues and to improve the safety of airport or any other critical or high-risk infrastructure, or the safety of a crowd or an individual or the safety of any other target in the case of a drone threat without disrupting their operations, this application discloses the utilization of hydrogen fuel cell powered (or any other energy producing device powered) unmanned vehicles, their autonomous storage/refueling stations, and their autonomous operation for the neutralization or incapacitation of any type of unauthorized, stray, or outlaw drones.

One of the major requirement for successfully defending the perimeters of an airport or any other critical or high-risk infrastructure or a manufacturing facility such as refineries or keeping a crowd or an individual safe from a threat of unauthorized, stray, or outlaw drone is to make sure that the unmanned vehicle that will be used to neutralize the threat have sufficient effective flight time. Currently developed drones usually utilize battery based power solutions and due to the low energy density (Wh/kg) of commercial batteries, they have a very limited and short flight endurance (<1 hr). The best battery systems can provide up to 220 to 240 Wh/kg energy density values based on the currently available commercial materials. In order to increase the flight endurance (also known as effective flight time), more batteries are needed. Since the batteries need to carry out the entire active materials with themselves (meaning anode and cathode active materials), the weight increase for a battery powered solution has a linear relationship between the weight of the power solution and how long the flight is going to be. For example, if 1 hour of flight is requiring a battery power solution that is weighing around 1 kg, then 5 hour flight will require a battery power solution that would weight roughly 5 kg. This linear relationship makes the final weight of the all-battery power solution very heavy and not suitable for aerial vehicles of any kind. Since battery powered drones provide very short durations for effective flight times (<30 minutes with a decent payload or up to 2 hours without any payload, these are estimates based on the commercially available products and their published product sheets from various drone manufacturers), it is very risky to use battery powered drones for the neutralization of unauthorized, stray, or outlaw drone where there exists a lot of unknowns at the time of neutralization missions such as the power source (battery powered, fuel cell powered, gasoline powered, etc.) of unauthorized, stray, or outlaw drone, the energy production capacity (maximum wattage), its storage capacity (watt-hours), its effective flight time (hours), etc. For a reasonable chasing time and outmaneuvering efforts, it is critical that the unmanned vehicle that will be used to chase and neutralize an unauthorized drone has ample amount of flight time such as >2 hours.

Hydrogen fuel cell based power solutions have been researched to increase the operation time of any applications, including unmanned vehicles of any type due to the lightweight feature of the fuel cell technology and also high energy density of hydrogen fuel. The main principle in a fuel cell based powering system is that there is a single fuel cell module in terms of a hardware that converts the chemical energy of hydrogen and oxygen reactants via simple electrochemical reactions and the output is simply the electrical energy and water. In order to increase the operation time of an application that is being powered by a fuel cell system, there is no need to carry a second or more fuel cell stacks and the only thing that is required is to increase the storage capacity of the hydrogen fuel. The relationship between the weight of the fuel cell based powering system and the operation time is not linear (to be more precise it is close to square root curves assuming that x-axis represents the operation time and y-axis represents the weight of the entire system) and not having a linear relationship between operation time and weight of the power system makes the fuel cell based technologies significantly lighter than batteries, which is ideal for unmanned vehicles (especially for unmanned aerial vehicles).

The disclosed neutralization or incapacitation concepts for unauthorized or stray or outlaw drone are not limited to the unmanned vehicles utilizing hydrogen fuel based power generation method. Other power generation tools/methods such as batteries, internal combustion engines, solar power, photovoltaic arrays, radioisotope or radioactive power systems, nuclear fission based power generators, thermal energy conversion devices, Stirling convertors, Brayton converters, Rankine converters, micro-miniature dynamic power converters that are integrated with radioisotope heater units, alpha/beta-voltaic energy conversion devices, bio-inspired power generation devices, etc., and also the combinations of these different power sources can also be utilized as the powering solution for unmanned vehicles to neutralize or incapacitate the unauthorized or stray or outlaw drone to eliminate the drone threats to critical or high-risk infrastructures without disrupting the scheduled operations. Due to the advantages of the hydrogen fuel powering devices such as high energy density of hydrogen, lightweight fuel cell stack technologies and hence longer effective flight durations, the main focus of the disclosed application is put on the hydrogen fuel cell powered unmanned vehicles for the neutralization of drone threats to the critical and high-risk infrastructures, though the content of this application is by no means limited to the unmanned vehicles that are utilizing hydrogen fuel or hydrogen fuel cells, or any other fuel cell device; other power generating devices (such examples are provided at the beginning of this paragraph) powered unmanned vehicles can also be used to neutralize the drone threats, which is inclusive and within the context of the disclosed application.

FIG. 33 shows a drone-detection radar 201 (or perimeter sensors, or other threat detection systems) picking the signature 202 of an unauthorized, stray or outlaw drone 212 with a payload of 211 that is in flight and approaching to an airport or a critical/high-risk infrastructure perimeter, then drone-detection radar sends the data/notification to the hydrogen fuel cell powered drone's 209 storing/refueling station 205 (also called as drone box that contains the storing section, a refueling section, and a control section) via a server 203 or cloud communication 204 or any other means of communication methods or data links in order for the drone box 205 to wake up the hydrogen fuel cell powered unmanned vehicle 209 (in this case a multi-rotor drone), then the drone box's 205 control system activates the hydrogen fuel cell powered unmanned vehicle 209 and schedules a flight path autonomously based on the coordinates that are received from the drone-detection radar 201, then initiates the autonomous flight and then launches the hydrogen fuel cell powered unmanned vehicle 209, then during the flight of the hydrogen fuel cell powered unmanned vehicle 209 the drone box 205 continuously communicates with the drone-detection radar 201 and receives data/coordinates for the unauthorized or stray or outlaw drone's new flight pathway via communications channels of a server 203 or a cloud 204 or any other data link that connects the drone box 205 with the drone-detection radar 201, then drone box 205 relays this information to the hydrogen fuel cell powered unmanned vehicle 209 (in this case a multi-rotor drone) via its communication device 206 and updates the flight path autonomously in order to intercept the unauthorized or stray or outlaw drone 212 with the payload of 211 for an intentional collision based approach 213 as the neutralization method and facilitates the crash event 214 between the hydrogen fuel cell powered unmanned vehicle 209 and the unauthorized or stray or outlaw drone 212 with the payload of 211. The hydrogen fuel cell powered unmanned vehicle 209 described in this section is just a simple platform without any additional sensors in order to keep the cost of the hydrogen fuel cell powered unmanned vehicle 209 at the minimum since the collision based neutralization approach will most likely result in the complete destruction of the both drones.

FIG. 34 shows a drone-detection radar 201 (or perimeter sensors, or other threat detection systems) picking the signature 202 of an unauthorized, stray or outlaw drone 212 with a payload of 211 that is in flight and approaching to an airport or a critical/high-risk infrastructure perimeter, then drone-detection radar sends the data/notification to the hydrogen fuel cell powered drone's 209 storing/refueling station 205 (also called as drone box that contains a storing section, a refueling section, and a control section) via a server 203 or cloud communication 204 or any other means of communication methods or data links in order for the drone box 205 to wake up the hydrogen fuel cell powered unmanned vehicle 209 (in this case a multi-rotor drone) with a sensing device 215 such as a camera in order to improve the detection/observation features of the hydrogen fuel cell powered unmanned vehicle 209, then the drone box's 205 control system activates the hydrogen fuel cell powered unmanned vehicle 209 with the sensing device 215 and schedules a flight path autonomously based on the coordinates that are received from the drone-detection radar 201, then initiates the autonomous flight and then launches the hydrogen fuel cell powered unmanned vehicle 209 with the sensing device 215 such as a camera, during the flight of the hydrogen fuel cell powered unmanned vehicle 209 with the sensing device 215 such as a camera, the drone box 205 continuously communicates with the drone-detection radar 201 and receives data/coordinates for the unauthorized or stray or outlaw drone's new flight pathway via communications channels of a server 203 or a cloud 204 or any other data link that connects the drone box 205 with the drone-detection radar 201, then drone box 205 relays this information to the hydrogen fuel cell powered unmanned vehicle 209 with the sensing device 215 such as a camera via its communication device 206 and updates the flight path autonomously in order to intercept the unauthorized or stray or outlaw drone 212 with the payload of 211 for an intentional collision based approach 213 as the neutralization method and facilitates the crash event 214 between the hydrogen fuel cell powered unmanned vehicle 209 with a sensing device 215 such as a camera and the unauthorized or stray or outlaw drone 212 with the payload of 211. Additional sensing devices such as a camera is added to the hydrogen fuel cell powered unmanned vehicle's platform in order to improve the accuracy or outcome of the collision event (meaning for the visual identification of the unauthorized or stray or outlaw drone and confirmation of the collision) and the success of the neutralization mission. Due to the advancements observed with technological devices, it can be assumed that if someone is trying to design and built a drone to breach the premises of an airport or any other critical/high-risk infrastructures, they would also deploy some countermeasures to their drone in the anticipation of their drone being chased down or encountering another unmanned vehicle or drone and may have to put up a fight in order to carry their missions. For such unexpected surprises, it is advised that the hydrogen fuel cell powered unmanned vehicle should carry countermeasures (additional sensing devices) too in order to successfully neutralize the unauthorized or stray or outlaw drone.

FIG. 35 shows a drone-detection radar 201 (or perimeter sensors, or other threat detection systems) picking the signature 202 of an unauthorized, stray or outlaw drone 212 with a payload of 211 that is in flight and approaching to an airport or a critical/high-risk infrastructure perimeter, then drone-detection radar sends the data/notification to the hydrogen fuel cell powered unmanned vehicle's 209 storing/refueling station 205 (also called as drone box that contains a storing section, a refueling section, and a control section) via a server 203 or cloud communication 204 or any other means of communication methods or data links in order to wake up the hydrogen fuel cell powered unmanned vehicle 209 (in this case a multi-rotor drone) with a sensing device such as a camera 215 and a proximity sensing device 216 such as a proximity sensor in order to improve the detection/observation features of the hydrogen fuel cell powered unmanned vehicle 209, then the drone box's 205 control system activates the hydrogen fuel cell powered unmanned vehicle 209 with the sensing device 215 such as a camera and a proximity sensing device 216 such as a proximity sensor and then schedules a flight path autonomously based on the coordinates that are received from the drone-detection radar 201, then the drone box 205 initiates the autonomous flight schedule and launches the hydrogen fuel cell powered unmanned vehicle 209 with the sensing device 215 such as a camera and a proximity sensing device 216 such as a proximity sensor, during the flight of the hydrogen fuel cell powered unmanned vehicle 209 with the sensing device 215 such as a camera and a proximity sensing device 216 such as a proximity sensor, the drone box 205 continuously communicates with the drone-detection radar 201 and receives data and coordinates for the unauthorized or stray or outlaw drone's new flight pathway from the drone-detection radar 201 via communications channels of a server 203 or a cloud 204 or any other data link that connects the drone box 205 with the drone-detection radar 201, then drone box 205 relays this information to the hydrogen fuel cell powered unmanned vehicle 209 with the sensing device 215 such as a camera and a proximity sensing device 216 such as a proximity sensor via its communication device 206 and updates the flight path autonomously in order to intercept the unauthorized or stray or outlaw drone 212 with the payload of 211 for an intentional collision based approach 213 as the neutralization method and facilitates the crash event 214 between the hydrogen fuel cell powered unmanned vehicle 209 with a sensing device 215 such as a camera and a proximity sensing device 216 such as a proximity sensor and the unauthorized or stray or outlaw drone 212 with the payload of 211. Additional sensing devices 215 such as a camera and a proximity sensing device 216 such as a proximity sensor are added to the hydrogen fuel cell powered unmanned vehicle's 209 platform in order to improve the accuracy of the collision event (meaning the visual identification of the unauthorized or stray or outlaw drone with a camera, closing the distance with the unauthorized drone via proximity sensing devices for a 100% collision event, and confirmation of the collision with the camera or proximity sensors) and the success of the neutralization mission. Due to the advancements observed with technological devices, it can be assumed that if someone is trying to design and built a drone to breach the premises of an airport or any other critical/high-risk infrastructures, they would also deploy some countermeasures to their drone in the anticipation of their drone being chase down or encountering another unmanned vehicle or drone and may have to put up a fight in order to carry their missions. For such unexpected surprises, it is advised that the hydrogen fuel cell powered unmanned vehicle should carry countermeasures (additional sensing devices) too in order to successfully neutralize the unauthorized or stray or outlaw drone.

FIG. 36 shows a drone-detection radar 201 (or perimeter sensors, or other threat detection systems) picking the signature 202 of an unauthorized, stray or outlaw drone 212 with a payload of 211 that is in flight and approaching to an airport or a critical/high-risk infrastructure perimeter, then drone-detection radar sends the data/notification to a swarm of hydrogen fuel cell powered drones' 217 storing/refueling station 205 (also called as drone box that contains a storing section, a refueling section, and a control section) via a server 203 or cloud communication 204 or any other means of communication methods or data links in order for the drone box 205 to wake up multiples of hydrogen fuel cell powered unmanned vehicles 209 (in this case a multi-rotor drones) in the form a swarm with sensing devices such as cameras 215 and proximity sensing devices 216 such as proximity sensors in order to improve the detection/observation features of the hydrogen fuel cell powered unmanned vehicles 209 as a swarm 217, then the drone box's 205 control system activates the swarm 217 of hydrogen fuel cell powered unmanned vehicles 209 with the sensing devices 215 such as cameras and proximity sensing devices 216 such as proximity sensors and then schedules a flight path autonomously based on the coordinates that are received from the drone-detection radar 201, then the drone box 205 initiates the autonomous flight schedule for the swarm 217 and launches the hydrogen fuel cell powered unmanned vehicles 209 with the sensing devices 215 such as cameras and proximity sensing devices 216 such as proximity sensors, during the flight of the hydrogen fuel cell powered unmanned vehicles 209 in the form of a swarm with the sensing devices 215 such as cameras and proximity sensing devices 216 such as proximity sensors, the drone box 205 continuously communicates with the drone-detection radar 201 and receives data/coordinates for the unauthorized or stray or outlaw drone's new flight pathway from the drone-detection radar 201 via communications channels of a server 203 or a cloud 204 or any other data link that connects the drone box 205 with the drone-detection radar 201, then drone box 205 relays this information to the swarm of hydrogen fuel cell powered unmanned vehicles 209 with the sensing devices 215 such as cameras and proximity sensing devices 216 such as proximity sensors via its communication device 206 and updates the flight path autonomously for the swarm 217 in order to intercept the unauthorized or stray or outlaw drone 212 with the payload of 211 for an intentional collision based approach 213 as the neutralization method and facilitates the crash event 214 between the swarm of hydrogen fuel cell powered unmanned vehicles 209 with sensing devices 215 such as cameras and proximity sensing devices 216 such as proximity sensors and the unauthorized or stray or outlaw drone 212 with the payload of 211. Additional sensing devices 215 such as a camera and a proximity sensing device 216 such as a proximity sensor are added to the hydrogen fuel cell powered unmanned vehicle's 209 platform in order to improve the accuracy of the collision event (meaning the visual identification of the unauthorized or stray or outlaw drone with a camera, closing the distance with the unauthorized drone via proximity sensing devices for a 100% collision event, and confirmation of the collision with the camera or proximity sensors) and also to ensure the success of the neutralization mission. Due to the advancements observed with technological devices, it can be assumed that if someone is trying to design and built a drone to breach the premises of an airport or any other critical/high-risk infrastructures, they would also deploy some countermeasures to their drone in the anticipation of their drone being chased down or encountering another unmanned vehicle or a swarm of unmanned vehicles or drones and may have to put up a fight in order to carry their missions. For such unexpected surprises, it is advised that the hydrogen fuel cell powered unmanned vehicle swarm should carry countermeasures (additional sensing devices) too in order to successfully neutralize the unauthorized or stray or outlaw drone.

FIG. 37 shows s drone-detection radar 201 (or perimeter sensors, or other threat detection systems) picking the signature 202 of an unauthorized, stray or outlaw drone 212 with a payload of 211 that is in flight and approaching to an airport or a critical/high-risk infrastructure perimeter, then drone-detection radar sends the data/notification to the hydrogen fuel cell powered drone's 209 storing/refueling station 205 (also called as drone box that contains a storing section, a refueling section, and a control section) via a server 203 or cloud communication 204 or any other means of communication methods or data links in order for the drone box 205 to wake up the hydrogen fuel cell powered unmanned vehicle 209 (in this case a multi-rotor drone) with a sensing device such as a camera 215, a proximity sensing device 216 such as a proximity sensor, and an on-board computer 218 or autonomous flight management system 218 (for autonomous course navigation and correction, search and identification, etc.) in order to further improve the detection/observation and neutralization features of the hydrogen fuel cell powered unmanned vehicle 209 and its autonomous operation in the case of a communication failure with its drone box 205 control module, then the drone box's 205 control system activates the hydrogen fuel cell powered unmanned vehicle 209 with the sensing device 215 such as a camera, a proximity sensing device 216 such as a proximity sensor, and an on-board computer or autonomous flight management system 218 and then schedules a flight path autonomously based on the coordinates that are received from the drone-detection radar 201, then the drone box 205 initiates the autonomous flight schedule and launches the hydrogen fuel cell powered unmanned vehicle 209 with the sensing device 215 such as a camera, a proximity sensing device 216 such as a proximity sensor, and an on-board computer or autonomous flight management system 218, during the flight of the hydrogen fuel cell powered unmanned vehicle 209 with the sensing device 215 such as a camera, a proximity sensing device 216 such as a proximity sensor, and an on-board computer or autonomous flight management system 218, the drone box 205 continuously communicates with the drone-detection radar 201 and receives data/coordinates for the unauthorized or stray or outlaw drone's new flight pathway from the drone-detection radar 201 via communications channels of a server 203 or a cloud 204 or any other data link that connects the drone box 205 with the drone-detection radar 201, then drone box 205 relays this information to the hydrogen fuel cell powered unmanned vehicle 209 with the sensing device 215 such as a camera, a proximity sensing device 216 such as a proximity sensor, and an on-board computer or autonomous flight management system 218 via its communication device 206 and updates the flight path autonomously in order to intercept the unauthorized or stray or outlaw drone 212 with the payload of 211 for an intentional collision 213 based approach as the neutralization method and facilitates the crash event 214 between the hydrogen fuel cell powered unmanned vehicle 209 with a sensing device 215 such as a camera, a proximity sensing device 216 such as a proximity sensor, and an on-board computer or autonomous flight management system 218 and the unauthorized or stray or outlaw drone 212 with the payload of 211. In the case of a communication failure between the hydrogen fuel cell powered unmanned vehicle 209 and the drone box 205, the on-board flight computer or autonomous flight management system 218 takes over the flight control and utilizes its on-boards sensors to search, find, and neutralize the unauthorized or stray or outlaw drone 212, and if the on-board flight computer or autonomous flight management system 218 cannot find the unauthorized or stray or outlaw drone, it turns back to the drone box 205 using its return home functionality. Additional sensing devices 215 such as a camera and a proximity sensing device 216 such as a proximity sensor and an autonomous flight management systems 218 are added to the hydrogen fuel cell powered unmanned vehicle platform 209 in order to improve the accuracy of the collision event (meaning the visual identification of the unauthorized or stray or outlaw drone with a camera, closing the distance with the unauthorized drone via proximity sensing devices for a 100% collision event, management of the flight by the onboard computer or autonomous flight management system in the case of a communication failure, and confirmation of the collision with the camera or proximity sensors) and the success of the neutralization mission. Due to the advancements observed with technological devices, it can be assumed that if someone is trying to design and built a drone to breach the premises of an airport or any other critical/high-risk infrastructures, they would also deploy some countermeasures to their drone in the anticipation of their drone being chased down or encountering another unmanned vehicle or drone and may have to put up a fight in order to carry their missions. For such unexpected surprises, it is advised that the hydrogen fuel cell powered unmanned vehicle should carry countermeasures (additional sensing devices) too in order to successfully neutralize the unauthorized or stray or outlaw drone.

FIG. 38 shows a drone-detection radar 201 (or perimeter sensors, or other threat detection systems) picking the signature 202 of an unauthorized, stray or outlaw drone 212 with a payload of 211 that is in flight and approaching to an airport or a critical/high-risk infrastructure perimeter, then drone-detection radar sends the data/notification to the drone box 205 via a server 203 or cloud communication 204 or any other means of communication methods or data link in order to wake up the swarm 219 of hydrogen fuel cell powered unmanned vehicles 209 (in this case multiples of multi-rotor drones) with sensing devices such as cameras 215, proximity sensing devices 216 such as proximity sensors, and on-board computers or autonomous flight management systems 218 (for autonomous course navigation and correction, search and identification, etc.) in order to further improve the detection/observation and neutralization features of the hydrogen fuel cell powered unmanned vehicles 209 and their autonomous operation in the case of a communication failure with their drone box 205 control module, then the drone box's 205 control system activates the swarm 219 of hydrogen fuel cell powered unmanned vehicles 209 with the sensing devices 215 such as cameras, proximity sensing devices 216 such as proximity sensors, and on-board computers or autonomous flight management systems 218 and then schedules a flight path autonomously based on the coordinates that are received from the drone-detection radar 201, then the drone box 205 initiates the autonomous flight schedule and launches the swarm 219 of hydrogen fuel cell powered unmanned vehicles 209 with the sensing devices 215 such as cameras, proximity sensing devices 216 such as proximity sensors, and on-board computers or autonomous flight management systems 218, during the flight of the swarm 219 the drone box 205 continuously communicates with the drone-detection radar 201 and receives data/coordinates for the unauthorized or stray or outlaw drone's new flight pathway from the drone-detection radar 201 via communications channels of a server 203 or a cloud 204 or any other data link that connects the drone box 205 with the drone-detection radar 201, then drone box 205 relays this information to the swarm 219 via its communication device 206 and updates the flight path of the swarm unmanned vehicles 19 autonomously in order for them to intercept the unauthorized or stray or outlaw drone 212 with the payload of 211 for an intentional collision based approach 213 as the neutralization method and facilitates the crash event 214 between the swarm 219 of the hydrogen fuel cell powered unmanned vehicles 209 with sensing devices 215 such as cameras, proximity sensing devices 216 such as proximity sensors, and on-board computers or autonomous flight management systems 218 and the unauthorized or stray or outlaw drone 212 with the payload of 211. Additional sensing devices 215 such as a camera, a proximity sensing device 216 such as a proximity sensor, or an autonomous flight management systems 218 are added to the hydrogen fuel cell powered unmanned vehicle platform 209 in order to improve the accuracy of the collision event (meaning the visual identification of the unauthorized or stray or outlaw drone with a camera, closing the distance with the unauthorized drone via proximity sensing devices for a 100% collision event, management of the flight by the on-board computer or autonomous flight management system in the case of a communication failure, and confirmation of the collision with the camera or proximity sensors) and the success of the neutralization mission. Due to the advancements observed with technological devices, it can be assumed that if someone is trying to design and built a drone to breach the premises of an airport or any other critical/high-risk infrastructures, they would also deploy some countermeasures to their drone in the anticipation of their drone being chased down or encountering another unmanned vehicle or drone and may have to put up a fight in order to carry their missions. For such unexpected surprises, it is advised that the hydrogen fuel cell powered unmanned vehicle should carry countermeasures (additional sensing devices) too in order to successfully neutralize the unauthorized or stray or outlaw drone.

FIG. 39 shows a drone-detection radar 201 (or perimeter sensors, or other threat detection systems) picking the signature 202 of an unauthorized, stray or outlaw drone 212 with a payload of 211 that is in flight and approaching to an airport or a critical/high-risk infrastructure perimeter, then drone-detection radar sends the data/notification to the drone box 205 via a server 203 or cloud communication 204 or any other means of communication methods or data links in order for the drone box 205 to wake up the hydrogen fuel cell powered unmanned vehicle 220 (in this case a vertical takeoff and landing vehicle, VTOL,) with a sensing device such as a camera 215 and a proximity sensing device 216 such as a proximity sensor in order to improve the detection/observation and neutralization features of the hydrogen fuel cell powered unmanned vehicle (VTOL) 220, then the drone box's 205 control system activates the hydrogen fuel cell powered unmanned vehicle (VTOL) 220 with the sensing device 215 such as a camera and a proximity sensing device 216 such as a proximity sensor and then schedules a flight path autonomously based on the coordinates that are received from the drone-detection radar 201, then the drone box 205 initiates the autonomous flight schedule and launches the hydrogen fuel cell powered unmanned vehicle (VTOL) 220 with the sensing device 215 such as a camera and a proximity sensing device 216 such as a proximity sensor, during the flight of the hydrogen fuel cell powered unmanned vehicle (VTOL) 220 the drone box 205 continuously communicates with the drone detection radar 201 and receives data/coordinates for the unauthorized or stray or outlaw drone's new flight pathway from the drone-detection radar 201 via communications channels of a server 203 or a cloud 204 or any other data link that connects the drone box 205 with the drone-detection radar 201, then Hydrogen Drone box 205 relays this information to the hydrogen fuel cell powered unmanned vehicle (VTOL) 220 with the sensing device 215 such as a camera and a proximity sensing device 216 such as a proximity sensor via its communication device 206 and updates the flight path autonomously in order to intercept the unauthorized or stray or outlaw drone 212 with the payload of 211 for an intentional collision based approach 213 as the neutralization method and facilitates the crash event 214 between the hydrogen fuel cell powered unmanned vehicle 209 with a sensing device 215 such as a camera and a proximity sensing device 216 such as a proximity sensor and the unauthorized or stray or outlaw drone 212 with the payload of 211. Additional sensing devices 215 such as a camera and a proximity sensing device 216 such as a proximity sensor are added to the hydrogen fuel cell powered unmanned vehicle platform 20 in order to improve the accuracy of the collision event (meaning the visual identification of the unauthorized or stray or outlaw drone with a camera, closing the distance with the unauthorized drone via proximity sensing devices for a 100% collision event, and confirmation of the collision with the camera or proximity sensors) and the success of the neutralization mission. Due to the advancements observed with technological devices, it can be assumed that if someone is trying to design and built a drone to breach the premises of an airport or any other critical/high-risk infrastructures, they would also deploy some countermeasures to their drone in the anticipation of their drone being chased down or encountering another unmanned vehicle or drone and may have to put up a fight in order to carry their missions. For such unexpected surprises, it is advised that the hydrogen fuel cell powered unmanned vehicle should carry countermeasures (additional sensing devices) too in order to successfully neutralize the unauthorized or stray or outlaw drone.

FIG. 40 shows a drone-detection radar 201 (or perimeter sensors, or other threat detection systems) picking the signature 202 of an unauthorized, stray or outlaw drone 212 with a payload of 211 that is in flight and approaching to an airport or a critical/high-risk infrastructure perimeter, then drone-detection radar 201 sends the data/notification to the drone box 205 via a server 203 or cloud communication 204 or any other means of communication methods or data links in order for the drone box 205 to wake up the hydrogen fuel cell powered unmanned vehicle 221 (in this case a vertical takeoff and landing, VTOL) with a sensing device such as a camera 215, a proximity sensing device 216 such as a proximity sensor, and an on-board computer 218 or an autonomous flight management system 218 (for autonomous course navigation and correction, search and identification in the case of a communication failure with the drone box 205) in order to improve the detection/observation and autonomous flying features of the hydrogen fuel cell powered unmanned vehicle (VTOL) 221, then the drone box's 205 control system activates the hydrogen fuel cell powered unmanned vehicle (VTOL) 221 with the sensing device such as a camera 215, a proximity sensing device 216 such as a proximity sensor, and an on-board computer or an autonomous flight management system 218 and then schedules a flight path autonomously based on the coordinates that are received from the drone-detection radar 201, then the drone box 205 initiates the autonomous flight schedule and launches the hydrogen fuel cell powered unmanned vehicle (VTOL) 221, during the flight of the hydrogen fuel cell powered unmanned vehicle (VTOL) 221 the drone box 205 continuously communicates with the drone-detection radar 201 and receives data/coordinates for the unauthorized or stray or outlaw drone's new flight pathway from the drone-detection radar 201 via communications channels of a server 203 or a cloud 204 or any other data link that connects the drone box 205 with the drone-detection radar 201, then drone box 205 relays this information to the hydrogen fuel cell powered unmanned vehicle (VTOL) 221 its communication device 206 and updates the flight path autonomously in order to intercept the unauthorized or stray or outlaw drone 212 with the payload of 211 for an intentional collision based approach 213 as the neutralization method and facilitates the crash event 214 between the hydrogen fuel cell powered unmanned vehicle 221 and the unauthorized or stray or outlaw drone 212 with the payload of 211. Additional sensing devices 215 such as a camera and a proximity sensing device 216 such as a proximity sensor, and an autonomous flight management systems 218 are added to the hydrogen fuel cell powered unmanned vehicle platform 221 in order to improve the accuracy of the collision event (meaning the visual identification of the unauthorized or stray or outlaw drone with a camera, closing the distance with the unauthorized drone via proximity sensing devices for a 100% collision event, management of the flight by the on-board computer or autonomous flight management system in the case of a communication failure, and confirmation of the collision with the camera or proximity sensors) and the success of the neutralization mission. Due to the advancements observed with technological devices, it can be assumed that if someone is trying to design and built a drone to breach the premises of an airport or any other critical/high-risk infrastructures, they would also deploy some countermeasures to their drone in the anticipation of their drone being chased down or encountering another unmanned vehicle or drone and may have to put up a fight in order to carry their missions. For such unexpected surprises, it is advised that the hydrogen fuel cell powered unmanned vehicle should carry countermeasures (additional sensing devices) too in order to successfully neutralize the unauthorized or stray or outlaw drone.

FIG. 41 Shows a drone-detection radar 201 (or perimeter sensors, or other threat detection systems) picking the signature 202 of an unauthorized, stray or outlaw drone 212 with a payload of 211 that is in flight and approaching to an airport or a critical/high-risk infrastructure perimeter, then drone-detection radar sends the data/notification to the drone box 205 via a server 203 or cloud communication 204 or any other means of communication methods or data link in order for the drone box 205 to wake up the hydrogen fuel cell powered unmanned vehicle 222 (in this case a fixed-wing unmanned aerial vehicle) with a sensing device such as a camera 215 and a proximity sensing device 216 such as a proximity sensor in order to improve the detection/observation and neutralization features of the hydrogen fuel cell powered unmanned vehicle (fixed-winged UAV) 222, then the drone box's 205 control system activates the hydrogen fuel cell powered unmanned vehicle (fixed-winged UAV) 222 with the sensing device 215 such as a camera and a proximity sensing device 216 such as a proximity sensor and then schedules a flight path autonomously based on the coordinates that are received from the drone-detection radar 201, then the drone box 205 initiates the autonomous flight schedule and launches the hydrogen fuel cell powered unmanned vehicle (fixed-winged UAV) 222 with the sensing device 215 such as a camera and a proximity sensing device 216 such as a proximity sensor, during the flight of the hydrogen fuel cell powered unmanned vehicle (fixed-winged UAV) 222 the drone box 205 continuously communicates with the drone-detection radar 201 and receives data/coordinates for the unauthorized or stray or outlaw drone's new flight pathway from the drone-detection radar 201 via communications channels of a server 203 or a cloud 204 or any other data link that connects the drone box 205 with the drone-detection radar 201, then drone box 205 relays this information to the hydrogen fuel cell powered unmanned vehicle (fixed-winged UAV) 222 via its communication device 206 and updates the flight path autonomously in order for the hydrogen fuel cell powered unmanned vehicle (fixed-winged UAV) 222 to intercept the unauthorized or stray or outlaw drone 212 with the payload of 211 for an intentional collision based approach 213 as the neutralization method and facilitates the crash event 214 between the hydrogen fuel cell powered unmanned vehicle (fixed-winged UAV) 222 and the unauthorized or stray or outlaw drone 212 with the payload of 211. Additional sensing devices and flight management systems are added to the hydrogen fuel cell powered unmanned vehicle platform 222 in order to improve the accuracy of the collision event (meaning the visual identification of the unauthorized or stray or outlaw drone with a camera, closing the distance with the unauthorized drone via proximity sensing devices for a 100% collision event, and confirmation of the collision with the camera or proximity sensors) and the success of the neutralization mission. Due to the advancements observed with technological devices, it can be assumed that if someone is trying to design and built a drone to breach the premises of an airport or any other critical/high-risk infrastructures, they would also deploy some countermeasures to their drone in the anticipation of their drone being chased down or encountering another unmanned vehicle or drone and may have to put up a fight in order to carry their missions. For such unexpected surprises, it is advised that the hydrogen fuel cell powered unmanned vehicle should carry countermeasures (additional sensing devices) too in order to successfully neutralize the unauthorized or stray or outlaw drone.

FIG. 42 shows a drone-detection radar 201 (or perimeter sensors, or other threat detection systems) picking the signature 202 of an unauthorized, stray or outlaw drone 212 with a payload of 211 that is in flight and approaching to an airport or a critical/high-risk infrastructure perimeter, then drone-detection radar sends the data/notification to the drone box 205 that controls a swarm 230 of hydrogen fuel cell powered unmanned vehicles 224 via a server 203 or cloud communication 204 or any other means of communication methods or data links in order for the drone box 205 to wake up multiples of hydrogen fuel cell powered unmanned vehicles 224 (in this case a multi-rotor drones) in the form a swarm with sensing devices 215 such as cameras, proximity sensing devices 216 such as proximity sensors, and capturing nets 223 in order to improve the detection/observation and defeating features of the hydrogen fuel cell powered unmanned vehicles 224 as a swarm 230, then the drone box's 205 control system activates the swarm 230 of hydrogen fuel cell powered unmanned vehicles 224 and then schedules a flight path autonomously based on the coordinates that are received from the drone-detection radar 201, then the drone box 205 initiates the autonomous flight schedule for the swarm 230 and launches the hydrogen fuel cell powered unmanned vehicles 224, during the flight of the hydrogen fuel cell powered unmanned vehicles 224 the drone box 205 continuously communicates with the drone-detection radar 201 and receives data/coordinates for the unauthorized or stray or outlaw drone's new flight pathway from the drone-detection radar 201 via communications channels of a server 203 or a cloud 204 or any other data link that connects the drone box 205 with the drone-detection radar 201, then drone box 205 relays this information to the swarm of hydrogen fuel cell powered unmanned vehicles 224 via its communication device 206 and updates the flight path autonomously for the swarm 217 in order for them to intercept the unauthorized or stray or outlaw drone 212 with the payload of 211 for neutralization of the unauthorized or stray or outlaw drone 212 with the payload 211 via deployed capturing nets 226 that will be used to incapacitate the unauthorized or stray or outlaw drone's flying capability via neutralization of the unauthorized or stray or outlaw drone with capturing nets approach 232 and facilitates the incapacitation event and results in incapacitation of the unauthorized or stray or outlaw drone with capturing net approach 233. Additional sensing devices are added to the hydrogen fuel cell powered unmanned vehicle's 224 platform in order to improve the accuracy of the neutralization event steps (meaning the visual identification of the unauthorized or stray or outlaw drone with a camera, closing the distance with the unauthorized drone via proximity sensing devices for a 100% collision event, and confirmation of the collision with the camera or proximity sensors) without damaging the hydrogen fuel cell powered unmanned vehicle in order to minimize the cost of defeating a drone threat. Due to the advancements observed with technological devices, it can be assumed that if someone is trying to design and built a drone to breach the premises of an airport or any other critical/high-risk infrastructures, they would also deploy some countermeasures to their drone in the anticipation of their drone being chased down or encountering another unmanned vehicle or a swarm of unmanned vehicles or drones and may have to put up a fight in order to carry their missions. For such unexpected surprises, it is advised that the hydrogen fuel cell powered unmanned vehicle swarm should carry countermeasures (additional sensing devices, capturing nets, etc.) too in order to successfully neutralize or incapacitate the unauthorized or stray or outlaw drone.

FIG. 43 shows a drone-detection radar 201 (or perimeter sensors, or other threat detection systems) picking the signature 202 of an unauthorized, stray or outlaw drone 212 with a payload of 211 that is in flight and approaching to an airport or a critical/high-risk infrastructure perimeter, then drone-detection radar sends the data/notification to the drone box 205 that controls a swarm 231 of hydrogen fuel cell powered unmanned vehicles (multi-rotor drones) 225 via a server 203 or cloud communication 204 or any other means of communication methods or data link in order for the drone box 205 to wake up multiples of hydrogen fuel cell powered unmanned vehicles 225 in the form a swarm with sensing devices such as cameras 215, proximity sensing devices 216 such as proximity sensors, capturing nets 223, and on-board computer 218 or autonomous flight management system 218 (for autonomous course navigation and correction, search and identification, etc.) in order to improve the detection/observation and defeating features of the hydrogen fuel cell powered unmanned vehicles 225 as a swarm 231, then the drone box's 205 control system activates the swarm 231 of hydrogen fuel cell powered unmanned vehicles 225 with the sensing devices 215 such as cameras, proximity sensing devices 216 such as proximity sensors, capturing nets 223, and on-board computer or autonomous flight management system 218 and then schedules a flight path autonomously based on the coordinates that are received from the drone-detection radar 201, then the drone box 205 initiates the autonomous flight schedule for the swarm 231 and launches the hydrogen fuel cell powered unmanned vehicles 225, during the flight of the hydrogen fuel cell powered unmanned vehicles 225 in the form of a swarm 231 with the sensing devices 215 such as cameras, proximity sensing devices 216 such as proximity sensors, capturing net devices 223, and on-board computer or autonomous flight management systems 218, the drone box 205 continuously communicates with the drone-detection radar 201 and receives data/coordinates for the unauthorized or stray or outlaw drone's new flight pathway from the drone-detection radar 201 via communications channels of a server 203 or a cloud 204 or any other data link that connects the drone box 205 with the drone-detection radar 201, then drone box 205 relays this information to the swarm 231 of hydrogen fuel cell powered unmanned vehicles 225 via its communication device 206 and updates the flight path autonomously for the swarm 231 in order to intercept the unauthorized or stray or outlaw drone 212 with the payload of 211 for neutralization of the unauthorized or stray or outlaw drone 212 with the payload 211 via deployed capturing nets 226 that will be used to incapacitate the unauthorized or stray or outlaw drone's flying capability via neutralization of the unauthorized or stray or outlaw drone with capturing nets approach 232 and facilitates the incapacitation event and results in incapacitation of the unauthorized or stray or outlaw drone with capturing net approach 233. Additional sensing devices are added to the hydrogen fuel cell powered unmanned vehicle's 225 platform in order to improve the accuracy of the neutralization event steps (meaning for the visual identification of the unauthorized or stray or outlaw drone with a camera, closing the distance with the unauthorized drone via proximity sensing devices for a 100% capturing via capturing net event, on-board computer or autonomous flight management system to enable the flight of the unmanned vehicle by itself in the case of a communication failure and confirmation of the incapacitation event with a camera) without damaging the hydrogen fuel cell powered unmanned vehicle in order to minimize the cost of defeating a drone threat. Due to the advancements observed with technological devices, it can be assumed that if someone is trying to design and built a drone to breach the premises of an airport or any other critical/high-risk infrastructures, they would also deploy some countermeasures to their drone in the anticipation of their drone being chased down or encountering another unmanned vehicle or a swarm of unmanned vehicles or drones and may have to put up a fight in order to carry their missions. For such unexpected surprises, it is advised that the hydrogen fuel cell powered unmanned vehicle swarm should carry countermeasures (additional sensing devices, capturing nets, etc.) too in order to successfully neutralize or incapacitate the unauthorized or stray or outlaw drone.

FIG. 44 shows a drone-detection radar 201 (or perimeter sensors, or other threat detection systems) picking the signature 202 of an unauthorized, stray or outlaw drone 212 with a payload of 211 that is in flight and approaching to an airport or a critical/high-risk infrastructure perimeter, then drone-detection radar sends the data/notification to the drone box 205 that controls a hydrogen fuel cell powered unmanned vehicle 227 via a server 203 or cloud communication 204 or any other means of communication methods or data links in order for the drone box 205 to wake up a hydrogen fuel cell powered unmanned vehicle 234 (in this case a multi-rotor drone) with sensing devices such as a camera 215, a proximity sensing device 216 such as a proximity sensor, a capturing net 223, and a spoofing or jamming or an electronic communication disruption device 227 in order to further improve the neutralization features of the hydrogen fuel cell powered unmanned vehicles 227, then the drone box's 205 control system activates the hydrogen fuel cell powered unmanned vehicle 234 and then schedules a flight path autonomously based on the coordinates that are received from the drone-detection radar 201, then the drone box 205 initiates the autonomous flight schedule for the hydrogen fuel cell powered unmanned vehicle 234 and launches the hydrogen fuel cell powered unmanned vehicles 234 with the sensing devices such as cameras 215, proximity sensing devices 216 such as proximity sensors, capturing nets 223, and a spoofing or jamming or an electronic communication disruption device 227, during the flight of the hydrogen fuel cell powered unmanned vehicles 234 the drone box 205 continuously communicates with the drone-detection radar 201 and receives data/coordinates for the unauthorized or stray or outlaw drone's new flight pathway from the drone-detection radar 201 via communications channels of a server 203 or a cloud 204 or any other data link that connects the drone box 205 with the drone-detection radar 201, then drone box 205 relays this information to the hydrogen fuel cell powered unmanned vehicle 234 via its communication device 206 and updates the flight path autonomously for the hydrogen fuel cell powered unmanned vehicle 234 to intercept the unauthorized or stray or outlaw drone 212 with the payload of 211 for neutralization of the unauthorized or stray or outlaw drone 212 via spoofing or jamming or an electronic communication disruption device 227 that will be used to incapacitate the unauthorized or stray or outlaw drone's flying capability by a remote control signal 228 that is sent by the spoofing or jamming or an electronic communication disruption device 227 and finally land the unauthorized or stray or outlaw drone to the ground 229. Additional sensing devices are added to the hydrogen fuel cell powered unmanned vehicle's 234 platform in order to improve the accuracy of the neutralization event steps (meaning for the visual identification of the unauthorized or stray or outlaw drone with a camera, closing the distance with the unauthorized drone via proximity sensing devices for better remote control, and confirmation of the incapacitation event with a camera) without damaging either the hydrogen fuel cell powered unmanned vehicle or the unauthorized or stray or outlaw drones in order to minimize the cost of defeating a drone threat and possibly identifying the operator or the entity controlling the unauthorized or stray or outlaw drone by studying the hardware located on-board of the unauthorized or stray or outlaw drone 212. Due to the advancements observed with technological devices, it can be assumed that if someone is trying to design and built a drone to breach the premises of an airport or any other critical/high-risk infrastructures, they would also deploy some countermeasures to their drone in the anticipation of their drone being chased down or encountering another unmanned vehicle or a swarm of unmanned vehicles or drones and may have to put up a fight in order to carry its mission. For such unexpected surprises, it is advised that the hydrogen fuel cell powered unmanned vehicle should carry countermeasures (additional sensing devices, capturing nets, spoofing or jamming or electronic communication disruption devices, etc.) too in order to successfully neutralize or incapacitate the unauthorized or stray or outlaw drone.

FIG. 45 shows a drone-detection radar 201 (or perimeter sensors, or other threat detection systems) picking the signature 202 of an unauthorized, stray or outlaw drone 212 with a payload of 211 that is in flight and approaching to an airport or a critical/high-risk infrastructure perimeter, then drone-detection radar 201 sends the data/notification to the drone box 205 via a server 203 or cloud communication 204 or any other means of communication methods or data links in order to wake up a hydrogen fuel cell powered unmanned vehicle 235 (in this case a multi-rotor drone) with sensing devices such as a camera 215, a proximity sensing device 216 such as a proximity sensor, a capturing net 223, a spoofing or jamming or an electronic communication disruption device 227, and an on-board computer or autonomous flight management system 218 in order to further improve the autonomous operation and neutralization features of the hydrogen fuel cell powered unmanned vehicles 235, then the drone box's 205 control system activates the hydrogen fuel cell powered unmanned vehicle 235 with the sensing devices such as cameras 215, proximity sensing devices 216 such as proximity sensors, capturing nets 223, a spoofing or jamming or an electronic communication disruption device 227, and an on-board computer or autonomous flight management system 218 and then schedules a flight path autonomously based on the coordinates that are received from the drone-detection radar 201, then the drone box 205 initiates the autonomous flight schedule for the hydrogen fuel cell powered unmanned vehicle 235 and launches the hydrogen fuel cell powered unmanned vehicles 235, during the flight of the hydrogen fuel cell powered unmanned vehicle 235 the drone box 205 continuously communicates with the drone-detection radar 201 and receives data/coordinates for the unauthorized or stray or outlaw drone's new flight pathway from the drone-detection radar 201 via communications channels of a server 203 or a cloud 204 or any other data link that connects the drone box 205 with the drone-detection radar 201, then drone box 205 relays this information to the hydrogen fuel cell powered unmanned vehicle 235 with the sensing devices such as a camera 215, a proximity sensing device 216, a capturing net 223, a spoofing or jamming or an electronic communication disruption device 227, and an on-board computer or autonomous flight management system 218 via its communication device 206 and updates the flight path autonomously for the hydrogen fuel cell powered unmanned vehicle 235 in order to intercept the unauthorized or stray or outlaw drone 212 with the payload of 211 for neutralization of the unauthorized or stray or outlaw drone 212 with the payload 211 via spoofing or jamming or an electronic communication disruption device 227 that will be used to incapacitate the unauthorized or stray or outlaw drone's flying capability by a remote control signal 228 which is sent by the spoofing or jamming or an electronic communication disruption device 227 and finally land the unauthorized or stray or outlaw drone to the ground 229. Additional sensing devices are added to the hydrogen fuel cell powered unmanned vehicle's 35 platform in order to improve the accuracy of the neutralization event steps (meaning the visual identification of the unauthorized or stray or outlaw drone with a camera, closing the distance with the unauthorized drone via proximity sensing devices for better remote control, managing the flight of the unmanned vehicle via on-board computer or on-board autonomous flight management system in the case of a communication failure, and confirmation of the incapacitation event with a camera) without damaging neither the hydrogen fuel cell powered unmanned vehicle nor the unauthorized or stray or outlaw drones in order to minimize the cost of defeating a drone threat and possibly identifying the operator or the entity controlling the unauthorized or stray or outlaw drone by studying its navigation and flight management systems. Due to the advancements observed with technological devices, it can be assumed that if someone is trying to design and built a drone to breach the premises of an airport or any other critical/high-risk infrastructures, they would also deploy some countermeasures to their drone in the anticipation of their drone being chased down or encountering another unmanned vehicle or a swarm of unmanned vehicles or drones and may have to put up a fight in order to carry their missions. For such unexpected surprises, it is advised that the hydrogen fuel cell powered unmanned vehicle should carry countermeasures (additional sensing devices, capturing nets, etc.) too in order to successfully neutralize or incapacitate the unauthorized or stray or outlaw drone.

FIG. 46 shows an autonomous hydrogen storing/refueling station (also called as drone box) assembly 205 in which a hydrogen fuel cell powered unmanned vehicle 209 (with a hydrogen fuel cell stack system 262 and an on-board hydrogen storage medium 236) lands on a landing platform with a smart device with precision landing mechanisms 213 and 263 that aligns the unmanned vehicle to the appropriate position after the autonomous storing/refueling station's opening doors 237 are opened, then landing platform's lifting mechanism 245 lowers the unmanned vehicle 209 to a lower section inside the autonomous storing/refueling station assembly 205 to prepare for the exchange of depleted on-board hydrogen storage 236, then hydrogen cylinder or cartridge or pod lifting mechanism 246 which utilizes a robotic grasping mechanism or a robotic arm 248 and locking/unlocking mechanism 247 to grasp depleted on-board hydrogen storage 236 and move this onto the depleted hydrogen cylinder or cartridge or pod conveyer belt 249 in order to move the depleted on-board hydrogen storage cylinder or cartridge or pod 236 in the direction of depleted hydrogen cylinder or cartridge or pod racks chamber with dispenser mechanism 252, then another robotic grasping mechanism or robotic arm 248 places the depleted on-board hydrogen storage cylinder, cartridge or pod 236 into one of the empty racks (labeled with 50 once it is placed in the rack) for depleted hydrogen cylinder, cartridge, or pod section 239. After then, another robotic grasping mechanism or a robotic arm 248 located in the vicinity of refilled/unused hydrogen cylinder or cartridge or pod racks chamber with dispenser mechanism 242 grabs a refilled/unused hydrogen storage cylinder or cartridge or pod 244 and moves it onto the charged hydrogen cylinder or cartridge or pod conveyor belt 264, then another robotic grasping mechanism or a robotic arm 248 located in the vicinity hydrogen cylinder or cartridge or pod lifting mechanism 246 captures the refilled/unused hydrogen cylinder or cartridge or pod 244 and installs it onto the unmanned vehicle platform via locking/unlocking mechanism 247. Even though robotics systems are becoming more advanced, it may be essential to have an external user to assist or interfere with the operation of the autonomous storing/refueling station assembly 205 and for this opening mechanism 253 is advised to be incorporated for manual refilling of water, hydrogen cylinder, cartridges, or pods and also opening mechanism 254 for manual disposal of depleted hydrogen cylinder, cartridge, or pods. Modular refueling storage box 238 integrated into the autonomous storing/refueling station assembly 205 can be comprised of the following components either in combination or separately: electronics and controls 255 to safely operate the hydrogen refueling process, pressurized gaseous hydrogen cylinders from commercial suppliers (not shown here), electrolysis hydrogen generation unit (not shown here), hydrogen slurry cartridges (not shown here), hydrogen solid cartridges (not shown here), liquid hydrogen cylinders 260, hydrogen pods (that are comprised of a fuel cell stack, hydrogen storage, control electronics, etc. in a single package and not shown here), water storage tank and transfer pump (not shown here) for the electrolyzers, gas cleanup units (not shown here), primary compressor 240, secondary compressor 241, booster pump (not shown here) and a refilling interface 243 or 259 to charge the depleted hydrogen cylinder, cartridge, or pod 236 or 260, charged hydrogen cylinder or cartridge or pod racks chamber with dispenser mechanism 242, charged hydrogen cylinders or cartridges or pods 244 or 260, and charged hydrogen cylinder or cartridge or pod conveyor belt 264. Modular disposing storage section 239 can be comprised of the following components either in combination or separately: Depleted hydrogen cylinder or cartridge or pod racks chamber with dispenser mechanism 252, empty rack for depleted hydrogen cylinder or cartridge or pod 251, depleted hydrogen cylinder or cartridge or pod 250, and depleted hydrogen cylinder or cartridge or pod conveyor belt 249. It is desired to have the autonomous hydrogen refueling and unmanned vehicle storing station assembly 205 be kept safe at various environments and hence an electric fence 265 to keep humans and animals away, a security device such as camera 257 to monitor and record the surroundings, and anti-tampering or anti-theft notification devices 256 can also integrated at various locations of the autonomous hydrogen refueling and unmanned vehicle storing station assembly 205. Furthermore, a weather sensor 258 or sensors package 258 (including a hyper-local weather device) is also advised to be integrated to the autonomous storing/refueling station assembly 205 in order to enable the safe operation of the autonomous hydrogen refueling and unmanned vehicle storing/refueling station assembly 205 or safe operation of the unmanned vehicle 209 during abnormal weather conditions. The weather sensor or sensor package 258 can also contain a hyper-local weather estimating device with hyper-accurate forecasting capability to get the local weather conditions that are relevant to the safe operation of the unmanned vehicles at ground and an altitude range (0-10 meters, 10-50 meters, 50-100 meters, 100-1000 meters, etc.) where the mission is planned. In order to prevent the plants and other plant-like things to cover the opening doors or external sensor platforms of the refueling station and hinder its operations or to keep the externals of the station clean from the plants, weeds, etc., a weed-killer 259 or plant-killer device 259 can also be integrated. In addition to weed-killing feature, the weed-killer device can also be integrated with an insecticide/pesticide killer device/compound to prevent insecticide/pesticide infestation on the external or internal sections of the refueling station. A communication module 206 is used to directly or remotely connect to the automated hydrogen refueling/exchanging and storing station, get status update or sending commends and some examples of this communication module are a satcom device and its antenna, a telecom device and its antenna, etc. and the content of this application is not limited to these communication methods. The power source (not shown here) to operate the autonomous hydrogen refueling and unmanned vehicle storing station assembly 205 can be obtained from a vehicle such as a pickup truck, van, car, etc. or from solar, wind, grid-electricity, battery, fuel cell, or combinations thereof, etc., but the content of this application is not limited to these power options. The basic setup provided in this figure is quite configurable for storing gaseous hydrogen (such as commercial hydrogen cylinders), generation of hydrogen by means of water electrolysis and then storing this gas into an intermediary storage tank in order to refill the depleted hydrogen storage cylinder or pod, storing and exchanging of slurry or solid hydrogen cartridge based on the use of a hydride material. Furthermore, cameras installed on the storing/refueling station can also be used to have the capability of beyond-the-line-of-sight or virtual-line-of-sight (using its local camera pole) in order to safely operate the unmanned vehicle or meet the requirements of local regulations without having a pilot or operator in the vicinity of the unmanned vehicle by using a software or some other controls on the cameras installed on the storing/refueling station, in which the cameras visual observation capability is utilized fully to track the flight of the unmanned vehicle.

FIG. 47 shows an autonomous liquid hydrogen storing/refueling station (also called as drone box) assembly 205 in which a hydrogen fuel cell powered unmanned vehicle 209 (with a hydrogen fuel cell stack system 262 and an on-board liquid hydrogen storage medium 260) lands on a landing platform with a smart device with precision landing mechanisms 213 and 263 that aligns the unmanned vehicle to the appropriate position after the autonomous storing/refueling station's opening doors 237 are opened, then landing platform's lifting mechanism 245 lowers the unmanned vehicle 209 to a lower section inside the autonomous storing/refueling station assembly 205 to prepare for the exchange of depleted on-board liquid hydrogen storage 260, then liquid hydrogen cylinder or pod lifting mechanism 246 which utilizes a robotic grasping mechanism or a robotic arm 248 and locking/unlocking mechanism 247 to grasp depleted onboard liquid hydrogen storage 260 and move this onto the depleted hydrogen cylinder or cartridge or pod conveyer belt 249 in order to move the depleted on-board liquid hydrogen storage cylinder or cartridge or pod 260 in the direction of depleted hydrogen cylinder or cartridge or pod racks chamber with dispenser mechanism 252, then another robotic grasping mechanism or robotic arm 248 places the depleted on-board liquid hydrogen storage cylinder or pod 260 into one of the empty racks (labeled with 50 once it is placed in the rack) for depleted hydrogen cylinder or pod section 239. After then, another robotic grasping mechanism or a robotic arm 248 located in the vicinity of refilled/unused liquid hydrogen cylinder or pod racks chamber with dispenser mechanism 242 grabs a refilled/unused liquid hydrogen storage cylinder or pod 244 and moves it onto the charged hydrogen cylinder or cartridge or pod conveyor belt 264, then another robotic grasping mechanism or a robotic arm 248 located in the vicinity hydrogen cylinder or cartridge or pod lifting mechanism 246 captures the refilled/unused liquid hydrogen cylinder or pod 260 and installs it onto the unmanned vehicle platform 209 via locking/unlocking mechanism 247. Even though robotics systems are becoming more advanced, it may be essential to have an external user to assist or interfere with the operation of the autonomous storing/refueling station assembly 205 and for this opening mechanism 253 is advised to be incorporated for manual refilling of water, hydrogen cylinder or pods and also opening mechanism 254 for manual disposal of depleted hydrogen cylinder or pods. Modular refueling storage box 238 integrated into the autonomous storing/refueling station assembly 205 can be comprised of the following components either in combination or separately: electronics and controls 255 to safely operate the liquid hydrogen refueling process, pressurized gaseous hydrogen cylinders from commercial suppliers (not shown here), electrolysis hydrogen generation unit (not shown here), liquid hydrogen cylinders 260, hydrogen pods (that are comprised of a fuel cell stack, liquid hydrogen storage, control electronics, etc. in a single package and not shown here), water storage tank and transfer pump for the electrolyzers (not shown here), gas cleanup units (not shown here), primary compressor 240, secondary compressor 241, booster pump (not shown here) and a refilling interface 259 to charge the depleted hydrogen cylinder or pod 260 with liquid hydrogen fuel, refilled/unused hydrogen cylinder or pod racks chamber with dispenser mechanism 242, refilled/unused liquid hydrogen cylinders or pods 260, and charged hydrogen cylinder or cartridge or pod conveyor belt 264. Modular disposing storage section 239 can be comprised of the following components either in combination or separately: Depleted hydrogen cylinder or pod racks chamber with dispenser mechanism 252, empty rack for depleted hydrogen cylinder or pod 251, depleted hydrogen cylinder or pod 250, and depleted hydrogen cylinder or cartridge or pod conveyor belt 249. It is desired to have the autonomous hydrogen refueling and unmanned vehicle storing station assembly 205 be kept safe at various environments and hence an electric fence 265 to keep humans and animals away, a security device such as camera 257 to monitor and record the surroundings, and anti-tampering or anti-theft notification devices 256 can also integrated at various locations of the autonomous hydrogen refueling and unmanned vehicle storing station assembly 205. Furthermore, a weather sensor 258 or sensors package 258 (including a hyper-local weather device) is also advised to be integrated to the autonomous storing/refueling station assembly 205 in order to enable the safe operation of the autonomous hydrogen refueling and unmanned vehicle storing/refueling station assembly 205 or safe operation of the unmanned vehicle 209 during abnormal weather conditions. The weather sensor or sensor package 258 can also contain a hyper-local weather estimating device with hyper-accurate forecasting capability to get the local weather conditions that are relevant to the safe operation of the unmanned vehicles at ground and an altitude range (0-10 meters, 10-50 meters, 50-100 meters, 100-1000 meters, etc.) where the mission is planned. In order to prevent the plants and other plant-like things to cover the opening doors or external sensor platforms of the refueling station and hinder its operations or to keep the externals of the station clean from the plants, weeds, etc., a weed-killer 259 or plant-killer device 259 can also be integrated. In addition to weed-killing feature, the weed-killer device can also be integrated with an insecticide/pesticide killer device/compound to prevent insecticide/pesticide infestation on the external or internal sections of the refueling station. A communication module 206 is used to directly or remotely connect to the automated hydrogen refueling/exchanging and storing station, get status update or sending commends and some examples of this communication module are a satcom device and its antenna, a telecom device and its antenna, etc. and the content of this application is not limited to these communication methods. The power source (not shown here) to operate the autonomous hydrogen refueling and unmanned vehicle storing station assembly 205 can be obtained from a vehicle such as a pickup truck, van, car, etc. or from solar, wind, grid-electricity, battery, fuel cell, or combinations thereof, etc., but the content of this application is not limited to these power options. The basic setup provided in this figure is quite configurable for storing gaseous hydrogen (such as commercial hydrogen cylinders), generation of hydrogen by means of water electrolysis and then storing this gas into an intermediary storage tank in order to further processing of the gaseous hydrogen liquefaction to liquid hydrogen fuel with the aid of a hydrogen liquefier device 261 and then refill the hydrogen storage medium with liquid hydrogen for further increasing the effective flight time compared to gaseous hydrogen approach. Furthermore, cameras installed on the storing/refueling station can also be used to have the capability of beyond-the-line-of-sight or virtual-line-of-sight (using its local camera pole) in order to safely operate the unmanned vehicle or meet the requirements of local regulations without having a pilot or operator in the vicinity of the unmanned vehicle by using a software or some other controls on the cameras installed on the storing/refueling station, in which the cameras visual observation capability is utilized fully to track the flight of the unmanned vehicle.

FIG. 48 describes the basic schematic of an electric propulsion pod that contains all of the essential components in a single package of 268, which is also called distributed and interchangeable electric propulsion pod, due to flexibility of this design to be used across multiple unmanned vehicle platforms either as single unit or in multiples of these units and its easy installation/removal/refueling features, in which the hydrogen fuel is charged into the hydrogen storage medium 271 via the interface to refuel the distributed and interchangeable electric propulsion pod 269 through the refueling line for the distributed and interchangeable electric propulsion pod 270, then the stored hydrogen fuel inside the hydrogen storage medium 271 is initially transferred to the fuel cell stack module 273 via discharge interface to transfer the fuel to the fuel cell stack 272, the chemical energy inside the hydrogen gets converted into electrical energy, the stored energy inside the hybrid battery module 274, the operation of the fuel cell stack module 273, the battery module 274, the electric gear or gearbox 276 and all of the safe operation protocols are managed with the aid of the control module 275, the propeller 279 that is connected to the distributed and interchangeable electrical propulsion pod and the wing 266 via a lock/unlock mechanism 267 and also through the electrical/electronics, data, and communication interface for the distributed and interchangeable electric propulsion pod 277 gets energized with the electrical energy generated from the fuel cell stack 273 or battery module 274. The hybrid battery module 274 has the capability of storing electrical energy from various sources such as from the fuel cell system or from the solar cells of photovoltaic cells spread out across the wing surface of the unmanned vehicle in order to reduce the hydrogen consumption.

FIG. 49 Shows the basic schematics of an unmanned aerial vehicle with fixed wing 281 where the main body (also known as fuselage 280) is comprised of a single distributed and interchangeable electric propulsion pod 268 with all of the required components, where the electrical energy generated from the fuel cell stack and hybrid battery modules located inside the distributed and interchangeable electric propulsion pod 268 gets transferred to the propeller 279 in order to move the unmanned vehicle from one location to another for neutralization of drone threats.

FIG. 50 shows the basic schematic of an unmanned vehicle 284 with multiple of distributed and interchangeable electric propulsion pods 268 attached to different parts of the fuselage 280, where the wing 281 enables the flight of the vehicle and has the capability of providing some extra energy when it is integrated with solar cells or photovoltaic cells, this energy can be stored inside the hybrid battery modules located either inside the distributed and interchangeable electric propulsion pods 268 or another centralized/decentralized battery modules located within the main body 280 of the unmanned vehicle, winglets 282 reduces the drag, horizontal/vertical stabilizer and rudder 283 enable the safe operation and its maneuvering of the unmanned vehicle, and the distributed and interchangeable electric propulsion pods 268 are attached to the wing with lock/unlock mechanisms that enables the easy removal with robotic solutions or manually, and distributed and interchangeable electric propulsion pods 268 also have the interface to refuel the distributed and interchangeable electric propulsion pod 269 for their easy and autonomous refueling process. The flexibility of the distributed and interchangeable electric propulsion pods 268 comes from its unique design that allows its multiple unit use depending on the aircraft need and also enables other safety features such as decentralized and networked energy management for the unmanned vehicle to safely land the unmanned vehicle in the case of a catastrophic failures with certain propellers or propulsion pods or enable the unmanned aircraft to continue to fly in the case of such failures. Conventional unmanned vehicles have single engines or very much centralized power generation schemes that get crippled completely in the case of a major failure and inability to control the unmanned aircraft in such situations.

FIG. 51 shows the basic schematic of removal process for the depleted distributed and interchangeable electric propulsion pods 268 for their refueling from the unmanned vehicle's 280 wing structure 281 via robotic solutions (whether this may be robotic grasping, robotic arms, robotic catch, etc.) 287 by activating the lock/unlock mechanisms integrated to both the wing 281 or fuselage 280 and distributed and integrated electric propulsion pods 268 via utilization of autonomous ground vehicles 285 that has either single or multiples of robotic solutions (whether this may be robotic grasping, robotic arms, robotic catch, etc.) 287 where the autonomous ground vehicle 285 with the stowage/storage section 288, discharge interface located on the autonomous ground vehicle to transfer the hydrogen fuel from the autonomous ground vehicle's common hydrogen manifold to the interface of the depleted hydrogen storage medium located inside the distributed and interchangeable electric propulsion pod 289 for the refueling of the depleted interchangeable electric propulsion pods 268 through the common hydrogen fuel manifold to transfer hydrogen fuel from the refueling infrastructure to the depleted hydrogen storage medium located inside the distributed and interchangeable electric propulsion pod 289 that is located on the autonomous ground vehicle. The autonomous ground vehicles for the removal/refueling/exchanging of the distributed and interchangeable electric propulsion pods can have single- or multi-steering capabilities for their approaching to the unmanned vehicle and moving away from the vehicle while carrying out their refueling efforts.

FIG. 52 Shows the basic schematic for the refueling process for depleted distributed and interchangeable electric propulsion pods 268 from another autonomous ground hydrogen supply tank 291 that carries hydrogen fuel that is stored inside its hydrogen storage 292, has a discharge mechanism 293 to dispense the hydrogen fuel through the hydrogen transfer line 294 into the common hydrogen fuel manifold to transfer hydrogen fuel from the refueling infrastructure to the depleted hydrogen storage medium located inside the distributed and interchangeable electric propulsion pod 286 where the hydrogen gets into the depleted hydrogen storage medium located inside the distributed and interchangeable electric propulsion pods 268 via mating of the discharge interface located on the autonomous ground vehicle to transfer the hydrogen fuel from the autonomous ground vehicle's common hydrogen manifold to the interface of the depleted hydrogen storage medium located inside the distributed and interchangeable electric propulsion pod 289 and interface to refuel the distributed and interchangeable electric propulsion pod 269, once the refueling is completed both autonomous vehicles communicates with each other in order to shut off the hydrogen line and then secure disengage the hydrogen transfer line to transfer the hydrogen from the autonomous ground hydrogen supply tank to the autonomous ground vehicle carrying the depleted distributed and interchangeable electric propulsion pods 294 from the autonomous ground vehicle that is carrying the distributed and interchangeable electric propulsion pods 285. After the refueling, the autonomous ground vehicle 285 that is carrying the refueled distributed and interchangeable electric propulsion pods returns to the unmanned vehicle and installs the charged propulsion pods back onto the vehicle using its own robotic solutions located on the vehicle.

FIG. 53 shows multiple autonomous ground vehicles 285 carrying the depleted distributed and interchangeable electric propulsion pods 268 for their refueling from a hydrogen supplying infrastructure 299 autonomously using the hydrogen fuel that is being supplied by the hydrogen refueling stations or hydrogen refueling plants 300 to the building's, warehouse's, hangar's or infrastructures main hydrogen fuel line 298 which then transfer this hydrogen fuel to the hydrogen discharge mechanism located in the building, warehouse, hangar, or an infrastructure that has the capability of transferring hydrogen fuel throughput the entire facility 296 where the autonomous ground vehicle's hydrogen receiving mechanism to the autonomous ground vehicle carrying the depleted distributed and interchangeable electric propulsion pods 295 is mated with the hydrogen discharge mechanism located in the building, warehouse, hangar, or an infrastructure that has the capability of transferring hydrogen fuel throughput the entire facility 296 in order to transfer the hydrogen fuel to the common hydrogen fuel manifold to transfer hydrogen fuel from the refueling infrastructure to the depleted hydrogen storage medium located inside the distributed and interchangeable electric propulsion pod 286 after a signal is being sent to the control module of the hydrogen refueling stations or hydrogen refueling plants 300, the system awaits for the charging of the depleted storage media and then sends another signal in order to shut off the discharge of hydrogen fuel from the hydrogen discharge mechanism located in the building, warehouse, hangar, or an infrastructure that has the capability of transferring hydrogen fuel throughput the entire facility 296, after the discharging 296 and receiving 295 mechanisms are disengaged, the autonomous ground vehicle carries the refueled distributed and interchangeable electric propulsion pods to the site of the unmanned vehicle that will be used for the neutralization of drone threats in order to install the charged distributed and interchangeable electric propulsion pods onto the unmanned vehicle.

FIG. 54 shows an autonomous ground vehicle 285 carrying the depleted distributed and interchangeable electric propulsion pods 268 for their liquid hydrogen refueling from a liquid hydrogen generator or liquid hydrogen supplying building, warehouse, hangar, or an infrastructure 303 that has a hydrogen storage or hydrogen generation unit 304 from where the gaseous hydrogen can be supplied to the hydrogen liquefier module 309 via through the primary compressor, secondary compressor, booster pump, gas cleanup, and other relevant balance of plant components 305, then through the discharge points for hydrogen gas to the hydrogen liquefier module 307 into the hydrogen gas transfer lines to transport the hydrogen to the hydrogen liquefier module 308, then into the individual hydrogen liquefier devices 310 in order to transform the gaseous hydrogen into the liquid hydrogen form, then the liquid hydrogen us transferred to the autonomous ground vehicle's 285 liquid hydrogen receiving mechanism located on the autonomous ground vehicle carrying the depleted distributed and interchangeable electric propulsion pods 301 by initially going through the liquid hydrogen transfer lines 311, then through liquid hydrogen discharge mechanism located on the liquid hydrogen generator or liquid hydrogen supplying building, warehouse, hangar or an infrastructure 302, then the liquid hydrogen gets transferred to the depleted distributed and interchangeable electric propulsion pods' 268 storage medium via hydrogen transfer lines 252, then through discharge mechanism 289, then through receiving mechanism 269, once the refueling is completed a signal is sent to the liquid hydrogen producing plant, station or infrastructure 300 to shut off the liquid hydrogen dispensation and initiate the disengagement of the receiving 301 and discharge 302 mechanisms, after than the autonomous ground vehicle carrying the liquid hydrogen containing distributed and interchangeable electric propulsion pods carries these back to the unmanned vehicle in order to install them on the vehicle before its drone neutralization missions.

FIG. 55 describes the basic schematic of refueling of the depleted distributed and interchangeable electric propulsion pods 268 that are connected to the discharge 289 and receiving 269 mechanism in order to get the hydrogen 292 from a manned ground hydrogen supply tanker 291 to refuel the depleted hydrogen storage media located in each one of the distributed and interchangeable electric propulsion pods 268, where the hydrogen 292 stored inside the manned ground hydrogen supply tanker 291 is initially discharged to the discharge interface to transfer the hydrogen from the autonomous ground hydrogen supply tank to the autonomous ground vehicle carrying the depleted distributed and interchangeable electric propulsion pods 293, then the discharged hydrogen 292 is transferred over the hydrogen transfer line to transfer the hydrogen from the autonomous ground hydrogen supply tank to the autonomous ground vehicle carrying the depleted distributed and interchangeable electric propulsion pods 294 and moved into the common hydrogen fuel manifold to transfer hydrogen fuel from the refueling infrastructure to the depleted hydrogen storage medium located inside the distributed and interchangeable electric propulsion pod 286, the system awaits for the refueling to complete and sends a signal to shut off the hydrogen dispensation, disengages from the manned ground hydrogen supply tanker by disconnecting it receiving mechanism and carries back the refueled propulsion pods to the location of the unmanned vehicle that will be used for the neutralization of the drones.

FIG. 56 shows the basic schematic of the refueling of the depleted distributed and interchangeable electric propulsion pods in the hydrogen farm 315, which is comprised of modular solar powered hydrogen fuel generation units 313 that is powered by the solar cells or photovoltaic cells 314 in order to generate the hydrogen from the electrolysis of water by an electrolyzer or generation hydrogen via other methods such as (steam reforming of natural gas or other hydrocarbons or fuels, other similar mechanisms for generating hydrogen from hydrogen containing materials, etc.), if required they generated hydrogen is cleaned from impurities in order to obtain the pure hydrogen, then the generated or purified hydrogen is either stored in an intermediary storage until the point of use or it is directly generated and dispensed straight to the common hydrogen manifold of the autonomous ground vehicle 285 via the discharge mechanism located on the solar powered hydrogen generation unit 313 and then transferred to the depleted storage media of the distributed and interchangeable electric propulsion pods 268.

FIG. 57 describes the basic schematic of an automated storing/battery module exchanging or recharging station that can be used to store the unmanned vehicle 209 for drone neutralization applications, where the unmanned vehicle 209 returning from a drone neutralization mission with a battery module 319 that is depleted and either needs to be exchanged or recharged initially lands on the landing platform with a smart alignment device 213 after the doors 237 opening in order to adjust the position of the unmanned vehicle 209 for properly lowering it down to the lower section with a lifting/descending mechanism 245 where the battery exchange or recharging can be done, for exchanging to a new battery module, a robotic grasping or robotic arm 327 in the vicinity of the depleted battery storage section 324 removes the depleted battery module 322 from the unmanned vehicle platform by the initiation of the lock/unlock mechanism 326, then the depleted battery module 322 is placed over the conveyer belt 321 in order to move the depleted battery module 322 to the storage section where the discharged or depleted battery module storage rack with dispenser mechanism is located, and the depleted battery gets placed into one of the empty racks 323, then another robotic grasping mechanism or robotic arm that is located in the vicinity of the charged or unused battery module storage rack and dispenser mechanism 318 that is contained within the charged or unused battery module storing section 317 grabs an unused or charged battery module and places on the conveyer belt 320 in order to move it towards the battery module lifting platform 325 for installation of this battery module onto the unmanned vehicle with the aid of a robotic grasping mechanism or robotic arm and then securing it onto the unmanned vehicle platform with the lock/unlock mechanism 326, then the unmanned vehicle is lifted to the landing platform with the aid of lifting/descending mechanism for its next drone neutralization mission. In the case of charging the battery module, the robotic arm or robotic grasping mechanism can have touch or press pins or rapid contact charging feature for energizing charging contacts located on the unmanned vehicle and carrying out the charging of the battery module without removing from the unmanned vehicle's platform. Furthermore, cameras installed on the storing/refueling station can also be used to have the capability of beyond-the-line-of-sight or virtual-line-of-sight (using its local camera pole) in order to safely operate the unmanned vehicle or meet the requirements of local regulations without having a pilot or operator in the vicinity of the unmanned vehicle by using a software or some other controls on the cameras installed on the storing/refueling station, in which the cameras visual observation capability is utilized fully to track the flight of the unmanned vehicle.

Operation or flight control for the unmanned vehicle for drone neutralization can be done by using web-based ground control, satellite based control, and other similar communication protocols that have the capability to safely communicate with the unmanned vehicle, its storing/refueling station or its storing/exchanging station or its storing/recharging station, the autonomous refueling infrastructure (and also all of the associated other autonomous ground vehicles, autonomous ground hydrogen supply tank, autonomous hydrogen refueling plants/stations, etc.). Furthermore, mission planning and scheduling systems' operation can be managed with a virtual command center that acts as the mission management for flight path planning and analysis to support the beyond-visual-line-of-sight or virtual-line-of-sight capability (using its local camera pole) that eliminates the physical presence requirement for the unmanned vehicle pilot or operator in order to safely fly the unmanned vehicle and also meet the local regulation requirements for drone flights. Further improvements in the virtual command center can be done by utilizing an artificial intelligence (A.I.) feature which can also be called as A.I.-enabled virtual command center, in order to allow an electronic brain or platform to be tasked with certain routines where human-decision making is found to be not sufficient or limiting factor such as rudimentary image search, rudimentary flight path analysis and calculations to determine the optimal flight path to intervene with the drone that is being considered a threat for the critical and high-risk infrastructures.

Reference 1: https://www.arabianbusiness.com/content/375851-drone-costs-100000-minute-loss-to-uae-airports, accessed on Sep. 1, 2018.

Reference 2: 13th World Conference on Transport Research Report which can be find at the following website: http://www.wctrs-society.com/wp-content/uploads/abstracts/rio/selected/1621.pdf, accessed on Sep. 1, 2018.

Reference 3: https://phys.org/news/2017-02-airline-airport-economy-billions-losses.html, accessed on Sep. 1, 2018.

The embodiments can also be described with the following lists of features or elements being organized into an item list. The respective combinations of features, which are disclosed in the item list, are regarded as independent subject matter, respectively, that can also be combined with other features of the application.

1. A hydrogen aviation eco-system that is comprised of;
   a hydrogen-electric aircraft
   solar cells or photovoltaic cells placed over the wing
   distributed and interchangeable electric propulsion pods that utilize fuel cells and hydrogen to generate electricity from the electrochemical reaction of hydrogen and oxygen and transfer of this power to the hydrogen-electric aircraft
   an autonomous refueling/recharging infrastructure to recharge the distributed and interchangeable electric propulsion pods with different forms of hydrogen fuel and also aid during the takeoff period
   where a hydrogen-electric aircraft has a wing with solar cells or photovoltaic cells spread across the wing, contains a battery module inside the fuselage to store electricity generated by the solar cells, photovoltaic cells, or distributed and interchangeable electric propulsion pods, has a control module to safely operate all of the on-board equipment and also the aircraft operations altogether, has the capability of using different power schemes such as power solely from solar cell or photovoltaic cells, power solely from battery module, power solely from distributed and interchangeable electric propulsion pods, or any combinations of these depending on the needs of the hydrogen-electric aircraft, has the flexibility of carrying either one-, two-, three- or multiple-distributed and interchangeable electric propulsion pods which have the capability of being autonomously refueled through an interface located on the distributed and interchangeable electric propulsion pods with the aid of autonomous ground refueling vehicles,
   where the distributed and interchangeable electric propulsion pods are comprised of a hydrogen storage medium such as a hydrogen cylinder, cartridge, or pod (with the capability of carrying different forms of hydrogen), a fuel cell module to produce electrical energy from the electrochemical reaction of hydrogen and oxygen inside of a fuel cell hardware, a battery module to either store electrical energy (from solar cells, photovoltaic cells, or distributed and interchangeable electric propulsion pods) or provide electrical energy back to the aircraft, a control module (electrical, electronics, data, communication, etc.) to safely operate all of the components/systems located inside the propulsion pod, a power management and regulation module to control the power output of the power generating and storing devices located inside of the propulsion pod, a gearbox to improve the power utilization and conversion efficiency from propeller to power pod architecture, an interface to connect the propulsion pods to the propeller and to the aircraft for its safe operation depending on the needs of the aircrafts, an interface for propulsion pods to refuel/recharge the depleted hydrogen storage medium, a plumbing set to carry the hydrogen fuel from the refueling/recharging interface to the hydrogen fuel storage cylinder, cartridge, or pod, an interface between the hydrogen storage cylinder, cartridge, or pod to the fuel cell module, and a lock/unlock mechanism to easily attach the distributed and interchangeable pods to the hydrogen-electric aircraft,
   where an autonomous refueling/recharging infrastructure is comprised of autonomous ground refueling vehicles to remove, refuel, and reinstall the propulsion pods, autonomously operating hydrogen storage, generation, and delivery infrastructure, autonomously operating hydrogen carrying supply tanks or dispensing hydrogen fuel via discharge points located inside/outside of a building, warehouse, or hangar or supplying hydrogen by means of manned ground supply tankers, and also an autonomous mobile catapult system with batteries to assist during the takeoff,
   where autonomous ground refueling vehicles have the capability of removing the distributed and interchangeable electric propulsion pods from the solar wing with the aid of robotic solutions, storing the depleted pods during towage for refueling process, autonomously connecting to the hydrogen discharge points located on the autonomous ground hydrogen carrying supply tank or hydrogen discharge points located on the walls of a building, warehouse, hangar, etc. or connecting to a manned ground supply tanker, and complete the refueling, disconnect from the hydrogen discharge points, tow back the charged propulsion pods to the hydrogen-electric aircraft locations, and re-attach the charged pods to the aircraft with the aid of robotic solutions
   where the autonomously operating hydrogen storage, generation, and delivery infrastructure is comprised of a hydrogen storage, hydrogen generation, hydrogen liquefaction, and hydrogen dispensing module either by themselves as a standalone unit or having a combination of these according to the need of the hydrogen-electric aircraft and all of these systems located inside/outside a building, warehouse, or hangar
   where the autonomously operating hydrogen carrying supply tanks are based on the autonomous vehicle architecture/design that has a hydrogen storage section, charging capability to refuel the hydrogen storage section with hydrogen fuel, an autonomous ground vehicle section that will transport the stored hydrogen inside the supply tank to the autonomous ground refueling vehicle that carries the depleted propulsion pods, having an interface on the autonomous ground hydrogen supply tank to allow a connection be established between the autonomous ground refueling vehicle and autonomous ground hydrogen supply tank, and a hydrogen fuel transfer line between the autonomous ground refueling vehicle and autonomous ground hydrogen supply tank, and depending on the need, there may be occasions where an operator assistance or intervention may needed and a manned ground hydrogen supply tanker may also become part of the hydrogen aviation eco-system,
   where the autonomously operating mobile catapult system has sufficient battery modules in order to store ample amount of electrical energy and then provide this energy to the hydrogen electric-aircraft during the take off period, furthermore, the autonomously operating mobile catapult system has the capability of carrying the entire hydrogen-electric aircraft on the runway until the aircraft achieves the takeoff air speed and then autonomously operating mobile catapult system detaches itself from the aircraft automatically with lock/unlock mechanism 2. A hydrogen aviation ecosystem mentioned in item 1 is comprised of:

an autonomous hydrogen-electric aircraft solar cells or photovoltaic cells placed over the wing distributed and interchangeable electric propulsion pods that utilize fuel cells and hydrogen to generate electricity from the electrochemical reaction of hydrogen and oxygen, propulsion pods attached to the hydrogen-electric aircraft and transfer of this power to the hydrogen-electric aircraft winglets to reduce drag fuselage vertical/horizontal stabilizers and rudder distributed and interchangeable electric propulsion pods refueling interface for the distributed and interchangeable electric propulsion pods an autonomous refueling/recharging infrastructure to recharge the distributed and interchangeable electric propulsion pods with different forms of hydrogen fuel and also aid during the takeoff period where the hydrogen-electric aircraft is fully autonomous and has the capability of carrying one-, two-, three-, or multiple-distributed and interchangeable electric propulsion pods, contains a battery module inside the fuselage to store electricity generated by the solar cells or photovoltaic cells or distributed and interchangeable electric propulsion pods, has a control module to safely and autonomously operate all of the on-board equipment and also the aircraft operations altogether, has the capability of using different power schemes such as power solely from solar cell or photovoltaic cells, power solely from battery module, power solely from distributed and interchangeable electric propulsion pods, or any combinations of these depending on the needs of the hydrogen-electric aircraft, has the flexibility of carrying either one, two-, three- or multiple-distributed and interchangeable electric propulsion pods which have the capability of being autonomously refueled through an interface located on the distributed and interchangeable electric propulsion pods with the aid of autonomous ground refueling vehicles, where solar wing has sufficient number of solar cells or photovoltaic cells spread across the wing surface in order to reduce the power generation burden for the distributed and interchangeable electric propulsion pods and electrical energy drawn from the on-board battery module, where winglets are used to reduce the drag in order to increase the aerodynamic feature and energy efficiency characteristics of the hydrogen-electric aircraft where distributed and interchangeable electric propulsion pods are either used in quantities of one, two, three, or multiples, have the capability of storing different forms of hydrogen fuel (such as gaseous hydrogen liquid hydrogen, slurry or solid hydrogen in the form of hydrides), and have lock/unlock mechanism for the attachment to the hydrogen-electric aircraft with robotic solutions or some other similar mechanisms where distributed and interchangeable electric propulsion pods have an interface for refueling of hydrogen fuel to the hydrogen storage medium which is located within the distributed and interchangeable electric propulsion pods where an autonomous refueling/recharging infrastructure is comprised of autonomous ground refueling vehicles to remove, refuel, and reinstall the propulsion pods, autonomously operating hydrogen storage, generation, and delivery infrastructure, autonomously operating hydrogen carrying supply tanks or dispensing hydrogen fuel via discharge points located inside/outside of a building, warehouse, or hangar or supplying hydrogen by means of manned ground supply tankers, and also an autonomous mobile catapult system with batteries to assist during the takeoff, where autonomous ground refueling vehicles have the capability of removing the distributed and interchangeable electric propulsion pods from the solar wing with the aid of robotic solutions, storing the depleted pods during towage for refueling process, autonomously connecting to the hydrogen discharge points located on the autonomous ground hydrogen supply tank or hydrogen discharge points located on the walls of a building, warehouse, hangar, etc. or connecting to manned ground supply tanker, and complete the refueling, then disconnecting from the hydrogen discharge points, then towing back the charged propulsion pods to the hydrogen-electric aircraft locations, and re-attach the charged pods to with the aid of robotic solutions where the autonomously operating hydrogen storage, generation, and delivery infrastructure is comprised of a hydrogen storage, hydrogen generation, hydrogen liquefaction, and hydrogen dispensing modules either by themselves as a standalone unit or having a combination of these according to the need of the hydrogen-electric aircraft and all of these systems located inside/outside of a building, warehouse, or hangar (including the hydrogen farm with modular and autonomous hydrogen generation and refueling modules that are utilizing various forms of renewable energy sources and hybridizing these with batteries, fuel cells, etc.)

where the autonomously operating hydrogen carrying supply tanks are based on the autonomous vehicle architecture/design that has a hydrogen storage section, charging capability to refuel the hydrogen storage section with hydrogen fuel, an autonomous ground vehicle section that will transport the stored hydrogen inside the supply tank to the autonomous ground refueling vehicle that carries the depleted propulsion pods, having an interface on the autonomous ground hydrogen supply tank to allow a connection be established between the autonomous ground refueling vehicle and autonomous ground hydrogen supply tank, and a hydrogen fuel transfer line between the autonomous ground refueling vehicle and autonomous ground hydrogen supply tank, and depending on the need, there may be occasions where an operator assistance or intervention may needed and a manned ground hydrogen supply tanker may also become part of the hydrogen aviation eco-system, where the autonomously operating mobile catapult system has sufficient battery modules in order to store ample amount of electrical energy and then provide this energy to the hydrogen electric-aircraft during the take off period, furthermore, the autonomously operating mobile catapult system has the capability of carrying the entire hydrogen-electric aircraft on the runway until the aircraft achieves the takeoff air speed and then autonomously operating mobile catapult system detaches itself from the aircraft automatically with lock/unlock mechanism 3. An autonomous hydrogen-electric aircraft mentioned in item 2 (For FIG. 1 and FIG. 2) having:
- a hydrogen-electric aircraft with distributed and interchangeable electric propulsion pods and have full autonomous operation capability for its flight to refueling of the propulsion pods and all other activities
- an aircraft wing or aircraft wing with solar cells or photovoltaic cells
- winglets to reduce drag
- fuselage
- vertical/horizontal stabilizers and rudder
- distributed and interchangeable electric propulsion pods refueling interface for the distributed and interchangeable electric propulsion pods
- hybrid battery and its storage area for the command and control system on-board of the hydrogen-electric aircraft cockpit section for the command and control
- propeller that is attached to the wing and interfaced to the distributed and interchangeable electric propulsion pod
- where the hydrogen-electric aircraft has the capability of carrying one-, two-, three-, or multiple-distributed and interchangeable electric propulsion pods, contains a battery module inside the fuselage to store electricity generated by the solar cells or photovoltaic cells or interchangeable electric propulsion pods, has a control module to safely operate all of the on-board equipment and also the aircraft operations altogether, has the capability of using different power schemes such as power solely from solar cell or photovoltaic cells, power solely from battery module, power solely from distributed and interchangeable electric propulsion pods, or any combinations of these depending on the needs of the hydrogen-electric aircraft, has the flexibility of carrying either one-, two-, three- or multiple-distributed and interchangeable electric propulsion pods which have the capability of being autonomously refueled through an interface located on the distributed and interchangeable electric propulsion pods with the aid of autonomous ground refueling vehicles,
- where solar wing has sufficient number of solar cells or photovoltaic cells spread across the wing surface in order to reduce the power generation burden for the distributed and interchangeable electric propulsion pods and electrical energy drawn from the on-board battery module,
- where winglets are used to reduce the drag in order to increase the aerodynamic feature and energy efficiency characteristics of the hydrogen-electric aircraft
- where distributed and interchangeable electric propulsion pods are either used in quantities of one, two, three, or multiples, have the capability of storing different forms of hydrogen fuel (such as gaseous hydrogen liquid hydrogen, slurry or solid hydrogen in the form of hydrides), have the capability of either powering a single propeller or providing electrical energy to another propulsion pod's propeller that has a failed power system (networked energy sharing), and have lock/unlock mechanism for the attachment to the aircraft with robotic or some other similar mechanisms
- where distributed and interchangeable electric propulsion pods have an interface for refueling of hydrogen fuel to the hydrogen storage medium which is located within the distributed and interchangeable electric propulsion pods
- where hybrid battery stores the excess electrical energy that is either coming from the solar cells, photovoltaic cells, or distributed and interchangeable electric propulsion pods, or providing the stored energy back to the systems that need electrical energy
- where a cockpit contains the seating section for passengers and all of the other essential hardware and control modules needed to safely operate the hydrogen-electric aircraft autonomously
- where a propeller is attached to the wing and distributed and interchangeable electric propulsion pods, have the capability of being powered by its own electric propulsion pod or receiving electrical energy from another propulsion pod or receiving electrical energy from multiple other propulsion pods (networked electrical energy sharing)

4. A distributed and interchangeable electric propulsion pod mentioned in item 3 (for FIG. 3 iteration 1) having:
- a refueling interface for the distributed and interchangeable electric propulsion pod
- a refueling line to charge hydrogen into the depleted hydrogen storage medium
- a hydrogen fuel storage medium
- a hydrogen delivery interface to the hydrogen fuel cell stack
- a fuel cell stack module
- a hybrid battery module
- a control module
- an interface to connect the distributed and interchangeable electric propulsion pod to a propeller and to the command/control system of the aircraft
- an electric motor
- an interface to connect the propeller to the electric motor and distributed and interchangeable electric propulsion pod a lock/unlock mechanism
- where the refueling interface exists on the surface propulsion pod, allows an easy charging of hydrogen fuel to the hydrogen storage medium by connecting to the discharge points located on the autonomous ground refueling vehicles,
- where distributed and interchangeable pods have the capability of storing and utilizing different forms of hydrogen fuels such as gaseous hydrogen, liquid hydrogen, slurry and solid hydrogen in the form of hydrides,
- where distributed and interchangeable pods are directly connected to the electrical motor section in order to energize the propellers
- where distributed and interchangeable pods have the capability of either powering their own propellers or providing some their electrical energy to the propellers connected to other pods via networked electrical energy sharing mechanism where electrical energy generated in a functional propulsion pod is diverted to another pod where the power system has failed where the lock/unlock mechanism provides an easy method for autonomous removal of the propulsion pods with the aid of robotic solutions or some other similar mechanisms 5. A distributed and interchangeable electric propulsion pod mentioned in item 4 (for FIG. 3, iteration 2) having:
- a refueling interface for the distributed and interchangeable electric propulsion pod
- a refueling line to charge hydrogen into the depleted hydrogen storage medium
- a hydrogen fuel storage medium
- a hydrogen delivery interface to the hydrogen fuel cell stack
- a fuel cell stack module
- a hybrid battery module

- a control module
- an interface to connect the distributed and interchangeable electric propulsion pod to a propeller and to the command/control system of the aircraft
- an electric motor
- an electric gearbox or an electric gear
- an interface to connect the propeller to the electric motor and distributed and interchangeable electric propulsion pod
- a lock/unlock mechanism
- where the refueling interface exists on the surface propulsion pod, allows an easy charging of hydrogen fuel to the hydrogen storage medium by connecting to the discharge points located on the autonomous ground refueling vehicles,
- where distributed and interchangeable pods have the capability of storing and utilizing different forms of hydrogen fuels such as gaseous hydrogen, liquid hydrogen, slurry and solid hydrogen in the form of hydrides,
- where distributed and interchangeable pods are first connected to the electric gearbox or gear, then electrical gearbox or gear connected to the electrical motor and then electrical motor is connected to the shaft of the propeller in order to energize the propeller in order to optimize the gear ratio between the electric motor and fuel cell subsystems for the sake of further improving the energy efficiency of the hydrogen-electric aircraft
- where distributed and interchangeable pods have the capability of either powering their own propellers or providing some electrical energy to the propellers connected to other pods via networked electrical energy sharing mechanism where electrical energy generated in a functional propulsion pod is diverted to another pod where the power system has failed
- where the lock/unlock mechanism provides an easy method for autonomous removal of the propulsion pods with the aid of robotic solutions or some other similar mechanisms 6. An autonomous ground refueling vehicle mentioned in item 2 (For FIG. 4) having:
- an autonomous ground refueling vehicle or multiple vehicles a robotic arm or robotic grasping mechanism or multiple robotic arms or robotic grasping mechanisms
- a storage section (or multiple storage sections) for storing charged or depleted distributed and interchangeable electric propulsion pods
- a discharge port (or multiple discharge ports) for hydrogen fuel transfer from the autonomous ground vehicle to the depleted distributed and interchangeable electric propulsion pods
- a hydrogen fuel manifold to supply hydrogen fuel to the hydrogen fuel discharge port and then to the hydrogen storage medium of the propulsion pod
- a hydrogen receiving point and receiving mechanism located on the autonomous ground refueling vehicle to receive hydrogen from the supply tanks, from the hydrogen discharge points existing on a building, warehouse or a hangar, or for receiving hydrogen from a manned ground supply tankers,
- where the autonomous ground refueling vehicle has either single or multiple robotic arms or robotic grasping mechanisms that has/have the capability of removing the depleted distributed and interchangeable electric propulsion pods simultaneously from the hydrogen-electric aircraft, then securing it on the autonomous ground refueling vehicle, then orient the depleted propulsion pods to match the refueling interface located on the propulsion pod to the hydrogen discharge point or interface located on the storage section of the autonomous ground refueling vehicle, then send a signal to hydrogen fuel supply tank or building, warehouse or hanger control module, or manned ground refueling tanker to initiate the discharge or refueling of hydrogen fuel, monitor the level of fueling, and then stop the fueling, has the capability of disengaging from the hydrogen fuel supply tank or building, warehouse or hangar's discharge points, or manned ground refueling tanker's discharge point autonomously, then tow back the charged propulsion pods to the aircraft location, then re-install the charged propulsion pods to the solar wing with the aid of robotic arms or robotic grasping mechanisms to the lock/unlock mechanisms existing on the aircraft structure,
- where all of the discharge ports for hydrogen fuel transfer from the autonomous ground refueling vehicle are connected to the common hydrogen fuel manifold that also exists on the autonomous ground refueling vehicle to charge all of the depleted propulsion pods simultaneously and significantly reduce the amount of refueling time,
- where the autonomous ground refueling vehicle has the capability of approaching to the hydrogen-electric aircraft from a perpendicular direction and have the mono-directional steering mechanism for the wheels and moving away from the hydrogen-electric aircraft from a perpendicular direction by using its mono-directional steering mechanism for the wheels 7. An autonomous ground refueling vehicle mentioned in item 6 (For FIG. 5) having:
- an autonomous ground refueling vehicle or multiple vehicles with elevator type lifting and lowering mechanisms, an autonomous ground refueling vehicle or multiple vehicles with elevator type lifting and lowering mechanisms that is located on the top of a base section of the autonomous ground refueling vehicle to carry the elevator section of the autonomous ground refueling vehicle with lift and catch mechanism, a "lift and catch" mechanism or multiple of these "lift and catch" mechanisms,
- a storage section (or multiple storage sections) for storing charged or depleted distributed and interchangeable electric propulsion pods,
- a discharge port (or multiple discharge ports) for hydrogen fuel transfer from the autonomous ground vehicle to the depleted distributed and interchangeable electric propulsion pods,
- a hydrogen fuel manifold to supply hydrogen fuel to the hydrogen fuel discharge ports and then to the hydrogen storage medium of the propulsion pod,
- a hydrogen receiving point and receiving mechanism located on the autonomous ground refueling vehicle to receive hydrogen from the supply tanks, from the hydrogen discharge points existing on a building, warehouse or a hangar, or for receiving hydrogen from a manned ground supply tanker,
- where the autonomous ground refueling vehicle has either single or multiple "lift and catch" mechanisms that has/have the capability of removing the depleted distributed and interchangeable electric propulsion pods simultaneously from the aircraft, then securing it on the autonomous ground refueling vehicle, then orient the depleted propulsion pods to match the refueling interface located on the propulsion pod to the hydrogen discharge point or interface located on the storage section of the autonomous ground refueling vehicle, send a signal to autonomous ground hydrogen fuel supply tank or building, warehouse or hanger's control module, or manned ground refueling tanker's control module to initiate the discharge or refueling of hydrogen fuel, monitor the level of fueling, and then stop the fueling, has the capability of disengaging from the hydrogen fuel supply tank or building, warehouse or hanger's discharge points, or manned ground refueling tanker's discharge point, then tow back the charged propulsion pods to the hydrogen-electric aircraft location, then re-install the charged propulsion pods to the aircraft with the aid of "lift and catch" mechanisms where all of the discharge ports for hydrogen fuel transfer from the autonomous ground refueling vehicle are connected to the common hydrogen fuel manifold that also exists on the autonomous ground refueling vehicle to charge all of the depleted propulsion pods simultaneously and significantly reduce the amount of refueling time, where the autonomous ground refueling vehicle has the capability of approaching to the hydrogen-electric aircraft from a perpendicular direction and have the mono-directional steering mechanism for the wheels and then moving away from the hydrogen-electric aircraft from a perpendicular direction by using its mono-directional steering mechanism for the wheels 8. An autonomous ground refueling vehicle mentioned in item 6 (For FIG. 6) having:

an autonomous ground refueling vehicle or multiple vehicles with multi-directional steering design a robotic arm or robotic grasping mechanism or multiple robotic arms or robotic grasping mechanisms a storage section (or multiple storage sections) for storing charged or depleted distributed and interchangeable electric propulsion pods a discharge port (or multiple discharge ports) for hydrogen fuel transfer from the autonomous ground vehicle to the depleted distributed and interchangeable electric propulsion pods a hydrogen fuel manifold to supply hydrogen fuel to the hydrogen fuel discharge port and then to the hydrogen storage medium of the propulsion pod a hydrogen receiving point and receiving mechanism located on the autonomous ground refueling vehicle to receive hydrogen from the supply tanks, from the hydrogen discharge points existing on a building, warehouse or a hangar, or for receiving hydrogen from a manned ground supply tankers, where the autonomous ground refueling vehicle has either single or multiple robotic arms or robotic grasping mechanisms that has/have the capability of removing the depleted distributed and interchangeable electric propulsion pods simultaneously from the aircraft, then securing it on the autonomous ground refueling vehicle, then orient the depleted propulsion pods to match the refueling interface located on the propulsion pod to the hydrogen discharge point or interface located on the storage section of the autonomous ground refueling vehicle, then send a signal to hydrogen fuel supply tank or building, warehouse or hanger control module, or manned ground refueling tanker to initiate the discharge or refueling of hydrogen fuel, monitor the level of fueling, and then stop the fueling, has the capability of disengaging from the hydrogen fuel supply tank or building, warehouse or hanger's discharge points, or manned ground refueling tanker's discharge point autonomously, then tow back the charged propulsion pods to the aircraft location, then re-install the charged propulsion pods to the aircraft with the aid of robotic arms or robotic grasping mechanisms to the lock/unlock mechanisms existing on the aircraft, where all of the discharge ports for hydrogen fuel transfer from the autonomous ground refueling vehicle are connected to the common hydrogen fuel manifold that also exists on the autonomous ground refueling vehicle to charge all of the depleted propulsion pods simultaneously and significantly reduce the amount of refueling time, where the autonomous ground refueling vehicle has the capability of approaching to the hydrogen-electric aircraft from multiple or different directions and have the multi-directional steering mechanism for the wheels and moving away from the hydrogen-electric aircraft from multiple different directions by using its multi-directional steering mechanism for the wheels 9. An autonomous ground refueling vehicle mentioned in item 7 (for FIG. 7) having:

an autonomous ground refueling vehicle or multiple vehicles with elevator type lifting and lowering mechanisms and having the capability of maneuvering in multiple directions with its multi-directional steering design, an autonomous ground refueling vehicle or multiple vehicles with elevator type lifting and lowering mechanisms that is located on the top of a base section of the autonomous ground refueling vehicle to carry the elevator section of the autonomous ground refueling vehicle with lift and catch mechanism, a "lift and catch" mechanism or multiple of these "lift and catch" mechanisms, a storage section (or multiple storage sections) for storing charged or depleted distributed and interchangeable electric propulsion pods, a discharge port (or multiple discharge ports) for hydrogen fuel transfer from the autonomous ground vehicle to the depleted distributed and interchangeable electric propulsion pods, a hydrogen fuel manifold to supply hydrogen fuel to the hydrogen fuel discharge ports and then to the hydrogen storage medium of the propulsion pod, a hydrogen receiving point and receiving mechanism located on the autonomous ground refueling vehicle to receive hydrogen from the supply tanks, from the hydrogen discharge points existing on a building, warehouse or a hangar, or for receiving hydrogen from a manned ground supply tanker, where the autonomous ground refueling vehicle has either single or multiple "lift and catch" mechanisms that has/have the capability of removing the depleted distributed and interchangeable electric propulsion pods simultaneously from the aircraft, then securing it on the autonomous ground refueling vehicle, then orient the depleted propulsion pods to match the refueling interface located on the propulsion pod to the hydrogen discharge point or interface located on the storage section of the autonomous ground refueling vehicle, send a signal to autonomous ground hydrogen fuel supply tank or building, warehouse or hanger's control module, or manned ground refueling tanker's control module to initiate the discharge or refueling of hydrogen fuel, monitor the level of fueling, and then stop the fueling, has the capability of disengaging from the hydrogen fuel supply tank or building, warehouse or hanger's discharge points, or manned ground refueling tanker's discharge point, then tow back the charged propulsion pods to the hydrogen-electric aircraft location, then re-install the charged propulsion pods to the aircraft with the aid of "lift and catch" mechanisms where all of the discharge ports for hydrogen fuel transfer from the autonomous ground refueling vehicle are connected to the common hydrogen fuel manifold that also exists on the autonomous ground refueling vehicle to charge all of the depleted propulsion pods simultaneously and significantly reduce the amount of refueling time, where the autonomous ground refueling vehicle has the capability of approaching to the hydrogen-electric aircraft from multiple different directions and have the multi-directional steering mechanism for the wheels and then moving away from the hydrogen-electric aircraft from multiple different directions by using its multi-directional steering mechanism for the wheels 10. An autonomous ground hydrogen supply tank mentioned in item 1 or item 2 (for FIG. 8) having:

an autonomous ground hydrogen supply tank with the capability of maneuvering in single direction with its mono-directional steering design, a hydrogen storage medium located within the autonomous ground hydrogen supply tank hydrogen fuel stored in the autonomous ground hydrogen supply tank an interface between the hydrogen fuel supply tank and hydrogen transfer line to move hydrogen fuel from the hydrogen fuel supply tank to the autonomous ground refueling vehicle a hydrogen transfer line from hydrogen supply tank to autonomous ground refueling vehicle to discharge the hydrogen fuel from the autonomous ground hydrogen supply tank to the autonomous ground refueling vehicle's common hydrogen manifold a hydrogen receiving point and receiving mechanism located on the autonomous ground hydrogen supply tank to replenish its hydrogen fuel from the autonomous hydrogen refueling infrastructure, where the autonomous ground hydrogen supply tank has an interface to connect with the autonomous hydrogen refueling vehicle and also use this interface to discharge hydrogen fuel and transfer it to the common manifold via hydrogen transfer line and also has the mono-directional steering capability for its maneuvering and approaching to the autonomous ground refueling vehicle carrying the depleted distributed and interchangeable electric propulsion pods where the autonomous ground hydrogen supply tank has an interface or a discharge point that can match the hydrogen receiving point and receiving mechanism located on the autonomous hydrogen refueling vehicle without the need of a hydrogen transfer line where the autonomous ground hydrogen supply tank has the capability of carrying and dispensing different forms of hydrogen fuel (such as gaseous, liquid, slurry or solid) depending on the need of the flight mission or aircraft mission An autonomous ground hydrogen supply tank mentioned in item 10 (for FIG. 9) having:

an autonomous ground hydrogen supply tank with the capability of maneuvering in multiple different directions with its multi-directional steering design, a hydrogen storage medium located within the autonomous ground hydrogen supply tank hydrogen fuel stored in the autonomous ground hydrogen supply tank an interface between the hydrogen fuel supply tank and hydrogen transfer line to move hydrogen fuel from the hydrogen fuel supply tank to the autonomous ground refueling vehicle a hydrogen transfer line from hydrogen supply tank to autonomous ground refueling vehicle to discharge the hydrogen fuel from the autonomous ground hydrogen supply tank to the autonomous ground refueling vehicle's common hydrogen manifold a hydrogen receiving point and receiving mechanism located on the autonomous ground hydrogen supply tank to replenish its hydrogen fuel from the autonomous hydrogen refueling infrastructure, where the autonomous ground hydrogen supply tank has an interface to connect with the autonomous hydrogen refueling vehicle and also use this interface to discharge hydrogen fuel and transfer it to the common manifold via hydrogen transfer line and also has the multi-directional steering capability for its maneuvering and approaching to the autonomous ground refueling vehicle carrying the depleted distributed and interchangeable electric propulsion pods from multiple direct directions and also moving away from multiple direct directions using the same steering mechanism where the autonomous ground hydrogen supply tank has an interface or a discharge point that can match the hydrogen receiving point and receiving mechanism located on the autonomous hydrogen refueling vehicle without the need of a hydrogen transfer line where the autonomous ground hydrogen supply tank has the capability of carrying and dispensing different forms of hydrogen fuel (such as gaseous, liquid, slurry or solid) depending on the need of the flight mission or aircraft mission 12 An autonomous gaseous hydrogen refueling infrastructure mentioned in item 1 or item 2 (for FIG. 10) having:

an autonomous hydrogen refueling setup with hydrogen storage or hydrogen generator or hydrogen liquefier and a hydrogen fuel plumbing/interface an autonomous ground refueling vehicle or multiple of these vehicles carrying the depleted distributed and interchangeable electric propulsion pods for refueling with hydrogen fuel and has/have the capability of either mono-directional or multidirectional steering mechanisms a storage section (or multiple storage sections) for storing charged or depleted distributed and interchangeable electric propulsion pods located on the autonomous ground refueling vehicle or vehicles a discharge port (or multiple discharge ports) located on the autonomous ground refueling vehicle for hydrogen fuel transfer from the autonomous ground vehicle to the depleted distributed and interchangeable electric propulsion pods a hydrogen fuel manifold located on the autonomous ground refueling vehicle to supply hydrogen fuel to the hydrogen fuel discharge port and then to the hydrogen storage medium of the propulsion pod a hydrogen receiving point and receiving mechanism located on the autonomous ground refueling vehicle to receive hydrogen from the hydrogen discharge points existing on a building, warehouse or a hangar, a hydrogen discharge point and discharge mechanism located on the building, warehouse, or hangar infrastructure to discharge the hydrogen from the building, warehouse, or hangar's infrastructure to the main hydrogen fuel transfer line inside a building such as hydrogen refueling warehouse or hydrogen refueling hangar, then to the hydrogen discharge point and discharge mechanism located on an easily accessible surface of the building, warehouse, or hangar a power supply where the autonomous ground refueling vehicle carrying the depleted distributed and interchangeable electric propulsion pods establishes a safe connection between its hydrogen receiving mechanism and the hydrogen discharge mechanism located on the building, warehouse, or hangar's infrastructure where either a single or multiple autonomous ground vehicles can be connected to the hydrogen discharge mechanisms located on the building, warehouse, or hangar's infrastructure where the autonomous hydrogen refueling infrastructure located within the building, warehouse, or hangar's infrastructure has the capability of dispensing different forms of hydrogen fuel (such as gaseous, liquid, slurry or solid) depending on the needs of the hydrogen-electric aircraft 13. An autonomous liquid hydrogen refueling infrastructure mentioned in item 1 or item 2 (for FIG. 11) having:

an autonomous liquid hydrogen generator and dispensing infrastructure a hydrogen storage or hydrogen generation module located within the autonomous liquid hydrogen generation infrastructure a set of compressors, booster pump, gas cleanup and all other essential balance of plant components needed to prepare the hydrogen for liquefaction step a hydrogen liquefier module with either single or multiple hydrogen liquefier devices an autonomous ground refueling vehicle or multiple of these vehicles carrying the depleted distributed and interchangeable electric propulsion pods for refueling with hydrogen fuel and has/have the capability of either mono-directional or multidirectional steering mechanisms a storage section (or multiple storage sections) for storing charged or depleted distributed and interchangeable electric propulsion pods located on the autonomous ground refueling vehicle or vehicles a discharge port (or multiple discharge ports) located on the autonomous ground refueling vehicle for liquid hydrogen fuel transfer from the autonomous ground vehicle to the depleted distributed and interchangeable electric propulsion pods Liquid hydrogen transfer lines existing on the autonomous ground refueling vehicle to move the liquid hydrogen from liquid hydrogen dispenser to the depleted distributed and interchangeable electric propulsion pods a hydrogen receiving point and receiving mechanism located on the autonomous ground refueling vehicle to receive the liquid hydrogen from the liquid hydrogen discharge points existing on a building, warehouse or a hangar a hydrogen discharge point and discharge mechanism located on the building, warehouse, or hangar infrastructure to discharge the liquid hydrogen from the building, warehouse, or hangar's infrastructure to the main hydrogen fuel transfer line inside a building such as hydrogen refueling warehouse or hydrogen refueling hangar, then to the hydrogen discharge point and discharge mechanism located on an easily accessible surface of the building, warehouse, or hangar a power supply where the autonomous ground refueling vehicle carrying the depleted distributed and interchangeable electric propulsion pods establishes a safe connection between its hydrogen receiving mechanism and the liquid hydrogen discharge mechanism located on the building, warehouse, or hangar's infrastructure where either a single or multiple autonomous ground vehicles can be connected to the liquid hydrogen discharge mechanisms located on the building, warehouse, or hangar's infrastructure where the autonomous liquid hydrogen refueling infrastructure located within the building, warehouse, or hangar's infrastructure has the capability of utilizing different sources of power supply such as solar, wind, battery, fuel cell, external generators sets, power from a vehicle engine, or any combinations of these for its autonomous operation 14. A hydrogen aviation eco-system, with a manned ground hydrogen supply tanker, mentioned in item 1 or item 2 (for FIG. 12) having:

a hydrogen-electric aircraft (with or without autonomous capability)

solar cells or photovoltaic cells placed over the wing distributed and interchangeable electric propulsion pods that utilize fuel cells and hydrogen to generate electricity from the electrochemical reaction of hydrogen and oxygen and transfer of this power to the hydrogen-electric aircraft an autonomous refueling/recharging infrastructure to recharge the distributed and interchangeable electric propulsion pods with different forms of hydrogen fuel and also aid during the takeoff period a manned ground hydrogen supply tanker with the capability of maneuvering in single direction with its mono-directional steering design, a hydrogen storage medium located within the manned hydrogen supply tanker hydrogen fuel stored in the manned ground hydrogen supply tanker an interface between the manned hydrogen fuel supply tanker and hydrogen transfer line to move hydrogen fuel from the manned hydrogen fuel supply tanker to the autonomous ground refueling vehicle a hydrogen transfer line from the manned hydrogen supply tanker to autonomous ground refueling vehicle to discharge the hydrogen fuel from the manned ground hydrogen supply tanker to the autonomous ground refueling vehicle's common hydrogen manifold a hydrogen receiving point and receiving mechanism located on the manned ground hydrogen supply tanker to replenish its hydrogen fuel from the autonomous hydrogen refueling infrastructure, a power supply where the manned ground hydrogen supply tanker has an interface to connect with the autonomous hydrogen refueling vehicle and also use this interface to discharge hydrogen fuel and transfer it to the common manifold via hydrogen transfer line and also has the mono-directional steering capability for its maneuvering and approaching to the autonomous ground refueling vehicle carrying the depleted distributed and interchangeable electric propulsion pods where the manned ground hydrogen supply tanker has an interface or a discharge point that can match the hydrogen receiving point and receiving mechanism located on the autonomous hydrogen refueling vehicle without the need of a hydrogen transfer line where the manned hydrogen fuel supply tanker has the capability of carrying and dispensing different forms of hydrogen fuel (such as gaseous, liquid, slurry or solid) depending on the need of the flight mission or aircraft mission 15. A hydrogen aviation eco-system, with a manned ground hydrogen supply tanker, mentioned in item 14 (for FIG. 13) having:

a hydrogen-electric aircraft (with or without autonomous capability)

solar cells or photovoltaic cells placed over the wing distributed and interchangeable electric propulsion pods that utilize fuel cells and hydrogen to generate electricity from the electrochemical reaction of hydrogen and oxygen and transfer of this power to the hydrogen-electric aircraft an autonomous refueling/recharging infrastructure to recharge the distributed and interchangeable electric propulsion pods with different forms of hydrogen fuel and also aid during the takeoff period a manned ground hydrogen supply tanker with the capability of maneuvering in multiple directions with its multi-directional steering design, a hydrogen storage medium located within the manned hydrogen supply tanker hydrogen fuel stored in the manned ground hydrogen supply tanker an interface between the manned hydrogen fuel supply tanker and hydrogen transfer line to move hydrogen fuel from the manned hydrogen fuel supply tanker to the autonomous ground refueling vehicle a hydrogen transfer line from the manned hydrogen supply tanker to autonomous ground refueling vehicle to discharge the hydrogen fuel from the manned ground hydrogen supply tanker to the autonomous ground refueling vehicle's common hydrogen manifold a hydrogen receiving point and receiving mechanism located on the manned ground hydrogen supply tanker to replenish its hydrogen fuel from the autonomous hydrogen refueling infrastructure, a power supply where the manned ground hydrogen supply tanker has an interface to connect with the autonomous hydrogen refueling vehicle and also use this interface to discharge hydrogen fuel and transfer it to the common manifold via hydrogen transfer line and also has the multi-directional steering capability for its maneuvering and approaching to the autonomous ground refueling vehicle carrying the depleted distributed and interchangeable electric propulsion pods where the manned ground hydrogen supply tanker has an interface or a discharge point that can match the hydrogen receiving point and receiving mechanism located on the autonomous hydrogen refueling vehicle without the need of a hydrogen transfer line where the manned hydrogen fuel supply tanker has the capability of carrying and dispensing different forms of hydrogen fuel (such as gaseous, liquid, slurry or solid) depending on the need of the flight mission or aircraft mission 16. An autonomous hydrogen refueling/exchanging and unmanned vehicle storing station enclosing (For FIG. 15 series) is comprised of:

an unmanned vehicle an unmanned vehicle landing platform that contains a smart device for autonomous landing of the said unmanned vehicle with precise alignment mechanism and doors a communication module a hydrogen refueling/exchanging station a storage section with a moving mechanism for storing and moving charged/unused hydrogen cylinders or cartridges or pods a lifting/descending mechanism to lower the unmanned vehicle to hydrogen cylinder or cartridge or pod exchange area or raise it to the landing platform a hydrogen cylinder or cartridge or pod lifting mechanism with robotic grasping or robotic arm and locking/unlocking mechanism to exchange the depleted hydrogen cylinder or cartridge or pod with a charged/unused cylinder or cartridge or pod a conveyer belt mechanism to transport the depleted hydrogen cylinder or cartridge or pod to the storage section for storing depleted hydrogen cylinder or cartridge or pod a conveyer belt mechanism to transport the charged/unused hydrogen cylinder or cartridge or pod from the storage section for storing charged/unused hydrogen cylinder or cartridge or pod to the location of the hydrogen cylinder or cartridge or pod exchange area a storage section with moving mechanisms for storing and moving depleted hydrogen cylinders or cartridges or pods opening mechanisms for manual maintenance or intervention related activities such as refilling of water, refueling/exchanging hydrogen cylinder, cartridges, or pods or disposal of depleted hydrogen cylinder, cartridges, or pods a weather station or weather station sensor package to monitor and communicate wind speed, wind direction, presence of weather anomalies such as rain, snow, hail, etc., weather temperature, and numerous other weather and external environment related parameters (including hyper-local weather forecasting devices) to the autonomous hydrogen refueling/exchanging and unmanned vehicle storing station or command center for the safe operation of the refueling/exchanging station and of the unmanned vehicle an anti-tamper and/or anti-theft sensor or sensor package to maintain or monitor the safety of the autonomous hydrogen refueling/exchanging and unmanned vehicle storing station and of the unmanned vehicle a security device such as camera to monitor the surroundings of the safety of the autonomous hydrogen refueling/exchanging and unmanned vehicle storing station and of the unmanned vehicle and also provide a mechanism for providing a virtual line of sight for the unmanned vehicle for its safe operation a fence, preferably with an active deterring mechanism such as electrical shock to keep or maintain the safety of the autonomous hydrogen refueling/exchanging and unmanned vehicle storing station a weed-killer (or plant killer) to keep the surrounding area clear or the external of the autonomous hydrogen refueling/exchanging and unmanned vehicle storing station clear off plants and weeds and etc. that may compromise the operation of the autonomous hydrogen refueling/exchanging and unmanned vehicle storing station a power supply that is either utilizing the power of the tow vehicle or battery or fuel cell, or solar, or wind, or a combination of these to power all of the sections or entire operation of the autonomous hydrogen refueling/exchanging and unmanned vehicle storing station where the unmanned vehicle can be of either aerial (multi-rotor, single rotor, VTOL, hybrid VTOL, fixed wing, vertically (perpendicularly) launched or horizontally launched or catapult launched, etc.), ground, maritime, underground, or underwater based vehicle where a hydrogen refueling/recharging/exchanging station has the capability of refueling or recharging or exchanging either one of or multiple of gaseous hydrogen, liquid hydrogen, slurry hydrogen, or solid hydrogen based cylinders, cartridges, or pods for unmanned vehicles where hydrogen refueling/exchanging station, storage sections, and all of the other balance of plant components/sections are all located inside underneath the landing platform 17. An autonomous hydrogen refueling/exchanging and unmanned vehicle storing station stated in item 16 (for FIG. 15 series) is comprised of:
- an unmanned vehicle
- an unmanned vehicle landing platform that contains a smart device for autonomous landing of the said unmanned vehicle with precise alignment mechanism and doors
- a communication module
- a hydrogen refueling/recharging/exchanging station
- a storage section with a moving mechanism for storing and moving charged/unused hydrogen cylinders or cartridges or pods
- a lifting/descending mechanism to lower the unmanned vehicle to hydrogen cylinder or cartridge or pod exchange area or raise it to the landing platform
- a hydrogen cylinder or cartridge or pod lifting mechanism with robotic grasping or robotic arm and locking/unlocking mechanism to exchange the depleted hydrogen cylinder or cartridge or pod with a charged/unused cylinder or cartridge or pod
- a conveyer belt mechanism to transport the depleted hydrogen cylinder or cartridge or pod to the storage section for storing depleted hydrogen cylinder or cartridge or pod
- a conveyer belt mechanism to transport the charged/unused hydrogen cylinder or cartridge or pod from the storage section for storing charged/unused hydrogen cylinder or cartridge or pod to the location of the hydrogen cylinder or cartridge or pod exchange area
- a storage section with moving mechanism for storing and moving depleted hydrogen cylinders or cartridges or pods
- opening mechanisms for manual maintenance or intervention related activities such as refilling of water, refueling/exchanging hydrogen cylinder, cartridges, or pods or disposal of depleted hydrogen cylinder, cartridges, or pods
- a weather station or weather station sensor package to monitor and communicate wind speed, wind direction, presence of weather anomalies such as rain, snow, hail, etc., weather temperature, and numerous other weather and external environment related parameters (including hyper-local weather forecasting devices) to the autonomous hydrogen refueling/exchanging and unmanned vehicle storing station or command center for the safe operation of the refueling/exchanging station and of the unmanned vehicle
- an anti-tamper and/or anti-theft sensor or sensor package to maintain or monitor the safety of the autonomous hydrogen refueling/exchanging and unmanned vehicle storing station and of the unmanned vehicle
- a security device such as camera to monitor the surroundings of the safety of the autonomous hydrogen refueling/exchanging and unmanned vehicle storing station and of the unmanned vehicle and also provide a mechanism for providing a virtual line of sight for the unmanned vehicle for its safe operation
- a fence, preferably with an active deterring mechanism such as electrical shock to keep or maintain the safety of the autonomous hydrogen refueling/exchanging and unmanned vehicle storing station
- a weed-killer (or plant killer) with an integrated insecticide/pesticide killer to keep the surrounding area clear or the external of the autonomous hydrogen refueling/exchanging and unmanned vehicle storing station clear off plants and weeds, insect/pesticide infestations and etc. that may compromise the operation of the autonomous hydrogen refueling/exchanging and unmanned vehicle storing station
- a power supply that is either utilizing the power of the tow vehicle or battery or fuel cell, or solar, or wind, or a combination of these to power all of the sections or entire operation of the autonomous hydrogen refueling/exchanging and unmanned vehicle storing station where the unmanned vehicle can be of either aerial (multi-rotor, single rotor, VTOL, hybrid VTOL, fixed wing, vertically launched or horizontally launched or catapult launched, etc.), ground, maritime, underground, or underwater based vehicle where a hydrogen refueling/recharging station has the capability of refueling or recharging or exchanging either one of or multiple of gaseous hydrogen, liquid hydrogen, slurry hydrogen, or solid hydrogen based cylinders, cartridges, or pods for unmanned vehicles where hydrogen refueling/exchanging station, storage sections, and all of the other balance of plant components/sections are all located inside underneath the landing platform 18. An autonomous hydrogen refueling and unmanned vehicle storing station mentioned in item 16 (For FIG. 15 series) is comprised of:
- an unmanned vehicle
- an unmanned vehicle landing platform that contains a smart device for autonomous landing of the said unmanned vehicle with precise alignment mechanism and doors
- a communication module
- a hydrogen refueling station with the capability of producing liquid hydrogen
- a storage section with a moving mechanism for storing and moving charged/unused hydrogen cylinders or pods
- a lifting/descending mechanism to lower the unmanned vehicle to hydrogen cylinder or pod exchange area or raise it to the landing platform
- a hydrogen cylinder or pod lifting mechanism with robotic grasping or robotic arm and locking/unlocking mechanism to exchange the depleted hydrogen cylinder or pod with a charged cylinder or pod
- a conveyer belt mechanism to transport the depleted hydrogen cylinder or pod to the storage section for storing depleted hydrogen cylinder or pod
- a conveyer belt mechanism to transport the charged/unused hydrogen cylinder o or pod from the storage section for storing charged/unused hydrogen cylinder or pod to the location of the hydrogen cylinder or pod exchange area a storage section with moving mechanism for storing and moving depleted hydrogen cylinders or pods opening mechanisms for manual maintenance or intervention related activities such as refilling of water, refueling hydrogen cylinder or pods or disposal of depleted hydrogen cylinder, cartridges, or pods a weather station or weather station sensor package to monitor and communicate wind speed, wind direction, presence of weather anomalies such as rain, snow, hail, etc., weather temperature, and numerous other weather and external environment related parameters (including hyper-local weather forecasting devices) to the autonomous hydrogen refueling and unmanned vehicle storing station or command center for the safe operation of the refueling station and of the unmanned vehicle an anti-tamper and/or anti-theft sensor or sensor package to maintain or monitor the safety of the autonomous hydrogen refueling and unmanned vehicle storing station and of the unmanned vehicle a security device such as camera to monitor the surroundings of the safety of the autonomous hydrogen refueling and unmanned vehicle storing station and of the unmanned vehicle and also provide a mechanism for providing a virtual line of sight for the unmanned vehicle for its safe operation a fence, preferably with an active deterring mechanism such as electrical shock to keep or maintain the safety of the autonomous hydrogen refueling and unmanned vehicle storing station a weed-killer (or plant killer) to keep the surrounding area clear or the external of the autonomous hydrogen refueling and unmanned vehicle storing station clear off plants and weeds and etc. that may compromise the operation of the autonomous hydrogen refueling and unmanned vehicle storing station a power supply that is either utilizing the power of the tow vehicle or battery or fuel cell, or solar, or wind, or a combination of these to power all of the sections or entire operation of the autonomous hydrogen refueling and unmanned vehicle storing station where the unmanned vehicle can be of either aerial (multi-rotor, single rotor, VTOL, hybrid VTOL, fixed wing, vertically launched or horizontally launched or catapult launched, etc.), ground, maritime, underground, or underwater based vehicle where a hydrogen refueling station has the capability of refueling liquid hydrogen for unmanned vehicles where the liquid hydrogen is being produced either from the liquefaction of the hydrogen gas contained inside a pressurized cylinder with a hydrogen liquefier device or hydrogen gas is initially generated with the aid of an electrolyzer and then liquified with a hydrogen liquefier device where hydrogen refueling station, storage sections, and all of the other balance of plant components/sections are all located inside the landing platform 19. An autonomous hydrogen refueling and unmanned vehicle storing station mentioned in item 17 (For FIG. 15 series):

an unmanned vehicle an unmanned vehicle landing platform that contains a smart device for autonomous landing of the said unmanned vehicle with precise alignment mechanism and doors a communication module a hydrogen refueling station with the capability of producing liquid hydrogen a storage section with a moving mechanism for storing and moving charged hydrogen cylinders or pods a lifting/descending mechanism to lower the unmanned vehicle to hydrogen cylinder or pod exchange area or raise it to the landing platform a hydrogen cylinder or pod lifting mechanism with robotic grasping or robotic arm and locking/unlocking mechanism to exchange the depleted hydrogen cylinder or pod with a charged cylinder or pod a conveyer belt mechanism to transport the depleted hydrogen cylinder or pod to the storage section for storing depleted hydrogen cylinder or pod a conveyer belt mechanism to transport the charged hydrogen cylinder or pod from the storage section for storing charged hydrogen cylinder or pod to the location of the hydrogen cylinder or pod exchange area a storage section with moving mechanism for storing and moving depleted hydrogen cylinders or pods opening mechanisms for manual maintenance or intervention related activities such as refilling of water, refueling hydrogen cylinder or pods or disposal of depleted hydrogen cylinder or pods a weather station or weather station sensor package to monitor and communicate wind speed, wind direction, presence of weather anomalies such as rain, snow, hail, etc., weather temperature, and numerous other weather and external environment related parameters (including hyper-local weather forecasting devices) to the autonomous hydrogen refueling and unmanned vehicle storing station or command center for the safe operation of the refueling station and of the unmanned vehicle an anti-tamper and/or anti-theft sensor or sensor package to maintain or monitor the safety of the autonomous hydrogen refueling and unmanned vehicle storing station and of the unmanned vehicle a security device such as camera to monitor the surroundings of the safety of the autonomous hydrogen refueling and unmanned vehicle storing station and of the unmanned vehicle and also provide a mechanism for providing a virtual line of sight for the unmanned vehicle for its safe operation a fence, preferably with an active deterring mechanism such as electrical shock to keep or maintain the safety of the autonomous hydrogen refueling and unmanned vehicle storing station a weed-killer (or plant killer) with an integrated insecticide/pesticide killer to keep the surrounding area clear or the external of the autonomous hydrogen refueling and unmanned vehicle storing station clear off plants and weeds, insect/pesticide infestations and etc. that may compromise the operation of the autonomous hydrogen refueling and unmanned vehicle storing station a power supply that is either utilizing the power of the tow vehicle or battery or fuel cell, or solar, or wind, or a combination of these to power all of the sections or entire operation of the autonomous hydrogen refueling and unmanned vehicle storing station where the unmanned vehicle can be of either aerial (multi-rotor, single rotor, VTOL, hybrid VTOL, fixed wing, vertically launched or horizontally launched or catapult launched, etc.), ground, maritime, underground, or underwater based vehicle where a hydrogen refueling station has the capability of refueling liquid hydrogen for unmanned vehicles where the liquid hydrogen is being produced either from the liquefaction of the hydrogen gas contained inside a pressurized cylinder with a hydrogen liquefier device or hydrogen gas is initially generated with the aid of an electrolyzer and then liquified with a hydrogen liquefier device where hydrogen refueling station, storage sections, and all of the other balance of plant components/sections are all located inside the landing platform 20. An autonomous hydrogen refueling and unmanned vehicle storing station mentioned in item 17 (For FIG. 25):
an unmanned vehicle
an unmanned vehicle landing platform that contains a smart device for autonomous landing of the said unmanned vehicle with precise alignment mechanism and doors
a communication module
a hydrogen refueling station
a storage section with a moving mechanism for storing and moving charged/depleted hydrogen cylinders or pods
a lifting/descending mechanism to move the unmanned vehicle to hydrogen cylinder or pod exchange area or raise it to the landing platform
a hydrogen cylinder or pod lifting mechanism with robotic grasping or robotic arm and locking/unlocking mechanism to exchange the depleted hydrogen cylinder or pod with a charged cylinder or pod
a conveyer belt mechanism to transport the charged/depleted hydrogen cylinder or pod to the storage section or to the hydrogen cylinder or pod exchange area
opening mechanisms for manual maintenance or intervention related activities such as refueling hydrogen cylinder or pods or disposal of depleted hydrogen cylinder or pods
a weather station or weather station sensor package to monitor and communicate wind speed, wind direction, presence of weather anomalies such as rain, snow, hail, etc., weather temperature, and numerous other weather and external environment related parameters (including hyper-local weather forecasting devices) to the autonomous hydrogen refueling and unmanned vehicle storing station or command center for the safe operation of the refueling station and of the unmanned vehicle
an anti-tamper and/or anti-theft sensor or sensor package to maintain or monitor the safety of the autonomous hydrogen refueling and unmanned vehicle storing station and of the unmanned vehicle
a security device such as camera to monitor the surroundings of the safety of the autonomous hydrogen refueling and unmanned vehicle storing station and of the unmanned vehicle and also provide a mechanism for providing a virtual line of sight for the unmanned vehicle for its safe operation
a fence, preferably with an active deterring mechanism such as electrical shock to keep or maintain the safety of the autonomous hydrogen refueling and unmanned vehicle storing station
a weed-killer (or plant killer) with an integrated insecticide/pesticide killer to keep the surrounding area clear or the external of the autonomous hydrogen refueling and unmanned vehicle storing station clear off plants and weeds, insect/pesticide infestations and etc. that may compromise the operation of the autonomous hydrogen refueling and unmanned vehicle storing station
a power supply that is either utilizing the power of the tow vehicle or battery or fuel cell, or solar, or wind, or a combination of these to power all of the sections or entire operation of the autonomous hydrogen refueling and unmanned vehicle storing station
where the unmanned vehicle can be of either aerial (multi-rotor, single rotor, VTOL, hybrid VTOL, fixed wing, vertically launched or horizontally launched or catapult launched, etc.), ground, maritime, underground, or underwater based vehicle
where a hydrogen refueling station has the capability of refueling or recharging of gaseous hydrogen for unmanned vehicles where the gaseous hydrogen is being initially stored at a lower pressure than the capability of onboard hydrogen storage cylinder and then transferred to the on-board storage cylinder or cartridge or pod with the aid of primary compressor, secondary compressor or a booster pump to a much higher pressure
where hydrogen refueling station, storage sections, and all of the other balance of plant components/sections are all located nearby (meaning next to) the landing platform in order to improve the modularity of the design for transportation purposes 21. An autonomous hydrogen refueling and unmanned vehicle storing station mentioned in item 20 For FIG. 26):
an unmanned vehicle
an unmanned vehicle landing platform that contains a smart device for autonomous landing of the said unmanned vehicle with precise alignment mechanism and doors
a communication module
a hydrogen refueling/recharging station
a storage section with a moving mechanism for storing and moving charged/depleted hydrogen cylinders or pods
a lifting/descending mechanism to move the unmanned vehicle to hydrogen cylinder or pod exchange area or raise it to the landing platform
a hydrogen cylinder or pod lifting mechanism with robotic grasping or robotic arm and locking/unlocking mechanism to exchange the depleted hydrogen cylinder or pod with a charged cylinder or pod
a conveyer belt mechanism to transport the charged/depleted hydrogen cylinder or pod to the storage section or to the hydrogen cylinder or pod exchange area
opening mechanisms for manual maintenance or intervention related activities such as refueling hydrogen cylinder or pods or disposal of depleted hydrogen cylinder or pods
a weather station or weather station sensor package to monitor and communicate wind speed, wind direction, presence of weather anomalies such as rain, snow, hail, etc., weather temperature, and numerous other weather and external environment related parameters (including hyper-local weather forecasting devices) to the autonomous hydrogen refueling and unmanned vehicle storing station or command center for the safe operation of the refueling station and of the unmanned vehicle
an anti-tamper and/or anti-theft sensor or sensor package to maintain or monitor the safety of the autonomous hydrogen refueling and unmanned vehicle storing station and of the unmanned vehicle a security device such as camera to monitor the surroundings of the safety of the autonomous hydrogen refueling and unmanned vehicle storing station and of the unmanned vehicle and also provide a mechanism for providing a virtual line of sight for the unmanned vehicle for its safe operation a fence, preferably with an active deterring mechanism such as electrical shock to keep or maintain the safety of the autonomous hydrogen refueling and unmanned vehicle storing station a weed-killer (or plant killer) with an integrated insecticide/pesticide killer to keep the surrounding area clear or the external of the autonomous hydrogen refueling and unmanned vehicle storing station clear off plants and weeds, insect/pesticide infestations and etc. that may compromise the operation of the autonomous hydrogen refueling and unmanned vehicle storing station a power supply that is either utilizing the power of the tow vehicle or battery or fuel cell, or solar, or wind, or a combination of these to power all of the sections or entire operation of the autonomous hydrogen refueling and unmanned vehicle storing station where the unmanned vehicle can be of either aerial (multi-rotor, single rotor, VTOL, hybrid VTOL, fixed wing, vertically launched or horizontally launched or catapult launched, etc.), ground, maritime, underground, or underwater based vehicle where a hydrogen refueling/recharging station has the capability of refueling or recharging of gaseous hydrogen for unmanned vehicles where the gaseous hydrogen is being initially generated with an electrolyzer, then hydrogen gas stream is cleaned out and prepared for intermediate storage via a primary compressor and then then transferred to the on-board storage cylinder or pod with the aid of secondary compressor or a booster pump to a much higher pressure where hydrogen refueling station, storage sections, and all of the other balance of plant components/sections are all located nearby (meaning next to) the landing platform in order to improve the modularity of the design for transportation purposes 22. An autonomous hydrogen refueling and unmanned vehicle storing station mentioned in item 21 (For FIG. 27):
an unmanned vehicle
an unmanned vehicle landing platform that contains a smart device for autonomous landing of the said unmanned vehicle with precise alignment mechanism and doors
a communication module
a hydrogen refueling station
a storage section with a moving mechanism for storing and moving charged/depleted hydrogen cylinders or pods
a lifting/descending mechanism to move the unmanned vehicle to hydrogen cylinder or pod exchange area or raise it to the landing platform
a hydrogen cylinder or pod lifting mechanism with robotic grasping or robotic arm and locking/unlocking mechanism to exchange the depleted hydrogen cylinder or pod with a charged cylinder or pod
a conveyer belt mechanism to transport the charged/depleted hydrogen cylinder or pod to the storage section or to the hydrogen cylinder or pod exchange area opening mechanisms for manual maintenance or intervention related activities such as refueling hydrogen cylinder or pods or disposal of depleted hydrogen cylinder or pods a weather station or weather station sensor package to monitor and communicate wind speed, wind direction, presence of weather anomalies such as rain, snow, hail, etc., weather temperature, and numerous other weather and external environment related parameters (including hyper-local weather forecasting devices) to the autonomous hydrogen refueling and unmanned vehicle storing station or command center for the safe operation of the refueling station and of the unmanned vehicle an anti-tamper and/or anti-theft sensor or sensor package to maintain or monitor the safety of the autonomous hydrogen refueling and unmanned vehicle storing station and of the unmanned vehicle a security device such as camera to monitor the surroundings of the safety of the autonomous hydrogen refueling and unmanned vehicle storing station and of the unmanned vehicle and also provide a mechanism for providing a virtual line of sight for the unmanned vehicle for its safe operation a fence, preferably with an active deterring mechanism such as electrical shock to keep or maintain the safety of the autonomous hydrogen refueling and unmanned vehicle storing station a weed-killer (or plant killer) with an integrated insecticide/pesticide killer to keep the surrounding area clear or the external of the autonomous hydrogen refueling and unmanned vehicle storing station clear off plants and weeds, insect/pesticide infestations and etc. that may compromise the operation of the autonomous hydrogen refueling and unmanned vehicle storing station a power supply that is either utilizing the power of the tow vehicle or battery or fuel cell, or solar, or wind, or a combination of these to power all of the sections or entire operation of the autonomous hydrogen refueling and unmanned vehicle storing station where the unmanned vehicle can be of either aerial (multi-rotor, single rotor, VTOL, hybrid VTOL, fixed wing, vertically launched or horizontally launched or catapult launched, etc.), ground, maritime, underground, or underwater based vehicle where a hydrogen refueling/recharging station has the capability of refueling or recharging of gaseous hydrogen for unmanned vehicles where the gaseous hydrogen is being initially generated with a high pressure electrolyzer and the generated hydrogen gas stream is cleaned out and prepared for intermediate storage without a primary compressor and then then transferred to the on-board storage cylinder or pod with the aid of secondary compressor or a booster pump to a much higher pressure where hydrogen refueling station, storage sections, and all of the other balance of plant components/sections are all located nearby (meaning next to) the landing platform in order to improve the modularity of the design for transportation purposes 23. An autonomous hydrogen refueling and unmanned vehicle storing station mentioned in item 20 (For FIG. 28):
an unmanned vehicle
an unmanned vehicle landing platform that contains a smart device for autonomous landing of the said unmanned vehicle with precise alignment mechanism and doors a communication module a hydrogen refueling station with the capability of producing liquid hydrogen a storage section with a moving mechanism for storing and moving charged/depleted hydrogen cylinders or pods a lifting/descending mechanism to move the unmanned vehicle to hydrogen cylinder or pod exchange area or raise it to the landing platform a hydrogen cylinder or pod lifting mechanism with robotic grasping or robotic arm and locking/unlocking mechanism to exchange the depleted hydrogen cylinder or pod with a charged cylinder or pod a conveyer belt mechanism to transport the charged/depleted hydrogen cylinder or pod to the storage section or to the hydrogen cylinder or pod exchange area opening mechanisms for manual maintenance or intervention related activities such as refueling hydrogen cylinder or pods or disposal of depleted hydrogen cylinder or pods a weather station or weather station sensor package to monitor and communicate wind speed, wind direction, presence of weather anomalies such as rain, snow, hail, etc., weather temperature, and numerous other weather and external environment related parameters (including hyper-local weather forecasting devices) to the autonomous hydrogen refueling and unmanned vehicle storing station or command center for the safe operation of the refueling station and of the unmanned vehicle an anti-tamper and/or anti-theft sensor or sensor package to maintain or monitor the safety of the autonomous hydrogen refueling and unmanned vehicle storing station and of the unmanned vehicle a security device such as camera to monitor the surroundings of the safety of the autonomous hydrogen refueling and unmanned vehicle storing station and of the unmanned vehicle and also provide a mechanism for providing a virtual line of sight for the unmanned vehicle for its safe operation a fence, preferably with an active deterring mechanism such as electrical shock to keep or maintain the safety of the autonomous hydrogen refueling and unmanned vehicle storing station a weed-killer (or plant killer) with an integrated insecticide/pesticide killer to keep the surrounding area clear or the external of the autonomous hydrogen refueling and unmanned vehicle storing station clear off plants and weeds, insect/pesticide infestations and etc. that may compromise the operation of the autonomous hydrogen refueling and unmanned vehicle storing station a power supply that is either utilizing the power of the tow vehicle or battery or fuel cell, or solar, or wind, or a combination of these to power all of the sections or entire operation of the autonomous hydrogen refueling and unmanned vehicle storing station where the unmanned vehicle can be of either aerial (multi-rotor, single rotor, VTOL, hybrid VTOL, fixed wing, vertically launched or horizontally launched or catapult launched, etc.), ground, maritime, underground, or underwater based vehicle where a hydrogen refueling/recharging station has the capability of refueling or recharging of liquid hydrogen for unmanned vehicles where the gaseous hydrogen is being initially stored at a lower pressure, stored at an intermediary storage section with the aid of primary compressor, secondary compressor or a booster pump to a much higher pressure, then this gaseous hydrogen is transformed into liquid hydrogen with the aid of a hydrogen liquefier device and then transferred to the on-board storage cylinder or pod in the liquid hydrogen form where hydrogen refueling station, storage sections, and all of the other balance of plant components/sections are all located nearby (meaning next to) the landing platform in order to improve the modularity of the design for transportation purposes 24. An autonomous hydrogen refueling and unmanned vehicle storing station mentioned in item 21 (For FIG. 29):

an unmanned vehicle an unmanned vehicle landing platform that contains a smart device for autonomous landing of the said unmanned vehicle with precise alignment mechanism and doors a communication module a hydrogen refueling station with the capability of producing liquid hydrogen a storage section with a moving mechanism for storing and moving charged/depleted hydrogen cylinders or pods a lifting/descending mechanism to move the unmanned vehicle to hydrogen cylinder or pod exchange area or raise it to the landing platform a hydrogen cylinder or pod lifting mechanism with robotic grasping or robotic arm and locking/unlocking mechanism to exchange the depleted hydrogen cylinder or pod with a charged cylinder or pod a conveyer belt mechanism to transport the charged/depleted hydrogen cylinder or pod to the storage section or to the hydrogen cylinder or pod exchange area opening mechanisms for manual maintenance or intervention related activities such as refueling hydrogen cylinder or pods or disposal of depleted hydrogen cylinder or pods a weather station or weather station sensor package to monitor and communicate wind speed, wind direction, presence of weather anomalies such as rain, snow, hail, etc., weather temperature, and numerous other weather and external environment related parameters (including hyper-local weather forecasting devices) to the autonomous hydrogen refueling and unmanned vehicle storing station or command center for the safe operation of the refueling station and of the unmanned vehicle an anti-tamper and/or anti-theft sensor or sensor package to maintain or monitor the safety of the autonomous hydrogen refueling and unmanned vehicle storing station and of the unmanned vehicle a security device such as camera to monitor the surroundings of the safety of the autonomous hydrogen refueling and unmanned vehicle storing station and of the unmanned vehicle and also provide a mechanism for providing a virtual line of sight for the unmanned vehicle for its safe operation a fence, preferably with an active deterring mechanism such as electrical shock to keep or maintain the safety of the autonomous hydrogen refueling and unmanned vehicle storing station a weed-killer (or plant killer) with an integrated insecticide/pesticide killer to keep the surrounding area clear or the external of the autonomous hydrogen refueling and unmanned vehicle storing station clear off plants and weeds, insect/pesticide infestations and etc. that may compromise the operation of the autonomous hydrogen refueling and unmanned vehicle storing station a power supply that is either utilizing the power of the tow vehicle or battery or fuel cell, or solar, or wind, or a combination of these to power all of the sections or entire operation of the autonomous hydrogen refueling and unmanned vehicle storing station where the unmanned vehicle can be of either aerial (multi-rotor, single rotor, VTOL, hybrid VTOL, fixed wing, vertically launched or horizontally launched or catapult launched, etc.), ground, maritime, underground, or underwater based vehicle where a hydrogen refueling station has the capability of refueling or recharging of liquid hydrogen for unmanned vehicles where the gaseous hydrogen is being initially generated with an electrolyzer, hydrogen gas stream is cleaned out and prepared for intermediate storage via a primary compressor or secondary compressor or a booster pump, then this gaseous hydrogen is transformed into liquid hydrogen with the aid of a hydrogen liquefier device and then transferred to the on-board storage cylinder or pod in the liquid hydrogen form where hydrogen refueling station, storage sections, and all of the other balance of plant components/sections are all located nearby (meaning next to) the landing platform in order to improve the modularity of the design for transportation purposes 25. An autonomous hydrogen refueling and unmanned vehicle storing station mentioned in item 22 (For FIG. 30):
an unmanned vehicle
an unmanned vehicle landing platform that contains a smart device for autonomous landing of the said unmanned vehicle with precise alignment mechanism and doors
a communication module
a hydrogen refueling station with the capability of producing liquid hydrogen
a storage section with a moving mechanism for storing and moving charged/depleted hydrogen cylinders or pods
a lifting/descending mechanism to move the unmanned vehicle to hydrogen cylinder or pod exchange area or raise it to the landing platform
a hydrogen cylinder or pod lifting mechanism with robotic grasping or robotic arm and locking/unlocking mechanism to exchange the depleted hydrogen cylinder or pod with a charged cylinder or pod
a conveyer belt mechanism to transport the charged/depleted hydrogen cylinder or pod to the storage section or to the hydrogen cylinder or pod exchange area
opening mechanisms for manual maintenance or intervention related activities such as refueling hydrogen cylinder or pods or disposal of depleted hydrogen cylinder or pods
a weather station or weather station sensor package to monitor and communicate wind speed, wind direction, presence of weather anomalies such as rain, snow, hail, etc., weather temperature, and numerous other weather and external environment related parameters (including hyper-local weather forecasting devices) to the autonomous hydrogen refueling and unmanned vehicle storing station or command center for the safe operation of the refueling station and of the unmanned vehicle
an anti-tamper and/or anti-theft sensor or sensor package to maintain or monitor the safety of the autonomous hydrogen refueling and unmanned vehicle storing station and of the unmanned vehicle a security device such as camera to monitor the surroundings of the safety of the autonomous hydrogen refueling and unmanned vehicle storing station and of the unmanned vehicle and also provide a mechanism for providing a virtual line of sight for the unmanned vehicle for its safe operation a fence, preferably with an active deterring mechanism such as electrical shock to keep or maintain the safety of the autonomous hydrogen refueling and unmanned vehicle storing station a weed-killer (or plant killer) with an integrated insecticide/pesticide killer to keep the surrounding area clear or the external of the autonomous hydrogen refueling and unmanned vehicle storing station clear off plants and weeds, insect/pesticide infestations and etc. that may compromise the operation of the autonomous hydrogen refueling and unmanned vehicle storing station a power supply that is either utilizing the power of the tow vehicle or battery or fuel cell, or solar, or wind, or a combination of these to power all of the sections or entire operation of the autonomous hydrogen refueling and unmanned vehicle storing station where the unmanned vehicle can be of either aerial (multi-rotor, single rotor, VTOL, hybrid VTOL, fixed wing, vertically launched or horizontally launched or catapult launched, etc.), ground, maritime, underground, or underwater based vehicle where a hydrogen refueling station has the capability of refueling liquid hydrogen for unmanned vehicles where the gaseous hydrogen is being initially generated with a high pressure electrolyzer and the generated hydrogen gas stream is cleaned out and prepared for intermediate storage without a primary compressor and then then transferred to the on-board storage cylinder or cartridge or pod with the aid of secondary compressor or a booster pump to a much higher pressure after it is being transformed into liquid hydrogen with the aid of a hydrogen liquefier device where hydrogen refueling station, storage sections, and all of the other balance of plant components/sections are all located nearby (meaning next to) the landing platform in order to improve the modularity of the design for transportation purposes 26. An autonomous hydrogen slurry cartridge exchange and unmanned vehicle storing station mentioned in item 16 (For FIG. 31):
an unmanned vehicle
an unmanned vehicle landing platform that contains a smart device for autonomous landing of the said unmanned vehicle with precise alignment mechanism and doors
a communication module
a hydrogen slurry cartridge exchange station
a storage section with a moving mechanism for storing and moving charged/depleted hydrogen slurry cartridges or pods
a lifting/descending mechanism to move the unmanned vehicle to hydrogen slurry cartridge or pod exchange area or to raise it to the landing platform
a hydrogen slurry cartridge or pod lifting mechanism with robotic grasping or robotic arm and locking/unlocking mechanism to exchange the depleted hydrogen slurry cartridge or pod with an unused cartridge or pod a conveyer belt mechanism to transport the unused/depleted hydrogen slurry cartridge or pod to the storage section or to the hydrogen slurry cartridge or pod exchange area opening mechanisms for manual maintenance or intervention related activities such as exchanging hydrogen slurry cartridges or pods or disposal of depleted hydrogen slurry cartridges or pods a weather station or weather station sensor package to monitor and communicate wind speed, wind direction, presence of weather anomalies such as rain, snow, hail, etc., weather temperature, and numerous other weather and external environment related parameters (including hyper-local weather forecasting devices) to the autonomous hydrogen slurry cartridge exchange and unmanned vehicle storing station or command center for the safe operation of the hydrogen slurry cartridge exchange station and of the unmanned vehicle an anti-tamper and/or anti-theft sensor or sensor package to maintain or monitor the safety of the autonomous hydrogen slurry cartridge exchange and unmanned vehicle storing station and of the unmanned vehicle a security device such as camera to monitor the surroundings of the safety of the autonomous hydrogen slurry cartridge exchange and unmanned vehicle storing station and of the unmanned vehicle and also provide a mechanism for providing a virtual line of sight for the unmanned vehicle for its safe operation a fence, preferably with an active deterring mechanism such as electrical shock to keep or maintain the safety of the autonomous hydrogen slurry cartridge exchange and unmanned vehicle storing station a weed-killer (or plant killer) with an integrated insecticide/pesticide killer to keep the surrounding area clear or the external of the autonomous hydrogen slurry cartridge exchange and unmanned vehicle storing station clear off plants and weeds, insect/pesticide infestations and etc. that may compromise the operation of the autonomous hydrogen slurry cartridge exchange and unmanned vehicle storing station a power supply that is either utilizing the power of the tow vehicle or battery or fuel cell, or solar, or wind, or a combination of these to power all of the sections or entire operation of the autonomous hydrogen slurry cartridge exchange and unmanned vehicle storing station where the unmanned vehicle can be of either aerial (multi-rotor, single rotor, VTOL, hybrid VTOL, fixed wing, vertically launched or horizontally launched or catapult launched, etc.), ground, maritime, underground, or underwater based vehicle where a hydrogen slurry cartridge exchange station has the capability of automatically exchanging hydrogen slurry cartridges for unmanned vehicles where the hydrogen is stored in the form of a slurry based on hydride materials utilizing water or water/alkali solution mixtures with or without a catalyst reactor or with or without a thermally activated mechanism to generate the hydrogen from the hydride materials where hydrogen slurry cartridge exchange station, storage sections, and all of the other balance of plant components/sections are all located nearby (meaning next to) the landing platform in order to improve the modularity of the design for transportation purposes 27. An autonomous hydrogen solid cartridge exchange and unmanned vehicle storing station mentioned in item 16 (For FIG. 32):

an unmanned vehicle an unmanned vehicle landing platform that contains a smart device for autonomous landing of the said unmanned vehicle with precise alignment mechanism and doors a communication module a hydrogen solid cartridge exchange station a storage section with a moving mechanism for storing and moving charged/depleted hydrogen solid cartridges a lifting/descending mechanism to move the unmanned vehicle to hydrogen slurry cartridge exchange area or to raise it to the landing platform a hydrogen slurry cartridge lifting mechanism with robotic grasping or robotic arm and locking/unlocking mechanism to exchange the depleted hydrogen slurry cartridge with a charged cylinder or pod a conveyer belt mechanism to transport the unused/depleted hydrogen slurry cartridge or pod to the storage section or to the hydrogen slurry cartridge or pod exchange area opening mechanisms for manual maintenance or intervention related activities such as refueling hydrogen solid cartridges or disposal of depleted hydrogen solid cartridges a weather station or weather station sensor package to monitor and communicate wind speed, wind direction, presence of weather anomalies such as rain, snow, hail, etc., weather temperature, and numerous other weather and external environment related parameters (including hyper-local weather forecasting devices) to the autonomous hydrogen solid cartridge exchange and unmanned vehicle storing station or command center for the safe operation of the hydrogen solid cartridge exchange station and of the unmanned vehicle an anti-tamper and/or anti-theft sensor or sensor package to maintain or monitor the safety of the autonomous hydrogen solid cartridge exchange and unmanned vehicle storing station and of the unmanned vehicle a security device such as camera to monitor the surroundings of the safety of the autonomous hydrogen solid cartridge exchange and unmanned vehicle storing station and of the unmanned vehicle and also provide a mechanism for providing a virtual line of sight for the unmanned vehicle for its safe operation a fence, preferably with an active deterring mechanism such as electrical shock to keep or maintain the safety of the autonomous hydrogen solid cartridge exchange and unmanned vehicle storing station a weed-killer (or plant killer) with an integrated insecticide/pesticide killer to keep the surrounding area clear or the external of the autonomous hydrogen solid cartridge exchange and unmanned vehicle storing station clear off plants and weeds, insect/pesticide infestations and etc. that may compromise the operation of the autonomous hydrogen solid cartridge exchange and unmanned vehicle storing station a power supply that is either utilizing the power of the tow vehicle or battery or fuel cell, or solar, or wind, or a combination of these to power all of the sections or entire operation of the autonomous hydrogen solid cartridge exchange and unmanned vehicle storing station where the unmanned vehicle can be of either aerial (multi-rotor, single rotor, VTOL, hybrid VTOL, fixed wing, vertically launched or horizontally launched or catapult launched, etc.), ground, maritime, underground, or underwater based vehicle where a hydrogen solid cartridge exchange station has the capability of automatically exchanging of hydrogen solid cartridges for unmanned vehicles where the hydrogen is stored in the form of a solid form based on hydride materials utilizing water with or without a catalyst reactor or with or without a thermally activated mechanism to generate the hydrogen from the hydride materials where hydrogen solid cartridge exchange station, storage sections, and all of the other balance of plant components/sections are all located nearby (meaning next to) the landing platform in order to improve the modularity of the design for transportation purposes 28. A hydrogen fuel cell powered unmanned vehicle and its storing/refueling station comprising of the followings systems/components (for the neutralization of unauthorized or stray or outlaw drones):

a hydrogen fuel cell powered unmanned vehicle,
an autonomous storing/refueling station (also known as drone box assembly),
a data link,
a drone-detection radar, perimeter sensors, or threat assessment system
a communication device for the autonomous storing/refueling station (also called as drone box or drone box assembly) to communicate with the said hydrogen fuel cell powered unmanned vehicle,
a communication device on-board of the hydrogen fuel cell powered unmanned vehicle to communicate with the autonomous storing/refueling station,
artificial intelligence enabled virtual command center a power supply for the autonomous storing/refueling station, where the hydrogen fuel cell powered unmanned vehicle be in the form of either single-rotor, multi-rotor, vertical takeoff and landing VTOL, hybrid VTOL, fixed-wing, vertically or perpendicularly launched unmanned vehicle, catapult-launched unmanned vehicle, horizontally launched unmanned vehicle, or any other similar aerial platforms, where the autonomous or automated storing/refueling station has a storing section, a refueling section, and a control section;

where the storing section has the capability of storing of the said unmanned vehicle with a smart precision landing device (such as vision-based landing, etc.) and containing all or part of the balance of plant that is needed for the safe operation of the storing/refueling station assembly (collectively known as drone box assembly), where the refueling section has the capability of storing hydrogen, generating hydrogen, dispensing hydrogen, refueling the stored or generated hydrogen to an intermediary storage first then and refill it to the hydrogen storage located on-board of the said unmanned vehicle, converting the gaseous hydrogen into liquid hydrogen and then transfer it into the on-board hydrogen storage medium, storing hydrogen in different forms such as gaseous and liquid hydrogen, or slurry or solid based on the hydrides and generation of hydrogen from the hydrides with or without a reactor that has either catalyst or thermal mechanism with or without water or water/alkali solvents, exchanging the spent cylinders, cartridges, or pods with refilled or unused ones, and containing all or part of the balance of plant that is needed for the safe operation of the storing/refueling station, where the control section has the capability of communicating with both the drone-detection radar and hydrogen fuel cell powered unmanned vehicles, and containing all or part of the balance of plant that is needed for the safe operation of the storing/refueling station, where the storing section, refueling section, and control section are either located within a single enclosure or each of these sections are split up and placed vertically or horizontally depending on the storing/refueling requirement of the unmanned vehicle that will be used for the neutralization of the unauthorized or stray or outlaw drone, where the autonomous storing/refueling station has anti-tamper or anti-theft devices, security monitoring devices such as cameras (optical, thermal, etc.), weather station or weather sensor packages that forms the weather station (including the hyper-local weather forecasting device), weed/plant killer unit with an integrated pesticides and insecticides device or setup, a fence with an active deterring mechanism such as electric shock, a thermal management mechanism (such as thermal insulation or thermal conduction materials or fans or heaters placed inside or outside of the drone box enclosure) to safely operate the drone box assembly, where the cameras installed on the drone box is being used with software to enable the capability of beyond-the-visual-line-of-sight or virtual-line-of-sight (using its local camera pole) in order to eliminate the need for the physical presence of a pilot or operator near the vicinity of the flight path or near the drone in order to further improve the safety of the drone and also meet the local safety and aviation requirements for unmanned vehicle operations, where the data link is some sort of a communication device or method that allows sending, receiving, and managing the communications between the drone-detection radar, storing/refueling station, hydrogen fuel cell powered unmanned vehicle, where the radar data can be sent to a server or cloud or some other medium and then this data is sent to the storing/refueling station, or radar data is directly sent to the storing/refueling station without an intermediary medium, then the received data is sent to the hydrogen fuel cell powered unmanned vehicle by the same communication system or another communication device (such as a tactical data link, a digital data link, aircraft communication systems such as VHF/UHF/HF radios, datalinks use for aircrafts, or SATCOM), either based on simplex communications, half-duplex, or duplex communications principles, where the drone-detection radar has the capability of detecting any type of drones whether the radar itself is primary or secondary type radar, or continuous wave or pulse based operation radars, or modulated or unmodulated radars, or MTI or doppler radars, or a radar category that is more specifically suited for the detection of unmanned vehicles or unmanned aerial vehicles, a solid state radar, solid state radar x-band pulse radar, solid state x-band pulse doppler radar, short range or long range of these abovementioned radars, or perimeter sensors, or threat assessment system that are capable of detecting the presence of drones or unmanned vehicles, where the communication device for the storing/refueling station is a communication device that has the capability of sending and receiving input/output or data or signal to the hydrogen fuel cell powered unmanned vehicle, where the communication device on-board of the hydrogen fuel cell powered unmanned vehicle is a communication device that has the capability of sending and receiving input/output or data or signal to the storing/refueling station, where the artificial intelligence enabled virtual command center is utilized for the flight mission and flight path management tool that assist in the remote flight, tele-piloting, and beyond-visual-line-of-sight or virtual-line-of-sight (using its local camera pole), schedule periodical drone flight activities around storing/refueling or storing/recharging stations, program to detect incoming drone threats within he radar range and automatically perform A.I> analysis to assess and identify the best method to intercept and neutralize the potential threats, where the artificial intelligence enabled virtual command center is utilized for the flight mission and flight path management tool that assist in the remote flight, tele-piloting, and beyond-visual-line-of-sight or virtual-line-of-sight (using its local camera pole), schedule periodical drone flight activities around storing/refueling or storing/recharging stations, program to detect incoming drone threats within the radar range and automatically perform A.I. analysis to assess and identify the best method to intercept and neutralize the potential threats, where web-based ground control or some other ground-control solution is also integrated with the A.I. enabled virtual command center to monitor or manage certain control functions, where the power supply for the autonomous storing/refueling station (also called as drone box or drone box assembly) is a power supplying device in order to power all of the components and hardware associated with the drone box or drone box assembly and having the capability of utilizing different power sources either in their standalone form or any combinations in the hybridized form (such as power coming from the towing vehicle engine or another standby engine, from a battery power module, from a fuel cell power module, from a solar power module, from a wind power module, etc.), 29. A hydrogen fuel cell powered unmanned vehicle and its storing/refueling station mentioned in item 28 comprising of the followings systems/components (for the neutralization of unauthorized or stray or outlaw drones):

a hydrogen fuel cell powered unmanned vehicle with an additional sensing device to improve its drone neutralization capability, an autonomous storing/refueling station (also known as drone box or drone box assembly), a data link, a drone-detection radar, perimeter sensors, or threat assessment system, a communication device for the autonomous storing/refueling station to communicate with the said hydrogen fuel cell powered unmanned vehicle, a communication device on-board of the hydrogen fuel cell powered unmanned vehicle to communicate with the autonomous storing/refueling station, artificial intelligence enabled virtual command center, a power supply for the autonomous storing/refueling station (also called as drone box or drone box assembly), where the hydrogen fuel cell powered unmanned vehicle be in the form of either single-rotor, multi-rotor, vertical takeoff and landing VTOL, hybrid VTOL, fixed-wing, vertically or perpendicularly launched unmanned vehicles, catapult-launched unmanned vehicles, horizontally launched unmanned vehicles, or any other similar aerial platforms, and have an additional sensing device such as a camera (optical, thermal, etc.) to search and identify, then monitor and confirm the collision event with the unauthorized or stray or outlaw drone, where the autonomous or automated storing/refueling station has a storing section, a refueling section, and a control section;

where the storing section has the capability of storing of the said unmanned vehicle with a smart precision landing device (such as vision-based landing, etc.) and containing all or part of the balance of plant that is needed for the safe operation of the storing/refueling station assembly, where the refueling section has the capability of storing hydrogen, generating hydrogen, dispensing hydrogen, refueling the stored or generated hydrogen to an intermediary storage first then and refill it to the hydrogen storage located on-board of the said unmanned vehicle, converting the gaseous hydrogen into liquid hydrogen and then transfer it into the on-board hydrogen storage medium, storing hydrogen in different forms such as gaseous, liquid, slurry or solid based on the hydrides and generation of hydrogen from the hydrides with or without a reactor that has either catalyst or thermal triggering with or without water or water/alkali solvents, exchanging the spent cylinders, cartridges, or pods with refilled or unused ones, and containing all or part of the balance of plant that is needed for the safe operation of the storing/refueling station, where the control section has the capability of communicating with both the drone-detection radar and hydrogen fuel cell powered unmanned vehicles, and containing all or part of the balance of plant that is needed for the safe operation of the storing/refueling station, where the storing section, refueling section, and control section are either located within a single enclosure or each of these sections are split up and placed vertically or horizontally depending on the storing/refueling requirement of the unmanned vehicle that will be used for the neutralization of the unauthorized or stray or outlaw drone, where the autonomous storing/refueling station has anti-tamper or anti-theft devices, security monitoring devices such as cameras (optical, thermal, etc.), weather station or weather sensor packages that forms the weather station (including the hyper-local weather forecasting device), weed/plant killer unit with an integrated pesticides and insecticides device or setup, an fence with an active deterring mechanism such as electric shock, a thermal management mechanism (such as thermal insulation or thermal conduction materials or fans or heaters placed inside or outside of the drone box enclosure) to safely operate the drone box assembly, where the cameras installed on the drone box is being used with software to enable the capability of beyond-the-visual-line-of-sight or virtual-line-of-sight (using its local camera pole) in order to eliminate the need for the physical presence of a pilot or operator near the vicinity of the flight path or near the drone in order to further improve the safety of the drone and also meet the local safety and aviation requirements for unmanned vehicle operations, where the data link is some sort of a communication device or method that allows sending, receiving, and managing the communications between the drone-detection radar, storing/refueling station, hydrogen fuel cell powered unmanned vehicle, where the radar data can be sent to a server or cloud or some other medium and then this data is sent to the storing/refueling station, or radar data is directly sent to the storing/refueling station, then the received data is sent to the hydrogen fuel cell powered unmanned vehicle by the same communication system or another communication device (such as a tactical data link, a digital data link, aircraft communication systems such as VHF/UHF/HF radios, datalinks use for aircrafts, or SATCOM), either based on simplex communications, half-duplex, or duplex communications principles, where the drone-detection radar has the capability of detecting any type of drones whether the radar itself is primary or secondary type radar, or continuous wave or pulse based operation radars, or modulated or unmodulated radars, or MTI or doppler radars, or a radar category that is more specifically suited for the detection of unmanned vehicles or unmanned aerial vehicles, a solid state radar, solid state radar x-band pulse radar, solid state x-band pulse doppler radar, short range or long range of these abovementioned radars, or perimeter sensors, or threat assessment system that are capable of detecting the presence of drones or unmanned vehicles, where the communication device for the storing/refueling station is a communication device that has the capability of sending and receiving input/output or data or signal to the hydrogen fuel cell powered unmanned vehicle, where the communication device on-board of the hydrogen fuel cell powered unmanned vehicle is a communication device that has the capability of sending and receiving input/output or data or signal to the storing/refueling station, where the artificial intelligence enabled virtual command center is utilized for the flight mission and flight path management tool that assist in the remote flight, tele-piloting, and beyond-visual-line-of-sight or virtual-line-of-sight, schedule periodical drone flight activities around storing/refueling or storing/recharging stations, program to detect incoming drone threats within the radar range and automatically perform A.I. analysis to assess and identify the best method to intercept and neutralize the potential threats, where web-based ground control or some other ground-control solution is also integrated with the A.I. enabled virtual command center to monitor or manage certain control functions, where the power supply for the autonomous storing/refueling station is a power supplying device in order to power all of the components and hardware associated with the drone box or drone box assembly and having the capability of utilizing different power sources either in their standalone form or any combinations in the hybridized form (such as power coming from the towing vehicle engine or another standby engine, from a battery power module, from a fuel cell power module, from a solar power module, from a wind power module, etc.), 30. A hydrogen fuel cell powered unmanned vehicle and its storing/refueling station mentioned in item 29 comprising of the followings systems/components (for the neutralization of unauthorized or stray or outlaw drones):

a hydrogen fuel cell powered unmanned vehicle with additional sensing devices to improve its drone neutralization capability, an autonomous storing/refueling station (also known as drone box or drone box assembly), a data link, a drone-detection radar, perimeter sensors, or threat assessment system, a communication device for the autonomous storing/refueling station to communicate with the said hydrogen fuel cell powered unmanned vehicle, a communication device on-board of the hydrogen fuel cell powered unmanned vehicle to communicate with the autonomous storing/refueling station, an artificial intelligence enabled virtual command center, a power supply for the autonomous storing/refueling station, where the hydrogen fuel cell powered unmanned vehicle be in the form of either single-rotor, multi-rotor, vertical takeoff and landing VTOL, hybrid VTOL, fixed-wing, vertically or perpendicularly launched unmanned vehicle, catapult-launched unmanned vehicle, horizontally launched unmanned vehicle, or any other similar aerial platforms, and have additional sensing devices such as a camera to search and identify, then monitor and confirm the collision and a proximity sensing device such as a proximity sensor to close the distance and confirm the collision events with the unauthorized or stray or outlaw drone, where the autonomous or automated storing/refueling station has a storing section, a refueling section, and a control section;

where the storing section has the capability of storing of the said unmanned vehicle with a smart precision landing device (such as vision-based landing, etc.) and containing all or part of the balance of plant that is needed for the safe operation of the storing/refueling station assembly (collectively known as drone box assembly), where the refueling section has the capability of storing hydrogen, generating hydrogen, dispensing hydrogen, refueling the stored or generated hydrogen to an intermediary storage first then and refill it to the hydrogen storage located on-board of the said unmanned vehicle, converting the gaseous hydrogen into liquid hydrogen and then transfer it into the on-board hydrogen storage medium, storing hydrogen in different forms such as gaseous, liquid, slurry or solid based on the hydrides and generation of hydrogen from the hydrides with or without a reactor that has either catalyst or thermal triggering with or without water or water/alkali solvents, exchanging the spent cylinders, cartridges, or pods with refilled or unused ones, and containing all or part of the balance of plant that is needed for the safe operation of the storing/refueling station, where the control section has the capability of communicating with both the drone-detection radar and hydrogen fuel cell powered unmanned vehicles, and containing all or part of the balance of plant that is needed for the safe operation of the storing/refueling station, where the storing section, refueling section, and control section are either located within a single enclosure or each of these sections are split up and placed vertically or horizontally depending on the storing/refueling requirement of the unmanned vehicle that will be used for the neutralization of the unauthorized or stray or outlaw drone, where the autonomous storing/refueling station has anti-tamper or anti-theft devices, security monitoring devices such as cameras (optical, thermal, etc.), weather station or weather sensor packages that forms the weather station (including the hyper-local weather forecasting device), weed/plant killer unit with an integrated pesticides and insecticides device or setup, an fence with an active deterring mechanism such as electric shock, a thermal management mechanism (such as thermal insulation or thermal conduction materials or fans or heaters placed inside or outside of the drone box enclosure) to safely operate the drone box assembly, where the cameras installed on the drone box is being used with software to enable the capability of beyond-the-visual-line-of-sight or virtual-line-of-sight (using its local camera pole) in order to eliminate the need for the physical presence of a pilot or operator near the vicinity of the flight path or near the drone in order to further improve the safety of the drone and also meet the local safety and aviation requirements for unmanned vehicle operations, where the data link is some sort of a communication device or method that allows sending, receiving, and managing the communications between the drone-detection radar, storing/refueling station, hydrogen fuel cell powered unmanned vehicle, where the radar data can be sent to a server or cloud or some other medium and then this data is sent to the storing/refueling station, or radar data is directly sent to the storing/refueling station, then the received data is sent to the hydrogen fuel cell powered unmanned vehicle by the same communication system or another communication device (such as a tactical data link, a digital data link, aircraft communication systems such as VHF/UHF/HF radios, datalinks use for aircrafts, or SATCOM), either based on simplex communications, half-duplex, or duplex communications principles, where the drone-detection radar has the capability of detecting any type of drones whether the radar itself is primary or secondary type radar, or continuous wave or pulse based operation radars, or modulated or unmodulated radars, or MTI or doppler radars, or a radar category that is more specifically suited for the detection of unmanned vehicles or unmanned aerial vehicles, a solid state radar, solid state radar x-band pulse radar, solid state x-band pulse doppler radar, short range or long range of these abovementioned radars, or perimeter sensors, or threat assessment system that are capable of detecting the presence of drones or unmanned vehicles, where the communication device for the storing/refueling station is a communication device that has the capability of sending and receiving input/output or data or signal to the hydrogen fuel cell powered unmanned vehicle, where the communication device on-board of the hydrogen fuel cell powered unmanned vehicle is a communication device that has the capability of sending and receiving input/output or data or signal to the storing/refueling station, where the artificial intelligence enabled virtual command center is utilized for the flight mission and flight path management tool that assist in the remote flight, tele-piloting, and beyond-visual-line-of-sight or virtual-line-of-sight, schedule periodical drone flight activities around storing/refueling or storing/recharging stations, program to detect incoming drone threats within the radar range and automatically perform A.I. analysis to assess and identify the best method to intercept and neutralize the potential threats, where web-based ground control or some other ground-control solution is also integrated with the A.I. enabled virtual command center to monitor or manage certain control functions, where the power supply for the autonomous storing/refueling station (also called as drone box or drone box assembly) is a power supplying device in order to power all of the components and hardware associated with the drone box or drone box assembly and having the capability of utilizing different power sources either in their standalone form or any combinations in the hybridized form (such as power coming from the towing vehicle engine or another standby engine, from a battery power module, from a fuel cell power module, from a solar power module, from a wind power module, etc.), 31. A hydrogen fuel cell powered unmanned vehicle and its storing/refueling station mentioned in item 30 in the form of a swarm comprising of the followings systems/components (for the neutralization of unauthorized or stray or outlaw drones):

a hydrogen fuel cell powered unmanned vehicle with additional sensing devices to improve its drone neutralization capability, a swarm of hydrogen fuel cell powered unmanned vehicles, an autonomous storing/refueling station (also known as drone box assembly), a data link, a drone-detection radar, perimeter sensors, or threat assessment system, a communication device for the autonomous storing/refueling station to communicate with the said hydrogen fuel cell powered unmanned vehicle, a communication device on-board of the hydrogen fuel cell powered unmanned vehicle to communicate with the autonomous storing/refueling station, an artificial intelligence enabled virtual command center, a power supply for the autonomous storing/refueling station, where the hydrogen fuel cell powered unmanned vehicle be in the form of either single-rotor, multi-rotor, vertical takeoff and landing VTOL, hybrid VTOL, fixed-wing, vertically or perpendicularly launched unmanned vehicles, catapult-launched unmanned vehicles, horizontally launched unmanned vehicles, or any other similar aerial platforms, and have additional sensing devices such as a camera to search and identify, then monitor and confirm the collision and a proximity sensing device such as a proximity sensor to close the distance and confirm the collision events with the unauthorized or stray or outlaw drone, where the multiples of hydrogen fuel cell powered unmanned vehicles are used in the form of a swarm to further improve the success of neutralization of unauthorized or stray or outlaw drones by having the advantage of large numbers, where the autonomous or automated storing/refueling station (collectively known as drone box assembly) has a storing section, a refueling section, and a control section;

where the storing section has the capability of storing of the said unmanned vehicle with a smart precision landing device (such as vision-based landing, etc.) and containing all or part of the balance of plant that is needed for the safe operation of the storing/refueling station assembly, where the refueling section has the capability of storing hydrogen, generating hydrogen, dispensing hydrogen, refueling the stored or generated hydrogen to an intermediary storage first then and refill it to the hydrogen storage located on-board of the said unmanned vehicle, converting the gaseous hydrogen into liquid hydrogen and then transfer it into the on-board hydrogen storage medium, storing hydrogen in different forms such as gaseous, liquid, slurry or solid based on the hydrides and generation of hydrogen from the hydrides with or without a reactor that has either catalyst or thermal triggering with or without water or water/alkali solvents, exchanging the spent cylinders, cartridges, or pods with refilled or unused ones, and containing all or part of the balance of plant that is needed for the safe operation of the storing/refueling station, where the control section has the capability of communicating with both the drone-detection radar and hydrogen fuel cell powered unmanned vehicles, and containing all or part of the balance of plant that is needed for the safe operation of the storing/refueling station, where the storing section, refueling section, and control section are either located within a single enclosure or each of these sections are split up and placed vertically or horizontally depending on the storing/refueling requirement of the unmanned vehicle that will be used for the neutralization of the unauthorized or stray or outlaw drone, where the autonomous storing/refueling station has anti-tamper or anti-theft devices, security monitoring devices such as cameras (optical, thermal, etc.), weather station or weather sensor packages that forms the weather station (including the hyper-local weather forecasting device), weed/plant killer unit with an integrated pesticides and insecticides device or setup, an fence with an active deterring mechanism such as electric shock, a thermal management mechanism (such as thermal insulation or thermal conduction materials or fans or heaters placed inside or outside of the drone box enclosure) to safely operate the drone box assembly, where the cameras installed on the drone box is being used with software to enable the capability of beyond-the-visual-line-of-sight or virtual-line-of-sight (using its local camera pole) in order to eliminate the need for the physical presence of a pilot or operator near the vicinity of the flight path or near the drone in order to further improve the safety of the drone and also meet the local safety and aviation requirements for unmanned vehicle operations, where the data link is some sort of a communication device or method that allows sending, receiving, and managing the communications between the drone-detection radar, storing/refueling station, hydrogen fuel cell powered unmanned vehicle, where the radar data can be sent to a server or cloud or some other medium and then this data is sent to the storing/refueling station, or radar data is directly sent to the storing/refueling station, then the received data is sent to the hydrogen fuel cell powered unmanned vehicle by the same communication system or another communication device (such as a tactical data link, a digital data link, aircraft communication systems such as VHF/UHF/HF radios, datalinks use for aircrafts, or SATCOM), either based on simplex communications, half-duplex, or duplex communications principles, where the drone-detection radar has the capability of detecting any type of drones whether the radar itself is primary or secondary type radar, or continuous wave or pulse based operation radars, or modulated or unmodulated radars, or MTI or doppler radars, or a radar category that is more specifically suited for the detection of unmanned vehicles or unmanned aerial vehicles, a solid state radar, solid state radar x-band pulse radar, solid state x-band pulse doppler radar, short range or long range of these abovementioned radars, or perimeter sensors, or threat assessment system that are capable of detecting the presence of drones or unmanned vehicles, where the communication device for the storing/refueling station is a communication device that has the capability of sending and receiving input/output or data or signal to the hydrogen fuel cell powered unmanned vehicle, where the communication device on-board of the hydrogen fuel cell powered unmanned vehicle is a communication device that has the capability of sending and receiving input/output or data or signal to the storing/refueling station, where the artificial intelligence enabled virtual command center is utilized for the flight mission and flight path management tool that assist in the remote flight, telepiloting, and beyond-visual-line-of-sight or virtual-line-of-sight (using its local camera pole), schedule periodical drone flight activities around storing/refueling or storing/recharging stations, program to detect incoming drone threats within the radar range and automatically perform A.I. analysis to assess and identify the best method to intercept and neutralize the potential threats, where web-based ground control or some other ground-control solution is also integrated with the A.I. enabled virtual command center to monitor or manage certain control functions, where the power supply for the autonomous storing/refueling station is a power supplying device in order to power all of the components and hardware associated with the drone box or drone box assembly and having the capability of utilizing different power sources either in their standalone form or any combinations in the hybridized form (such as power coming from the towing vehicle engine or another standby engine, from a battery power module, from a fuel cell power module, from a solar power module, from a wind power module, etc.)

32. A hydrogen fuel cell powered unmanned vehicle and its storing/refueling station mentioned in item 30 with further enhancement of autonomous flying capability for the hydrogen fuel cell powered unmanned vehicle and hence comprising of the followings systems/components (for the neutralization of unauthorized or stray or outlaw drones):
- a hydrogen fuel cell powered unmanned vehicle with additional sensing devices and an on-board computer or autonomous flight management system to improve its drone neutralization capability,
- an autonomous storing/refueling station (also known as drone box assembly),
- a data link,
- a drone-detection radar, perimeter sensors, or threat assessment system
- a communication device for the autonomous storing/refueling station to communicate with the said hydrogen fuel cell powered unmanned vehicle,
- a communication device on-board of the hydrogen fuel cell powered unmanned vehicle to communicate with the autonomous storing/refueling station,
- an artificial intelligence enabled virtual command center,
- a power supply for the autonomous storing/refueling station,
- where the hydrogen fuel cell powered unmanned vehicle be in the form of either single-rotor, multi-rotor, vertical takeoff and landing VTOL, hybrid VTOL, fixed-wing, vertically or perpendicularly launched unmanned vehicles, catapult-launched unmanned vehicles, horizontally launched unmanned vehicles, or any other similar aerial platforms, and have additional sensing devices such as a camera to search and identify, then monitor and confirm the collision, a proximity sensing device such as a proximity sensor to close the distance and confirm the collision events with the unauthorized or stray or outlaw drone, and an on-board computer or autonomous flight management system for the autonomous flying capability in the case of a communication failure with the drone box and the need for pursuing the unauthorized or stray or outlaw drone without the support of the drone box,
- where the autonomous or automated storing/refueling station (collectively known as drone box assembly) has a storing section, a refueling section, and a control section;
  - where the storing section has the capability of storing of the said unmanned vehicle with a smart precision landing device (such as vision-based landing, etc.) and containing all or part of the balance of plant that is needed for the safe operation of the storing/refueling station assembly,
  - where the refueling section has the capability of storing hydrogen, generating hydrogen, dispensing hydrogen, refueling the stored or generated hydrogen to an intermediary storage first then and refill it to the hydrogen storage located on-board of the said unmanned vehicle, converting the gaseous hydrogen into liquid hydrogen and then transfer it into the on-board hydrogen storage medium, storing hydrogen in different forms such as gaseous, liquid, slurry or solid based on the hydrides and generation of hydrogen from the hydrides with or without a reactor that has either catalyst or thermal triggering with or without water or water/alkali solvents, exchanging the spent cylinders, cartridges, or pods with refilled or unused ones, and containing all or part of the balance of plant that is needed for the safe operation of the storing/refueling station,
  - where the control section has the capability of communicating with both the drone-detection radar and hydrogen fuel cell powered unmanned vehicles, and containing all or part of the balance of plant that is needed for the safe operation of the storing/refueling station,
- where the storing section, refueling section, and control section are either located within a single enclosure or each of these sections are split up and placed vertically or horizontally depending on the storing/refueling requirement of the unmanned vehicle that will be used for the neutralization of the unauthorized or stray or outlaw drone,
- where the autonomous storing/refueling station has anti-tamper or anti-theft devices, security monitoring devices such as cameras (optical, thermal, etc.), weather station or weather sensor packages that forms the weather station (including the hyper-local weather forecasting device), weed/plant killer unit with an integrated pesticides and insecticides device or setup, an fence with an active deterring mechanism such as electric shock, a thermal management mechanism (such as thermal insulation or thermal conduction materials or fans or heaters placed inside or outside of the drone box enclosure) to safely operate the drone box assembly,
- where the cameras installed on the drone box is being used with software to enable the capability of beyond-the-visual-line-of-sight or virtual-line-of-sight (using its local camera pole) in order to eliminate the need for the physical presence of a pilot or operator near the vicinity of the flight path or near the drone in order to further improve the safety of the drone and also meet the local safety and aviation requirements for unmanned vehicle operations,
- where the data link is some sort of a communication device or method that allows sending, receiving, and managing the communications between the drone-detection radar, storing/refueling station, hydrogen fuel cell powered unmanned vehicle, where the radar data can be sent to a server or cloud or some other medium and then this data is sent to the storing/refueling station, or radar data is directly sent to the storing/refueling station, then the received data is sent to the hydrogen fuel cell powered unmanned vehicle by the same communication system or another communication device (such as a tactical data link, a digital data link, aircraft communication systems such as VHF/UHF/HF radios, datalinks use for aircrafts, or SATCOM), either based on simplex communications, half-duplex, or duplex communications principles,
- where the drone-detection radar has the capability of detecting any type of drones whether the radar itself is primary or secondary type radar, or continuous wave or pulse based operation radars, or modulated or unmodulated radars, or MTI or doppler radars, or a radar category that is more specifically suited for the detection of unmanned vehicles or unmanned aerial vehicles, a solid state radar, solid state radar x-band pulse radar, solid state x-band pulse doppler radar, short range or long range of these abovementioned radars, or perimeter sensors, or threat assessment system that are capable of detecting the presence of drones or unmanned vehicles,
- where the communication device for the storing/refueling station is a communication device that has the capability of sending and receiving input/output or data or signal to the hydrogen fuel cell powered unmanned vehicle, where the communication device on-board of the hydrogen fuel cell powered unmanned vehicle is a communication device that has the capability of sending and receiving input/output or data or signal to the storing/refueling station, where the artificial intelligence enabled virtual command center is utilized for the flight mission and flight path management tool that assist in the remote flight, tele-piloting, and beyond-visual-line-of-sight or virtual-line-of-sight (using its local camera pole), schedule periodical drone flight activities around storing/refueling or storing/recharging stations, program to detect incoming drone threats within the radar range and automatically perform A.I. analysis to assess and identify the best method to intercept and neutralize the potential threats, where web-based ground control or some other ground-control solution is also integrated with the A.I. enabled virtual command center to monitor or manage certain control functions, where the power supply for the autonomous storing/refueling station is a power supplying device in order to power all of the components and hardware associated with the drone box or drone box assembly and having the capability of utilizing different power sources either in their standalone form or any combinations in the hybridized form (such as power coming from the towing vehicle engine or another standby engine, from a battery power module, from a fuel cell power module, from a solar power module, from a wind power module, etc.), 33. A hydrogen fuel cell powered unmanned vehicle and its storing/refueling station mentioned in item 32 with further enhancement of autonomous flying capability for the hydrogen fuel cell powered unmanned vehicle and establishing a swarm architecture and hence comprising of the followings systems/components (for the neutralization of unauthorized or stray or outlaw drones):

a hydrogen fuel cell powered unmanned vehicle with additional sensing devices and an on-board computer or autonomous flight management system to improve its drone neutralization capability, a swarm of the said unmanned vehicles, an autonomous storing/refueling station (also known as drone box assembly), a data link, a drone-detection radar, perimeter sensors, or threat assessment system, a communication device for the autonomous storing/refueling station to communicate with the said hydrogen fuel cell powered unmanned vehicle, a communication device on-board of the hydrogen fuel cell powered unmanned vehicle to communicate with the autonomous storing/refueling station, an artificial intelligence enabled virtual command center, a power supply for the autonomous storing/refueling station, where the hydrogen fuel cell powered unmanned vehicle be in the form of either single-rotor, multi-rotor, vertical takeoff and landing VTOL, hybrid VTOL, fixed-wing, vertically or perpendicularly launched unmanned vehicles, catapult-launched unmanned vehicles, horizontally launched unmanned vehicles, or any other similar aerial platforms, and have additional sensing devices such as a camera to search and identify, then monitor and confirm the collision, a proximity sensing device such as a proximity sensor to close the distance and confirm the collision events with the unauthorized or stray or outlaw drone, and an on-board computer or autonomous flight management system for the autonomous flying capability in the case of a communication failure with the drone box and the need for pursuing the unauthorized or stray or outlaw drone without the support from the drone box, where the multiples of hydrogen fuel cell powered unmanned vehicles are used in the form of a swarm to further improve the success of neutralization of unauthorized or stray or outlaw drones by having the advantage of large numbers, where the autonomous or automated storing/refueling station (collectively known as drone box assembly) has a storing section, a refueling section, and a control section;

where the storing section has the capability of storing of the said unmanned vehicle with a smart precision landing device (such as vision-based landing, etc.) and containing all or part of the balance of plant that is needed for the safe operation of the storing/refueling station assembly, where the refueling section has the capability of storing hydrogen, generating hydrogen, dispensing hydrogen, refueling the stored or generated hydrogen to an intermediary storage first then and refill it to the hydrogen storage located on-board of the said unmanned vehicle, converting the gaseous hydrogen into liquid hydrogen and then transfer it into the on-board hydrogen storage medium, storing hydrogen in different forms such as gaseous, liquid, slurry or solid based on the hydrides and generation of hydrogen from the hydrides with or without a reactor that has either catalyst or thermal triggering with or without water or water/alkali solvents, exchanging the spent cylinders, cartridges, or pods with refilled or unused ones, and containing all or part of the balance of plant that is needed for the safe operation of the storing/refueling station, where the control section has the capability of communicating with both the drone-detection radar and hydrogen fuel cell powered unmanned vehicles, and containing all or part of the balance of plant that is needed for the safe operation of the storing/refueling station, where the storing section, refueling section, and control section are either located within a single enclosure or each of these sections are split up and placed vertically or horizontally depending on the storing/refueling requirement of the unmanned vehicle that will be used for the neutralization of the unauthorized or stray or outlaw drone, where the autonomous storing/refueling station has anti-tamper or anti-theft devices, security monitoring devices such as cameras (optical, thermal, etc.), weather station or weather sensor packages that forms the weather station (including the hyper-local weather forecasting device), weed/plant killer unit with an integrated pesticides and insecticides device or setup, an fence with an active deterring mechanism such as electric shock, a thermal management mechanism (such as thermal insulation or thermal conduction materials or fans or heaters placed inside or outside of the drone box enclosure) to safely operate the drone box assembly, where the cameras installed on the drone box is being used with software to enable the capability of beyond-the-visual-line-of-sight or virtual-line-of-sight (using its local camera pole) in order to eliminate the need for the physical presence of a pilot or operator near the vicinity of the flight path or near the drone in order to further improve the safety of the drone and also meet the local safety and aviation requirements for unmanned vehicle operations, where the data link is some sort of a communication device or method that allows sending, receiving, and managing the communications between the drone-detection radar, storing/refueling station, hydrogen fuel cell powered unmanned vehicle, where the radar data can be sent to a server or cloud or some other medium and then this data is sent to the storing/refueling station, or radar data is directly sent to the storing/refueling station, then the received data is sent to the hydrogen fuel cell powered unmanned vehicle by the same communication system or another communication device (such as a tactical data link, a digital data link, aircraft communication systems such as VHF/UHF/HF radios, datalinks use for aircrafts, or SATCOM), either based on simplex communications, half-duplex, or duplex communications principles where the drone-detection radar has the capability of detecting any type of drones whether the radar itself is primary or secondary type radar, or continuous wave or pulse based operation radars, or modulated or unmodulated radars, or MTI or doppler radars, or a radar category that is more specifically suited for the detection of unmanned vehicles or unmanned aerial vehicles, a solid state radar, solid state radar x-band pulse radar, solid state x-band pulse doppler radar, short range or long range of these abovementioned radars, or perimeter sensors, or threat assessment system that are capable of detecting the presence of drones or unmanned vehicles, where the communication device for the storing/refueling station is a communication device that has the capability of sending and receiving input/output or data or signal to the hydrogen fuel cell powered unmanned vehicle, where the communication device on-board of the hydrogen fuel cell powered unmanned vehicle is a communication device that has the capability of sending and receiving input/output or data or signal to the storing/refueling station, where the artificial intelligence enabled virtual command center is utilized for the flight mission and flight path management tool that assist in the remote flight, telepiloting, and beyond-visual-line-of-sight or virtual-line-of-sight (using its local camera pole), schedule periodical drone flight activities around storing/refueling or storing/recharging stations, program to detect incoming drone threats within the radar range and automatically perform A.I. analysis to assess and identify the best method to intercept and neutralize the potential threats, where web-based ground control or some other ground-control solution is also integrated with the A.I. enabled virtual command center to monitor or manage certain control functions, where the power supply for the autonomous storing/refueling station (also called as drone box or drone box assembly) is a power supplying device in order to power all of the components and hardware associated with the drone box or drone box assembly and having the capability of utilizing different power sources either in their standalone form or any combinations in the hybridized form (such as power coming from the towing vehicle engine or another standby engine, from a battery power module, from a fuel cell power module, from a solar power module, from a wind power module, etc.), 34. A hydrogen fuel cell powered unmanned vehicle and its storing/refueling station mentioned in item 30 in the form of a swarm that is comprised of the followings systems/components (for the incapacitation of unauthorized or stray or outlaw drones without damaging the fuel cell powered unmanned vehicle):

a hydrogen fuel cell powered unmanned vehicle with additional sensing devices and a capturing tool to improve its drone incapacitation capability, a swarm of hydrogen fuel cell powered unmanned vehicles, an autonomous storing/refueling station (also known as drone box assembly), a data link, a drone-detection radar, perimeter sensors, or threat assessment system, a communication device for the autonomous storing/refueling station to communicate with the said hydrogen fuel cell powered unmanned vehicle, a communication device on-board of the hydrogen fuel cell powered unmanned vehicle to communicate with the autonomous storing/refueling station, an artificial intelligence enabled virtual command center, a power supply for the autonomous storing/refueling station, where the hydrogen fuel cell powered unmanned vehicle be in the form of either single-rotor, multi-rotor, vertical takeoff and landing VTOL, hybrid VTOL, fixed-wing, vertically or perpendicularly launched unmanned vehicles, catapult-launched unmanned vehicles, horizontally launched unmanned vehicles, or any other similar aerial platforms, and have additional sensing devices such as a camera to search and identify, then monitor and confirm the incapacitation, a proximity sensing device such as a proximity sensor to close the distance and ensures the incapacitation event, and a capturing device such as a capturing net to incapacitate the flight capability of the unauthorized or stray or outlaw drone without creating any damage on the hydrogen fuel cell powered unmanned vehicle to reduce the cost of the drone neutralization efforts, where the multiples of hydrogen fuel cell powered unmanned vehicles are used in the form of a swarm to further improve the success of incapacitation of unauthorized or stray or outlaw drones by having the advantage of large numbers, where the autonomous or automated storing/refueling station (collectively known as drone box assembly) has a storing section, a refueling section, and a control section;

where the storing section has the capability of storing of the said unmanned vehicle with a smart precision landing device (such as vision-based landing, etc.) and containing all or part of the balance of plant that is needed for the safe operation of the storing/refueling station assembly, where the refueling section has the capability of storing hydrogen, generating hydrogen, dispensing hydrogen, refueling the stored or generated hydrogen to an intermediary storage first then and refill it to the hydrogen storage located on-board of the said unmanned vehicle, converting the gaseous hydrogen into liquid hydrogen and then transfer it into the on-board hydrogen storage medium, storing hydrogen in different forms such as gaseous, liquid, slurry or solid based on the hydrides and generation of hydrogen from the hydrides with or without a reactor that has either catalyst or thermal triggering with or without water or water/alkali solvents, exchanging the spent cylinders, cartridges, or pods with refilled or unused ones, and containing all or part of the balance of plant that is needed for the safe operation of the storing/refueling station, where the control section has the capability of communicating with both the drone-detection radar and hydrogen fuel cell powered unmanned vehicles, and containing all or part of the balance of plant that is needed for the safe operation of the storing/refueling station, where the storing section, refueling section, and control section are either located within a single enclosure or each of these sections are split up and placed vertically or horizontally depending on the storing/refueling requirement of the unmanned vehicle that will be used for the neutralization of the unauthorized or stray or outlaw drone, where the autonomous storing/refueling station has anti-tamper or anti-theft devices, security monitoring devices such as cameras (optical, thermal, etc.), weather station or weather sensor packages that forms the weather station (including the hyper-local weather forecasting device), weed/plant killer unit with an integrated pesticides and insecticides device or setup, an fence with an active deterring mechanism such as electric shock, a thermal management mechanism (such as thermal insulation or thermal conduction materials or fans or heaters placed inside or outside of the drone box enclosure) to safely operate the drone box assembly, where the cameras installed on the drone box is being used with software to enable the capability of beyond-the-visual-line-of-sight or virtual-line-of-sight (using its local camera pole) in order to eliminate the need for the physical presence of a pilot or operator near the vicinity of the flight path or near the drone in order to further improve the safety of the drone and also meet the local safety and aviation requirements for unmanned vehicle operations, where the data link is some sort of a communication device or method that allows sending, receiving, and managing the communications between the drone-detection radar, storing/refueling station, hydrogen fuel cell powered unmanned vehicle, where the radar data can be sent to a server or cloud or some other medium and then this data is sent to the storing/refueling station, or radar data is directly sent to the storing/refueling station, then the received data is sent to the hydrogen fuel cell powered unmanned vehicle by the same communication system or another communication device (such as a tactical data link, a digital data link, aircraft communication systems such as VHF/UHF/HF radios, datalinks use for aircrafts, or SATCOM), either based on simplex communications, half-duplex, or duplex communications principles, where the drone-detection radar has the capability of detecting any type of drones whether the radar itself is primary or secondary type radar, or continuous wave or pulse based operation radars, or modulated or unmodulated radars, or MTI or doppler radars, or a radar category that is more specifically suited for the detection of unmanned vehicles or unmanned aerial vehicles, a solid state radar, solid state radar x-band pulse radar, solid state x-band pulse doppler radar, short range or long range of these abovementioned radars, or perimeter sensors, or threat assessment system that are capable of detecting the presence of drones or unmanned vehicles, where the communication device for the storing/refueling station is a communication device that has the capability of sending and receiving input/output or data or signal to the hydrogen fuel cell powered unmanned vehicle, where the communication device on-board of the hydrogen fuel cell powered unmanned vehicle is a communication device that has the capability of sending and receiving input/output or data or signal to the storing/refueling station, where the artificial intelligence enabled virtual command center is utilized for the flight mission and flight path management tool that assist in the remote flight, telepiloting, and beyond-visual-line-of-sight or virtual-line-of-sight (using its local camera pole), schedule periodical drone flight activities around storing/refueling or storing/recharging stations, program to detect incoming drone threats within the radar range and automatically perform A.I. analysis to assess and identify the best method to intercept and neutralize the potential threats, where web-based ground control or some other ground-control solution is also integrated with the A.I. enabled virtual command center to monitor or manage certain control functions, where the power supply for the autonomous storing/refueling station (also called as drone box or drone box assembly) is a power supplying device in order to power all of the components and hardware associated with the drone box or drone box assembly and having the capability of utilizing different power sources either in their standalone form or any combinations in the hybridized form (such as power coming from the towing vehicle engine or another standby engine, from a battery power module, from a fuel cell power module, from a solar power module, from a wind power module, etc.)

35. A hydrogen fuel cell powered unmanned vehicle and its storing/refueling station mentioned in item 34 with the fuel cell powered unmanned vehicle having the autonomous flying capability and in the form of a swarm that is comprised of the followings systems/components (for the incapacitation of unauthorized or stray or outlaw drones without damaging the fuel cell powered unmanned vehicle):

a hydrogen fuel cell powered unmanned vehicle with additional sensing devices, a capturing tool, and an on-board computer or autonomous flight management system to improve its drone incapacitation capability, a swarm of the fuel cell powered unmanned vehicles, an autonomous storing/refueling station (also known as drone box assembly), a data link, a drone-detection radar, perimeter sensors, or threat assessment system, a communication device for the autonomous storing/refueling station to communicate with the said hydrogen fuel cell powered unmanned vehicle, a communication device on-board of the hydrogen fuel cell powered unmanned vehicle to communicate with the autonomous storing/refueling station, an artificial intelligence enabled virtual command center, a power supply for the autonomous storing/refueling station, where the hydrogen fuel cell powered unmanned vehicle be in the form of either single-rotor, multi-rotor, vertical takeoff and landing VTOL, hybrid VTOL, fixed-wing, vertically or perpendicularly launched unmanned vehicles, catapult-launched unmanned vehicles, horizontally launched unmanned vehicles, or any other similar aerial platforms, and have additional sensing devices such as a camera to search and identify, then monitor and confirm the incapacitation, a proximity sensing device such as a proximity sensor to close the distance and ensure the incapacitation event, a capturing device such as a capturing net to incapacitate the flight capability of the unauthorized or stray or outlaw drone, and an on-board computer or autonomous flight management system for autonomous flying (to minimize the amount of physical damages on the hydrogen fuel cell powered unmanned vehicle to reduce the cost of the drone neutralization efforts and provide autonomous flying capability to the fuel cell powered unmanned vehicle in the case of communication failure between the unmanned vehicle and drone box and the need for pursuing the unauthorized or stray or outlaw drone without the support of the drone box), where the multiples of hydrogen fuel cell powered unmanned vehicles are used in the form of a swarm to further improve the success of incapacitation of unauthorized or stray or outlaw drones by having the advantage of large numbers, where the autonomous or automated storing/refueling station (collectively known as drone box assembly) has a storing section, a refueling section, and a control section;
  where the storing section has the capability of storing of the said unmanned vehicle with a smart precision landing device (such as vision-based landing, etc.) and containing all or part of the balance of plant that is needed for the safe operation of the storing/refueling station assembly,
  where the refueling section has the capability of storing hydrogen, generating hydrogen, dispensing hydrogen, refueling the stored or generated hydrogen to an intermediary storage first then and refill it to the hydrogen storage located on-board of the said unmanned vehicle, converting the gaseous hydrogen into liquid hydrogen and then transfer it into the on-board hydrogen storage medium, storing hydrogen in different forms such as gaseous, liquid, slurry or solid based on the hydrides and generation of hydrogen from the hydrides with or without a reactor that has either catalyst or thermal triggering with or without water or water/alkali solvents, exchanging the spent cylinders, cartridges, or pods with refilled or unused ones, and containing all or part of the balance of plant that is needed for the safe operation of the storing/refueling station,
  where the control section has the capability of communicating with both the drone-detection radar and hydrogen fuel cell powered unmanned vehicles, and containing all or part of the balance of plant that is needed for the safe operation of the storing/refueling station,
  where the storing section, refueling section, and control section are either located within a single enclosure or each of these sections are split up and placed vertically or horizontally depending on the storing/refueling requirement of the unmanned vehicle that will be used for the neutralization of the unauthorized or stray or outlaw drone where the autonomous storing/refueling station has anti-tamper or anti-theft devices, security monitoring devices such as cameras (optical, thermal, etc.), weather station or weather sensor packages that forms the weather station (including the hyper-local weather forecasting device), weed/plant killer unit with an integrated pesticides and insecticides device or setup, an fence with an active deterring mechanism such as electric shock, a thermal management mechanism (such as thermal insulation or thermal conduction materials or fans or heaters placed inside or outside of the drone box enclosure) to safely operate the drone box assembly, where the cameras installed on the drone box is being used with software to enable the capability of beyond-the-visual-line-of-sight or virtual-line-of-sight (using its local camera pole) in order to eliminate the need for the physical presence of a pilot or operator near the vicinity of the flight path or near the drone in order to further improve the safety of the drone and also meet the local safety and aviation requirements for unmanned vehicle operations, where the data link is some sort of a communication device or method that allows sending, receiving, and managing the communications between the drone-detection radar, storing/refueling station, hydrogen fuel cell powered unmanned vehicle, where the radar data can be sent to a server or cloud or some other medium and then this data is sent to the storing/refueling station, or radar data is directly sent to the storing/refueling station, then the received data is sent to the hydrogen fuel cell powered unmanned vehicle by the same communication system or another communication device (such as a tactical data link, a digital data link, aircraft communication systems such as VHF/UHF/HF radios, datalinks use for aircrafts, or SATCOM), either based on simplex communications, half-duplex, or duplex communications principles, or perimeter sensors, or threat assessment system that are capable of detecting the presence of drones or unmanned vehicles, where the drone-detection radar has the capability of detecting any type of drones whether the radar itself is primary or secondary type radar, or continuous wave or pulse based operation radars, or modulated or unmodulated radars, or MTI or doppler radars, or a radar category that is more specifically suited for the detection of unmanned vehicles or unmanned aerial vehicles, a solid state radar, solid state radar x-band pulse radar, solid state x-band pulse doppler radar, short range or long range of these abovementioned radars, where the communication device for the storing/refueling station is a communication device that has the capability of sending and receiving input/output or data or signal to the hydrogen fuel cell powered unmanned vehicle, where the communication device on-board of the hydrogen fuel cell powered unmanned vehicle is a communication device that has the capability of sending and receiving input/output or data or signal to the storing/refueling station, where the artificial intelligence enabled virtual command center is utilized for the flight mission and flight path management tool that assist in the remote flight, telepiloting, and beyond-visual-line-of-sight or virtual-line-of-sight (using its local camera pole), schedule periodical drone flight activities around storing/refueling or storing/recharging stations, program to detect incoming drone threats within the radar range and automatically perform A.I. analysis to assess and identify the best method to intercept and neutralize the potential threats, where web-based ground control or some other ground-control solution is also integrated with the A.I. enabled virtual command center to monitor or manage certain control functions, where the power supply for the autonomous storing/refueling station (also called as drone box or drone box assembly) is a power supplying device in order to power all of the components and hardware associated with the drone box or drone box assembly and having the capability of utilizing different power sources either in their standalone form or any combinations in the hybridized form (such as power coming from the towing vehicle engine or another standby engine, from a battery power module, from a fuel cell power module, from a solar power module, from a wind power module, etc.)

36. A hydrogen fuel cell powered unmanned vehicle and its storing/refueling station mentioned in item 34 with a spoofing, jamming, or electronic communication disruption capability that is comprised of the followings systems/components (for the incapacitation of unauthorized or stray or outlaw drones without damaging any one of the unmanned vehicles or unauthorized or stray or outlaw drones):

a hydrogen fuel cell powered unmanned vehicle with additional sensing devices, a capturing tool, and a spoofing or jamming or electronic communication disruption device to improve its drone incapacitation capability, an autonomous storing/refueling station (also known as drone box o drone box assembly), a data link, a drone-detection radar, perimeter sensors, or threat assessment system, a communication device for the autonomous storing/refueling station to communicate with the said hydrogen fuel cell powered unmanned vehicle, a communication device on-board of the hydrogen fuel cell powered unmanned vehicle to communicate with the autonomous storing/refueling station, an artificial intelligence enabled virtual command center, a power supply for the autonomous storing/refueling station, where the hydrogen fuel cell powered unmanned vehicle be in the form of either single-rotor, multi-rotor, vertical takeoff and landing VTOL, hybrid VTOL, fixed-wing, vertically or perpendicularly launched unmanned vehicles, catapult-launched unmanned vehicles, horizontally launched unmanned vehicles, or any other similar aerial platforms, and have additional sensing devices such as a camera to search and identify, then monitor and confirm the incapacitation event, and a proximity sensing device such as a proximity sensor to close the distance and ensure the incapacitation event, a capturing device such as a capturing net to incapacitate the flight capability, and an electronic communication disruption device such as a spoofing, jamming or communication disruption tool to overtake the remote control of the unauthorized or stray or outlaw drone and force it to land (without creating any damage on the hydrogen fuel cell powered unmanned vehicle or on the unauthorized or stray or outlaw drone to reduce the cost of the drone neutralization efforts and also enable the capability of studying the hardware of the captured drone in order to identify the operator or entity that is remotely controlling the unauthorized or stray or outlaw drone for the prosecution of the person or entity, capturing net will be utilized in the event of not being able take the control of the unauthorized or stray or outlaw drone with the spoofing, jamming or communication disruption tool), where the autonomous or automated storing/refueling station (collectively known as drone box assembly) has a storing section, a refueling section, and a control section;

where the storing section has the capability of storing of the said unmanned vehicle with a smart precision landing device (such as vision-based landing, etc.) and containing all or part of the balance of plant that is needed for the safe operation of the storing/refueling station assembly (collectively known as drone box assembly), where the refueling section has the capability of storing hydrogen, generating hydrogen, dispensing hydrogen, refueling the stored or generated hydrogen to an intermediary storage first then and refill it to the hydrogen storage located on-board of the said unmanned vehicle, converting the gaseous hydrogen into liquid hydrogen and then transfer it into the on-board hydrogen storage medium, storing hydrogen in different forms such as gaseous, liquid, slurry or solid based on the hydrides and generation of hydrogen from the hydrides with or without a reactor that has either catalyst or thermal triggering with or without water or water/alkali solvents, exchanging the spent cylinders, cartridges, or pods with refilled or unused ones, and containing all or part of the balance of plant that is needed for the safe operation of the storing/refueling station, where the control section has the capability of communicating with both the drone-detection radar and hydrogen fuel cell powered unmanned vehicles, and containing all or part of the balance of plant that is needed for the safe operation of the storing/refueling station, where the storing section, refueling section, and control section are either located within a single enclosure or each of these sections are split up and placed vertically or horizontally depending on the storing/refueling requirement of the unmanned vehicle that will be used for the neutralization of the unauthorized or stray or outlaw drone, where the autonomous storing/refueling station has anti-tamper or anti-theft devices, security monitoring devices such as cameras (optical, thermal, etc.), weather station or weather sensor packages that forms the weather station (including the hyper-local weather forecasting device), weed/plant killer unit with an integrated pesticides and insecticides device or setup, an fence with an active deterring mechanism such as electric shock, a thermal management mechanism (such as thermal insulation or thermal conduction materials or fans or heaters placed inside or outside of the drone box enclosure) to safely operate the drone box assembly, where the cameras installed on the drone box is being used with software to enable the capability of beyond-the-visual-line-of-sight or virtual-line-of-sight (using its local camera pole) in order to eliminate the need for the physical presence of a pilot or operator near the vicinity of the flight path or near the drone in order to further improve the safety of the drone and also meet the local safety and aviation requirements for unmanned vehicle operations, where the data link is some sort of a communication device or method that allows sending, receiving, and managing the communications between the drone-detection radar, storing/refueling station, hydrogen fuel cell powered unmanned vehicle, where the radar data can be sent to a server or cloud or some other medium and then this data is sent to the storing/refueling station, or radar data is directly sent to the storing/refueling station, then the received data is sent to the hydrogen fuel cell powered unmanned vehicle by the same communication system or another communication device (such as a tactical data link, a digital data link, aircraft communication systems such as VHF/UHF/HF radios, datalinks use for aircrafts, or SATCOM, either based on simplex communications, half-duplex, or duplex communications principles, where the drone-detection radar has the capability of detecting any type of drones whether the radar itself is primary or secondary type radar, or continuous wave or pulse based operation radars, or modulated or unmodulated radars, or MTI or doppler radars, or a radar category that is more specifically suited for the detection of unmanned vehicles or unmanned aerial vehicles, a solid state radar, solid state radar x-band pulse radar, solid state x-band pulse doppler radar, short range or long range of these abovementioned radars, or perimeter sensors, or threat assessment system that are capable of detecting the presence of drones or unmanned vehicles, where the communication device for the storing/refueling station is a communication device that has the capability of sending and receiving input/output or data or signal to the hydrogen fuel cell powered unmanned vehicle, where the communication device on-board of the hydrogen fuel cell powered unmanned vehicle is a communication device that has the capability of sending and receiving input/output or data or signal to the storing/refueling station, where the artificial intelligence enabled virtual command center is utilized for the flight mission and flight path management tool that assist in the remote flight, telepiloting, and beyond-visual-line-of-sight or virtual-line-of-sight (using its local camera pole), schedule periodical drone flight activities around storing/refueling or storing/recharging stations, program to detect incoming drone threats within the radar range and automatically perform A.I. analysis to assess and identify the best method to intercept and neutralize the potential threats, where web-based ground control or some other ground-control solution is also integrated with the A.I. enabled virtual command center to monitor or manage certain control functions, where the power supply for the autonomous storing/refueling station (also called as drone box or drone box assembly) is a power supplying device in order to power all of the components and hardware associated with the drone box or drone box assembly and having the capability of utilizing different power sources either in their standalone form or any combinations in the hybridized form (such as power coming from the towing vehicle engine or another standby engine, from a battery power module, from a fuel cell power module, from a solar power module, from a wind power module, etc.), 37. A hydrogen fuel cell powered unmanned vehicle and its storing/refueling station mentioned in item 36 with a spoofing, jamming, or electronic communication disruption capability and autonomous flying capability that is comprised of the followings systems/components (for the incapacitation of unauthorized or stray or outlaw drones without damaging any one of the unmanned vehicles or unauthorized or stray or outlaw drones):

a hydrogen fuel cell powered unmanned vehicle with additional sensing devices, a capturing tool, a spoofing or jamming or electronic communication disruption device, and an on-board computer or autonomous flight management system to improve its drone incapacitation capability, an autonomous storing/refueling station (also known as drone box assembly), a data link, a drone-detection radar, perimeter sensors, or threat assessment system a communication device for the autonomous storing/refueling station to communicate with the said hydrogen fuel cell powered unmanned vehicle, a communication device on-board of the hydrogen fuel cell powered unmanned vehicle to communicate with the autonomous storing/refueling station, an artificial intelligence enabled virtual command center, a power supply for the autonomous storing/refueling station, where the hydrogen fuel cell powered unmanned vehicle be in the form of either single-rotor, multi-rotor, vertical takeoff and landing VTOL, hybrid VTOL, fixed-wing, vertically or perpendicularly launched unmanned vehicles, catapult-launched unmanned vehicles, horizontally launched unmanned vehicles, or any other similar aerial platforms, and have additional sensing devices such as a camera to search and identify, then monitor and confirm the incapacitation event, a proximity sensing device such as a proximity sensor to close the distance and ensure the incapacitation event, a capturing device such as a capturing net to incapacitate the flight capability, an electronic communication disruption device such as a spoofing, jamming or communication disruption tool to overtake the remote control of the unauthorized or stray or outlaw drone and force it to land, and an on-board computer or autonomous flight management system to enable the autonomous flying of the hydrogen fuel cell powered unmanned vehicle in the case of a communication failure with the drone box (without creating any damage on the hydrogen fuel cell powered unmanned vehicle or on the unauthorized or stray or outlaw drone to reduce the cost of the drone neutralization efforts and also enable the capability of studying the hardware of the captured drone in order to identify the operator or entity that is remotely controlling the unauthorized or stray or outlaw drone for the prosecution of the person or entity, capturing net will be utilized in the event of not being able take the control of the unauthorized or stray or outlaw drone with the spoofing, jamming or communication disruption tool), where the autonomous or automated storing/refueling station (collectively known as drone box assembly) has a storing section, a refueling section, and a control section;
  where the storing section has the capability of storing of the said unmanned vehicle with a smart precision landing device (such as vision-based landing, etc.) and containing all or part of the balance of plant that is needed for the safe operation of the storing/refueling station assembly,
  where the refueling section has the capability of storing hydrogen, generating hydrogen, dispensing hydrogen, refueling the stored or generated hydrogen to an intermediary storage first then and refill it to the hydrogen storage located on-board of the said unmanned vehicle, converting the gaseous hydrogen into liquid hydrogen and then transfer it into the on-board hydrogen storage medium, storing hydrogen in different forms such as gaseous, liquid, slurry or solid based on the hydrides and generation of hydrogen from the hydrides with or without a reactor that has either catalyst or thermal triggering with or without water or water/alkali solvents, exchanging the spent cylinders, cartridges, or pods with refilled or unused ones, and containing all or part of the balance of plant that is needed for the safe operation of the storing/refueling station,
  where the control section has the capability of communicating with both the drone-detection radar and hydrogen fuel cell powered unmanned vehicles, and containing all or part of the balance of plant that is needed for the safe operation of the storing/refueling station,
  where the storing section, refueling section, and control section are either located within a single enclosure or each of these sections are split up and placed vertically or horizontally depending on the storing/refueling requirement of the unmanned vehicle that will be used for the neutralization of the unauthorized or stray or outlaw drone,
  where the autonomous storing/refueling station has anti-tamper or anti-theft devices, security monitoring devices such as cameras (optical, thermal, etc.), weather station or weather sensor packages that forms the weather station (including the hyper-local weather forecasting device), weed/plant killer unit with an integrated pesticides and insecticides device or setup, an fence with an active deterring mechanism such as electric shock, a thermal management mechanism (such as thermal insulation or thermal conduction materials or fans or heaters placed inside or outside of the drone box enclosure) to safely operate the drone box assembly,
  where the cameras installed on the drone box is being used with software to enable the capability of beyond-the-visual-line-of-sight or virtual-line-of-sight (using its local camera pole) in order to eliminate the need for the physical presence of a pilot or operator near the vicinity of the flight path or near the drone in order to further improve the safety of the drone and also meet the local safety and aviation requirements for unmanned vehicle operations,
where the data link is some sort of a communication device or method that allows sending, receiving, and managing the communications between the drone-detection radar, storing/refueling station, hydrogen fuel cell powered unmanned vehicle, where the radar data can be sent to a server or cloud or some other medium and then this data is sent to the storing/refueling station, or radar data is directly sent to the storing/refueling station, then the received data is sent to the hydrogen fuel cell powered unmanned vehicle by the same communication system or another communication device (such as a tactical data link, a digital data link, aircraft communication systems such as VHF/UHF/HF radios, datalinks use for aircrafts, or SATCOM), either based on simplex communications, half-duplex, or duplex communications principles,
  where the drone-detection radar has the capability of detecting any type of drones whether the radar itself is primary or secondary type radar, or continuous wave or pulse based operation radars, or modulated or unmodulated radars, or MTI or doppler radars, or a radar category that is more specifically suited for the detection of unmanned vehicles or unmanned aerial vehicles, a solid state radar, solid state radar x-band pulse radar, solid state x-band pulse doppler radar, short range or long range of these abovementioned radars, or perimeter sensors, or threat assessment system that are capable of detecting the presence of drones or unmanned vehicles,
  where the communication device for the storing/refueling station is a communication device that has the capability of sending and receiving input/output or data or signal to the hydrogen fuel cell powered unmanned vehicle,
  where the communication device on-board of the hydrogen fuel cell powered unmanned vehicle is a communication device that has the capability of sending and receiving input/output or data or signal to the storing/refueling station,
  where the artificial intelligence enabled virtual command center is utilized for the flight mission and flight path management tool that assist in the remote flight, telepiloting, and beyond-visual-line-of-sight or virtual-line-of-sight (using its local camera pole), schedule periodical drone flight activities around storing/refueling or storing/recharging stations, program to detect incoming drone threats within the radar range and automatically perform A.I. analysis to assess and identify the best method to intercept and neutralize the potential threats,
  where web-based ground control or some other ground-control solution is also integrated with the A.I. enabled virtual command center to monitor or manage certain control functions,
  where the power supply for the autonomous storing/refueling station (also called as drone box or drone box assembly) is a power supplying device in order to power all of the components and hardware associated with the drone box or drone box assembly and having the capability of utilizing different power sources either in their standalone form or any combinations in the hybridized form (such as power coming from the towing vehicle engine or another standby engine, from a battery power module, from a fuel cell power module, from a solar power module, from a wind power module, etc.).

38. A hydrogen fuel cell powered unmanned vehicle and its storing/refueling station with an autonomous infrastructure as an autonomous eco-system and the unmanned vehicle having the capabilities of spoofing, jamming, or electronic communication disruption and autonomous flying capability that is comprised of the followings systems/ components (for the incapacitation of unauthorized or stray or outlaw drones without damaging any one of the unmanned vehicles or unauthorized or stray or outlaw drones):

a hydrogen fuel cell powered unmanned vehicle with additional sensing devices, a capturing tool, a spoofing or jamming or electronic communication disruption device, and an on-board computer or autonomous flight management system to improve its drone incapacitation capability, an autonomous storing/refueling station (also known as drone box assembly), a distributed and interchangeable electric propulsion pod an autonomous ground vehicle with robotic solutions for the refueling of the distributed and interchangeable electric propulsion pod an autonomous ground hydrogen supply tank an autonomous refueling infrastructure that can supply different forms of hydrogen fuel (gaseous or liquid) manned ground hydrogen fuel tanker hydrogen farm that is comprised of renewable energy powered modular hydrogen generation units a data link, a drone-detection radar, perimeter sensors, or threat assessment system a communication device for the autonomous storing/refueling station to communicate with the said hydrogen fuel cell powered unmanned vehicle, a communication device on-board of the hydrogen fuel cell powered unmanned vehicle to communicate with the autonomous storing/refueling station, an artificial intelligence enabled virtual command center, a power supply for the autonomous storing/refueling station, where the hydrogen fuel cell powered unmanned vehicle be in the form of either single-rotor, multi-rotor, vertical takeoff and landing VTOL, hybrid VTOL, fixed-wing, vertically or perpendicularly launched unmanned vehicles, catapult-launched unmanned vehicles, horizontally launched unmanned vehicles, or any other similar aerial platforms, and have additional sensing devices such as a camera to search and identify, then monitor and confirm the incapacitation event, a proximity sensing device such as a proximity sensor to close the distance and ensure the incapacitation event, a capturing device such as a capturing net to incapacitate the flight capability, an electronic communication disruption device such as a spoofing, jamming or communication disruption tool to overtake the remote control of the unauthorized or stray or outlaw drone and force it to land, and an on-board computer or autonomous flight management system to enable the autonomous flying of the hydrogen fuel cell powered unmanned vehicle in the case of a communication failure with the drone box (without creating any damage on the hydrogen fuel cell powered unmanned vehicle or on the unauthorized or stray or outlaw drone to reduce the cost of the drone neutralization efforts and also enable the capability of studying the hardware of the captured drone in order to identify the operator or entity that is remotely controlling the unauthorized or stray or outlaw drone for the prosecution of the person or entity, capturing net will be utilized in the event of not being able take the control of the unauthorized or stray or outlaw drone with the spoofing, jamming or communication disruption tool), where the autonomous or automated storing/refueling station being a part of the eco-system (collectively known as drone box assembly) has a storing section, a refueling section, and a control section;

where the storing section has the capability of storing of the said unmanned vehicle with a smart precision landing device (such as vision-based landing, etc.) and containing all or part of the balance of plant that is needed for the safe operation of the storing/refueling station assembly, where the refueling section has the capability of storing the refueled or unused distributed and interchangeable electric propulsion pods, storage and dispensing mechanisms with conveyer belts to move the propulsion pods around, robotic solutions to remove the depleted propulsion pods and exchange these with refueled ones, where the control section has the capability of communicating with both the drone-detection radar and hydrogen fuel cell powered unmanned vehicles, and containing all or part of the balance of plant that is needed for the safe operation of the storing/refueling station, where the storing section, refueling section, and control section are either located within a single enclosure or each of these sections are split up and placed vertically or horizontally depending on the storing/refueling requirement of the unmanned vehicle that will be used for the neutralization of the unauthorized or stray or outlaw drone, where the autonomous storing/refueling station has anti-tamper or anti-theft devices, security monitoring devices such as cameras (optical, thermal, etc.), weather station or weather sensor packages that forms the weather station (including the hyper-local weather forecasting device), weed/plant killer unit with an integrated pesticides and insecticides device or setup, an fence with an active deterring mechanism such as electric shock, a thermal management mechanism (such as thermal insulation or thermal conduction materials or fans or heaters placed inside or outside of the drone box enclosure) to safely operate the drone box assembly, where the cameras installed on the drone box is being used with software to enable the capability of beyond-the-visual-line-of-sight or virtual-line-of-sight (using its local camera pole) in order to eliminate the need for the physical presence of a pilot or operator near the vicinity of the flight path or near the drone in order to further improve the safety of the drone and also meet the local safety and aviation requirements for unmanned vehicle operations, where the robotics solutions also has an integrated electrical charging mechanism that can be used to charge the battery on-board of the distributed and interchangeable electric propulsion pods and achieves this by contact charging or wireless charging, where the unmanned vehicle is designed to carry a distributed and interchangeable electric propulsion pods either in a single form or in its multiple form depending on the power requirement for the unmanned vehicle or the length of the mission, where the distributed and interchangeable electric propulsion pods have an interface for the refueling of the hydrogen fuel either in gaseous or liquid form, a hydrogen fuel storage medium, essential plumbing to refuel the hydrogen fuel to the storage medium, a dispensing interface to deliver the hydrogen to the fuel cell stack, a hybrid battery module to store or deliver electrical energy whenever it is needed, a control module to safely operate operation of the hardware located inside the distributed and interchangeable electric propulsion pod, an electric gear or gearbox to increase the energy efficiency by optimizing the gear ratio to the propeller and electric motor, where an autonomous ground vehicle with robotic solutions (also being a part of the eco-system) is utilized to remove the depleted distributed and interchangeable electric propulsion pods from the unmanned vehicle, stowage and storage of the depleted pods after properly matching the refueling mechanisms located both on the pods and also the autonomous ground vehicle, carrying the depleted propulsion pods to the refueling site (whether this is an autonomous ground hydrogen fuel tank, hydrogen discharge points located within an infrastructure, or manned hydrogen fuel tanker, etc.), complete the refueling of the hydrogen and then ring back the charged or refueled propulsion pods to the location of the unmanned vehicle and finally install these onto the unmanned vehicle via robotic solutions, where an autonomous ground hydrogen supply tank (also being part of the eco-system) is an autonomous vehicle that carries hydrogen supply within its hydrogen storage medium for refueling of the depleted distributed and interchangeable electric propulsion pods that are carried over the autonomous ground vehicle, where an autonomous refueling infrastructure (also being part of the eco-system) has the capability of either storing gaseous hydrogen obtained from commercial cylinders and then supply this fuel the autonomous refueling of the autonomous ground vehicles that are carrying depleted distributed and interchangeable electric propulsion pods either in the gaseous or liquid from, or generating gaseous hydrogen via electrolysis or reforming or another similar mechanism, then purifying it and then deliver it to the autonomous refueling of the autonomous ground vehicles that are carrying depleted distributed and interchangeable electric propulsion pods, or generating gaseous hydrogen first and then then converting it into liquid hydrogen and then dispense this to the autonomous refueling of the autonomous ground vehicles that are carrying depleted distributed and interchangeable electric propulsion pods, where a manned ground hydrogen supply tanker (also being a part of the eco-system) is a vehicle that is man-operated and carries either gaseous or liquid hydrogen in order to refuel the depleted distributed and interchangeable electric propulsion pods with the aid of an operator, where a hydrogen farm is a facility (also being a part of the eco-system) that is comprised of modular hydrogen generation units that utilizes solar, wind, and other renewable energy sources in addition to batteries, fuel cells, etc. to generate hydrogen from electrolysis or reforming or other similar mechanisms and then dispense this hydrogen gas to the autonomous ground vehicles that are carrying depleted distributed and interchangeable electric propulsion pods, where the data link is some sort of a communication device or method that allows sending, receiving, and managing the communications between the drone-detection radar, storing/refueling station, hydrogen fuel cell powered unmanned vehicle, where the radar data can be sent to a server or cloud or some other medium and then this data is sent to the storing/refueling station, or radar data is directly sent to the storing/refueling station, then the received data is sent to the hydrogen fuel cell powered unmanned vehicle by the same communication system or another communication device (such as a tactical data link, a digital data link, aircraft communication systems such as VHF/UHF/HF radios, datalinks use for aircrafts, or SATCOM), either based on simplex communications, half-duplex, or duplex communications principles, where the drone-detection radar has the capability of detecting any type of drones whether the radar itself is primary or secondary type radar, or continuous wave or pulse based operation radars, or modulated or unmodulated radars, or MTI or doppler radars, or a radar category that is more specifically suited for the detection of unmanned vehicles or unmanned aerial vehicles, a solid state radar, solid state radar x-band pulse radar, solid state x-band pulse doppler radar, short range or long range of these abovementioned radars, or perimeter sensors, or threat assessment system that are capable of detecting the presence of drones or unmanned vehicles, where the communication device for the storing/refueling station is a communication device that has the capability of sending and receiving input/output or data or signal to the hydrogen fuel cell powered unmanned vehicle, where the communication device on-board of the hydrogen fuel cell powered unmanned vehicle is a communication device that has the capability of sending and receiving input/output or data or signal to the storing/refueling station, where the artificial intelligence enabled virtual command center is utilized for the flight mission and flight path management tool that assist in the remote flight, telepiloting, and beyond-visual-line-of-sight or virtual-line-of-sight (using its local camera pole), schedule periodical drone flight activities around storing/refueling or storing/recharging stations, program to detect incoming drone threats within the radar range and automatically perform A.I. analysis to assess and identify the best method to intercept and neutralize the potential threats, where web-based ground control or some other ground-control solution is also integrated with the A.I. enabled virtual command center to monitor or manage certain control functions, where the power supply for the autonomous storing/refueling station (also called as drone box or drone box assembly) is a power supplying device in order to power all of the components and hardware associated with the drone box or drone box assembly and having the capability of utilizing different power sources either in their standalone form or any combinations in the hybridized form (such as power coming from the towing vehicle engine or another standby engine, from a battery power module, from a fuel cell power module, from a solar power module, from a wind power module, etc.).

39. An unmanned vehicle and its storing/refueling station mentioned in item 37 with a spoofing, jamming, or electronic communication disruption capability and autonomous flying capability that is comprised of the followings systems/components (for the incapacitation of unauthorized or stray or outlaw drones without damaging any one of the unmanned vehicles or unauthorized or stray or outlaw drones):
- a non-hydrogen power generating device powered unmanned vehicle with additional sensing devices, a capturing tool, a spoofing or jamming or electronic communication disruption device, and an on-board computer or autonomous flight management system to improve its drone incapacitation capability,
- an autonomous storing/refueling station (also known as drone box assembly),
- a data link,
- a drone-detection radar, perimeter sensors, or threat assessment system
- a communication device for the autonomous storing/refueling station to communicate with the said non-hydrogen power generating device powered unmanned vehicle,
- a communication device on-board of non-hydrogen power generating device powered unmanned vehicle to communicate with the autonomous storing/refueling station,
- an artificial intelligence enabled virtual command center,
- a power supply for the autonomous storing/refueling station,
- where the non-hydrogen power generating device powered unmanned vehicle be in the form of either single-rotor, multi-rotor, vertical takeoff and landing VTOL, hybrid VTOL, fixed-wing, vertically or perpendicularly launched unmanned vehicles, catapult-launched unmanned vehicles, horizontally launched unmanned vehicles, or any other similar aerial platforms, and have additional sensing devices such as a camera to search and identify, then monitor and confirm the incapacitation event, a proximity sensing device such as a proximity sensor to close the distance and ensure the incapacitation event, a capturing device such as a capturing net to incapacitate the flight capability, an electronic communication disruption device such as a spoofing, jamming or communication disruption tool to overtake the remote control of the unauthorized or stray or outlaw drone and force it to land, and an onboard computer or autonomous flight management system to enable the autonomous flying of the non-hydrogen power generating device powered unmanned vehicle in the case of a communication failure with the drone box (without creating any damage on the non-hydrogen power generating device powered unmanned vehicle or on the unauthorized or stray or outlaw drone to reduce the cost of the drone neutralization efforts and also enable the capability of studying the hardware of the captured drone in order to identify the operator or entity that is remotely controlling the unauthorized or stray or outlaw drone for the prosecution of the person or entity, capturing net will be utilized in the event of not being able take the control of the unauthorized or stray or outlaw drone with the spoofing, jamming or communication disruption tool),
- where the autonomous or automated storing/refueling station (collectively known as drone box assembly) has a storing section, a refueling section, and a control section;
    - where the storing section has the capability of storing of the said unmanned vehicle with a smart precision landing device (such as vision-based landing, etc.) and containing all or part of the balance of plant that is needed for the safe operation of the storing/refueling station assembly,
- where the refueling/recharging/exchanging section has the capability of refueling or recharging or exchanging the depleted power generating device and/or its fuel with the unused or charged one
- where the power generation is based on either batteries, internal combustion engines, solar power, photovoltaic arrays, radioisotope or radioactive power systems, nuclear fission based power generators, thermal energy conversion devices, Stirling convertors, Brayton converters, Rankine converters, micro-miniature dynamic power converters that are integrated with radioisotope heater units, alpha/beta-voltaic energy conversion devices, bio-inspired power generation devices, etc., and also the combinations of these different power sources,
- where the control section has the capability of communicating with both the drone-detection radar and non-hydrogen power generating device powered unmanned vehicle, and containing all or part of the balance of plant that is needed for the safe operation of the storing/refueling station,
- where the storing section, refueling section, and control section are either located within a single enclosure or each of these sections are split up and placed vertically or horizontally depending on the storing/refueling requirement of the unmanned vehicle that will be used for the neutralization of the unauthorized or stray or outlaw drone,
- where the autonomous storing/refueling station has anti-tamper or anti-theft devices, security monitoring devices such as cameras (optical, thermal, etc.), weather station or weather sensor packages that forms the weather station (including the hyper-local weather forecasting device), weed/plant killer unit with an integrated pesticides and insecticides device or setup, an fence with an active deterring mechanism such as electric shock, a thermal management mechanism (such as thermal insulation or thermal conduction materials or fans or heaters placed inside or outside of the drone box enclosure) to safely operate the drone box assembly,
- where the cameras installed on the drone box is being used with software to enable the capability of beyond-the-visual-line-of-sight or virtual-line-of-sight (using its local camera pole) in order to eliminate the need for the physical presence of a pilot or operator near the vicinity of the flight path or near the drone in order to further improve the safety of the drone and also meet the local safety and aviation requirements for unmanned vehicle operations,
- where the robotics solutions also has an integrated electrical charging mechanism that can be used to charge the battery on-board of the unmanned vehicle and achieves this by contact charging or wireless charging,
- where the data link is some sort of a communication device or method that allows sending, receiving, and managing the communications between the drone-detection radar, storing/refueling station, non-hydrogen power generating device powered unmanned vehicle, where the radar data can be sent to a server or cloud or some other medium and then this data is sent to the storing/refueling station, or radar data is directly sent to the storing/refueling station, then the received data is sent to the non-hydrogen power generating device powered unmanned vehicle by the same communication system or another communication device (such as a tactical data link, a digital data link, aircraft communication systems such as VHF/UHF/HF radios, datalinks use for aircrafts, or SATCOM), either based on simplex communications, half-duplex, or duplex communications principles, where the drone-detection radar has the capability of detecting any type of drones whether the radar itself is primary or secondary type radar, or continuous wave or pulse based operation radars, or modulated or unmodulated radars, or MTI or doppler radars, or a radar category that is more specifically suited for the detection of unmanned vehicles or unmanned aerial vehicles, a solid state radar, solid state radar x-band pulse radar, solid state x-band pulse doppler radar, short range or long range of these abovementioned radars, or perimeter sensors, or threat assessment system that are capable of detecting the presence of drones or unmanned vehicles, where the communication device for the storing/refueling station is a communication device that has the capability of sending and receiving input/output or data or signal to the non-hydrogen power generating device powered unmanned vehicle, where the communication device on-board of the non-hydrogen power generating device powered unmanned vehicle is a communication device that has the capability of sending and receiving input/output or data or signal to the storing/refueling station, where the artificial intelligence enabled virtual command center is utilized for the flight mission and flight path management tool that assist in the remote flight, tele-piloting, and beyond-visual-line-of-sight or virtual-line-of-sight (using its local camera pole), schedule periodical drone flight activities around storing/refueling or storing/recharging stations, program to detect incoming drone threats within the radar range and automatically perform A.I. analysis to assess and identify the best method to intercept and neutralize the potential threats, where web-based ground control or some other ground-control solution is also integrated with the A.I. enabled virtual command center to monitor or manage certain control functions, where the power supply for the autonomous storing/refueling station (also called as drone box or drone box assembly) is a power supplying device in order to power all of the components and hardware associated with the drone box or drone box assembly and having the capability of utilizing different power sources either in their standalone form or any combinations in the hybridized form (such as power coming from the towing vehicle engine or another standby engine, from a battery power module, from a fuel cell power module, from a solar power module, from a wind power module, etc.).

The embodiments can also be described with a different item list below, which includes lists of features or elements. The respective combinations of features, which are disclosed in the item list, are regarded as independent subject matter, respectively, that can also be combined with other features of the application.

1. An autonomous refueling vehicle for a hydrogen-electric aircraft, wherein the hydrogen-electric aircraft comprises
   at least two wings, and
   at least one removable electric propulsion pod that is attached to one of the two wings, the at least one removable electric propulsion pod comprising
      a body that comprises a hydrogen refueling interface for receiving hydrogen, and
      a lock and unlock mechanism being adapted to removably attach the body to one of the two wings,
   the autonomous refueling vehicle comprising
      a hydrogen refueling module being adapted to connect to the hydrogen refueling interface and to a hydrogen source, and
      a propulsion pod handling device being adapted to activate the lock and unlock mechanism to remove the at least one removable electric propulsion pod from one of the two wings, and to position the at least one removable electric propulsion pod on the hydrogen refueling module such that the hydrogen refueling interface is connected to the hydrogen refueling module,
   wherein the autonomous refueling vehicle is adapted to autonomously move itself to the hydrogen source to allow the hydrogen refueling module to removably connect to the hydrogen source for refueling of the removable electric propulsion pod.

2. The autonomous refueling vehicle according to item 1, wherein the propulsion pod handling device is further adapted to attach the at least one removable electric propulsion pod to one of the two wings.

3. The autonomous refueling vehicle according to item 1 or 2, wherein the hydrogen refueling module comprises
   a hydrogen receiving interface being adapted to connect to the hydrogen source,
   a chamber being connected to the hydrogen receiving interface, and
   a plurality of recesses with hydrogen discharge ports, the hydrogen discharge ports being connected to the chamber,
   wherein each recess is adapted to receive the at least one removable electric propulsion pod for allowing the hydrogen discharge port to be connected to the hydrogen refueling interface of the at least one removable electric propulsion pod.

4. The autonomous refueling vehicle according to one of items 1 to 3, wherein the propulsion pod handling device comprises at least one robotic arm with at least one robotic grasping mechanism, the robotic grasping mechanism being adapted to position the at least one removable electric propulsion pod on the hydrogen refueling module.

5. The autonomous refueling vehicle according to one of items 1 to 3, wherein the propulsion pod handling device comprises a hydrogen refueling module elevating assembly being adapted to vertically move the hydrogen refueling module towards and away from the at least one removable electric propulsion pod.

6. The autonomous refueling vehicle according to item 5, wherein the propulsion pod handling device further comprises at least one lift and catch mechanism being adapted to attach the at least one removable electric propulsion pod to one of the two wings.

7. The autonomous refueling vehicle according to one of the above-mentioned items, wherein the at least one autonomous refueling vehicle further comprises at least two wheels being adapted to move towards and away from the hydrogen-electric aircraft.

8. The autonomous refueling vehicle according to item 7, wherein the at least one autonomous refueling vehicle further comprises a mono-directional steering mechanism being adapted to direct the at least two wheels to move in one direction.

9. The autonomous refueling vehicle according to item 7, wherein the at least one autonomous refueling vehicle further comprises a multi-directional steering mechanism being adapted to direct the at least two wheels to move in multiple directions.

10. An autonomous hydrogen refueling infrastructure comprising
an autonomous refueling vehicle according to one of items 1 to 9, and
a hydrogen source for providing hydrogen to the autonomous refueling vehicle.

11. The autonomous hydrogen refueling infrastructure according to item 10, wherein the hydrogen source comprises an autonomous movable hydrogen supply tank.

12. The autonomous hydrogen refueling infrastructure according to item 11, wherein the autonomous movable hydrogen supply tank comprises at least two wheels with a multidirectional steering mechanism being adapted to move in multiple directions.

13. A hydrogen refueling system for aviation comprising
a hydrogen-electric aircraft that comprises
at least two wings, and
at least one removable electric propulsion pod that is attached to one of the two wings, the at least one removable electric propulsion pod comprising
a body that comprises a hydrogen refueling interface for receiving hydrogen, and
a lock and unlock mechanism being adapted to removably attach the body to one of the two wings,
an autonomous hydrogen refueling infrastructure according to one of items 10 or 13.

14. An automated hydrogen refueling and storage assembly for at least one unmanned vehicle, the at least one unmanned vehicle comprises at least one hydrogen storage device, the automated hydrogen refueling and storage assembly comprising
a hydrogen storage device handling unit,
a movable landing platform being adapted to receive at least one landing unmanned vehicle and to move to a predetermined position, wherein the hydrogen storage device handling unit is adapted to move near to the predetermined position and to receive the at least one hydrogen storage device from the at least one unmanned vehicle,
a disposing storage unit being adapted to receive the at least one hydrogen storage device from the hydrogen storage device handling unit and to store the at least one hydrogen storage device,
a hydrogen storage device storing unit for storing a plurality of hydrogen storage devices, the hydrogen storage device storing unit being adapted to transfer a hydrogen storage device from the plurality of the hydrogen storage devices to the hydrogen storage device handling unit, wherein the hydrogen storage device handling unit is further adapted to attach the hydrogen storage device to the at least one unmanned vehicle,
wherein the disposing storage unit and the hydrogen storage device storing unit are located inside and underneath the landing platform.

15. The automated hydrogen refueling and storage assembly according to item 14, wherein
the hydrogen storage device handling unit is positioned adjacent to the disposing storage unit and the hydrogen storage device storing unit.

16. The automated hydrogen refueling and storage assembly according item 14, wherein
the hydrogen storage device handling unit is positioned between the disposing storage unit and the hydrogen storage device storing unit.

17. The automated hydrogen refueling and storage assembly according to one of items 14 to 16, wherein the hydrogen storage device storing unit comprises a hydrogen refueling unit being adapted to provide hydrogen to the plurality of the hydrogen storage devices.

18. The automated hydrogen refueling and storage assembly according to one of items 14 to 17, wherein
the hydrogen storage device handling unit comprises a robotic arm with a grasping mechanism and with a locking/unlocking mechanism, the grasping mechanism and the locking/unlocking mechanism being adapted to work cooperatively to grasp the at least one hydrogen storage device from the at least one unmanned vehicle.

19. The automated hydrogen refueling and storage assembly according to item 18, wherein
the grasping mechanism and the locking/unlocking mechanism are further adapted to work cooperatively to attach the at least one hydrogen storage device to the at least one unmanned vehicle.

20. The automated hydrogen refueling and storage assembly according to one of items 14 to 19, wherein
the disposing storage unit comprises a first conveyer belt mechanism being adapted to transfer the at least one hydrogen storage device from the hydrogen storage device handling unit to the disposing storage unit.

21. The automated hydrogen refueling and storage assembly according to one of items 14 to 20, wherein
the hydrogen storage device storing unit comprises a second conveyer belt mechanism being adapted to transfer the hydrogen storage devices to the hydrogen storage device handling unit.

22. The automated hydrogen refueling and storage assembly according to one of items 14 to 21, wherein the hydrogen storage device comprises a member that is selected from a group consisting of hydrogen cylinder, hydrogen cartridge, and hydrogen pods.

23. An automated hydrogen refueling and storage assembly for at least one unmanned vehicle, the at least one unmanned vehicle comprises at least one hydrogen storage device, the automated hydrogen refueling and storage assembly comprising
a hydrogen storage device handling unit,
a movable landing platform being adapted to receive at least one landing unmanned vehicle and to move to a predetermined position,
wherein the hydrogen storage device handling unit is adapted to move near to the predetermined position and to receive the at least one hydrogen storage device from the at least one unmanned vehicle,
a hydrogen storage device storing unit being adapted to receive the at least one hydrogen storage device from the hydrogen storage device handling unit, and to store the at least one hydrogen storage device, wherein the hydrogen storage device storing unit is further adapted to transfer another hydrogen storage device to the hydrogen storage device handling unit,
a hydrogen refueling unit being adapted to receive the at least one hydrogen storage device from the hydrogen storage device storing unit and to provide hydrogen to the at least one hydrogen storage device,
wherein the hydrogen refueling unit and the hydrogen storage device storing unit are located next to the landing platform.

24. The automated hydrogen refueling and storage assembly according to item 23, wherein
hydrogen refueling unit and the hydrogen storage device storing unit are located adjacent to each other.

25. The automated hydrogen refueling and storage assembly according to item 23 or 24, wherein
the hydrogen storage device handling unit is further adapted to receive the other hydrogen storage device from the hydrogen storage device handling unit and to attach the other hydrogen storage device to the at least one unmanned vehicle.

26. The automated hydrogen refueling and storage assembly according to one of items 23 to 25, wherein
the hydrogen storage device storing unit is located between the hydrogen refueling unit and the landing platform.

27. The automated hydrogen refueling and storage assembly according to one of items 23 to 26, wherein
the hydrogen storage device storing unit comprises a conveyer belt mechanism being adapted to transfer the at least one hydrogen storage device between the hydrogen storage device handling unit and the hydrogen storage device storing unit.

28. The automated hydrogen refueling and storage assembly according to one of items 23 to 27, wherein
the hydrogen storage device handling unit comprises a robotic arm with a grasping mechanism and with a locking/unlocking mechanism, the grasping mechanism and the locking/unlocking mechanism being adapted to work cooperatively to grasp the at least one hydrogen storage device from the at least one unmanned vehicle.

29. The automated hydrogen refueling and storage assembly according to item 28, wherein
the grasping mechanism and the locking/unlocking mechanism are further adapted to work cooperatively to attach the at least one hydrogen storage device to the at least one unmanned vehicle.

30. A drone defense assembly for neutralization of at least one drone, the drone defense assembly comprising
an automated hydrogen refueling and storage assembly according to one of items 14 to 29,
at least one hydrogen fuel cell powered unmanned vehicle comprising at least one hydrogen storage device, and
a drone-detection radar,
wherein the automated hydrogen refueling and storage assembly further comprises a control unit, the control unit being adapted to communicatively connect to the drone-detection radar and to the at least one hydrogen fuel cell powered unmanned vehicle,
wherein the drone-detection radar is adapted to detect drones, to assess potential threats of the detected drones, and to send at least one control signal to the control unit,
wherein the control unit is further adapted to direct the at least one hydrogen fuel cell powered unmanned vehicle according to the at least one control signal to move in a manner to neutralize the potential threats.

Although the above description contains much specificity, this should not be construed as limiting the scope of the embodiments but merely providing illustration of the foreseeable embodiments. The above-stated advantages of the embodiments should not be construed especially as limiting the scope of the embodiments but merely to explain possible achievements if the described embodiments are put into practice. Thus, the scope of the embodiments should be determined by the claims and their equivalents, rather than by the examples given.

REFERENCE NUMBERS

1 Hydrogen-electric aircraft with distributed and interchangeable electric propulsion pods and solar wing
2 Aircraft wing or aircraft wing with solar cells or photovoltaic cells
3 Winglet to decrease drag
4 Fuselage
5 Vertical/Horizontal stabilizers and rudder
6 Distributed and interchangeable electric propulsion pods
7 Refueling interface for the distributed and interchangeable electric propulsion pods (to get hydrogen from the autonomous ground refueling vehicles)
8 Solar cells or photovoltaic cells placed on the aircraft wing
9 Hybrid battery storage area for the command and control system on-board of the hydrogen-electric aircraft
10 Outer surface of the hydrogen-electric aircraft
11 Cockpit for command and control
12 Propeller
13 Lock/unlock mechanism to secure the distributed and interchangeable electric propulsion pods to the hydrogen-electric aircraft's wing
14 Hydrogen fuel cell stack
15 Hydrogen storage cylinder, cartridge or pod
16 Hydrogen delivery interface to the hydrogen fuel cell stack
17 Battery modules
18 Electronics and controls
19 Electric motor gears or gearbox or electric motor
20 Data and electrical communication interface between the distributed and interchangeable electric propulsion pods, propeller, and cockpit
21 Propeller attachment interface to the aircraft wing and the distributed and interchangeable electric propulsion pods
22 Refueling line to charge hydrogen into the depleted hydrogen storage cylinder, cartridge or pod
23 Robotic arm or robotic grasping mechanism
24 Autonomous ground refueling vehicle
25 Storage section for charged or depleted distributed and interchangeable electric propulsion pods
26 Hydrogen fuel discharge port from the autonomous ground vehicle to the depleted distributed and interchangeable electric propulsion pods
27 Hydrogen fuel manifold to supply hydrogen fuel to the hydrogen fuel discharge port
28 Mono-directional steering mechanism for the autonomous ground refueling vehicle
29 Autonomous ground refueling vehicle lift mechanism component 1
30 Autonomous ground refueling vehicle lift mechanism component 2
31 Lift and catch mechanism
32 Elevator section of the autonomous ground refueling vehicle with lift and catch mechanism 33 Base section of the autonomous ground refueling vehicle to carry the elevator section of the autonomous ground refueling vehicle with lift and catch mechanism
34 Multi-directional steering mechanism for the autonomous ground refueling vehicle
35 Hydrogen fuel stored in the autonomous ground hydrogen supply tank
36 Hydrogen transfer line from hydrogen supply tank to autonomous ground refueling vehicle
37 Autonomous ground hydrogen supply tank
38 Interface between the hydrogen fuel supply tank and hydrogen transfer line to move hydrogen fuel from the hydrogen fuel supply tank to the autonomous ground refueling vehicle
39 Hydrogen fuel discharge or pumping points installed inside a building such as hydrogen refueling warehouse or hydrogen refueling hangar
40 Main hydrogen fuel transfer line inside a building such as hydrogen refueling warehouse or hydrogen refueling hangar
41 Portion of the building or the building itself such as hydrogen refueling warehouse or hydrogen refueling hangar
42 Hydrogen storage or hydrogen generation section
43 Primary compressor, secondary compressor, or booster pump
44 Intermediary storage
45 Interface between the intermediary storage and hydrogen liquefier device
46 Hydrogen fuel transfer line from intermediary storage to the hydrogen liquefier device
47 Hydrogen liquefier unit
48 Individual hydrogen liquefier devices
49 Liquid hydrogen fuel transfer line to the liquid hydrogen fuel discharge point
50 Liquid hydrogen discharge point and discharge mechanism
51 Liquid hydrogen receiving point and receiving mechanism located on the autonomous ground refueling vehicle
52 Liquid hydrogen transfer lines existing on the autonomous ground refueling vehicle to move the liquid hydrogen from liquid hydrogen dispenser to the depleted distributed and interchangeable electric propulsion pods
53 Manned ground hydrogen fuel supply tanker
54 On-site liquid hydrogen generator setup
55 Gaseous or high pressure gaseous hydrogen discharge point and discharge mechanism
56 Gaseous or high pressure gaseous hydrogen receiving point and receiving mechanism
57 Autonomous hydrogen storage or hydrogen generator, or hydrogen liquefier, and hydrogen dispenser infrastructure
58 An autonomous mobile catapult system with batteries to assist during the take off
59 Solar panels used in the hydrogen farm to produce electrical energy for generating hydrogen form the water electrolysis reaction while reducing the CO2 emission
60 Attachment point for the solar panels to provide a share for the autonomous hydrogen refueling station located in the hydrogen farm
61 Renewable energy powered (solar or wind, hybridized with battery or fuel cells or any combination of different renewable energy sources with battery/fuel cells) hydrogen refueling modules for generation of hydrogen from the water electrolysis reaction and then discharge this fuel into the distributed and interchangeable electric propulsion pods
62 Hydrogen discharge points to transfer the hydrogen fuel generated inside the solar-powered or hybrid solar-battery powered hydrogen refueling module into the distributed and interchangeable electric propulsion pods
63 Wind turbines to harness the wind power energy
64 Hydrogen farm
101 Drone charging and storing station's opening doors
102 Modular refueling/refilling storage box
103 Unmanned vehicle
104 Hydrogen fuel cell stack system
105 On-board hydrogen storage cylinder or cartridge or pod
106 Unmanned vehicle landing platform's lifting/descending mechanism
107 Charged/unused hydrogen cylinder or cartridge or pod racks chamber with dispenser mechanism
108 Charged/unused hydrogen cylinder or cartridge or pod
109 Charged/unused hydrogen cylinder or cartridge or pod conveyor belt
110 Hydrogen cylinder or cartridge or pod lifting mechanism
111 Robotic grasping mechanism or robotic arm
112 Locking/Unlocking mechanism
113 Depleted hydrogen cylinder or cartridge or pod conveyor belt
114 Depleted hydrogen cylinder or cartridge or pod racks chamber with dispenser mechanism
115 Depleted hydrogen cylinder or cartridge or pod
116 Empty rack for depleted hydrogen cylinder or cartridge or pod
117 Modular disposing storage box
118 Opening mechanism for manual disposal
119 Refilling port interface
120 Primary Compressor
121 Secondary Compressor
122 Booster pump
123 Water storage tank
124 Water transfer pump
125 Electrolyzer
126 Gas cleanup unit for hydrogen stream
127 Intermediary hydrogen storage tank
128 Opening mechanism for manual refilling/exchanging of water or hydrogen cylinders or cartridges or pods
129 Unmanned vehicle landing platform
130 Electronics and control
131 Charged/unused/depleted hydrogen cylinder or cartridge or pod conveyer belt
132 Drone box
133 Charged/empty hydrogen cylinder/pod storage
134 Hydrogen refueling section
135 Power supply
136 Charged hydrogen cylinder or cartridge or pod racks chamber
137 Revolving racks moving mechanism
138 Depleted cylinder or cartridge or pod rack chamber
139 Disposed depleted cylinder or cartridge or pod
140 Linear rack moving mechanism
141 Payload
142 Landing platform with precision landing mechanism #1 and doors
143 Compressed hydrogen gas cylinders (from commercial suppliers or other sources)

144 Water filtration unit to clean the field water for the electrolyzer
145 Weed/plant killer unit with an integrated pesticides and insecticides device or setup
146 Electric fence
147 Anti-tamper or anti-theft device
148 Charged/unused hydrogen cylinder or cartridges or pod rack chamber
149 Hydrogen liquefier device
150 Unused hydrogen slurry cartridge or pod
151 Hydrogen slurry cartridge or pod interface connections to the fuel cell stack or fuel cell system
152 Hydrogen slurry cartridge or pod storage
153 Hydrogen slurry cartridge or pod exchange station
154 Hydrogen solid cartridge or pod
155 Hydrogen solid cartridge or pod interface connections to the fuel cell stack or fuel cell system
156 Hydrogen solid cartridge or pod storage
157 Hydrogen solid cartridge or pod exchange station
158 Charged/Depleted hydrogen cylinders or cartridges or pods rack chamber
159 Refilling or dispensing port for the cylinder
160 Autonomous hydrogen refueling/exchanging and unmanned vehicle storing station
161 Landing platform with precision landing mechanism #2
162 Opening mechanism for manual refilling of water, hydrogen cylinder, cartridges, or pods
163 Electronics and control for autonomous hydrogen refueling and unmanned vehicle storing station
164 Security monitoring device such as a camera for controlling the security of the autonomous hydrogen refueling and unmanned vehicle storing station
165 Weather sensor or weather sensor package (including a hyper-local weather forecasting device)
166 Communication module
201 Drone-detection radar setup (or perimeter sensors, or other threat detection systems)
202 Signature of the unauthorized or stray or outlaw drone on the drone-detection radar ((or perimeter sensors, or other threat detection systems)
203 Server for managing the communications between the drone-detection radar (or perimeter sensors, or other threat detection systems) and storing/refueling station of the hydrogen powered unmanned vehicle
204 Cloud for managing the communications between the drone-detection radar (or perimeter sensors, or other threat detection systems) and storing/refueling station of the hydrogen powered unmanned vehicle
205 Storing/Refueling station for the hydrogen fuel cell powered unmanned vehicle (also known as drone box)
206 Drone box's communication device to send/receive signals between drone box to the hydrogen fuel cell powered unmanned vehicle
207 Communication link between the drone box and the hydrogen fuel cell powered unmanned vehicle
208 Hydrogen fuel cell powered drone's communication device to send/receive signals between drone box to the hydrogen fuel cell powered unmanned vehicle
209 Hydrogen fuel cell powered unmanned vehicle (in this case multi-rotor drone)
210 Route to the unauthorized or stray or outlaw drone
211 Unauthorized or stray or outlaw drone's payload
212 Unauthorized or stray or outlaw drone
213 Collision event between the hydrogen fuel cell powered unmanned vehicle and the unauthorized or stray or outlaw drone
214 Crashed and broken hydrogen fuel cell powered unmanned vehicle and the unauthorized or stray or outlaw drone
215 A security device such as camera installed on the hydrogen fuel cell powered unmanned vehicle
216 Proximity sensors or devices installed on the hydrogen fuel cell powered unmanned vehicle
217 A swarm of hydrogen fuel cell powered unmanned vehicles with cameras and proximity sensors as their payload and en-route for drone neutralization
218 On-board computer installed on the hydrogen fuel cell powered unmanned vehicle (for autonomous course navigation and correction, search and identification, etc.)
219 A swarm of hydrogen fuel cell powered unmanned vehicles with cameras, proximity sensors, and an on-board computer (for autonomous course navigation and correction, search and identification, etc.) as their payload and en-route for drone neutralization
220 Hydrogen fuel cell powered unmanned vehicle (in this case VTOL) with a camera and proximity sensors en-route to neutralization of a drone
221 Hydrogen fuel cell powered unmanned vehicle (in this case VTOL) with a camera, proximity sensors, and an on-board computer (for autonomous course navigation and correction, search and identification, etc.) as its payload and en-route to neutralization of a drone
222 Hydrogen fuel cell powered unmanned vehicle (in this case fixed-wing) with a camera and proximity sensors en-route to neutralization of a drone
223 Capturing net installed on the hydrogen fuel cell powered unmanned vehicle
224 A swarm of hydrogen fuel cell powered unmanned vehicles (in this case multi-rotor drones) with cameras, proximity sensors, and capturing nets and en-route to neutralization of a drone
225 A swarm of hydrogen fuel cell powered unmanned vehicles (in this case multi-rotor drones) with cameras, proximity sensors, on-board computers (for autonomous course navigation and correction, search and identification, etc.) and capturing nets and en-route to neutralization of a drone
226 Capturing net in its deployed form
227 Spoofing or jamming or electronic disruption device installed on the hydrogen fuel cell powered unmanned vehicle
228 Remote controlling signal sent from the hydrogen fuel cell powered unmanned vehicle sent to unauthorized or stray or outlaw drone in order to take control of the drone
229 Ground for the unauthorized drone to land after its control is taken by the spoofing or jamming or electronic disruption device installed on the hydrogen fuel cell powered unmanned vehicle
230 A swarm of hydrogen fuel cell powered unmanned vehicles with cameras, proximity sensors, and capturing nets as their payload and en-route for drone neutralization
231 A swarm of hydrogen fuel cell powered unmanned vehicles with cameras, proximity sensors, on-board computers or autonomous flight managements systems, and capturing nets as their payload and en-route for drone neutralization
232 Neutralization of the unauthorized or stray or outlaw drone with capturing nets approach
233 Incapacitation of the unauthorized or stray or outlaw drone with capturing net approach 234 Hydrogen fuel cell powered unmanned vehicle with a security device such as camera, a proximity sensor, a capturing net, and a spoofing or jamming or an electronic communication disruption device 235 Hydrogen fuel cell powered unmanned vehicle with a security device such as camera, a proximity sensor, a capturing net, a spoofing or jamming or an electronic communication disruption device, and an on-board computer or autonomous flight management system 236 On-board hydrogen storage cylinder or cartridge or pod 237 Hydrogen fuel cell powered unmanned vehicle's automated storing and refueling station's (also called as drone box) opening doors 238 Drone box's modular refueling storage section 239 Drone box's modular disposing storage section 240 Primary Compressor 241 Secondary compressor 242 Charged/unused hydrogen cylinder or cartridge or pod racks chamber with dispenser mechanism 243 Refueling port interface 244 Charged/unused hydrogen cylinder or cartridge or pod 245 Unmanned vehicle landing platform's lifting/descending mechanism 246 Hydrogen cylinder or cartridge or pod lifting mechanism 247 Locking/Unlocking mechanism 248 Robotic grasping mechanism or robotic arm 249 Depleted hydrogen cylinder or cartridge or pod conveyor belt 250 Depleted hydrogen cylinder or cartridge or pod 251 Empty rack for depleted hydrogen cylinder or cartridge or pod 252 Depleted hydrogen cylinder or cartridge or pod racks chamber with dispenser mechanism 253 Opening mechanism for manual refilling/exchanging of water or hydrogen cylinders or cartridges or pods 254 Opening mechanism for manual disposal 255 Electronics and control 256 Anti-tamper or anti-theft notification device 257 Security monitoring device such as a camera for controlling the security of the autonomous hydrogen refueling and unmanned vehicle storing station 258 Weather sensor or weather sensor package (including a hyper-local weather forecasting device)

259 Weed/plant killer unit with an integrated pesticides and insecticides device or setup 260 Charged/unused liquid hydrogen cylinder or pod 261 Hydrogen liquefier device 262 Fuel cell power system 263 Hydrogen fuel cell powered unmanned vehicle's landing platform that contains a smart device for autonomous landing of the said unmanned vehicle with precise alignment mechanism 264 Charged/unused hydrogen cylinder or cartridge or pod conveyor belt 265 A fence, preferably with an active deterring mechanism such as electrical shock to keep or maintain the safety of the autonomous storing/refueling station (also called as drone box or drone box assembly)

266 Wing section of the unmanned vehicle (in this case fixed-wing or hybrid VTOL with a fixed wing platform)

267 Lock/unlock mechanism to easily attach an distributed and interchangeable electric propulsion pod 268 Distributed and interchangeable electric propulsion pod 269 Interface to refuel the distributed and interchangeable electric propulsion pod 270 Refueling line for the distributed and interchangeable electric propulsion pod 271 Fuel storage medium for the distributed and interchangeable electric propulsion pod 272 Discharge interface to transfer the fuel to the fuel cell stack 273 Fuel Cell stack system 274 Battery module or hybrid battery module 275 Control module for the distributed and interchangeable electric propulsion pod 276 Electric gear or gearbox for the distributed and interchangeable electric propulsion pod to optimize the gear ratio 277 Electrical/electronics, data, and communication interface for the distributed and interchangeable electric propulsion pod 278 Interface to attach the distributed and interchangeable electric propulsion pod to the propeller secured on the wing of the unmanned vehicle 279 Propeller attached to the unmanned vehicle 280 Fuselage (or the main body of the unmanned aerial vehicle for the fixed wing platform)

281 Wing for the unmanned aerial vehicle (with or without solar cells or photovoltaic cells)

282 Winglet for drag reduction

283 Vertical/horizontal stabilizers and rudder

284 Unmanned aerial vehicle with multiple of distributed and interchangeable electric propulsion pods (with easy attachment of the propulsion pods to the vehicle via lock/unlock mechanisms)

285 Autonomous ground vehicle for removal/refueling of the distributed and interchangeable electric propulsion pods 286 Common hydrogen fuel manifold to transfer hydrogen fuel from the refueling infrastructure to the depleted hydrogen storage medium located inside the distributed and interchangeable electric propulsion pod 287 Robotic arms, robotic grabbing mechanisms or robotic solutions to remove or exchange or aid in the refueling of the distributed and interchangeable electric propulsion pods 288 Storage/stowage section for the depleted or refueled distributed and interchangeable electric propulsion pods 289 Discharge interface located on the autonomous ground vehicle to transfer the hydrogen fuel from the autonomous ground vehicle's common hydrogen manifold to the interface of the depleted hydrogen storage medium located inside the distributed and interchangeable electric propulsion pod 290 Steering mechanism of the autonomous ground vehicle for the refueling of the distributed and interchangeable electric propulsion pods 291 Autonomous ground hydrogen supply tank 292 Hydrogen fuel stored inside the hydrogen tank located on the autonomous ground hydrogen supply tank 293 Discharge interface to transfer the hydrogen from the autonomous ground hydrogen supply tank to the autonomous ground vehicle carrying the depleted distributed and interchangeable electric propulsion pods 294 Hydrogen transfer line to transfer the hydrogen from the autonomous ground hydrogen supply tank to the autonomous ground vehicle carrying the depleted distributed and interchangeable electric propulsion pods 295 Hydrogen receiving mechanism to the autonomous ground vehicle carrying the depleted distributed and interchangeable electric propulsion pods
296 Hydrogen discharge mechanism located in the building, warehouse, hangar, or an infrastructure that has the capability of transferring hydrogen fuel throughput the entire facility
297 Hydrogen discharge points located in the building, warehouse, hangar, or an infrastructure that has the capability of transferring hydrogen fuel throughput the entire facility
298 Hydrogen fuel transfer pipeline existing within the building, warehouse, hangar, or an infrastructure to carry the hydrogen fuel to the hydrogen discharge points located within the facility
299 Cross section of the building, warehouse, hangar or the infrastructure that contains the hydrogen refueling stations or hydrogen refueling plants
300 Hydrogen refueling stations or hydrogen refueling plants
301 Liquid hydrogen receiving mechanism located on the autonomous ground vehicle carrying the depleted distributed and interchangeable electric propulsion pods
302 Liquid hydrogen discharge mechanism located on the liquid hydrogen generator or liquid hydrogen supplying building, warehouse, hangar, or an infrastructure
303 Liquid hydrogen generator or liquid hydrogen supplying building, warehouse, hangar, or an infrastructure
304 Hydrogen storage or hydrogen generation module
305 Primary compressor, secondary compressor, booster pump, gas cleanup, etc. hardware required to condition the hydrogen gas for its liquefaction
306 Intermediary storage to store the hydrogen gas
307 Discharge points for hydrogen gas to the hydrogen liquefier module
308 Hydrogen gas transfer lines to transport the hydrogen to the hydrogen liquefier module
309 Hydrogen liquefier module
310 Individual hydrogen liquefiers
311 Liquid hydrogen transfer lines
312 Manned ground hydrogen fuel supply tanker
313 Modular solar powered hydrogen generators
314 Solar cells or photovoltaic cells to covert light into electrical energy
315 Hydrogen farm that is comprised of multiple modular solar powered hydrogen generation units
316 Automated storing/battery module exchanging or recharging station for the unmanned vehicle
317 Charged or unused battery module storing section
318 Charged or unused battery module storage rack with dispensing mechanism
319 Charged or unused battery modules
320 Conveyer belt to transport charged/unused battery modules to the exchanging station
321 Conveyer belt to transport discharged or depleted battery modules to the storage section designated for depleted batteries
322 Discharged or depleted battery module
323 Empty rack to place the discharged or depleted battery module
324 Discharged or depleted battery module storage rack with dispensing mechanism
325 Battery module lifting mechanism
326 Battery module lock/unlocking mechanism
327 Robotic grasping or robotic arm with charging capability to either exchange the battery modules or recharge the battery modules

The invention claimed is:

1. An autonomous refueling vehicle for a hydrogen-electric aircraft, wherein the hydrogen-electric aircraft comprises
at least two wings, and
at least one removable electric propulsion pod that is attached to one of the two wings, the at least one removable electric propulsion pod comprising
a body that comprises a hydrogen refueling interface for receiving hydrogen, and
a lock and unlock mechanism being adapted to removably attach the body to one of the two wings,
the autonomous refueling vehicle comprising
a hydrogen refueling module being adapted to connect to the hydrogen refueling interface and to a hydrogen source, and
a propulsion pod handling device being adapted to activate the lock and unlock mechanism to remove the at least one removable electric propulsion pod from one of the two wings, and to position the at least one removable electric propulsion pod on the hydrogen refueling module such that the hydrogen refueling interface is connected to the hydrogen refueling module,
wherein the autonomous refueling vehicle is adapted to autonomously move itself to the hydrogen source to allow the hydrogen refueling module to removably connect to the hydrogen source for refueling of the removable electric propulsion pod.

2. The autonomous refueling vehicle according to claim 1, wherein the propulsion pod handling device is further adapted to attach the at least one removable electric propulsion pod to one of the two wings.

3. The autonomous refueling vehicle according to claim 1, wherein the hydrogen refueling module comprises
a hydrogen receiving interface being adapted to connect to the hydrogen source,
a chamber being connected to the hydrogen receiving interface, and
a plurality of recesses with hydrogen discharge ports, the hydrogen discharge ports being connected to the chamber,
wherein each recess is adapted to receive the at least one removable electric propulsion pod for allowing the hydrogen discharge port to be connected to the hydrogen refueling interface of the at least one removable electric propulsion pod.

4. The autonomous refueling vehicle according to claim 1, wherein the propulsion pod handling device comprises at least one robotic arm with at least one robotic grasping mechanism, the robotic grasping mechanism being adapted to position the at least one removable electric propulsion pod on the hydrogen refueling module.

5. The autonomous refueling vehicle according to claim 1, wherein the propulsion pod handling device comprises a hydrogen refueling module elevating assembly being adapted to vertically move the hydrogen refueling module towards and away from the at least one removable electric propulsion pod.

6. The autonomous refueling vehicle according to claim 5, wherein the propulsion pod handling device further comprises at least one lift and catch mechanism being adapted to attach the at least one removable electric propulsion pod to one of the two wings.

7. The autonomous refueling vehicle according to claim 1, wherein the at least one autonomous refueling vehicle further comprises at least two wheels being adapted to move towards and away from the hydrogen-electric aircraft.

8. The autonomous refueling vehicle according to claim 7, wherein the at least one autonomous refueling vehicle further comprises a mono-directional steering mechanism being adapted to direct the at least two wheels to move in one direction.

9. The autonomous refueling vehicle according to claim 7, wherein the at least one autonomous refueling vehicle further comprises a multi-directional steering mechanism being adapted to direct the at least two wheels to move in multiple directions.

10. An autonomous hydrogen refueling infrastructure comprising
   an autonomous refueling vehicle according to claim 1, and
   a hydrogen source for providing hydrogen to the autonomous refueling vehicle.

11. The autonomous hydrogen refueling infrastructure according to claim 10, wherein the hydrogen source comprises an autonomous movable hydrogen supply tank.

12. The autonomous hydrogen refueling infrastructure according to claim 11, wherein the autonomous movable hydrogen supply tank comprises at least two wheels with a multidirectional steering mechanism being adapted to move in multiple directions.

* * * * *